United States Patent
Thomson et al.

(10) Patent No.: US 8,464,229 B2
(45) Date of Patent: *Jun. 11, 2013

(54) CREATION OF FORM-BASED SOFTWARE APPLICATION IN A GRAPHICAL USER INTERFACE (GUI) ENVIRONMENT

(75) Inventors: Neil Thomson, Inverness (GB); Grzegorz Roman Pusz, Wroclaw (PL)

(73) Assignee: Microgen Aptitude Limited (GB)

( * ) Notice: Subject to any disclaimer, the term of this patent is extended or adjusted under 35 U.S.C. 154(b) by 738 days.

This patent is subject to a terminal disclaimer.

(21) Appl. No.: 12/648,617

(22) Filed: Dec. 29, 2009

(65) Prior Publication Data

US 2011/0161941 A1    Jun. 30, 2011

(51) Int. Cl.
*G06F 9/45*    (2006.01)
*G06F 9/44*    (2006.01)

(52) U.S. Cl.
USPC .............................. 717/140; 717/141; 714/15

(58) Field of Classification Search
USPC ................. 717/139–145; 714/15–71
See application file for complete search history.

(56) References Cited

U.S. PATENT DOCUMENTS

| | | | |
|---|---|---|---|
| 4,333,144 A | 6/1982 | Whiteside et al. | |
| 4,885,684 A | 12/1989 | Austin et al. | |
| 5,075,847 A | 12/1991 | Fromme | |
| 5,265,249 A | 11/1993 | Kumamoto | |
| 5,276,881 A | 1/1994 | Chan et al. | |
| 5,301,270 A | 4/1994 | Steinberg et al. | |
| 5,625,823 A | 4/1997 | Debenedictis et al. | |
| 5,651,108 A | 7/1997 | Cain et al. | |
| 5,748,963 A | 5/1998 | Orr | |

(Continued)

FOREIGN PATENT DOCUMENTS

| | | |
|---|---|---|
| EP | 0640914 | 3/1995 |
| EP | 1643435 | 4/2006 |
| EP | 1686466 | 8/2006 |
| WO | WO 03/050677 | 6/2003 |

OTHER PUBLICATIONS

Habegger et al, "Web services for information extraction from the web", IEEE pp. 279-286, 2004.*

(Continued)

*Primary Examiner* — Anil Khatri
(74) *Attorney, Agent, or Firm* — Thompson Hine L.L.P.

(57) ABSTRACT

A method of creating a form-based web application using a computing device having at least a processor, a memory, a display device and an input device. The method includes retrieving from the memory and providing on the display device a number of form icons, each form icon representing a form to be displayed to a user of the application. The method further includes retrieving from said memory and providing on the display device a number of service icons, each service icon representing a service which may be called in response to actions of the user. The method further includes allowing a developer of the application to use the input device to select one or more of the form icons and one or more of the service icons and to arrange the selected icons on the display device. The method also includes allowing the developer to use the input device to arrange links between the selected icons, wherein the links together with the selected icons form an Application Diagram which represents the navigation of a user of the application between the forms and services represented by the selected form and service icons respectively. The method further includes compiling, at the processor, the application on the basis of the Application Diagram.

17 Claims, 113 Drawing Sheets

Working Environment of the
General Application

U.S. PATENT DOCUMENTS

| | | | |
|---|---|---|---|
| 5,761,656 | A | 6/1998 | Ben-Shachar |
| 5,987,246 | A | 11/1999 | Thomsen et al. |
| 6,002,867 | A | 12/1999 | Jazdzewski |
| 6,144,984 | A | 11/2000 | DeBenedictis et al. |
| 6,185,728 | B1 | 2/2001 | Hejlsberg |
| 6,915,301 | B2 * | 7/2005 | Hirsch ............... 717/100 |
| 6,968,536 | B2 * | 11/2005 | Jazdzewski ............ 717/106 |
| 6,985,900 | B2 | 1/2006 | Codd et al. |
| 7,424,542 | B2 * | 9/2008 | Herrod ............... 709/227 |
| 7,487,395 | B2 * | 2/2009 | van Ingen et al. ........ 714/16 |
| 7,565,647 | B2 * | 7/2009 | Davidov et al. .......... 717/140 |
| 7,634,766 | B2 * | 12/2009 | Ali et al. .............. 717/141 |
| 7,818,729 | B1 * | 10/2010 | Plum et al. ............ 717/140 |
| 7,873,948 | B2 * | 1/2011 | Sentovich et al. ........ 717/140 |
| 7,895,566 | B2 * | 2/2011 | Shenfield et al. ........ 717/107 |
| 7,921,408 | B2 * | 4/2011 | Shenfield et al. ........ 717/107 |
| 8,087,009 | B1 * | 12/2011 | Cornish .............. 717/143 |
| 8,140,894 | B2 * | 3/2012 | Thomson et al. ......... 714/15 |
| 8,141,033 | B2 * | 3/2012 | Gupta et al. ........... 717/105 |
| 8,261,231 | B1 * | 9/2012 | Hirsch et al. .......... 717/100 |
| 8,397,223 | B2 * | 3/2013 | Chiang .............. 717/145 |
| 2001/0034562 | A1 | 10/2001 | Aumer et al. |
| 2006/0247805 | A1 | 11/2006 | Thomson et al. |
| 2007/0055964 | A1 | 3/2007 | Mirkazemi et al. |

OTHER PUBLICATIONS

Sunshine et al, "DynXML: safely programminig the dynamic web", ACM pp. 29-38, 2010.*

Puder, "A cross language framework for developing AJAX applications", ACM pp. 105-112, 2007.*

Mickens et al, "Atlantis: Robust, extensible execution environments for web applications", ACM, pp. 217-231, 2011.*

EP, European Search Report, European Application No. 10196007.8 (Jun. 29, 2011).

Beecher, V. et al., "Oracle® Fusion Middleware, Developer's Guide for Oracle SOA Suite 11g Release (Jan. 1, 2011) E10224-01," Chapters 1, 14 and 18 (May 2009).

Gurd, J.R. et al., "The Manchester Prototype Dataflow Computer," *Communications of the ACM*, vol. 28, No. 1, pp. 34-52 (Jan. 1985).

Strom, R. et al., "Poster Submission—A Visual Environment for Distributed Object-Oriented Multi-Applications," OOPSLA '92, Addendum to the Proceedings, pp. 205-206, Vancouver, British Columbia (Oct. 1992).

Linthicum, D.S., "Get the Picture with Visual Programming," *Application Development Trends*, pp. 52-58 (Feb. 1994).

Dyer, D.S., "Visualization. A Dataflow Toolkit for Visualization," *IEEE Computer Graphics and Applications*, vol. 10, No. 4, pp. 60-69 (Jul. 1990).

"Breaking the Software Development Bottleneck," AVS/Express, Advanced Visual Systems Inc. (Mar. 1994).

Veen, Arthur H., "Dataflow Machine Architecture," *ACM Computing Surveys*, vol. 18, No. 4, pp. 365-396 (Dec. 1986).

* cited by examiner

Application Diagram

Sub-Page for Hierarchical form

Application Navigation

Form Template with Menu

Security Roles Declaration

Aptitude Application Deployment

Working Environment of the
General Application

Single Transaction regions

BP containing one-transaction region

BP containing three transaction regions
and two transaction boundary nodes

| | | |
|---|---|---|
| ↓ My Projects\Sale Transaction\Execution Properties * | | |
| General | Parameters | |

| | Name | |
|---|---|---|
| ⊟ | Execution | |

| | Name | Value |
|---|---|---|
| | Fast Mode | ☐ |
| | Thread pool size | 1 |
| | Automatic restart after failure | ☑ |
| ▶ | Internal data handling | Recovery ▼ |
| | Transactional batch size | 1000 |
| | Execution error handling | Reprocess Events ▼ |
| | Sourse events limit | 0 |
| | Enable data description in audit | ☐ |
| | Default Engine | |
| | Additional engines | |
| | Session sharing | No session sharing ▼ |

Figure 17

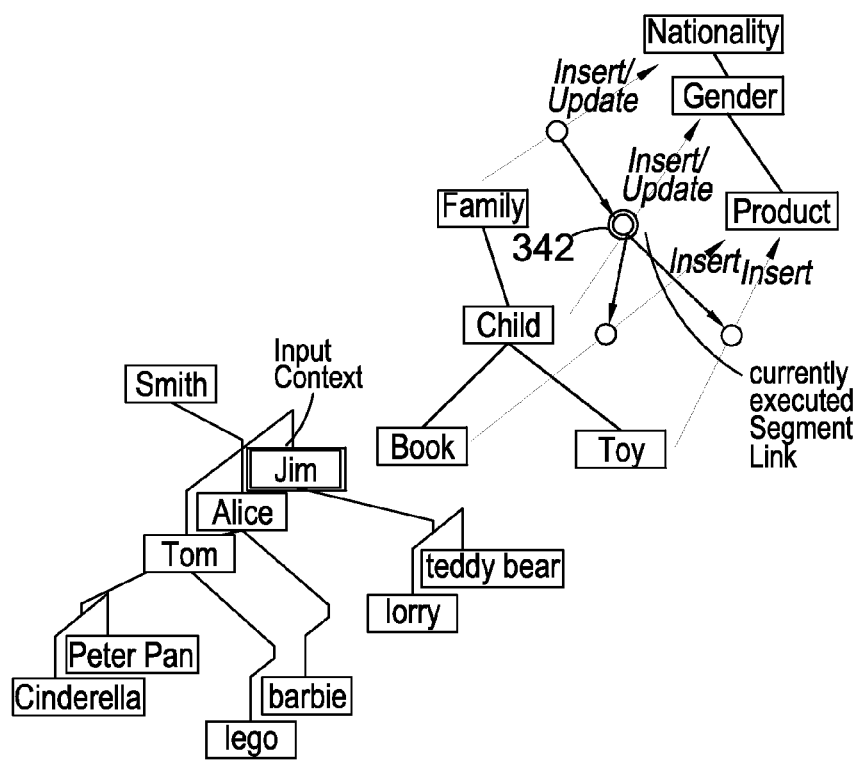
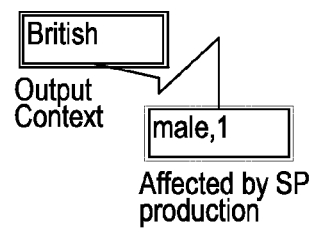
Figure 21

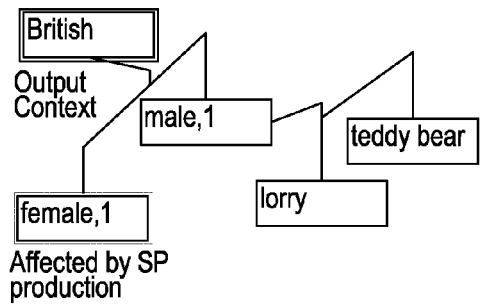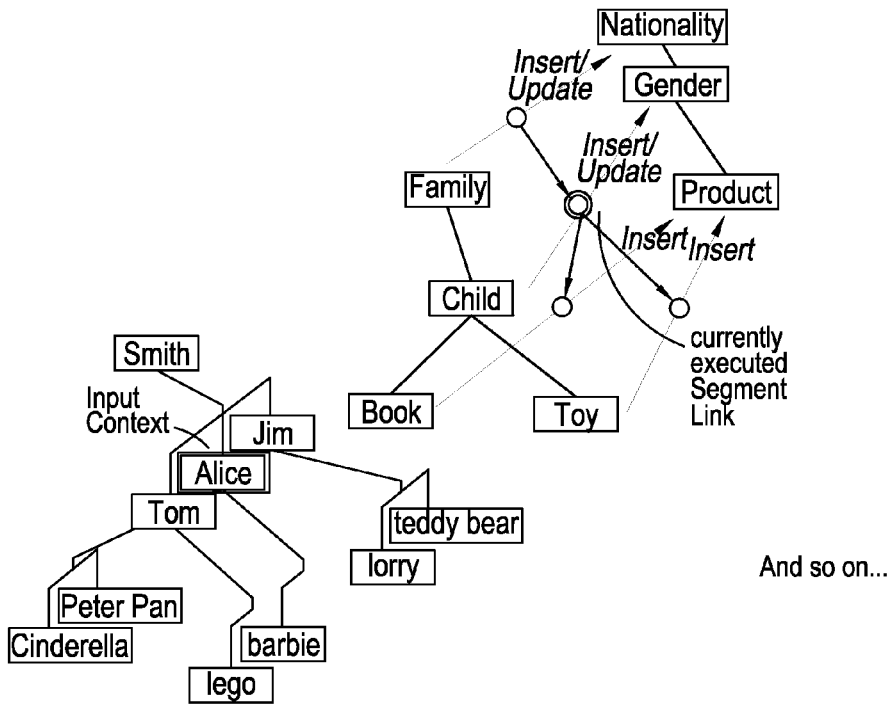
Figure 25

STRUCTURE CLONING

STRUCTURE PRUNING

STRUCTURE GRAFTING

STRUCTURE SPLITTING

STRUCTURE FLATTENING
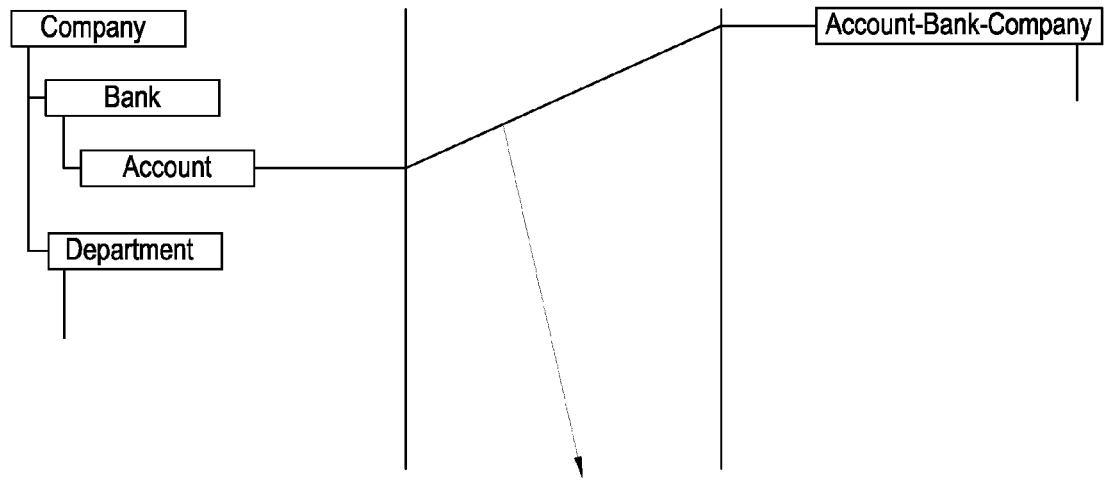
Segment Link Attribute Mapping
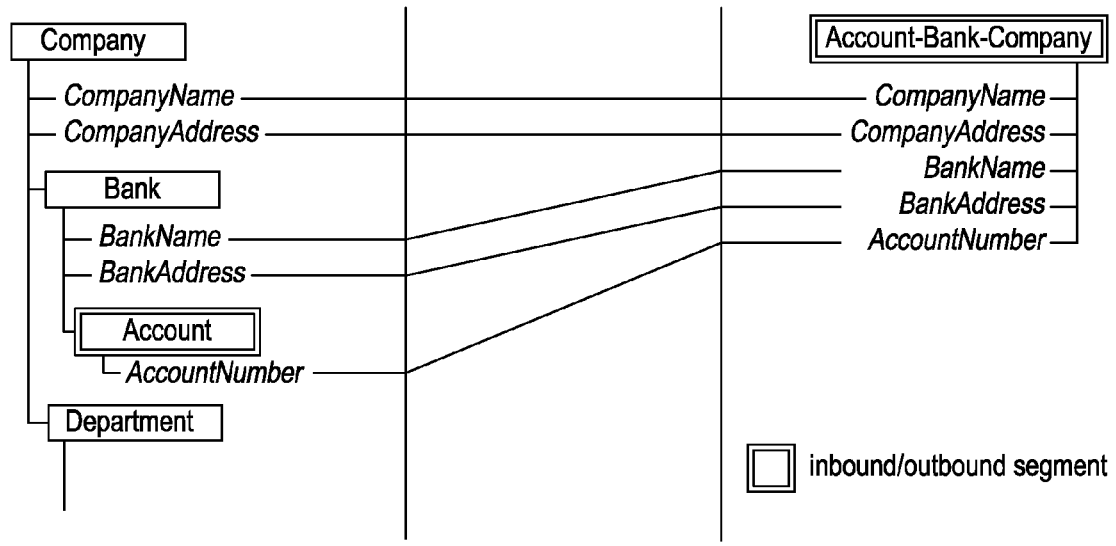
Figure 34

Rule "Calculate Customer Portfolio" for calculation of a total return on a portfolio Rule template "Calculate Sector Return" for calculation total return on a portfolio Rule "Calculate Sector Return" for calculation total return on a portfolio

```
Root
|_Customer
        |_Portfolio
        |       |_ Bonds
        |       |_ Shares
        |_Account Data
```

Figure 51a

```
|_Portfolio
        |_Sector
                |_ Child Sector
                |_ Assets
```

Figure 51d i) Employee (firstname, lastname, date of birth)
|_Promotion (date, position, salary, salary raise percentage)
|_Skill (name of skill, degree)
|_Course (name, date from, date to)

ii)

| Key | Value |
|---|---|
| 11223133 | Employee ("Robert", "Smith", 10.03.1970)<br>|_Promotion (20.02.2008, "salesman", 3000, 0%)<br>|_Promotion (12.10.2008, "sales manager", 4500, 50%)<br>|_Promotion (06.08.2009, "sales senior manager", 6000, 33%)<br>|_Skill ("driving licence", "")<br>|_Course ("Marketing techniques", 03.04.2009, 08.04.2009) | iii)

| Key | Value |
|---|---|
| 49128988 | Employee ("Alice", "Littlewood", 21.05.1977)<br>|_Promotion (12.10.2008, "senior sales manager", 5000, 0%)<br>|_Promotion (06.08.2009, "head manager", 10000, 100%)<br>|_Course ("Persuading techniques", 10.01.2009, 14.01.2009) |

Figure 53 i)
Scenario 1

640 reader 1 -------- R0------------------------------R0--------Tc
642 writer     ------------------W1------------ Tr ii)
Scenario 2

644 reader 1 -------- R0---------------R0------------------------Tc
646 writer 1 ------------------W1------------ Tc
648 writer 2 -----------------------------***********W2--------- Tc iii)
Scenario 3

650 reader 1 ---------------R0------------------------------R1--------Tc
652 reader 2 ----R0---------------------------R0------------Tc
654 writer     ------------------W1------------ Tc

Figure 58

Normal Skew Kurtotic Probability Distribution, its Chart, and its Hint

Histogram Probability Distribution and its chart

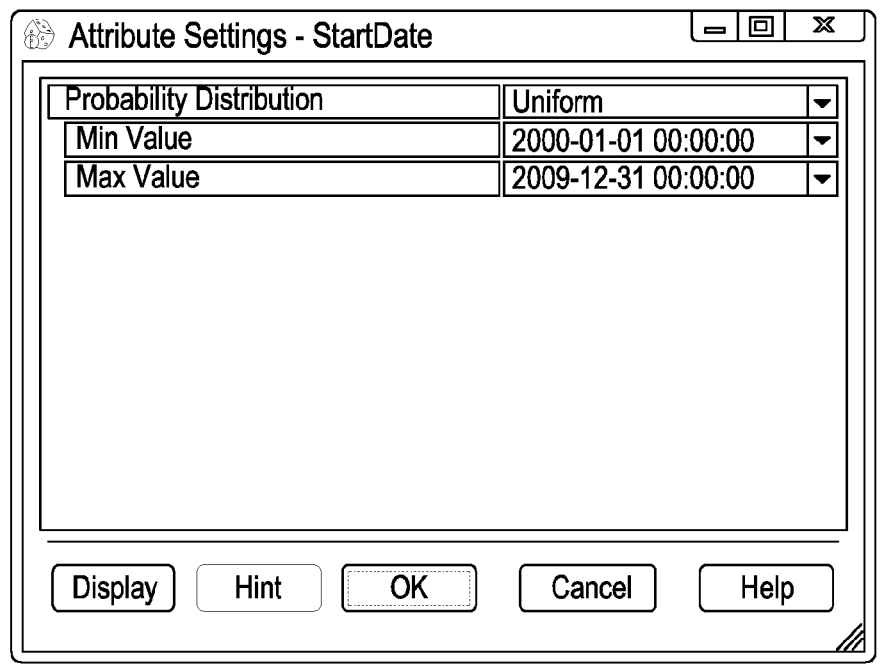
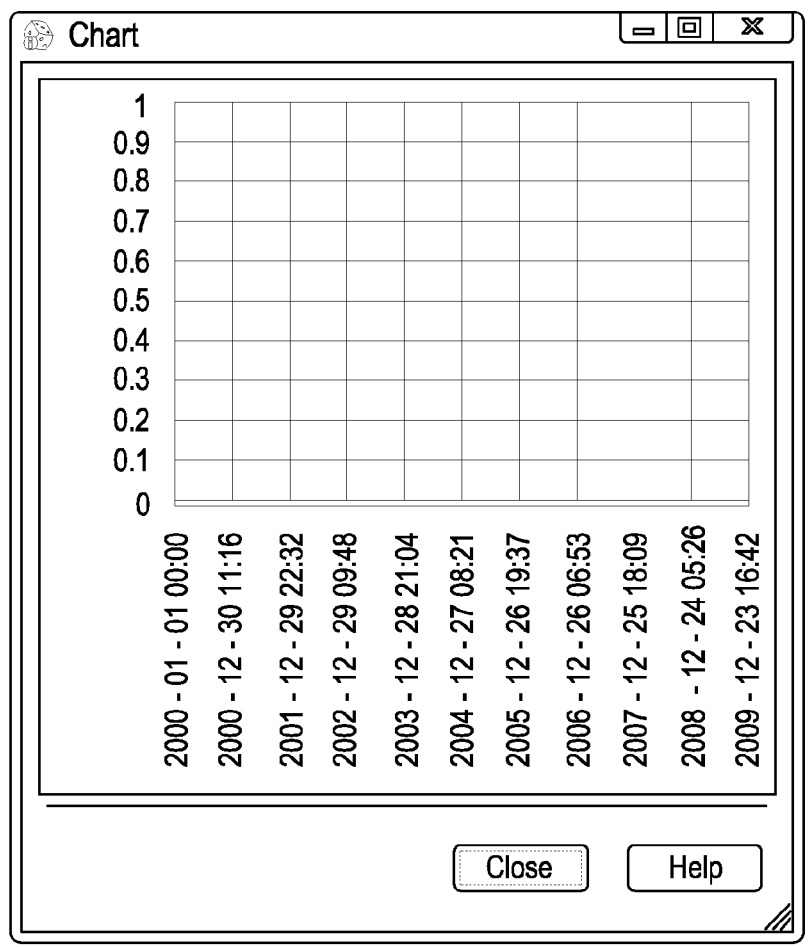
Uniform Probability Distribution and its chart
Figure 67

| 2009-11-23 11:10:30 | | | |
|---|---|---|---|
| Name | Indicator Name | Value | Date |
| ▲ Employee\BPMonitoringNodeBlocksMonitoringNode | Avg Salary | 12962.206172519206 | 2009-11-23 11:10:30 |
| Employee\BPMonitoringNodeBlocksMonitoringNode | Sum Salary | 7615323.7035115237 | 2009-11-23 11:10:30 |
| Employee\RoutingBlocks\Salary Rage | Processing Time | 0.871894 | 2009-11-23 11:10:30 |
| Employee\BPNoOperationBlocks\Salary > 30k | Processing Time | 0.006836 | 2009-11-23 11:10:30 |
| Employee\BPNoOperationBlocks\20k < Salary <= 30k | Processing Time | 0.056624 | 2009-11-23 11:10:30 |
| Employee\BPNoOperationBlocks\10k <= Salary | Processing Time | 0.202089 | 2009-11-23 11:10:30 |
| Employee\BPNoOperationBlocks\10k < Salary <= 20k | Processing Time | 0.407141 | 2009-11-23 11:10:30 |

Figure 72

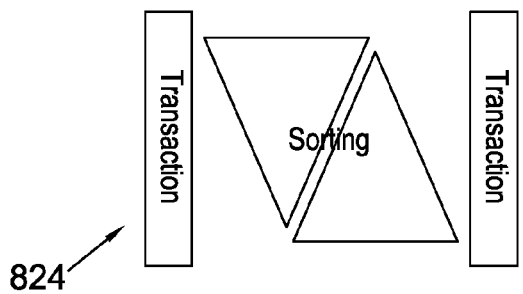
Figure 82
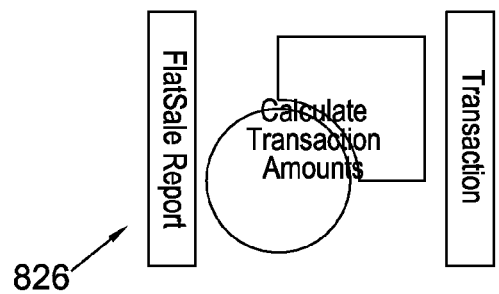
Figure 83
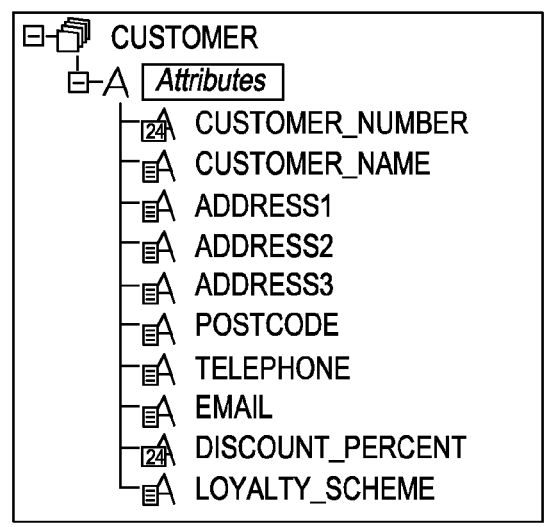
(a)
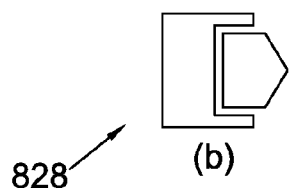
(b)
Figure 84

| | | | |
|---|---|---|---|
| | Transactional batch size | | 1000 |
| ▶ | Execution error handling | Reprocess Events | ▼ |
| | Source events limit | Reprocess Events | 838 |
| | Number of Projects running in parallel | Reprocess Events (Optimistic Mode) | 848 |
| | Default Engine | Continue Processing | 840 |
| | Additional Engines | Break Batch Processing | 842 |
| | Session sharing | Stop Microflow Execution | 844 |
| | COM + threading model | Mark Batch As Error | 846 |
| | | Multi-Threaded Apartment | |

CREATION OF FORM-BASED SOFTWARE APPLICATION IN A GRAPHICAL USER INTERFACE (GUI) ENVIRONMENT

The invention relates to form-based applications and related areas.

BACKGROUND OF THE INVENTION

The present specification describes features of a new product known as Microgen Aptitude V3.00. This product is a development of Microgen's earlier Aptitude product which is described in U.S. patent application Ser. No. 11/341,156 (publication no US-2006-0247805-A1) and corresponding European Patent Application No 06100913.0 (publication no 1,686,466), the contents of which are incorporated herein by reference.

Aptitude is a program with a graphical interface which allows users to create complex applications without knowledge of traditional programming languages.

SUMMARY OF THE INVENTION

The invention provides a method of creating a form-based application using a computing device having at least a processor, a memory, a display device and an input device, the method comprising:
  retrieving from said memory and providing on said display device a number of form icons, each form icon representing a form to be displayed to a user of the application;
  retrieving from said memory and providing on said display device a number of service icons, each service icon representing a service which may be called in response to actions of said user;
  allowing a developer of the application to use said input device to select one or more of said form icons and one or more of said service icons and to arrange the selected icons on the display;
  allowing the developer to use said input device to arrange links between said selected icons, wherein said links together with the selected icons form an Application Diagram which represents the navigation of a user of the application between the forms and services represented by the selected form and service icons respectively; and
  compiling, at said processor, said application on the basis of said Application Diagram.

The invention also provides a computer programmed to perform a corresponding method, and a computer readable medium containing computer-readable instructions for performing a corresponding method.

The invention also provides method of deploying a form-based application to a web server comprising:
  first compiling the application into an intermediate language to form a deployment package which is technology independent and which may be deployed to more than one web technology;
  compiling said deployment package to form a final application in a particular technology; and
  deploying said final application to said web server.

The invention further provides a method of creating a form for a form-based application using a computing device having at least a processor, a memory, a display device and an input device, the method comprising:
  retrieving from said memory and providing on said display device a number of controls for use in a form;
  allowing a developer of the application to create a form template and use said input device to select one or more of said controls on the display and to arrange the controls on the form template so as to define the layout of the form template; and
  allowing the developer to create a form based on the layout of the form template.

BRIEF DESCRIPTION OF THE DRAWINGS

FIG. 17 shows a window in which the developer can set execution properties;

FIGS. 20 to 25 show six initial stages in the execution of the Hierarchy Transformation algorithm in relation to the example of FIG. 18;

FIGS. 30 to 37 show different types of transformations which can be performed by the Aptitude software, using the algorithm of FIG. 19;

FIGS. 51A, B and D illustrate schematically various exemplary path structures for data objects, and FIG. 51C illustrates schematically rules called from another rule;

FIG. 53 shows an exemplary Data Object and exemplary transactional variables;

FIG. 58 illustrates exemplary scenarios illustrating reading and writing restrictions for variables;

FIG. 67 shows an exemplary user interface for allowing a developer to select a uniform probability distribution and an associated chart;

FIG. 72 is an exemplary grid output of a monitoring node;

FIG. 82 illustrates schematically in a block diagram a sorting node according to an embodiment of the invention;

FIG. 83 illustrates schematically in a block diagram a transformation node according to an embodiment of the invention;

FIG. 84 illustrates an exemplary data object and source node;

FIG. 86 shows an exemplary user interface for defining an error handling mode for a data processing function;

DETAILED DESCRIPTION OF THE INVENTION

In order to provide the reader with a full understanding of the context of the invention we have included here a description of many different features of Microgen Aptitude. However, we direct the reader particularly to FIGS. 1 to 11 and their associated description, which are particularly relevant to understanding of the present invention.

An Aptitude Project (a single development and deployment unit) is created by a user of the Aptitude software (hereinafter also referred to as a developer), in order to define a final Aptitude Application which is then used by an end user. The Aptitude Project contains the following elements designed as application building blocks:

1) An Application Diagram, which is a diagram describing the navigation of an end user through the final Aptitude Application, in a modeless manner;

2) One or more Application Forms—each form comprising one or more User Interface Pages containing the pages' layouts and a tree-like diagram defining modal navigation between the pages;

3) One or more Application Form Templates, each Template being a definition of a part of a User Interface Page; and 4) User Interface (UI) Preferences, which define a set of CSS (Cascading Style Sheets) classes customizing the look and feel of a web page and its elements.

Figure 1:
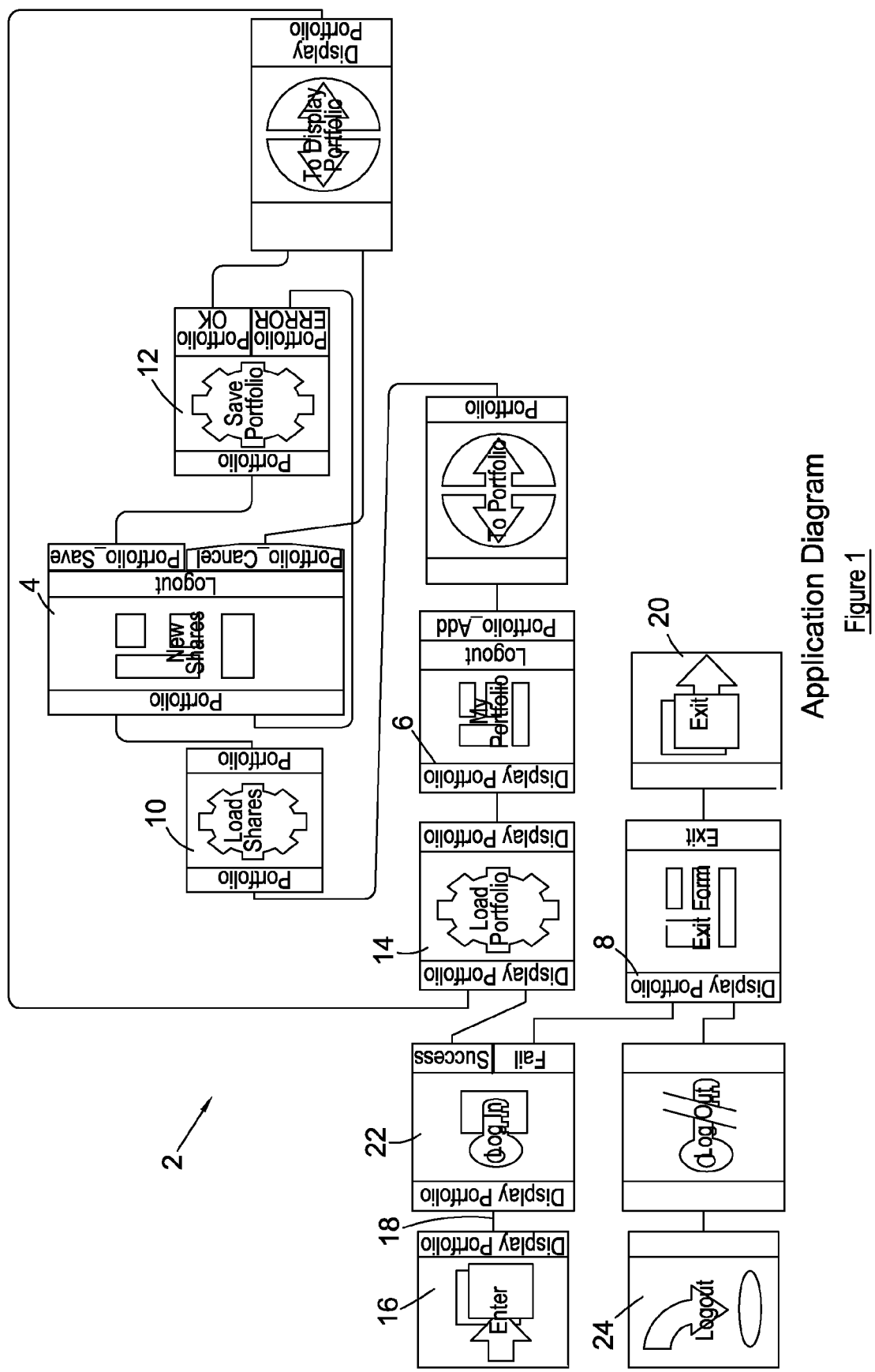
FIG. 1 shows an example Application Diagram which forms part of an Aptitude Project created by a user of the Aptitude software.

The Application Generator allows a user of Aptitude (ie a developer, as defined above) to create applications in which an end user can navigate between a number of forms and services, as illustrated in the example of FIG. 1. FIG. 1 shows graphical elements, or icons, and links therebetween, which the developer may manipulate on his/her computer screen, for example using drag and drop with a mouse, to create the application. FIG. 1 shows an application diagram 2 comprising form icons 4, 6, 8 (coloured orange) and service icons 10, 12, 14 (coloured blue) representing forms and services respectively. The developer can thereby create form-based applications, which can be web applications for use on the internet, but can also be used on a stand alone computer or network of computers. The forms display information to the end user of the application, and present the user with choices, for example buttons and other controls, and the services perform processing, sometimes at the request of the forms.

We refer to "modeless" navigation between forms, which allows the user to go from one form to any of a number of other forms. We also refer to "modal" navigation in which a form has one or more child pages, each of which opens on top of its parent. Any changes made by the user on a child page are not accepted until the user confirms the changes on a parent page. In the Application Diagram such child pages are not forms, but instead each form may represent a hierarchy or collection of (modal) pages, all of which can be used to modify a single data object. Thus the Application Diagram does not become cluttered by the child pages of modal forms, but remains clear and simple for the developer to use. Indeed to keep the Application Diagram even simpler, some services are not shown in the diagram, for example if the service has no input or output or just processes form data.

The forms and services are themselves built by the developer by manipulating icons and links within Aptitude. The links between the form and service icons represent both the navigation path of the end user and the flow of data between the forms and services. The Application Diagram defines an application which will ultimately reside, together with the forms, on a web server, whereas the services ultimately reside on an Aptitude server, as will be described below.

The following Aptitude Project elements are shared with the Services implementation:

Data Object—the business data model definition used both for programming the processing and describing the state of the Form and Application User Session.

Aptitude Services—the means of programming in Aptitude and the interface for calling the processing routines. Microflows, Rules and Hierarchy Transformations are graphically implemented processing units published on the internal bus as Aptitude Services. Additionally Web Services are wrapped by Aptitude Web Service References and also internally published as Aptitude Services. Aptitude Services can be called from Diagrams and Forms as handlers of user actions.

Devices (Database, LDAP, Aptitude Bus)—used to describe the access to the Aptitude Bus Server or the security server.

File Attachments—contain all binary elements of the user front-end like: pictures, custom security plug-ins or custom user controls plug-ins.

Security Roles—a list of security roles

Localization and Translations—used for localizing user messages both in processing and the user front-end.

The Application Diagram 2 is a crucial element of the Application Generator. Its general function is to define the navigation between forms (eg. 4, 6, 8) and services (eg. 10, 12, 14) in the front-end application (which resides on a web server). To understand how it works one has to look at it from the deployed application user's perspective. When a user types a web address into an internet browser he/she enters the application. This moment is represented by the Enter block 16 in the Application Diagram 2. From that moment the user navigates through the application along the links (eg 18) between the icons. Two important blocks on the diagram are:

Form Blocks (eg 4, 6, 8)—each representing a single Page displayed to an end user or a sub-diagram or hierarchy of Pages.

Service Call Blocks (eg 10, 12, 14)—each representing one of the services published and running on an Aptitude server.

Each form icon or block (eg 4, 6, 8) is associated with only one data object relating to all data associated with that form. We could say that navigating along the diagram links means displaying the pages in a modeless way, in that the pages are displayed one after another and all changes made by a user in one of them are committed before the next page is displayed.

Here we describe a second feature of the diagram 2—it also represents the transition of the state of the user session. For every end user that enters the Application a user session is created to store his application state. The user session (or application session) contains:

1. an instance of the application diagram (or actually a place in the diagram where the user currently is);

2. a Data Object representing the last known state of the last page the user has visited, the Data Object being stored in the user session; and 3. user security: name and roles (in cached mode)

The state of a user session is initialized in the Enter block 16 and includes an instance of the Data Object assigned to that block. Then the Data Object instance is passed to the next block along the link. Each block in the diagram can be treated as a routine modifying that instance or converting it to the instance of a different Data Object. We could easily imagine that the diagram depicts a flow of data representing the state of a single user session. Each user session relates to exactly one point of the diagram. There are as many instances of the application diagram as the number of users who have entered the application.

Other Blocks of the Application Diagram include:

Exit block 20—the user exits the application; his/her session is terminated

Login block 22—represents the user authentication

Logout block 24—from that point the user session does not contain user credentials Conversion—accepts any Data Object on the input and converts it to the output Data Object using Services or generates a default instance if the conversion is not defined.

Input/Output—allows embedding one diagram into another. Separating parts of the application into sub-diagrams is a way of handling the complexity of a large application.

Navigation Point/Navigation Jump—in some cases it is easier to have an invisible jump to a point in the application diagram instead of drawing a link. A good example is the Logout command usually accessible in all Pages.

The Application Diagram allows a developer to generate both web and desktop applications. The Application Diagram defines not only the user navigation between Forms but also the transition of the data introduced/modified by the user and the services (user session state).

We next describe features of the application forms.

Figure 2:
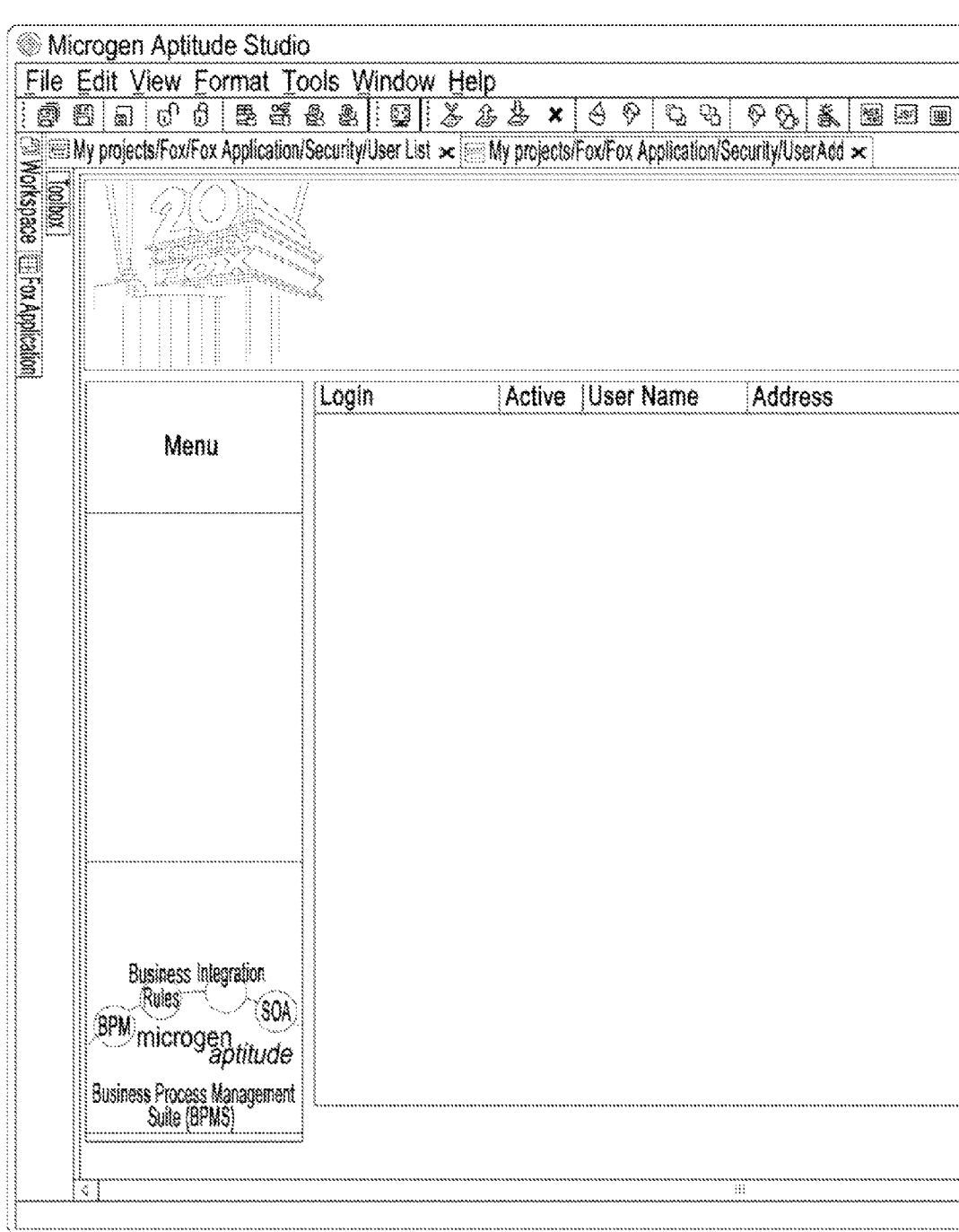
FIG. 2 shows a root page of an example hierarchical form which comprises a hierarchy of pages.
Figure 2:
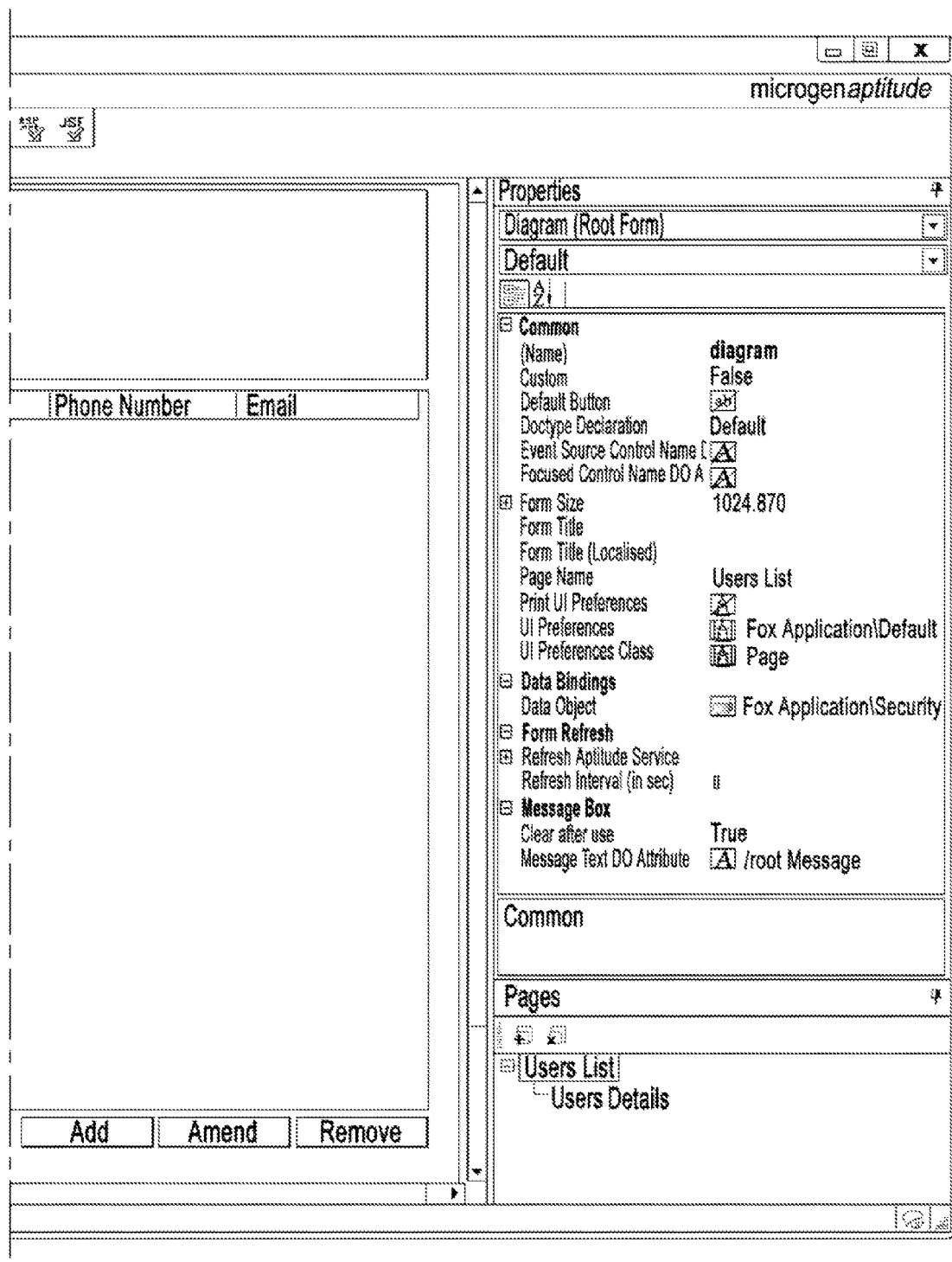
Figure 3:
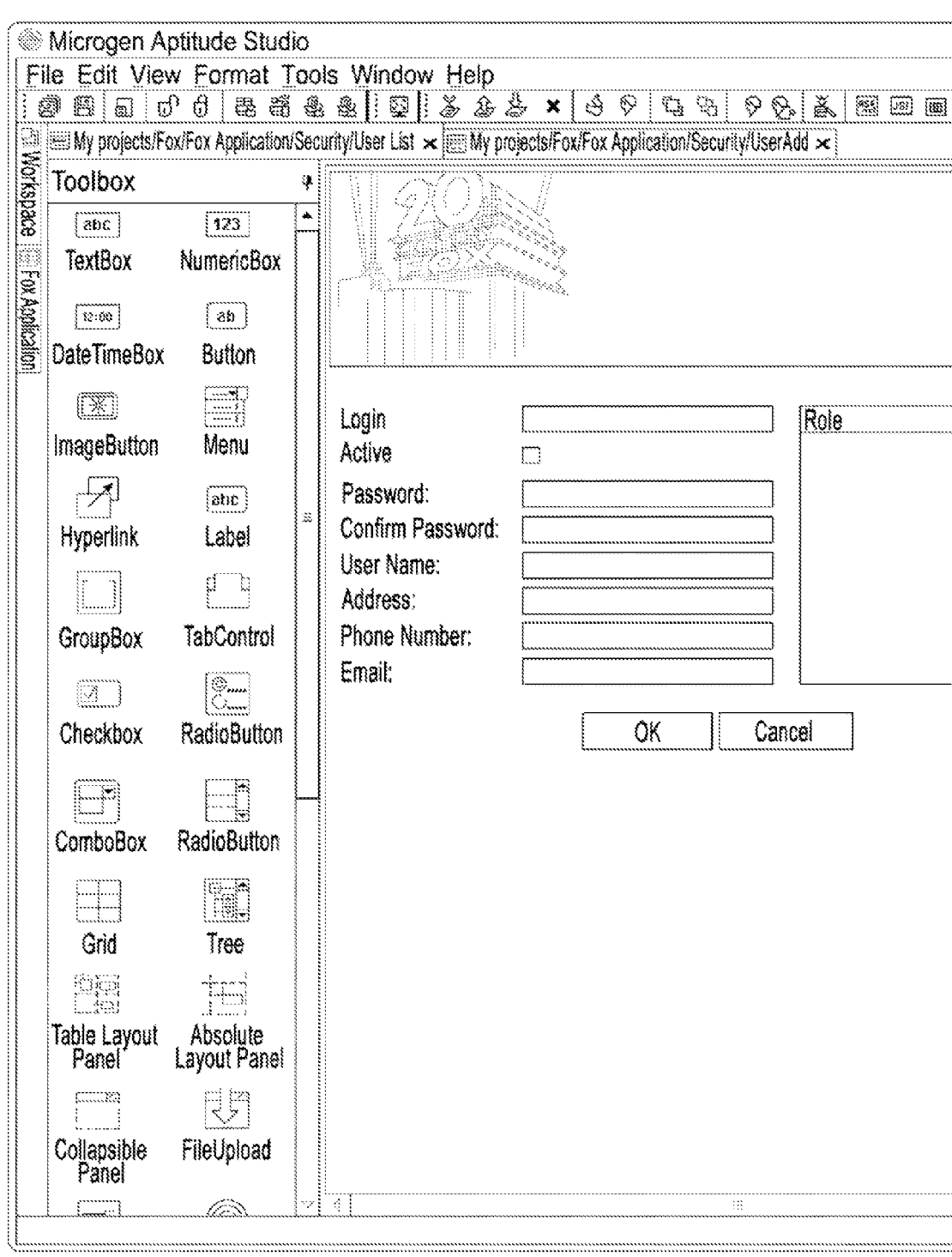
FIG. 3 shows a sub-page in the same hierarchical form as shown in FIG. 2.
Figure 3:
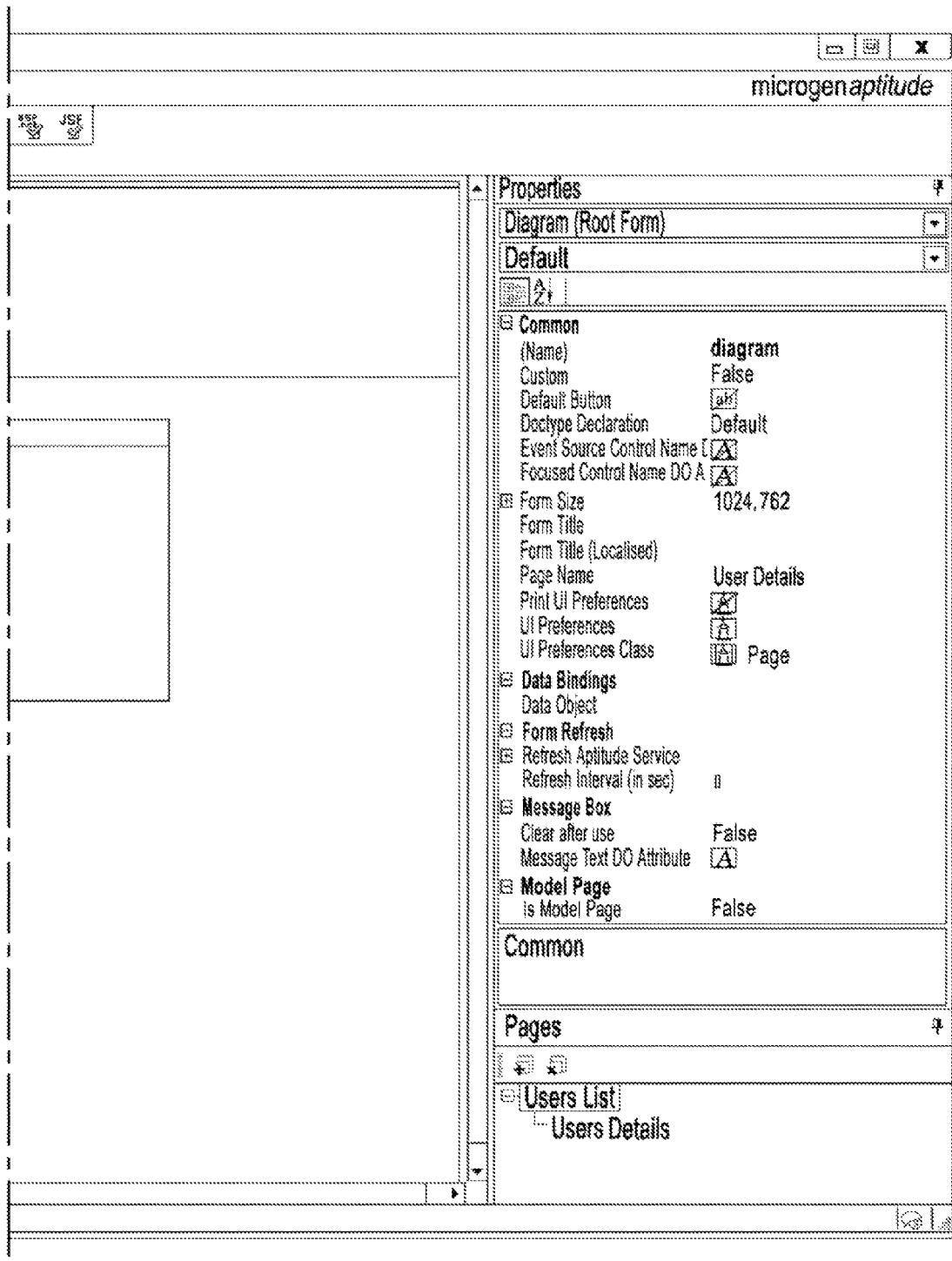

An Application Form can be a simple Page or a hierarchy of Pages comprising a Root Page, such as that shown in FIG. 2, and one or more Sub-Pages, such as that shown in FIG. 3.

An Application Form (even if it contains a whole hierarchy of Pages) stores and/or displays its data in and/or from one Data Object instance.

The hierarchy of Pages are called in a modal way (one page is displayed on top of another). Such a hierarchy modifies the common Data Object instance in a transactional way (in that either all changes to all pages are committed or none are). All the Pages modify the same Data Object instance but only the Modifying Output of the root Page commits the changes in a permanent way.

The buttons, links or menu commands in the form are represented as outputs of the Form Block (eg 4, 6, 8) in the Application Diagram 2.

Figure 4:
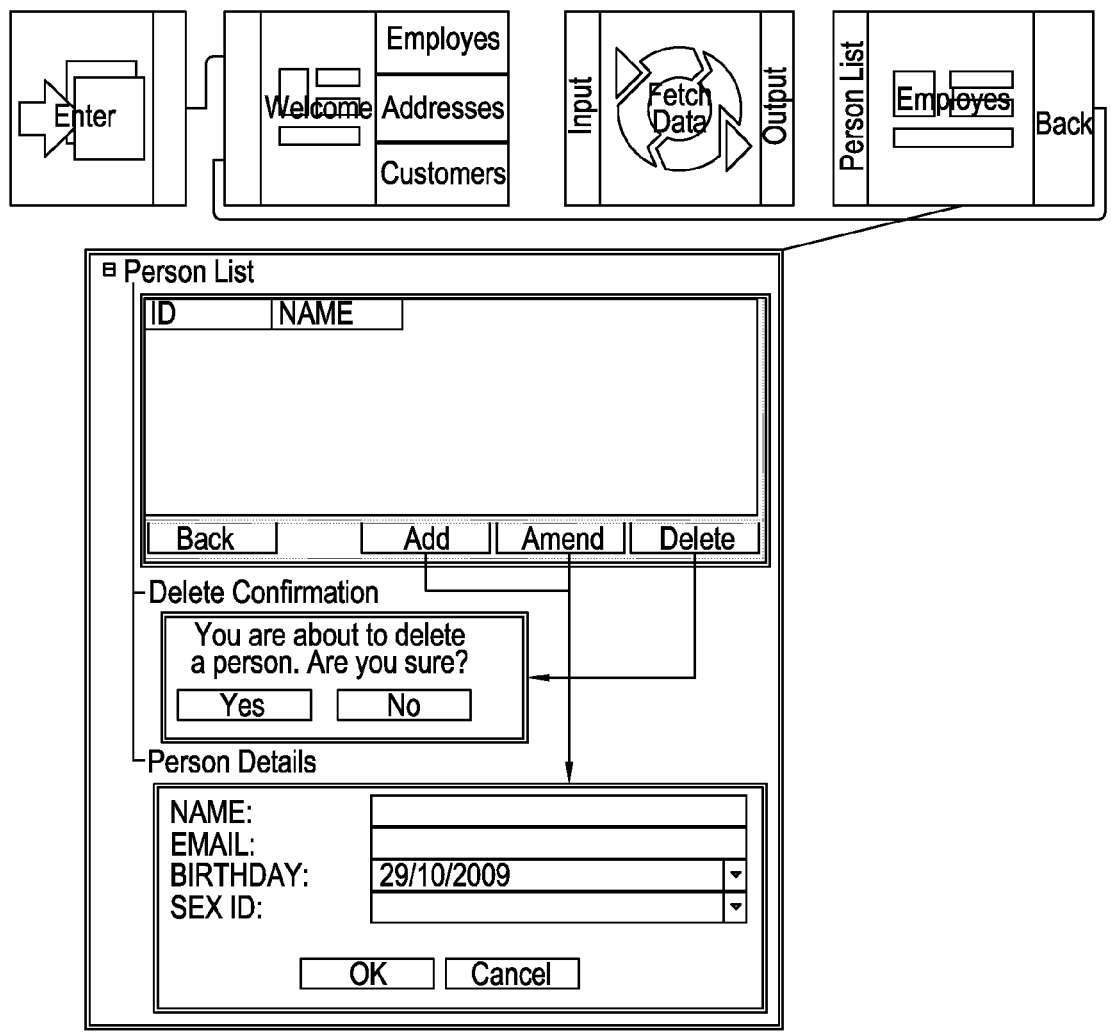
FIG. 4 shows an example Person List form which forms part of an Application Diagram, and illustrates application navigation.

A single Page includes the layout of the form controls, as illustrated by the "Person List" form shown in FIG. 4. The controls' Properties are properly bound to the Form's Data Object Segments and Attributes. The Services are assigned to the controls' events as their handlers.

An Aptitude Form has the following features:

a) It defines the user interface page layout;

b) It defines which handlers (i.e. services) are called in response to actions of the user (such as pressing buttons on the page). Some Form Blocks (eg Form Block 4 in FIG. 1) may have two or more outputs depending on which button has been pressed on a form; and c) The form may consist of a hierarchy of modally called pages constituting a single user transaction on the Application Diagram.

We have described two different navigation types, namely modeless and modal navigation, which are now further explained. The more natural is modeless navigation, typical for web pages. The user displays one page after another but never two at the same time. However there are cases when while displaying one page he wants to see another one at the top of the previous. Typical examples are details pop-up dialogs (in desktop applications) or user messages dialogs (e.g. with "yes/no" question). Such modal dialogs usually modify the data displayed on their parent form and in this way they constitute a user interaction transaction because the data changes are committed when the parent form is submitted. From such a form the user cannot easily navigate to another form. He may pop-up another modal dialog creating a whole stack of opened dialogs, or he has to close the dialog coming back to the form underneath.

Considering these two different display strategies and data modification approaches Aptitude splits the navigation into two different diagrams. The Application Diagram 2 represents all the modeless navigation between the Forms. Modeless navigation between pages may be described by a graph so a diagram is the best choice. On the other hand the modal calls create stacks so the description of all possible modal calls between the pages always shape into a tree like graph. Moreover from the data modification perspective all modally called dialogs modify the same set of data before committing the data to storage. Such a stack of modally called pages looks like one block called from the Application Diagram describing a modeless navigation between forms. For this reason an Aptitude Form is not just a single Page but it describes a tree-like graph of a set of pages which are being called modally.

Figure 5:
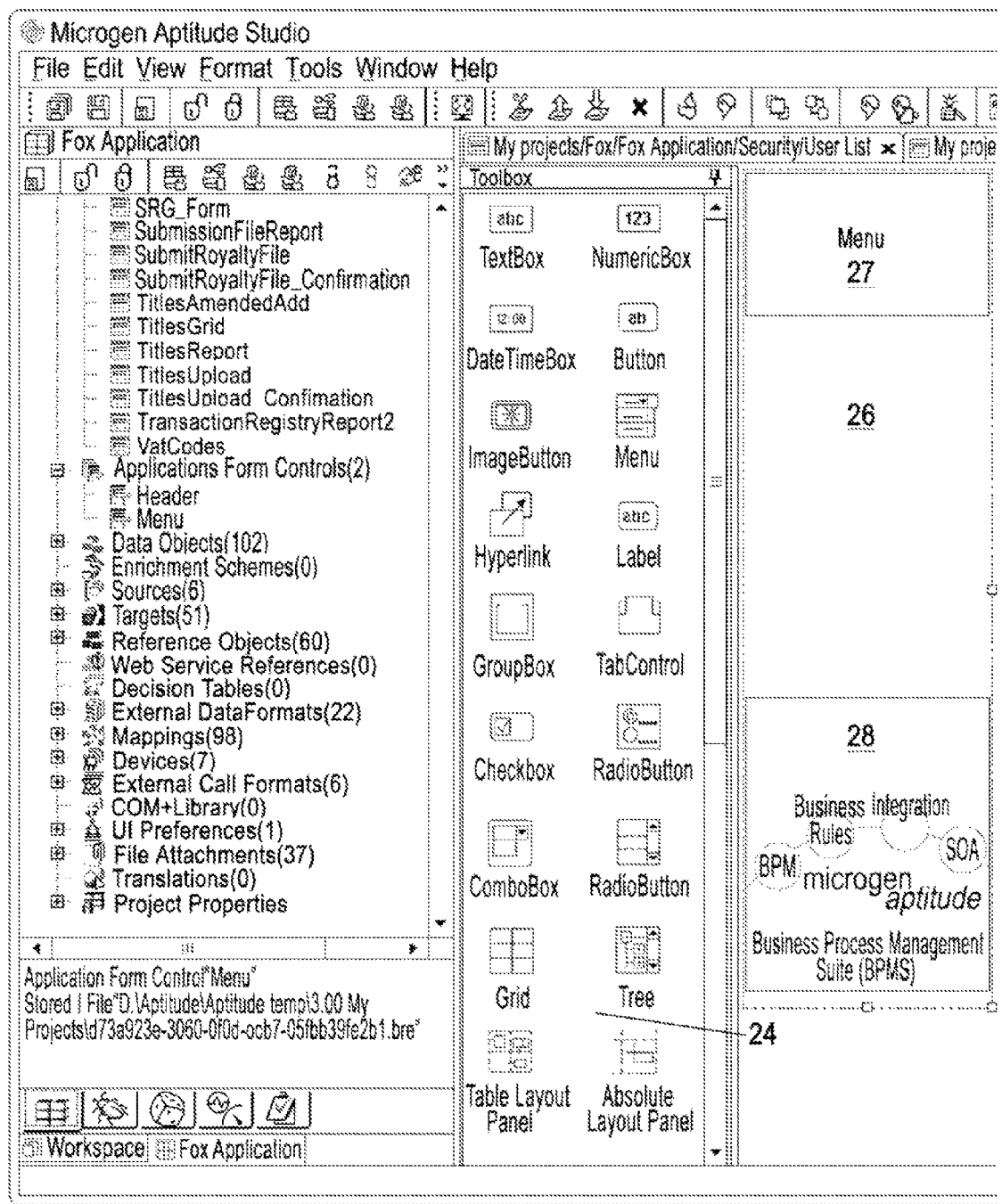
FIG. 5 shows a form template with a menu.
Figure 5:
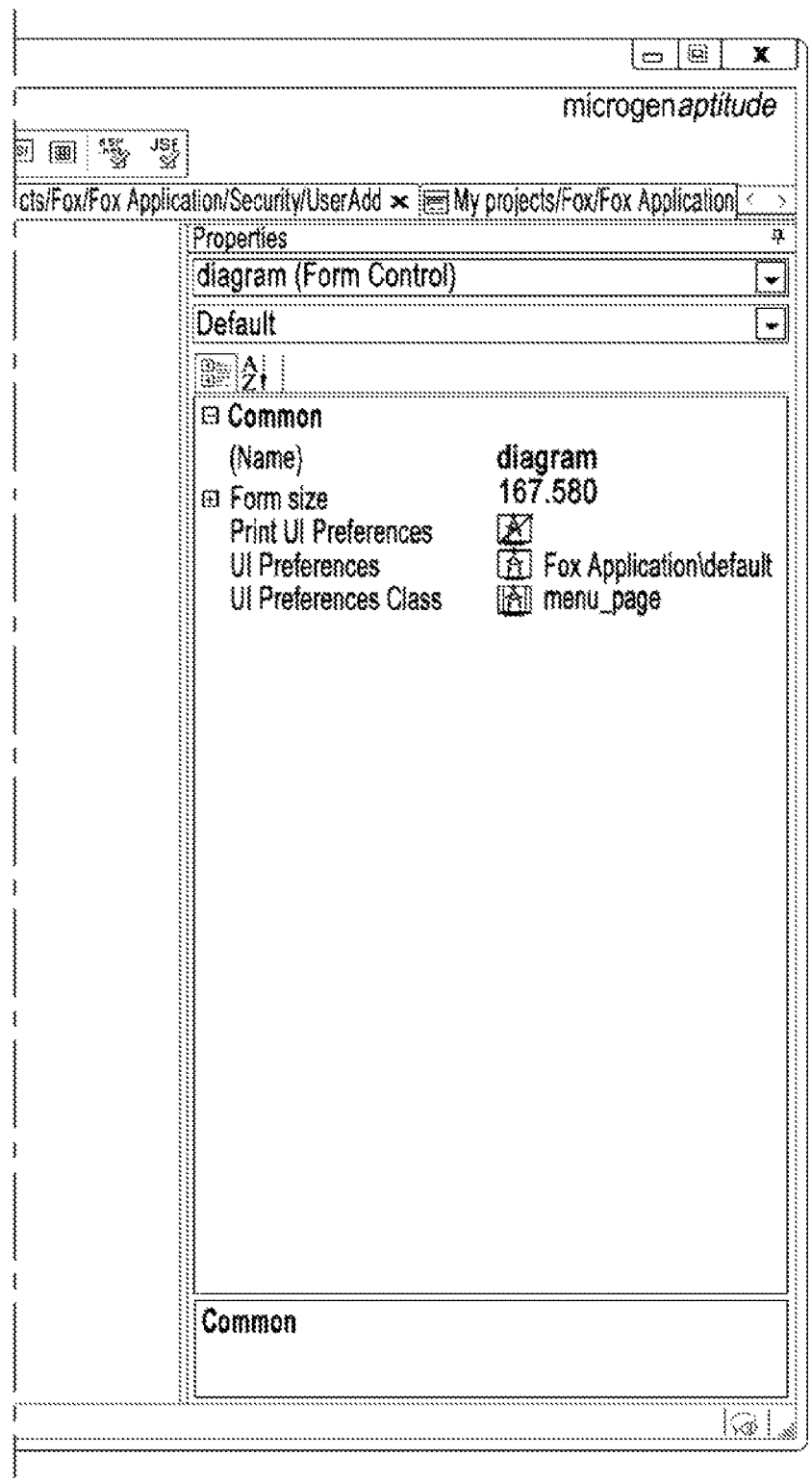

Aptitude also provides Application Form Templates, which define the layout of controls on a page. A control is something which can be reused, such as a button or a header. FIG. 5 shows a toolbox 24 containing a selection of controls which are available to the developer, and each of which can be added to a form. Next to the toolbox 24 in FIG. 5 there is shown an example form template 26 containing a menu control 27 and logo control 28. A developer can start from a form template and then change or add/delete controls to create a desired form. Alternatively the template can be placed on an existing form using a drag and drop operation, after which the controls of the template will be added to the form. The template defines only the layout of the form.

An Application Form Template looks similar to a Form's Page and defines the layout of the form controls. It is not assigned to any Data Object and does not contain the data binding and events' handlers assignments. The data binding and event handlers assignment is done when the developer edits the Page. All properties of controls in a Form Template (except the size and position of the controls) may be changed by the developer on a particular Page which uses the Template. Changes made to a Form Template's controls can be automatically propagated to all Pages which make use of that form template if the developer so chooses. The user has two options (which are available in a menu in Aptitude):

1. From an opened Form Template he can amend the Form Template and then update all the Forms containing the Form Template; or 2. From an opened Form he can amend the Form and then update the Form Template on which the Form is based with any or all of the changes to the Form.

Figure 6:
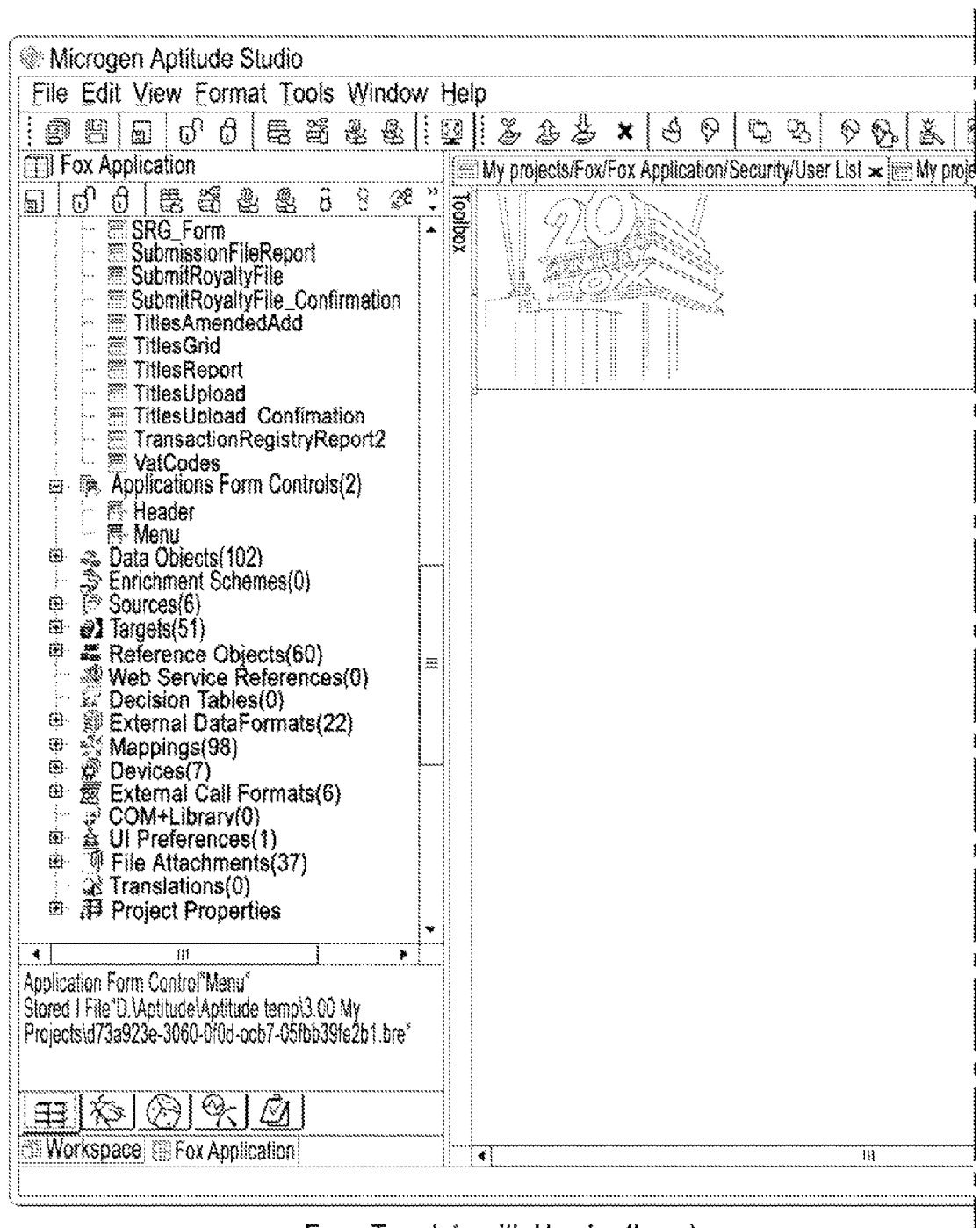
FIG. 6 shows a form template with a header or logo.
Figure 6:
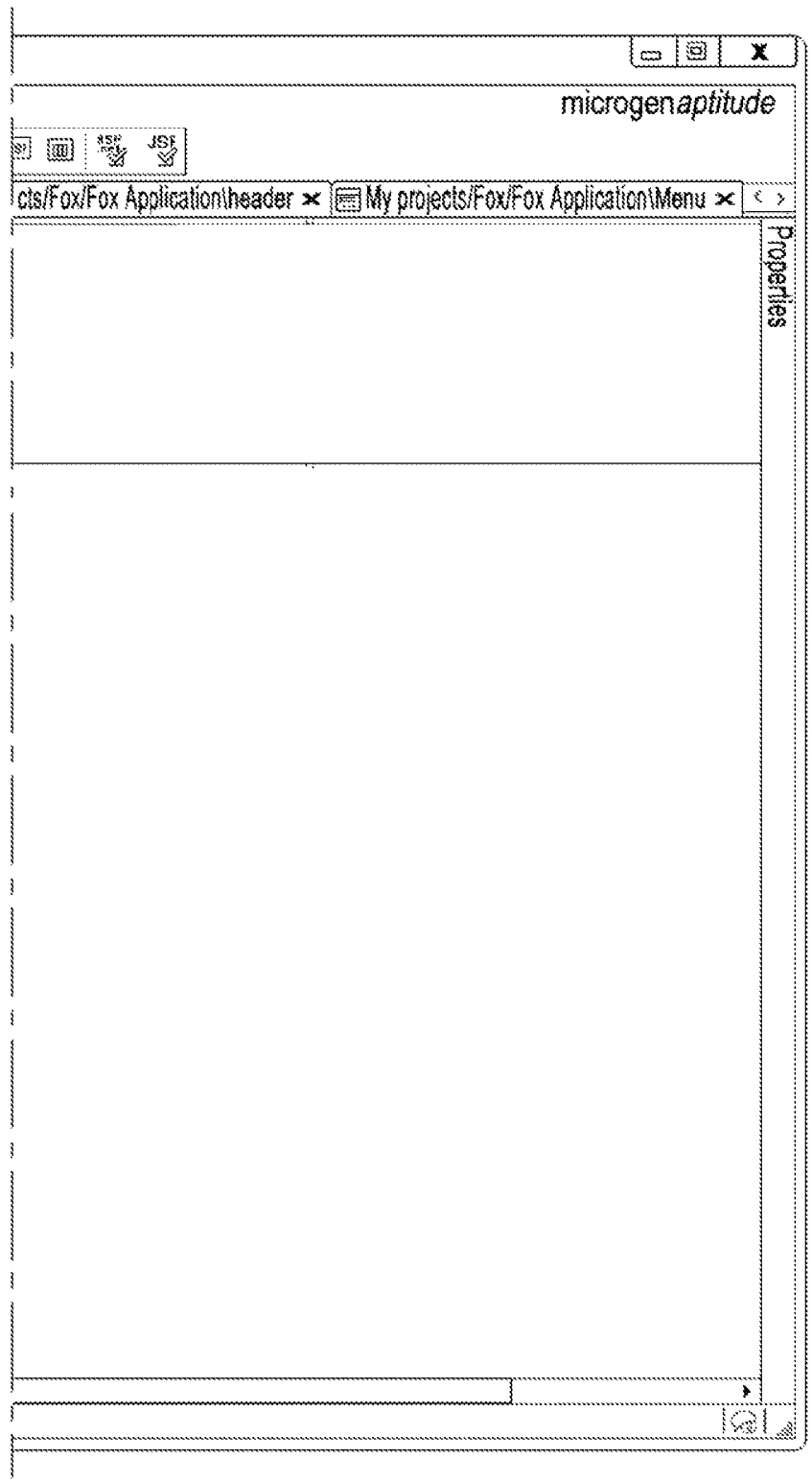

Such a Form Template may be used to implement the common layout of particular parts of all forms. FIG. 6 shows an example of a form template containing a header control.

An Application Form Template contains a partial definition of a user interface layout that, rather than being traditional controls on a form, defines the set of controls without data binding and user interactions' handlers. Such a template must be attached by the developer to the data specific for the particular Form it is used with, and may be additionally customized from the Page it lays in.

Figure 7:
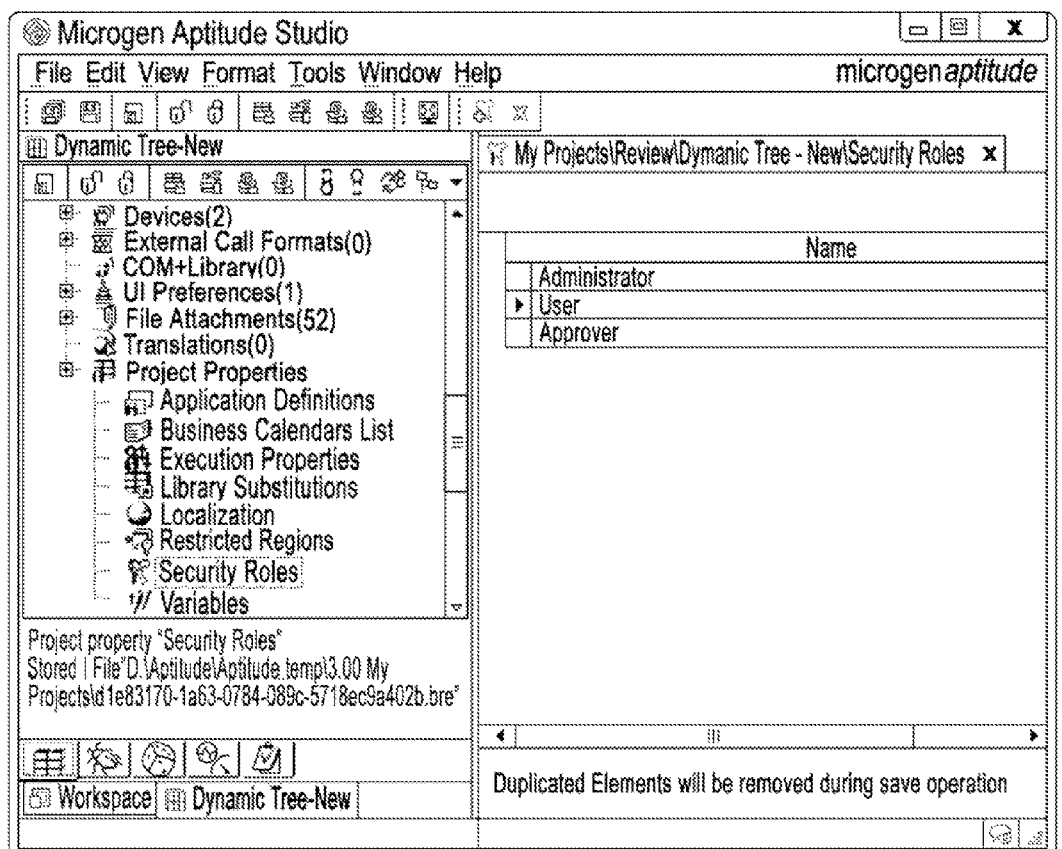
FIG. 7 shows how security roles can be declared in an Aptitude Project.
Figure 8:
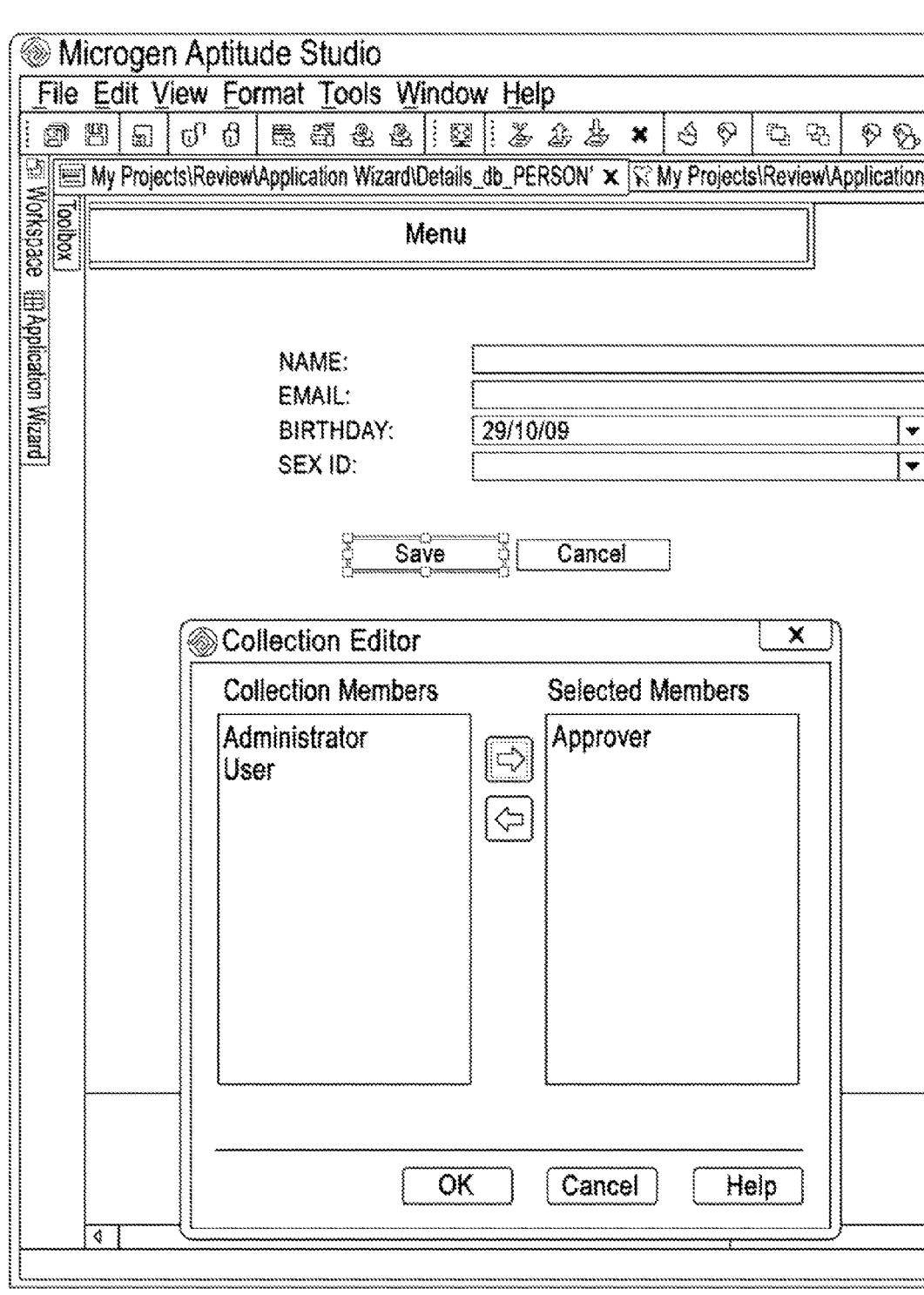
FIG. 8 shows how, during the building of an Aptitude Project, security roles can be allocated to a button on a page.
Figure 8:
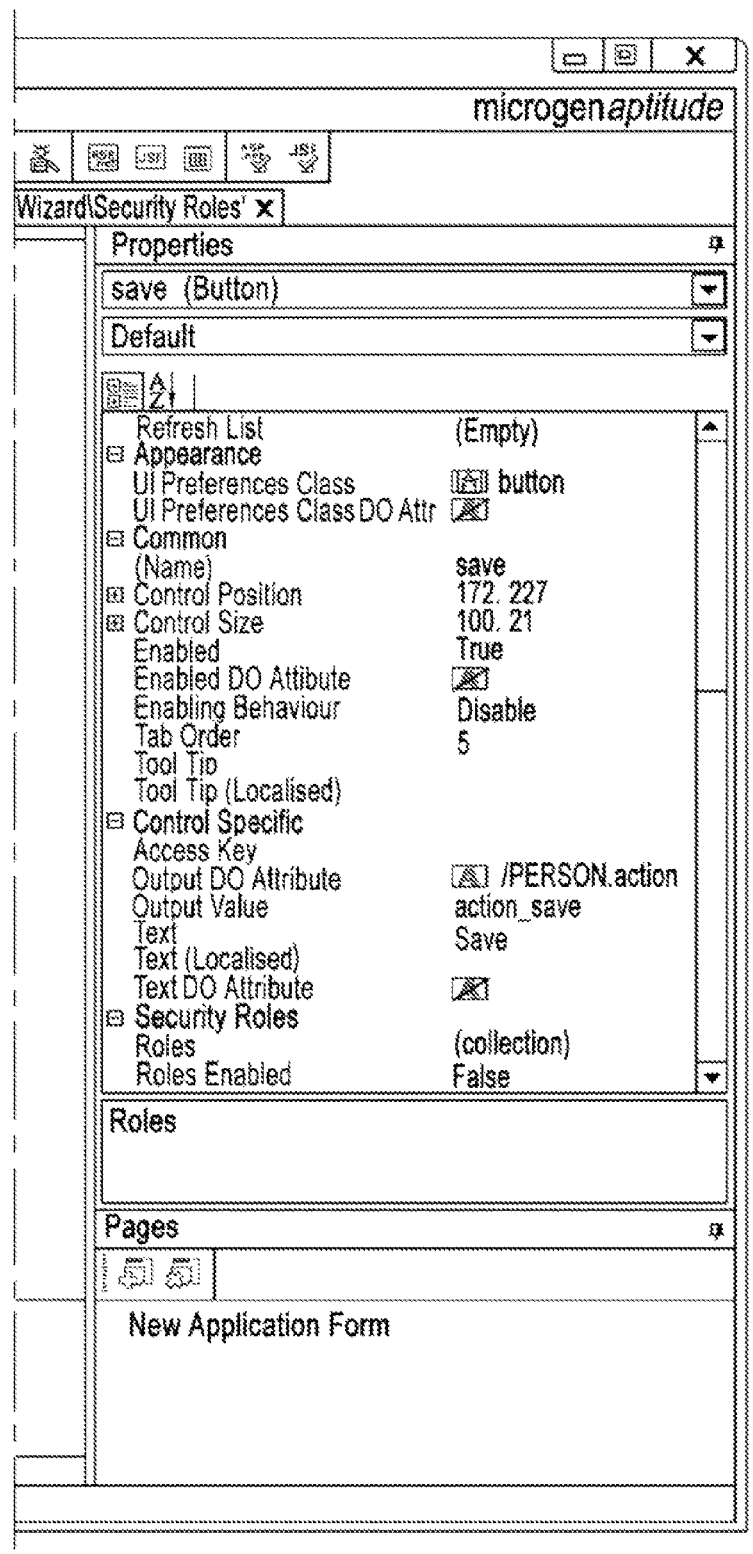

We next describe security features of Aptitude. Aptitude provides declarative role based security in which roles are declared in the Aptitude Project. FIG. 7 shows three such roles. The Roles are local to the Project and are not represented by any physical entities. The controls on each Page provide different access levels; such as Read or Read & Modify. In the Aptitude Project the Roles are then assigned to a particular access level of the controls in the Pages. That is, the different Roles are assigned to each control separately. For example some controls may be assigned only to "Administrator" so that such controls cannot be used by lower roles, while other controls may be assigned to several roles. FIG. 8 shows how one or more Roles are assigned to a "Save" button for example, after which only those Roles may use the button. In the running application a user must have the appropriate Role or Roles granted to have access to the Pages and controls (such as particular buttons on the Page).

The Security in the Project is completely abstract and thus is easy to use by business users. The binding between the declared Roles and physical roles is done during the application deployment.

Using the menu items "Project Property-Application Definitions" available within the Aptitude Studio software, the user can set the Security technical binding. Currently Aptitude supports three technologies: LDAP; Out-of-the-box database solution; and Custom Library LDAP is a centralised security system used by Microsoft and others, which allows different security levels to be given to different people across a number of applications. Aptitude can take the security information from LDAP in order to match the security levels in LDAP with the Roles in Aptitude. More generally, the Roles in Aptitude can be mapped to different security levels in another application; thus allowing users of the other application having different security levels to be automatically allocated corresponding Roles in Aptitude, or vice versa.

The Role Based Security is independent from any particular technology giving Aptitude the ability to integrate with any existing solution.

Figure 9:
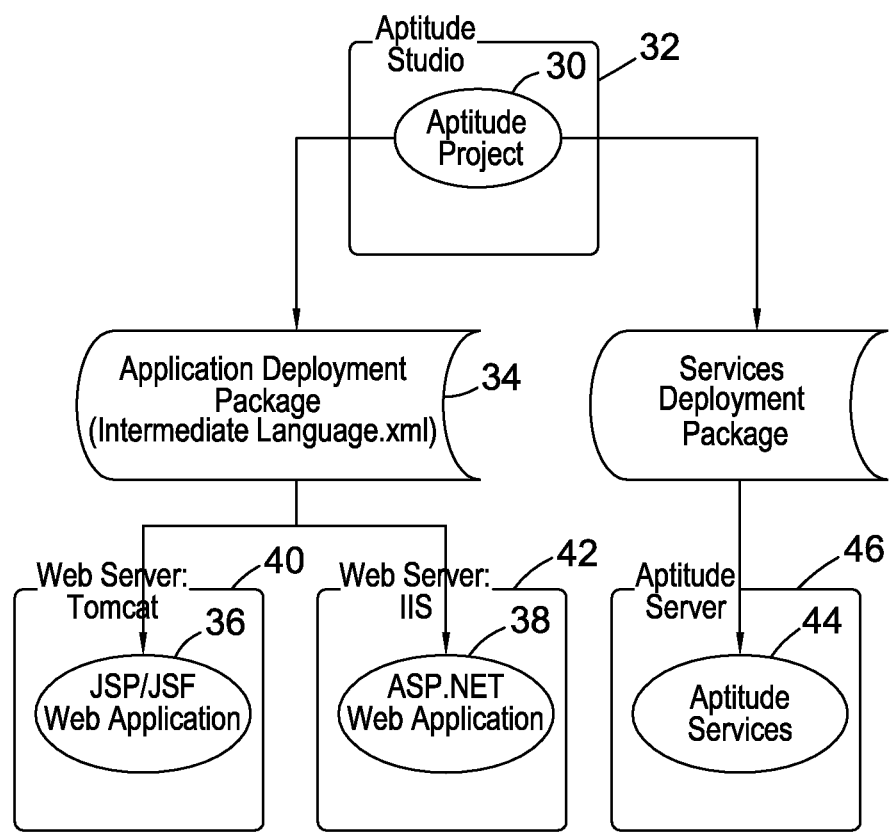
FIG. 9 shows the deployment of an Aptitude Application.

We next describe deployment of the application. The Application Deployment is based on the fact that the front-end Application is implemented without using any particular programming language or technology. Referring to FIG. 9, Aptitude first compiles the Aptitude Project 30 (developed using the Aptitude Studio software 32) into an abstract definition of the Application represented in the Aptitude Application Intermediate Language called the Application Deployment Package 34. The Deployment Package 34 is technology independent, and can be deployed to any web technology. The Application Deployment Package is used to generate the Application e.g. 36 or 38 in a particular technology (e.g. ASP.NET or JSP/JSF) during the deployment to a physical web server e.g. 40 or 42.

The deployment is done in two steps:
1) Aptitude Studio creates the deployment package, based on the application diagram, described using an intermediate language.
2) The Web application is generated from the intermediate language using proper target technology (currently supported: ASP.NET or JSP/JSF)

The deployment can be done in two ways:
1) In Aptitude Studio: just drag and drop the project onto the web folder under the web server. The deployment package is created in temporary folders and then from that package we generate the application in two steps:
  a. source files with the code are generated to the temporary folder.
  b. we compile the application and if the compilation is successful we copy both the code and the compiled results to the web folder
2) In Aptitude Studio create deployment package and then deploy the application to the web server using also Aptitude Studio or the command line tool AptCmd. The deployment Package is created in a given folder. Then the deployment is done in two steps:
  a. Aptitude Studio or AptCmd reads the files into the intermediate language structures
  b. The application is generated from the intermediate language: first the application code files are generated to the temporary folder and compiled and the copied to the web folder.

We could say that the deployment package is just the intermediate language serialized to the files. So we always first generate the intermediate language and then from the intermediate language we generate the application. The intermediate language can be serialized to the file and distributed in this form to the client site and then picked up using AptCmd to generate the application. The intermediate language is a technology independent description of the application graph plus the description of the forms and all other application elements.

Figure 10:
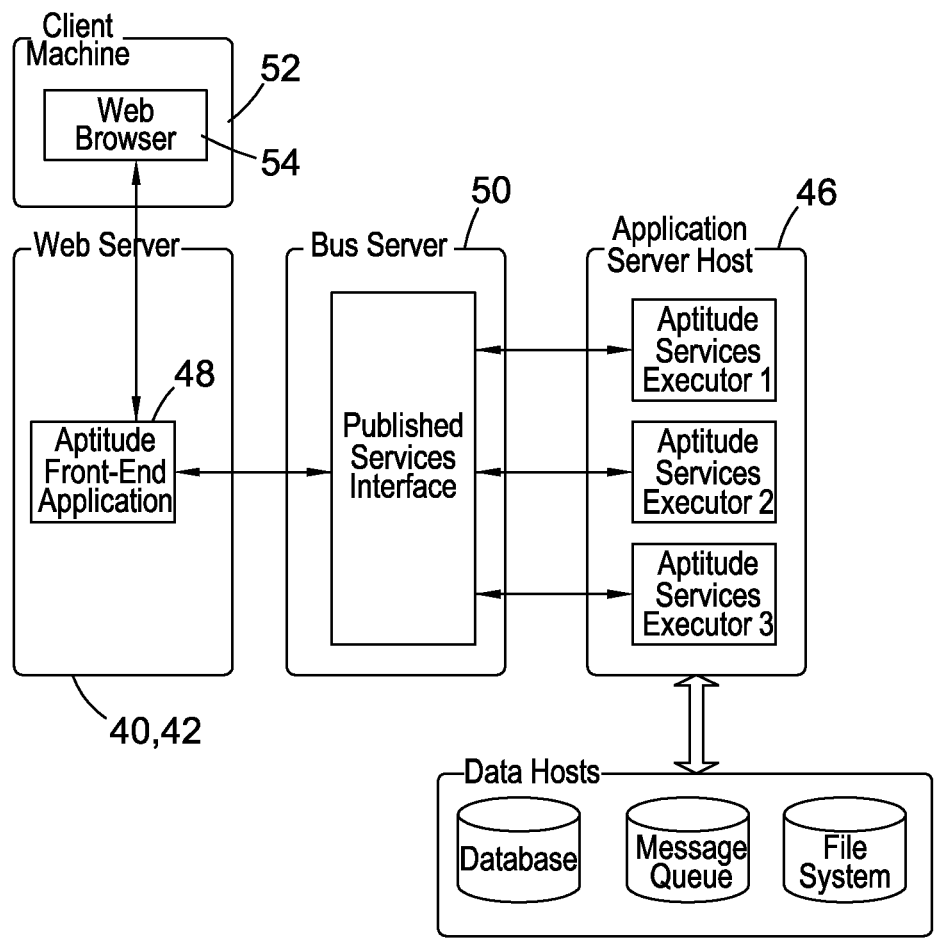
FIG. 10 shows the working environment of a final Aptitude Application.

Aptitude is able to generate either or both of the following two parts of the system:
1) A Front-End Application which provides the user interface (including the forms) generated in one of the supported technologies (ASP.NET or JSP/JSF); and
2) The Services, which are responsible for:
  a) providing data for web pages;
  b) processing data submitted in web pages; and
  c) handling events from pages' controls The Front-End Application is deployed to a Web Server such as a Microsoft IIS web server 42 (which uses C#) or a Java Tomcat web server 40 (which uses Java). The Services 44 are deployed to the Aptitude Application Server 46. As shown in FIG. 10, the communication between the Aptitude Front-End Application 48 and the Services goes through additional Bus Server 50. The Bus server 50 is known as the Aptitude Services publication interface and handles communication between many different Services, consumers and Servers. The end user uses a computer 52, such as a PC, provided with a web browser 54 to access the Application 48 on the web server 40, 42.

The Intermediate Language as a deployment intermediate product gives Aptitude the ability to deploy the front-end Application using any User Interface technology. Currently, two web technologies are supported: ASP.NET (IIS) and JSP/JSF (Tomcat, JBoss). No traditional programming languages are required by the developer, as all the programming can be done using Aptitude.

Figure 11:
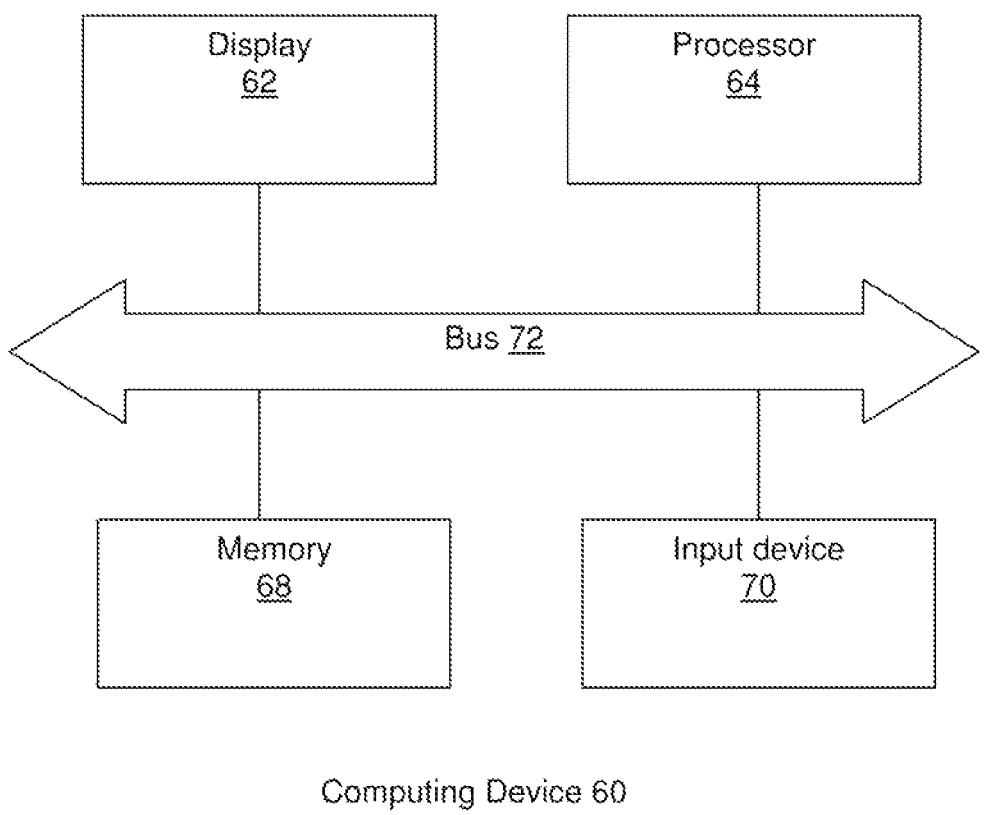
FIG. 11 shows a computing device suitable for running the Aptitude software.

FIG. 11 shows a computing device 60, which may for example be a personal computer (PC), which is suitable for running the Aptitude software. The computing device 60 comprises a display 62 for displaying information to the developer, a processor 64, a memory 68 and an input device 70 (for example a mouse and/or keyboard) for allowing the developer to input information. These elements are connected by a bus 72 via which information is exchanged between the components.

We next describe a functionality of Aptitude which we refer to as Transaction Regions.

Sometimes it is important to exert transactional control over a number of operations, so that either all of the operations are completed successfully or none of the operations are completed. In such cases the transactional control ensures that it is impossible for only some of the operations to be completed successfully and for others to fail.

Aptitude uses a collection of icons or blocks, each representing an operation or "node", to define the processing of data for a process in Microgen Aptitude. The process may relate to any field, including engineering or business. As an example our discussion focuses on business processes, although the concepts are equally applicable to engineering processes. In Aptitude a Business Process is a segmentation, or division, of a process flow consisting of Nodes; it may consist of the complete flow or, more usually, is divided into a set of nested business processes. The latter is preferable as it adds little or no additional performance overhead and can make the diagrams much easier to understand. Aptitude delivers a complete Business Process Management layer allowing nested business processes and rules. The same Business Process may be used as a standalone process and as a part of other processes.

The Nodes in the Business Process represent different stages where various operations and/or transformations can be performed on data. These nodes are connected using links to create a diagram that represents the complete business process. Using the Business Process toolbox, the developer can drag-and-drop the nodes onto the editor screen.

The links represent the flow of data and are added by the developer; each link has its corresponding Data Object.

Within business processes, Microgen Aptitude has a concept of transaction regions that can be used to position "roll back" points within a business process.

A "Transaction" in Microgen Aptitude is a set of operations which must all be conducted successfully by a group of nodes as a result of the processing of one or more messages. An Aptitude Transaction is atomic i.e. all operations of the transaction have to be executed successfully in order for their results to be permanently stored (ie committed). Aptitude Transactions provide the complete set of generally used properties, guaranteeing reliable transaction processing, called ACID for atomicity, consistency, isolation, durability. We define a group of nodes that define a Transaction as a "Transaction Region". When processing a message (or record), if any of the operations within the Transaction Region fails, then all operations belonging to the transaction may be rolled back (ie the operations are undone and/or their results are not stored) and the whole Transaction fails, at least for that message or record.

We pause for a moment to discuss terminology. The term "record" usually relates to databases and to flat data, while a "message" can be hierarchical. "Record" should be used when talking about flat data (ie a one-dimensional array of attributes or columns) e.g. when talking about data to be written to a single table. Records are therefore appropriate for Aptitude Rules where data is flat within a particular rule. Data processed in Aptitude Microflows (which are graphical flow charts, which may be business processes) is usually hierarchical. The correct term for "message" would be "Data Object instance" or "Data Format instance" but these terms are quite long so we sometimes use just "Data Object" or "message" for short.

As will be explained later, Aptitude can process data messages individually (Straight Through Processing (STP) Mode) or in batches. Such batches of messages can be either Logical Batches (eg all messages relating to one division) or Transactional Batches in which the user decides that a certain number of messages will be grouped to form a Transactional Batch which a Transaction Region then treats as a single Transaction. It is possible for the developer or user to set the "Execution Error Handling" mode of each Transaction Region, and this mode determines what happens in the event that an error occurs in the processing of a Batch (as will be described much later in connection with FIGS. 75 to 88). A record which causes an error may be marked as an "error" record. A rollback (ie undo) operation may be performed, and processing of the Batch may start again from the beginning of the Transaction Region (depending on the particular error handling mode which has been set).

Aptitude provides a graphical representation of such Transaction Regions which makes the Transaction Regions easy to identify and manipulate by the developer. Aptitude also introduces the concept of transaction initiating nodes and transaction boundary nodes. An Aptitude Transaction Region is defined as all nodes that receive directly or indirectly the messages from a transaction initiating node up to the transaction boundary nodes. A transaction initiating node is either:

a Source Node (being a node which receives data, for example from the outside world, and which is discussed in more detail later), or a transaction boundary node.

Figure 13:
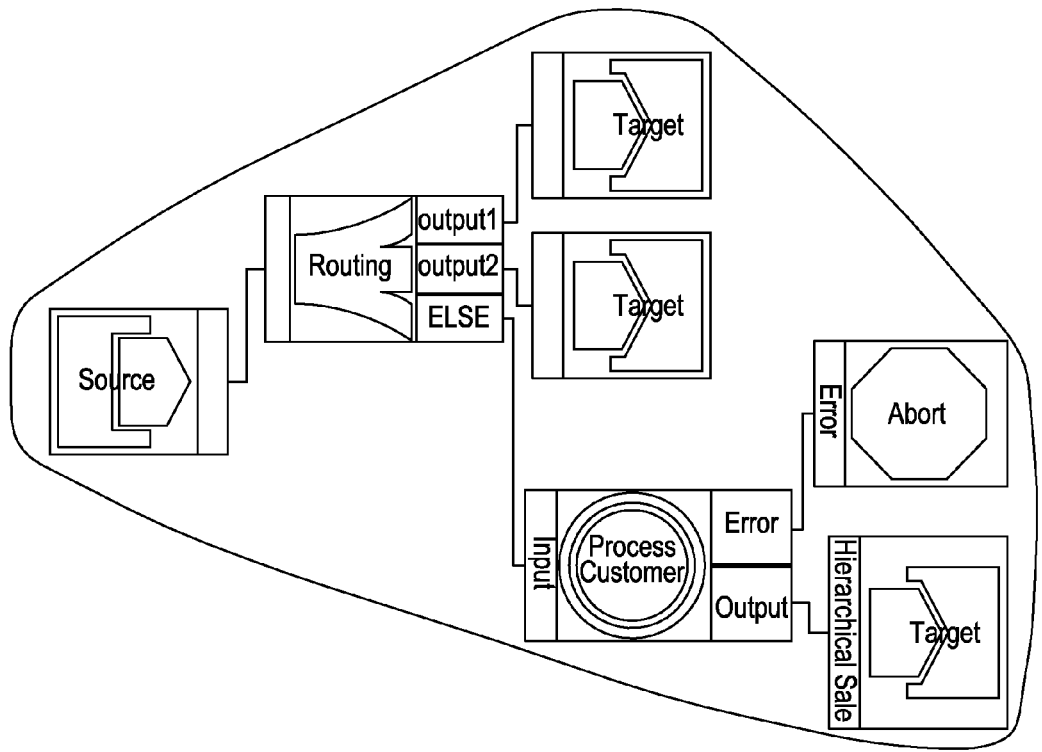
FIG. 13 shows an example of a Business Process containing only one transaction region.
Figure 14:
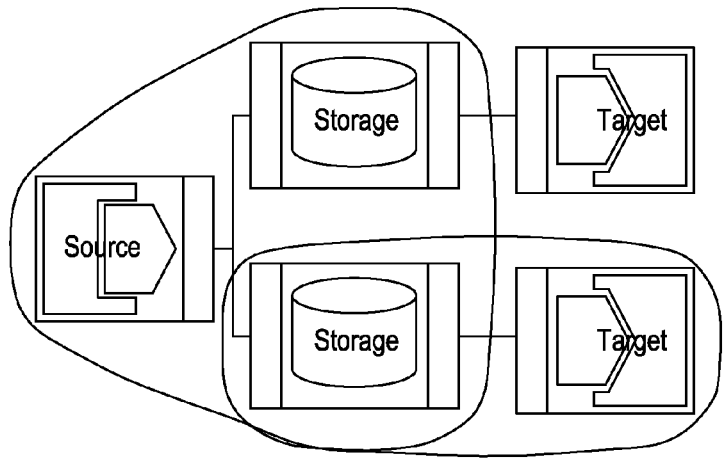
FIG. 14 shows a Business Process containing three transaction regions and two transaction boundary nodes, being two storage nodes.

A transaction boundary node is any one of the following three types of node:

a Grouping Node (which deals with a group of messages, as discussed in more detail later), a Storage Node, at which the results of one or more operations are stored; or an embedded Business Process Node For each of these three types of nodes the developer can check (ie tick) or uncheck (ie untick) a Transaction Boundary Node option, which is made available for example when the developer double-clicks on the node. This option controls whether or not the node functions as a transaction boundary node. No other nodes have this option, and so no other nodes may be set as transaction boundary nodes. (A final Target node, such as those shown at the end of FIGS. 12, 13 and 14, is an alternative way of ending a transaction region.)

Each transaction boundary node starts another Transaction Region. In Aptitude a Business Process can consist of many Transaction Regions.

Transaction Regions are displayed to the developer in the diagram of nodes/icons and links on the computer screen during Business Process development. The scope, ie area, of each Transaction Region is generated automatically by Aptitude, based on the presence of the transaction initiating and boundary nodes mentioned above. However the developer can also merge or split Transaction Regions.

Figure 12:
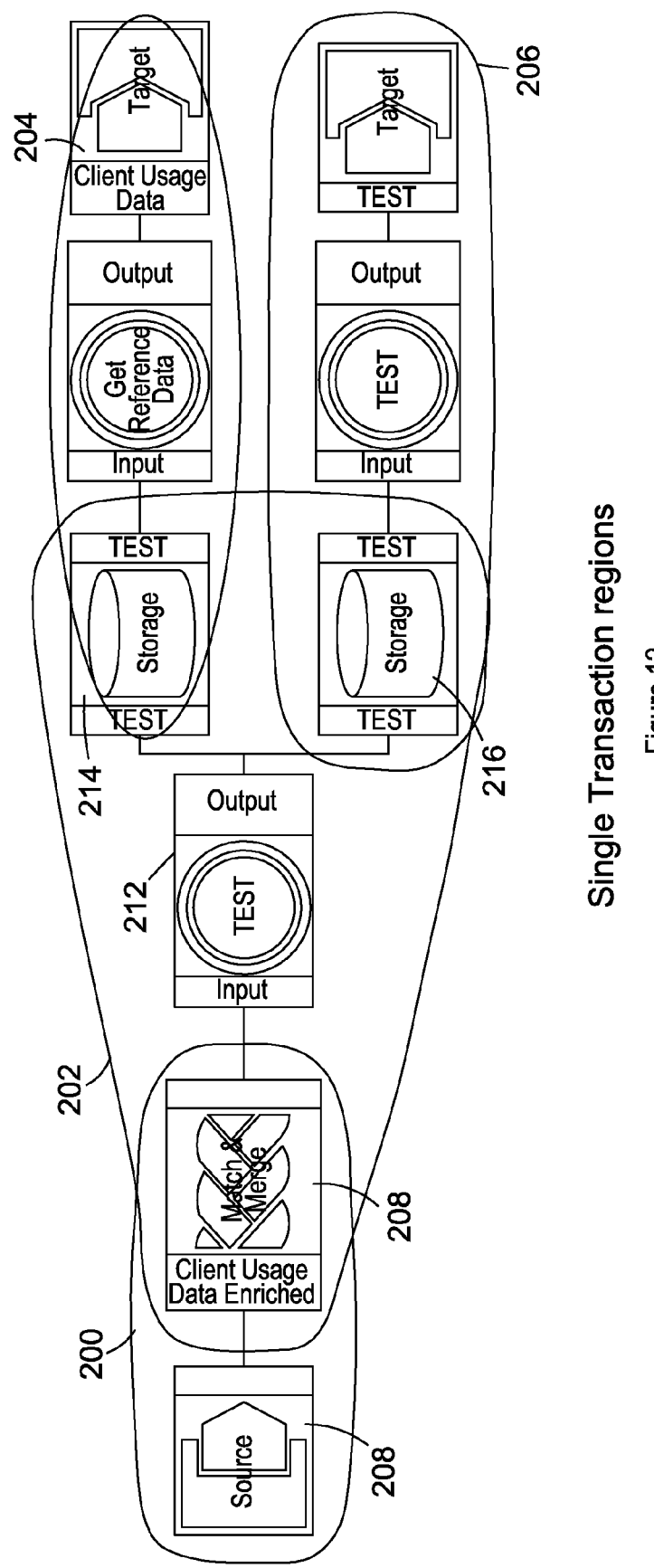
FIG. 12 shows an example of a process containing four transaction regions.

FIG. 12 shows an example of a Business Process containing four Transaction Regions 200, 202, 204 and 206.

Data within a single transaction region is processed without any storage or roll back points allowing for optimum throughput and performance (ETL-like very high speed). This is because storing the results of operations takes time, and therefore by not storing the results as data passes through the Transaction Region time is saved, and processing is speeded up. In the event of the failure of an operation during processing within a single transaction region the processing may roll back to the start of that region in order to reprocess the data. (Not all Execution Error Handling modes involve rollback—for example the "Continue Processing" mode discussed later).

The Business Process of FIG. 12 begins with a source node 208 at which incoming messages containing data are received. The messages then pass to a Match & Merge node 210. Aptitude automatically recognises that the source node 208 is a transaction initiating node, and that the Match & Merge node 210 is a grouping node, and therefore also a transaction boundary node, and Aptitude therefore automatically creates the first Transaction Region 200 by drawing a blue line around the two icons 208 and 210 and shading the area within the line, in this case using the colour blue.

The Business Process of FIG. 12 continues to the rule icon 212, after which the data passes either to storage block 214 or storage block 216, depending on a test applied by the rule represented by rule icon 212. Aptitude automatically identifies the two storage blocks/nodes 214 and 216 as transaction boundary nodes, and Aptitude therefore automatically creates the second transaction region 202 by drawing a purple line around the four nodes 210, 212, 214 and 216 and shading the area within the line purple. The same process applies to transaction regions 204 and 206.

Note that the Match & Merge node 210 lies in both the first and second Transaction Regions 200 and 202. This is because the Match & Merge node 210 is both a transaction boundary node and (therefore) also a transaction initiating node.

Aptitude selects different colours for the different Transaction Regions in order to graphically represent each Transaction Region to the developer in the most clear manner. Furthermore this graphical representation occurs automatically, without the developer having to think about where Transaction Regions begin and end. The developer simply creates the process by arranging the icons/nodes and links, and the Aptitude software takes care of indicating the Transaction Regions in a graphical manner.

FIG. 13 shows an example of a Business Process containing only one transaction region.

By specifying a number of transaction regions within a Business Process the developer defines a number of storage points. The act of specifying a node as a transaction boundary automatically create a storage point at that node, even if the node itself is not a storage node. Data is stored automatically at the final node (ie the transaction boundary node) of each transaction region (regardless of whether that node is a storage node) so that it can act as a roll back point in the event of processing failure within the next transaction region. That is, if there is a processing failure within the next transaction region it is possible to use the data stored at the storage point to reprocess at least the data which has failed to process properly. Once all of the data in a transaction region has been processed it is no longer necessary for the data to continue to be stored at the storage point at the beginning of the transaction region, and the processing can move on to the next transaction region. This provides the user with quick error and problem resolution.

Every Transaction Boundary Node, for which the "Transaction Boundary Node" option is checked, is a storage point in a Business Process, i.e. the entry or exit node within the Transaction Region. Every Transaction Boundary Node starts a new Transaction Region by default.

FIG. 14 shows a Business Process containing three transaction regions and two transaction boundary nodes, being the two storage nodes shown in FIG. 14.

Two Transaction Regions can be merged by the developer to form one single transaction region that contains all nodes that previously belonged to the two transaction regions. To merge two Transaction Regions the developer simply unchecks a Transaction Boundary Node option for a particular node contained within the two Regions. If the developer unchecks the Transaction Boundary Node option for a storage node then the storage node simply transmits the data without storing it. This possibility has been left mainly for consistency, so that the developer can check or uncheck the Transaction Boundary Node option for any of the three types of node which may act as a Transaction Boundary Node.

Similarly a single Transaction Region can be divided into two Transaction Regions by creating a new Transaction Boundary Node somewhere within the original single Transaction Region. This could be done for example by checking the Transaction Boundary Node option of a node in the original single Transaction Region, or by adding a Transaction Boundary Node, for example a Storage Node.

As described, nodes in the Business Process can be defined as transaction boundary nodes—storage points used for roll back in the event of processing failure. Storage nodes are one example of transaction boundary nodes and indicate points in the Business Process where data should be stored internally.

Internal data can be stored in two places:
1. Aptitude Internal Storage, which is implemented with BerkeleyDB—a type of file database, embedded into Aptitude and not visible outside. Internal data is effectively written to disk files in this option.
2. External database—Aptitude can be configured such that the internal data is stored in the tables of an external database. This option makes it possible to provide "hot-swap" functionality i.e. ability to instantly switch to the secondary system and continue the processing if the primary system fails.

Using a storage node automatically creates a transaction region (if the Transaction Boundary Node option for the storage node is checked).

Only Grouping Nodes, Storage Nodes and embedded Business Process Nodes can be set (by the developer) as Transaction Boundary Nodes.

In case of execution errors the records are rolled back to a Transaction Boundary Node and kept in internal Berkeley Db storage (or an external database).

The data stored internally can be viewed using an Internal Data interface provided in Aptitude Studio for a deployed Project (the end user simply right clicks on a deployed Project and selects Internal Data). A "deployed Project" here means a project which has been compiled and deployed to Aptitude Server. Business Processes defined in Aptitude project are executed within Aptitude Executors, started by Engines and controlled by Aptitude Server. In contrast, the Aptitude project part defining a web application (containing forms/screens) is compiled into ASP.NET or Java (JSP/JSF) code and deployed into the web server.

The Internal Data Interface is a part of Aptitude's failover and recovery functionality. We next describe Aptitude's failover and recovery functionality in more detail.

The failover functionality implemented in Aptitude consists of three layers:
1. Aptitude modules replication (a secondary instance can take the processing over if the primary module is not available)
2. Projects restarting (automatic)
3. Data recovery of broken projects The Data Recovery mechanism allows recovering data of the broken Business Process execution. Data recovery can be carried out only when the project stores node internal data permanently. Data recovery usage can be switched on or off by the end user in the project configuration. During the project startup, no matter if the startup is a result of a restart after a failure, depending on the configuration settings, the internal data can be removed from the internal storage, can be processed or can be omitted in processing.

During processing of a batch, the internal storage initially contains the whole batch and then the messages are removed when they are processed successfully. If there are no errors in the whole batch, it is completely removed from the internal storage when the batch processing is finished. In case of error, the message remains in the internal storage with the "error" status.

If the processing stops as a result of a power failure for example, the project may be restarted automatically by Aptitude Server. This is controlled by the "Automatic restart after failure" execution property visible in FIG. 17, which shows a window available to the end user. When the project is restarted, if the "Internal data handling" execution property is set to "Recovery", as also shown in FIG. 17, the recovery is done automatically i.e. any unprocessed data is processed first.

When the whole project (including all its Microflows/Business Processes) (we note that in Aptitude V3 the term "Microflow" replaced "Business Process", but both terms are used to refer to a diagram representing a message processing, with a set of nodes representing operations) is restarted either manually or automatically (the latter if the "Automatic restart after failure is set"), then there are three options concerning how the internal data is handled:

1. "Recovery"—after start, the microflow at first processes the data from the internal storage until there is no unprocessed data in the internal storage, and then the microflow resumes normal operation i.e. it reads data to be processed from its input(s) if possible. The messages with the "error" state are left in the storage.
2. "Remove"—after start, the microflow removes all data from the internal storage and then resumes normal processing.
3. "None"—after start, the microflow processes data in normal mode, neglecting the messages existing in the internal data storage. A user can still view or modify the internal data manually, accessing it from the Aptitude Studio interface.

If an error happens because of some external reason e.g. there is no corresponding account number in some table, then the error will need to be fixed outside of the Aptitude project. However the automatic restart and recovery options are intended to be used for the situation when the execution breaks because of a power down, machine failure or fatal program error for example. In such cases, the important thing is to process the unprocessed messages from the internal storage, as otherwise some of the messages would be lost. Any messages in error will then be handled by users as usual when the processing is resumed. The whole project execution stops only in the case of power/fatal errors or when the "Execution error handling" setting for a Transaction Region is set to "Stop microflow execution". The user can then examine the internal data (using the Internal Data Interface) before the project is re-started. The user can correct the internal data contents if this is needed (e.g. for the failed data). After examining or correcting the internal data contents with the Internal Data Interface, the user can re-start the project manually.

If the Business Process configuration requires data recovery (ie. if "Internal data handling" is set to "Recovery" as discussed above) all Transaction Boundary Nodes in each Transaction Region read the unprocessed data from the internal permanent storage. This unprocessed data is used for the state initialization of these nodes. After that phase, the Executor executes all unprocessed data.

When a Business Process contains transaction regions, in case of execution errors the data will be rolled back to the nearest transaction boundary node (where it is stored in the internal storage).

The data stored internally can be viewed by the end user using an Internal Data Interface provided in Aptitude Studio for a deployed Project. As explained above, the end user can view or edit the internal data after the project failure, before the project is re-started (which means that the automatic restart after the failure cannot be used in this scenario). Internal data can be also examined when the project is run in a debug mode which allows the user to analyze how the internal data changes during the project execution.

The Internal Data storage contains only the unprocessed, broken or error records.

The data can be amended by the user from within the Internal Data Interface and reprocessed at Project startup according to the execution properties.

However, storing the intermediate data permanently for the recovery usage decreases the efficiency of the execution.

Depending on the Execution Error Handling mode specifying how rollbacks and errors are handled in Transaction Regions the internal data storage will contain either:
Broken or error record(s) only or:
All records from a batch where the error occurred:

If the Business Process configuration requires automatic data recovery, the "Internal Data Handling" property, referred to above, should be set by the end user to "Recovery" in the Project Execution Properties screen shown in FIG. 17. If it is set, the transaction boundary nodes in all transaction regions will read the unprocessed data from the internal storage and the Executor will reprocess this data.

The developer is able to set some execution parameters for every transaction region. In the Aptitude Project this is possible on a Business Process Properties/Execution Properties screen. Even after deployment the user can change them in a Configuration Settings file. The following example parameters are available:

Thread Pool Size—the maximum number of threads executing the same transaction region simultaneously Transaction Batch Size—the number of input events/messages constituting the transactional batch Execution Error Handling mode—the way the errors are handled in the transaction region e.g.:
  Continue Processing—marks only erroneous events in the batch as error. In this mode neither rollback nor reprocessing is performed.
  Break Batch Processing—marks all events in the batch as "broken" in case of any error, and marks the erroneous events as "error".
  Stop Microflow Execution—marks all events in the batch as broken in case of any error and then stops the executor. The "automatic restart after failure" is a separate functionality, which can be switched on or off independently.

Session Sharing—describes whether database elements share sessions
  No session sharing
  Targets based on the same device
  Targets and Reference objects based on the same device Fast mode—doesn't store data in the internal database which makes the processing faster but recovery after failure is impossible.

For the convenience of the developer all of these parameters and some more can be modified globally for the whole project (also available in the project and in the configuration settings).

Figure 15:
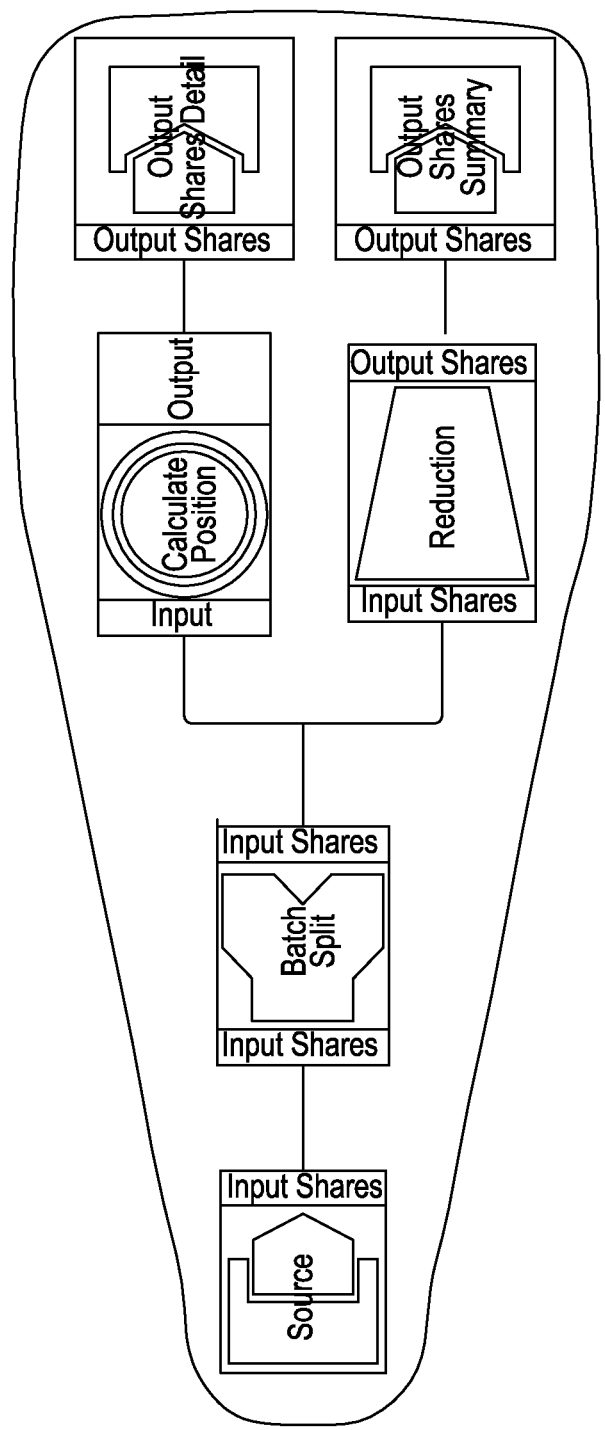
FIG. 15 shows a further example of a business process containing only one transaction region.

FIG. 15 shows a further example of a business process containing only one transaction region, and has the following features:
  The whole logical batch is processed in one transaction (in the presence of grouping nodes)
  In case of execution errors the data is rolled back to source and the reprocessing (if required) will be done from source
  Larger amount of consumed memory
  Faster execution when no errors occur.

Figure 16:
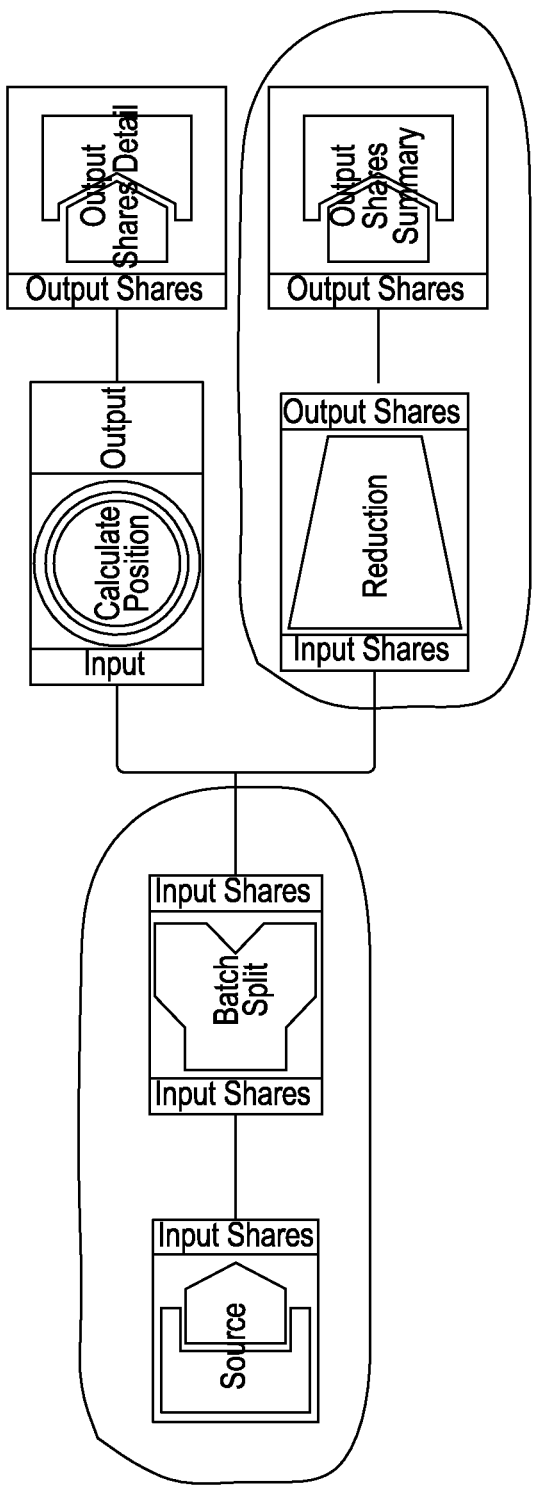
FIG. 16 shows an example of a business process having three transaction regions.

FIG. 16 shows an example of a business process having three transaction regions, and has the following features:
  Allows the developer to split a huge logical batch into smaller transactions (using grouping nodes)

Storing data in transaction boundary nodes in case of execution errors

Smaller memory consumption (data batches can be stored on disk instead of being kept in memory)

Affects performance. For error resolution, dividing a large task into a number of smaller tasks significantly reduces the time taken to trace problems and recover the system, as the user only needs to analyse the step that failed. When there are no errors, storing data slows the processing down.

The Transaction Regions in Aptitude provide the following features and advantages:

1. Graphical representation of transaction processing in the form of Transaction Regions.
2. Ability to change the set of operations (nodes) belonging to the Transaction Region (by setting the "Transaction Boundary Node" option of Nodes). Transaction Regions can be merged, split etc.
3. Possibility to define the same node either as a transaction boundary or not.
4. Ability to define execution properties for each of the defined Transaction Regions.
5. Ability to view (browse) internal data stored during the processing, using the Internal Data Interface. This allows the developer to look for problems in the data.
6. Provide functionality needed for a part of the failover functionality—i.e. the ability to recover data and the possibility to browse/edit the internal data.

We now describe functionality of Aptitude which we refer to as Hierarchy Transformation. Many data objects have a hierarchical structure. A simple example is a family, where a parent may have several children who each have several children, and so on. There may be many such families, each representing an "instance" of such a family data object. Such a hierarchical data object has a structure which is a "weakly connected directed graph" and which we may refer to as a "tree graph". This is because a tree is a structure which may have several branches, each of which has several branches, and so on. We refer to each branch of such a tree graph as a "segment" or "node". Typically we have a root segment which has one or more subordinate segments, each of which may have subordinate segments, and so on. In general there may be zero, one or more instances of each segment. To return to our example of a family, we may have a family called "Smith" which is an instance of our family data object. An instance of the root segment may be, say, John Smith. There may be, for example, three instance of the next (child) segment, say Tom, Alice and Jim. Each child may have zero, one or more instances of the next (grandchild) segment, and so on.

Hierarchy Transformation in Aptitude is a graphical means of transforming one tree graph into another tree graph, without the developer needing knowledge of any programming language. (We refer to "developer" in this description of Hierarchy Transformation, as distinct from the end user, because the Hierarchy Transformation produced by a developer can be compiled into executable code for use by an end user.) Hierarchy Transformation exploits concepts which will now be defined. These concepts are easier to understand when considering the example of FIG. 18, so it is suggested that the reader keeps this figure at hand for better understanding.

We first introduce the concept of a Data Format.

A Data Format is a directed graph, which can be a tree graph, the nodes of which are called Segments, where one (ie the uppermost) Segment is distinguished as the Root Segment.

A Segment represents a node in a Data Format tree graph.

Figure 18:
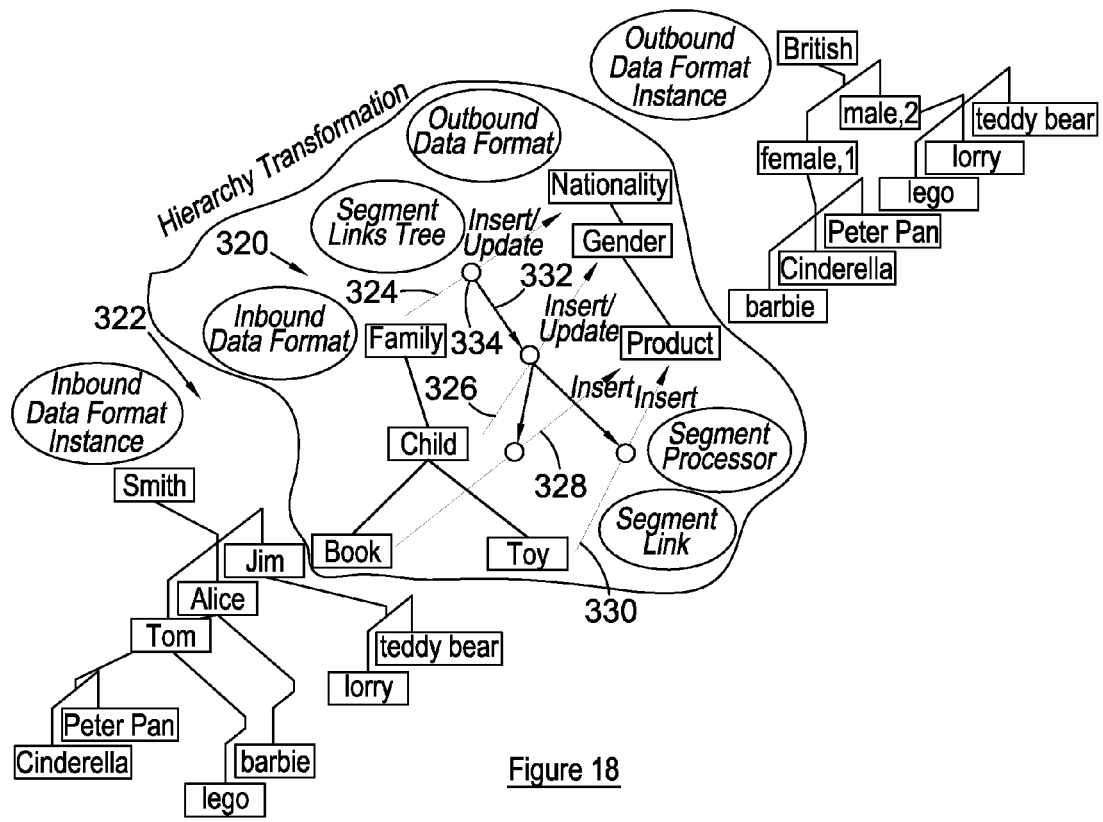
FIG. 18 shows the concepts involved in hierarchy transformation by means of an example.

FIG. 18 illustrates an example Data Format referred to as the "Inbound Data Format" 320, in which there is a root Segment named "Family", which has one subordinate Segment named "Child", which has two subordinate Segments names "Book" and "Toy".

We next introduce the concept of a Data Format Instance.

A Data Format Instance is an instance of data which has the same format as the Data Format. A Data Format Instance is a tree graph that is compliant with a Data Format. By "compliant" we mean that each route in the Data Format Instance starting from the root node of that tree can be walked-through in the tree graph of the Data Format Instance starting from its Root Segment. The nodes of a Data Format Instance are called Segment Instances.

A Segment Instance represents a node in a Data Format Instance.

FIG. 18 shows an example of a Data Format Instance referred to as the "Inbound Data Format Instance" 322. In this example there are three instances of the Child Segment, named Tom, Alice and Jim. Tom has one instance of the Toy Segment, lego, and Alice has two instances of the Book Segment, Cinderella and Peter Pan, and one instance of the Toy Segment, barbie. Jim has two instances of the Toy Segment.

Hierarchy Transformation is a concept that facilitates transformation of one Data Format Instance into another Data Format Instance. Hierarchy Transformation involves the following components:

1. An Inbound Data Format (as mentioned above).
2. An Outbound Data Format (as mentioned above).
3. Segment Links.

The example of FIG. 18 contains four Segment Links 324, 326, 328 and 330. A Segment Link is a connection, or link, between a particular Segment of the Inbound Data Format and a particular Segment of the Outbound Data Format. A Segment Link is also a component that is executed upon each iteration of the execution a Hierarchy Transformation algorithm (described below in relation to FIG. 19) as the algorithm moves through the Segment Links Tree (described below). Because a Segment Link connects two Segments (ie an inbound Segment and an outbound Segment) it can also be defined in terms of an Inbound Segment Path (being a route to the inbound Segment within Inbound Data Format starting from its Root Segment) and an Outbound Segment Path (being a route to the outbound Segment within Outbound Data Format starting from its Root Segment).

4. A Segment Links Tree.

Referring again to the example of FIG. 18 it can be seen that the Segment Links 324, 326, 328 and 330 themselves form a tree structure, which we refer to as a Segment Links Tree 332. This Segment Links Tree is represented by dotted lines with arrow tips. The intersection points 334 of the example Segment Links Tree 332 and the Segment Links are represented by circles 334 in FIG. 18, and it will be seen that each circle 334 corresponds with a respective Segment Link. In the example of FIG. 18 the Segment Links Tree 332 has the same structure as the Inbound Data Format, but this is not necessarily the case for all Hierarchy Transformations.

A Segment Links Tree is therefore a directed tree graph the nodes of which are Segment Links. The Segment Links Tree defines the Hierarchy Transformation. This tree graph is defined by the developer, but by default its structure is determined by the structure of Inbound Data Format. The transformation is performed by executing the Segment Links in accordance with the Hierarchy Transformation algorithm of FIG. 19.

Although the Segment Links Tree is illustrated in FIG. 18 as a tree, it is important to understand that this tree exists only as a concept within the software.

5. Segment Processor (SP)

Each Segment Link is provided with a Segment Processor, which for a single inbound Segment Instance (i.e. an instance that matches the Segment Link's Inbound Segment Path) in the current Input Context (the concept of Input Context will be defined later) produces zero, one or more temporary outbound Segment Instances (i.e. temporary instances that match the Segment at the end of the Link's Outbound Segment Path). These Instances are also referred to as "SP production" in the discussion which follows and, after creation by the Segment Processor, these temporary instances (SP Production) are used by the Segment Link during its execution according to the Link's Operation Mode (see below).

These concepts will become more clear when the example of FIGS. 20 to 25 is worked through. However, at this stage it is enough to note that a two stage process is involved. The first stage is the production of temporary instances by the Segment Processor (ie the SP Production), and the second stage is the execution of the Segment Link according to its Operation Mode (discussed below).

6. Operation Mode of the Segment Link

Each Segment Link has an Operation Mode, which can be one of the following:

a) Insert Mode

In this mode the SP production (ie the temporary outbound instances created by the SP) is/are inserted under the current Output Context (the concept of Output Context will be defined later).

[With reference to the term "outbound Segment Instances affected by the operation" (in box 307 of FIG. 19*a*): unlike in the other operation modes, in the case of "Insert" the "outbound Segment Instances affected by the operation" (loop 307) can be identified with the temporary Instances of SP production, as these temporary Instances are simply grabbed by the operation and glued under the Instance pointed by the Output Context—as it is in the example (FIGS. 20 to 25) that illustrates the algorithm.]

b) Update Mode in this mode the developer can specify a Matching Key, by means of which the SP production is matched against already existing outbound Segment Instances under the current Output Context—if such Instances exist, they are updated with the values in the SP production.

[With reference to the term "outbound Segment Instances affected by the operation": in the case of "Update" operation, the "outbound Segment Instances affected by the operation" (loop 307) would be those existing outbound Instances (under the Output Context) that match (in terms of Matching Key) the temporary Instance that loop 304 is currently positioned on. The number of such matching outbound Instances—i.e. Instances affected by the "Update"—can be zero, one or more.]

c) Insert/Update Mode

This mode is the same as "Update", except that those temporary outbound segment instances (SP Production) for which no matching (existing, ie not temporary) outbound Segment Instances were found are simply inserted under the current Output Context.

[With reference to the term "outbound Segment Instances affected by the operation": see the comment for "Insert" and for "Update".]

d) Delete Mode

This mode is the same as "Update Mode", except that the matching outbound Segment Instances are deleted (together with their subtree) from the current Output Context.

e) Select Mode

This mode is the same as "Update Mode", except that the matching outbound Segment Instances are not updated but just selected in order to position the Output Context for the Segment Links that are subordinate to the one that is currently being executed.

[With reference to the term "outbound Segment Instances affected by the operation": see the comment for "Update"—it is true for the "Select", except that word "Update" should be replaced with word "Select".]

f) Replace Mode

This mode deletes all the outbound Segment Instances (and their subtrees) under the current Output Context, then inserts the SP production under the current Output Context.

[With reference to the term "outbound Segment Instances affected by the operation": see the comment for "Insert".]

Two further options available within a Segment Link are:

1. Input Filter:

This allows optional filtering out some of the inbound Segment Instances fed into the Segment Link (in the current Input Context) before they reach the Link's Segment Processor.

2. "Take Children" flag:

If the graph under the inbound Segment is identical to the graph under the outbound Segment, the developer can set this flag on, in which case—during transformation execution—all the Segment Instances under the Input Context will be copied to every outbound Segment Instance affected by SP production (under the current Output Context).

FIG. 18 shows a summary of the concepts involved in Hierarchy Transformation, with reference to an example. The example of FIG. 18 relates to the transformation of an Inbound Data Format Instance, relating to the "Smith" family, to an Outbound Data Format Instance which has a different Data Format, based on Nationality, Gender, Product.

The "Family" structure is to be transformed by the Hierarchy Transformation into a "Nationality" structure that groups products—i.e. toys and books owned by individual children—into "Gender" categories, and "Gender" categories are grouped under "Nationality" categories.

FIG. 18 can be looked at as a perspective view, where the most distant scene is at the top-right corner of the page.

FIG. 19 illustrates the Hierarchy Transformation (HT) execution algorithm. FIG. 19 provides a summary of the main steps in the algorithm, rather than showing every step in the software.

The transformation execution algorithm is a recursive algorithm which starts at a root Segment Link in a Segment Links Tree. Among other things, the algorithm determines the processing path which is taken through the Segment Links Tree.

We now include some further explanation of the term "perform the operation" used in block 305 (FIG. 19*a*), as this term and the term "affected" depend on the Operation Mode set on the Segment Link.

In block 305 in the flowchart of FIG. 19, the term "perform the operation" can be expanded as follows with regard to each of the possible Operation Modes (this also expands term "affected"):

Given the current temporary outbound Segment Instance within the current SP production, IF the current SL's Operation Mode is:
"Insert", THEN insert the temporary Instance under the outbound Segment Instance pointed to by the Output Context and mark this newly inserted outbound Instance as affected.
"Update", THEN, within the Instances that exist under the outbound Segment Instance pointed to by the Output Context, try to find Instances that match (in terms of Matching Key) the temporary Instance—if there are any, update their values with the value of the temporary Instance and mark them as affected; if there are none, do nothing.
"Insert/Update", THEN, within the Instances that exist under the outbound Segment Instance pointed to by the Output Context, try to find Instances that match (in terms of Matching Key) the temporary Instance—if there are any, update their values with the value of the temporary Instance and mark them as affected; if there are none, insert the temporary Instance under the outbound Segment Instance pointed to by the Output Context and mark this newly inserted outbound Instance as affected.
"Select", THEN, within the Instances that exist under the outbound Segment Instance pointed to by the Output Context, try to find Instances that match (in terms of Matching Key) the temporary Instance—if there are any, mark them as affected; if there are none, do nothing.
"Delete", THEN, within the Instances that exist under the outbound Segment Instance pointed to by the Output Context, try to find Instances that match (in terms of Matching Key) the temporary Instance—if there are any, delete them (together with their sub-trees); if there are none, do nothing.
"Replace", THEN if this is the first iteration of loop 302, delete all the Instances of the SL's Outbound Segment under the outbound Segment Instance pointed to by the Output Context. Insert the temporary Instance under the outbound Segment Instance pointed to by the Output Context and mark this newly inserted outbound Instance as affected.

FIGS. 20 to 25 show six consecutive initial stages of the execution algorithm performing the transformation presented in the example of FIG. 18.

Figure 20:
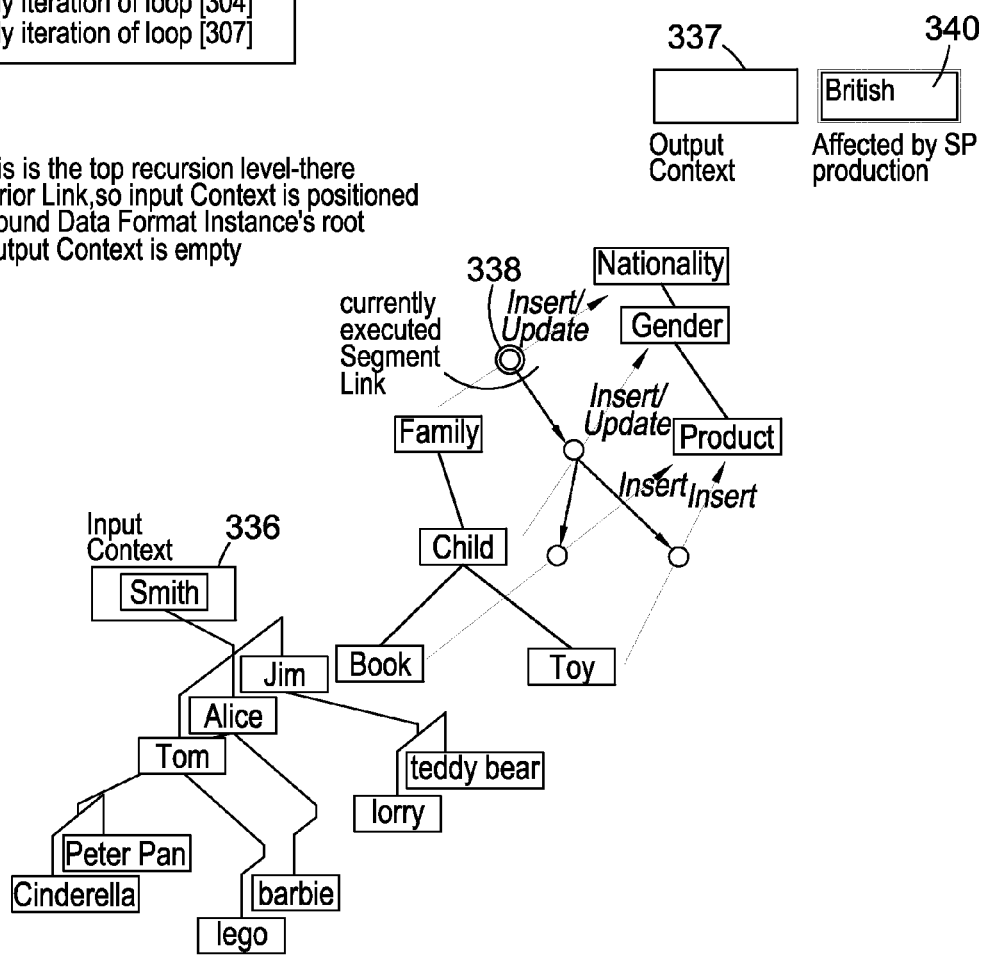
Figure 22:
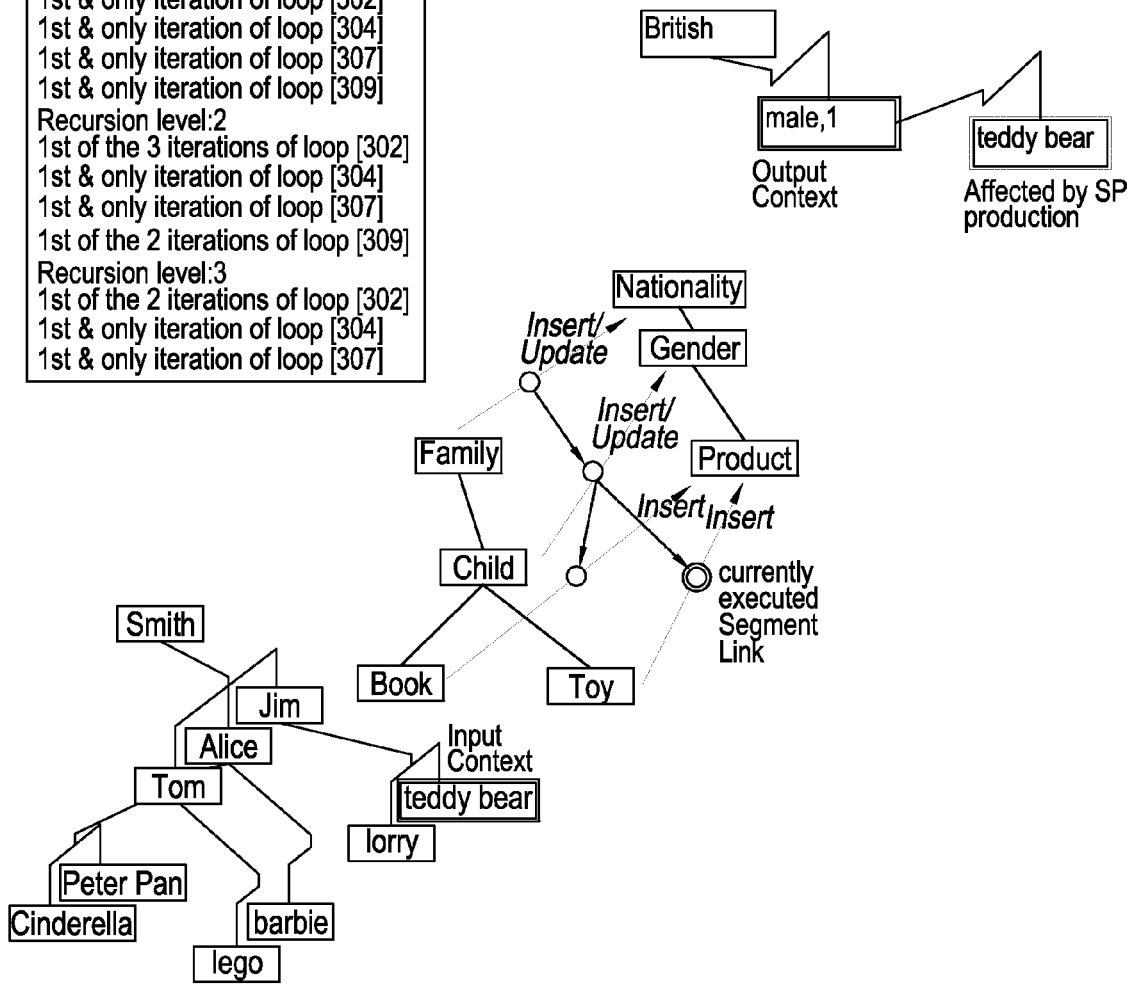
Figure 23:
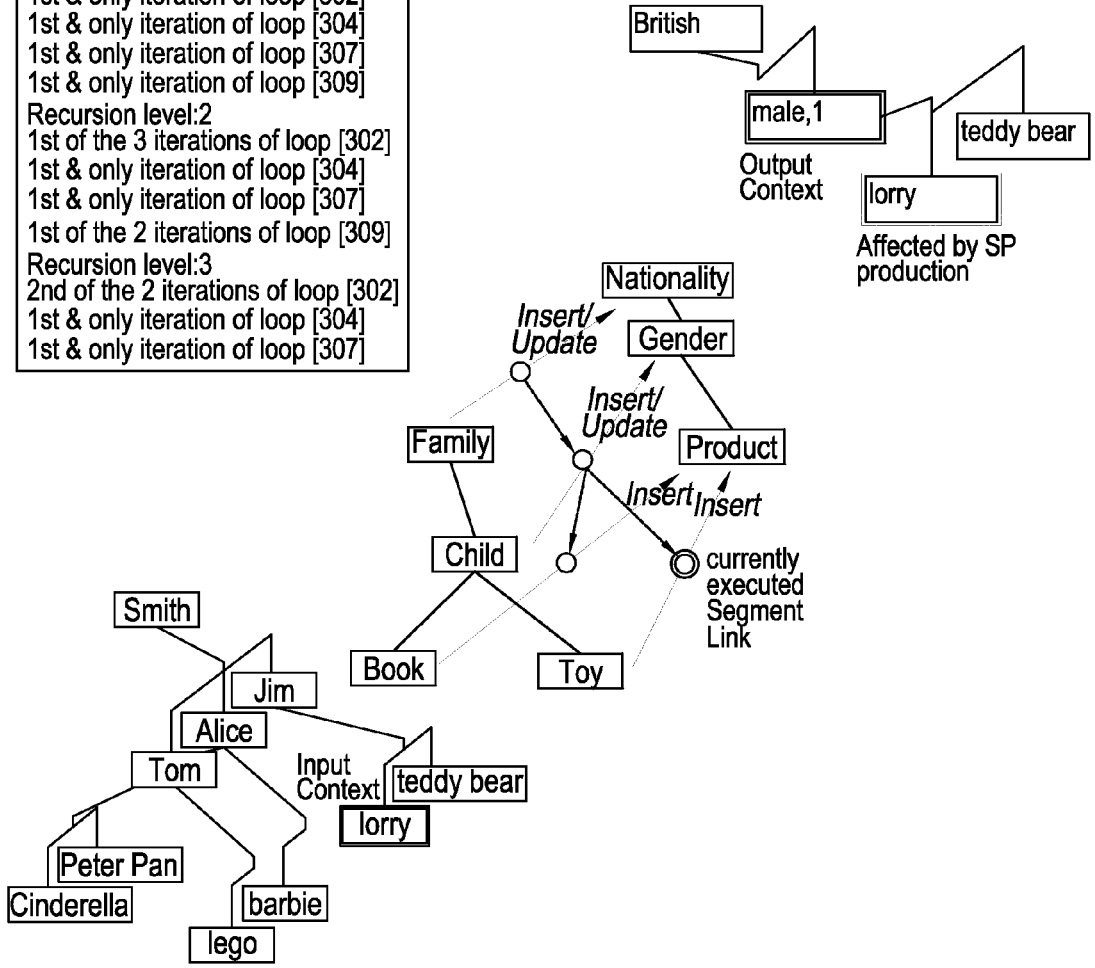
Figure 24:
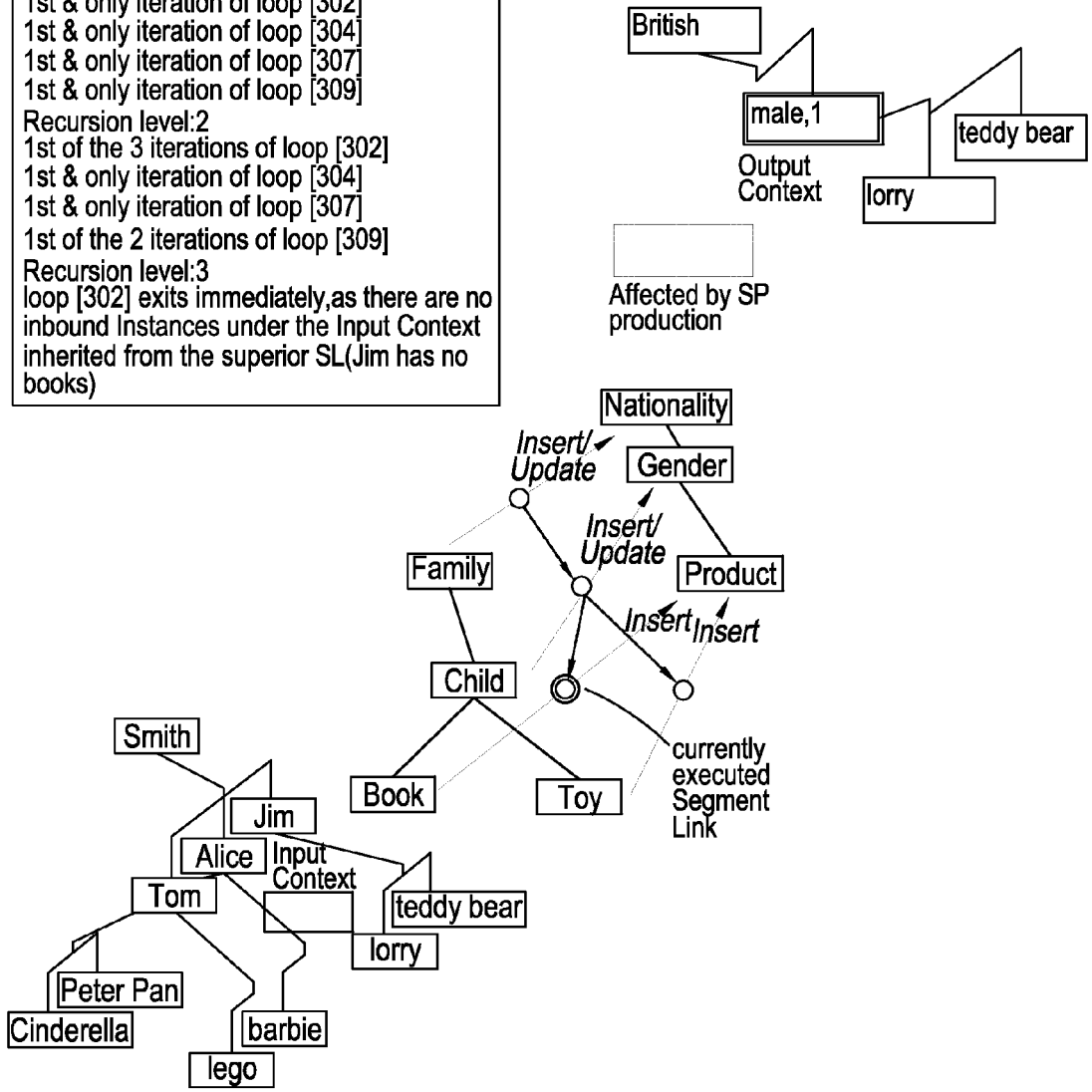

Referring to FIG. 20, the Input Context 336 can be identified with that inbound Segment Instance the execution algorithm is currently positioned on (being the "Smith" Segment Instance in FIG. 20), whereas the Output Context 337 can be identified with the outbound Segment Instance the execution algorithm is currently positioned on.

Each of the steps/boxes in FIG. 19 is numbered (within the box) from 301 to 315. Starting with FIG. 20, the algorithm of FIG. 19 starts at box 301. The algorithm moves to the root Segment Link (SL), as indicated by circle 338 in FIG. 20. The Operation Mode of this SL is "Insert/Update", as indicated on the SL in FIG. 20. In box 301 the Input Context 336 is positioned on the root inbound Segment Instance, ie "Smith", and the Output Context 337 is not yet used.

We next move to box 302, which has no effect as we are still at the first instance in the root SL.

In box 303 the algorithm executes the current Segment Link's Segment Processor (SP), and this produces the temporary outbound segment instance 340, ie "British", shown in FIG. 20. This temporary "British" outbound segment instance is referred to as the "SP Production", because it is produced by the SP. The reason why it has to be temporary is because, until the operation defined by the SL's Operation Mode is performed (in box 305) the algorithm does not know what should be done. For example the SL's Operation Mode may require insertion, deletion, selection etc.

We next move to box 304, which has no effect as we are already at the first temporary outbound segment instance "British". However, it is worth noting that, although in this example the SP has produced only one temporary outbound segment instance (British), in general the SP may produce any number of temporary outbound segment instances, which is why box 304 refers to moving to the first or next temporary outbound segment instance. The temporary outbound segment instances therefore act as a sort of "pattern" which is can be viewed as being "placed over" any real (ie already existing) outbound segment instances, after which the effect on the outbound segment instances (eg insert, update, delete etc) is determined by the operation mode of the relevant Segment Link.

In box 305 the "Insert/Update" operation of the Segment Link is performed, so now the temporary "British" segment becomes a "real" British segment, because the temporary British segment is inserted into the Outbound Data Format Instance.

From box 306 we pass down to box 307 because the operation was not a deletion or replacement.

The effect of boxes 307 and 308 is to move the Output Context 337 onto the British segment (ie the segment instance affected by the Insert/Update operation).

In box 309 we move down to the next Segment Link (326 in FIG. 18), as illustrated by the circle 342 in FIG. 21.

We next enter box 310 which is the recursion box. Box 310 requires that we execute the "single link execution algorithm" again, but this time the current subordinate SL (ie 326 in FIG. 18) becomes the "current SL", and the current SL (ie 324 in FIG. 18) becomes the "superior SL". The "single link execution algorithm" is just another name for the algorithm of FIG. 19, and we therefore follow the dotted line back to box 302. The terms "current SL", "subordinate SL" and "superior SL" are all terms used in the algorithm of FIG. 19, and so the effect of entering recursion in box 310 is that we start again from the Segment Link (326 in FIG. 18) which we have just moved to.

FIGS. 22 to 25 illustrate how the outbound segment instances are built up as the algorithm progresses.

Figure 19A:
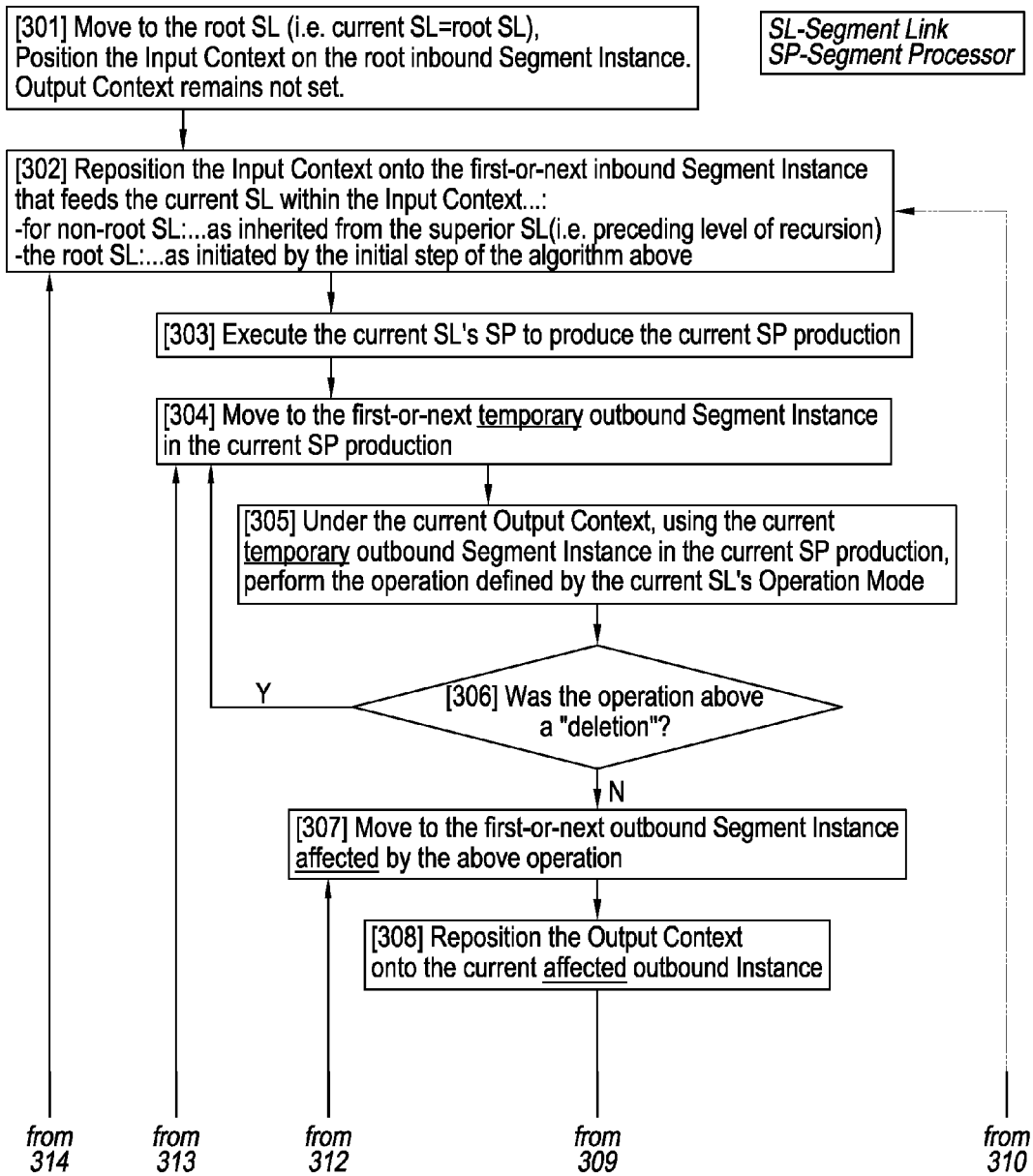
FIG. 19a/b shows a Hierarchy Transformation algorithm, also referred to as a "single Link execution algorithm", which defines the manner in which Segment Links may be processed during hierarchy transformation.
Figure 19B:
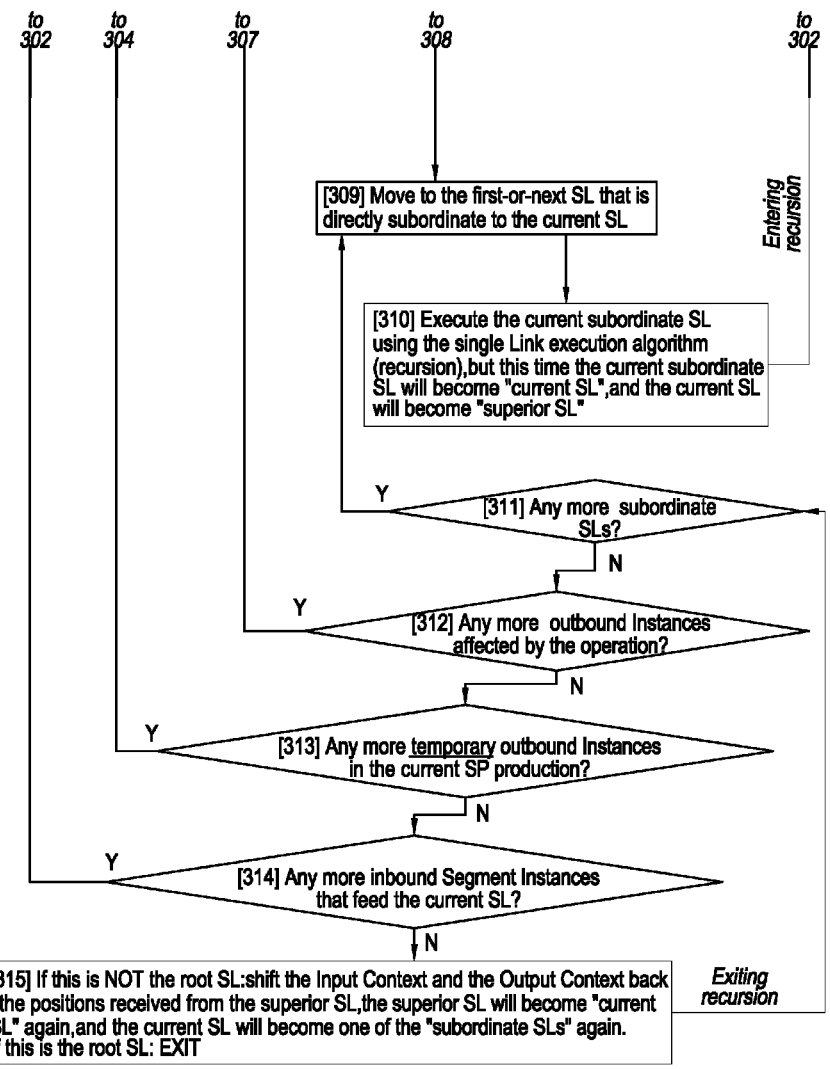

As an alternative to following the flow chart shown in FIGS. 19a and 19b, the execution algorithm can be understood as follows.

Step 1. For each inbound segment instance that feeds a Segment Link (starting with the root Segment Link), run that Link's Segment Processor to produce zero, one or more temporary outbound segment instances.

Step 2. Then for each such temporary outbound segment instance perform the operation defined by the Link's Operation Mode (eg. insert, update, delete, select, replace).

Step 3. Then for each outbound segment instance affected by execution of the operation, for each Segment Link directly subordinate to the current Segment Link repeat these steps by returning to Step 1.

In Step 3, the expression "each outbound segment instance affected . . . ", this can be explained as follows: the "single temporary Instance" (i.e. the one that loop 304 is positioned on upon its single iteration) feeds and triggers the Link's operation—the result of this operation can be zero, one or more outbound Instances affected by the operation.

See below for how the term "affected Instances" should be understood for particular Operation Modes:

In the case of the "insert" operation, the affected instances can be identified with the temporary Instances, as they are grabbed by the operation and glued under the Instance pointed to by the Output Context—as in the example. Thus in the case of "insert" the number of outbound Instances is equal to the number of temporary Instances.

In the case of the "update" or "select" operations though, the affected instances would be those existing outbound Instances under the Output Context that match this particular "single temporary Instance" (in terms of Matching Key). The number of such matching outbound Instances—i.e. Instances affected by the operation—can be zero, one or more.

A Project Element is a portion of the Aptitude software which is available to a developer. The concept of HT is implemented in the following Microgen Aptitude Project Elements:

1. Hierarchy Transformation Project Element. The concept of the Segment Processor is implemented by a Complex Rule or Attribute Mapping.

2. EDF Mappings Project Elements, e.g. XML File EDF Mapping.

The Hierarchy Transformation Project Element (HT PE) implements a subset of HT concept functionality. The view of the HT that is presented to the developer in the HT PE editor is different from the purely abstract diagram of HT shown in FIGS. 18 to 25. For example, the fact that the Segment Links form a Segment Links Tree is concealed. The Segment Links Tree is not shown to the developer. Also naming is different—some abstract concept components present in the HT have different names in the HT PE.

The Aptitude Studio screenshots shown in FIGS. 26 to 29 show the transformation used in the example of FIG. 18 implemented by means of the HT PE.

In the HT PE editor (see the screenshots in FIG. 26) the Inbound Data Format (Family, Child, Toy, Book in our example) is displayed to the developer on the left side of a window, and the Outbound Data Format (Nationality, Gender, Product in our example) is displayed to the developer on the right hand side of a window. The developer is able to create and manipulate these data formats. The developer is also able to create Segment Links 351 between the inbound and outbound segments. When the developer double-clicks on a Segment Link 351, a "Segment Mapping Properties" modal window 353 is displayed. In this window 353, the developer can choose the "Mapping type" 354 of the Segment Link. This "Mapping type" corresponds with the type of Segment Processor to be used for that Segment Link. There are two "Mapping type" options available to the developer: "Attribute mapping" (selected in FIG. 26) or "Complex Rule mapping". These are the two types of the segment processor available to the developer.

When "Attribute mapping" is chosen, the lower panel 352 of the HT PE editor is automatically displayed to the developer for defining the Attribute mapping, which in this case is an implementation of the HT's Segment Processor abstract concept. In this case note that the "Complex Rule name" edit box 356 is inaccessible to the developer.

In the very same modal window 353, the developer can set the Segment Link Operation Type 355—in this case "Insert/Update".

In the Attribute mapping panel 352 each segment can be expanded to show the attributes of each segment, or collapsed, by clicking on a + or − sign beside the segment name. For example the Family (root) segment has two attributes, which are "Surname" and "Nationality". The developer is able to create and change the mappings between the inbound and outbound attributes. When the developer double-clicks on an outbound Segment attribute, an "Attribute mapping Properties" modal window 357 is displayed. In this window, the developer can specify if the attribute is to be a Matching key 358. Matching keys are discussed later.

Edit-boxes 359 and 360 specify the inbound Data Format and outbound Data Format respectively, where in the case of HT PE the inbound Data Format can be of one of the two classes: Data Object or Enrichment schema. The Outbound Data Format must be a Data Object in the case of HT PE.

Figure 26:
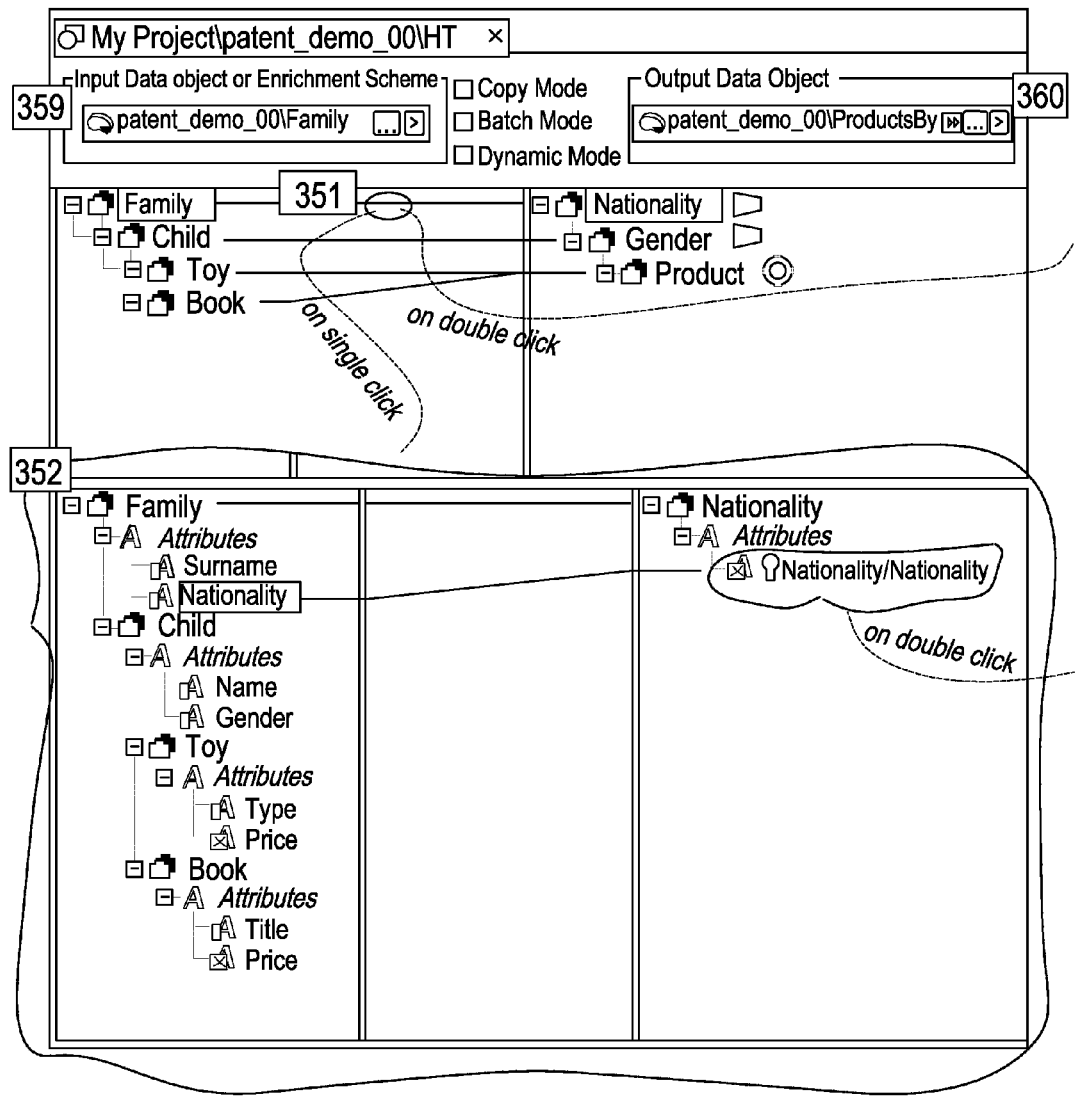
FIGS. 26 to 29 show screen shots of the Aptitude software, showing the settings which are used for the example of FIG. 18.
Figure 26:
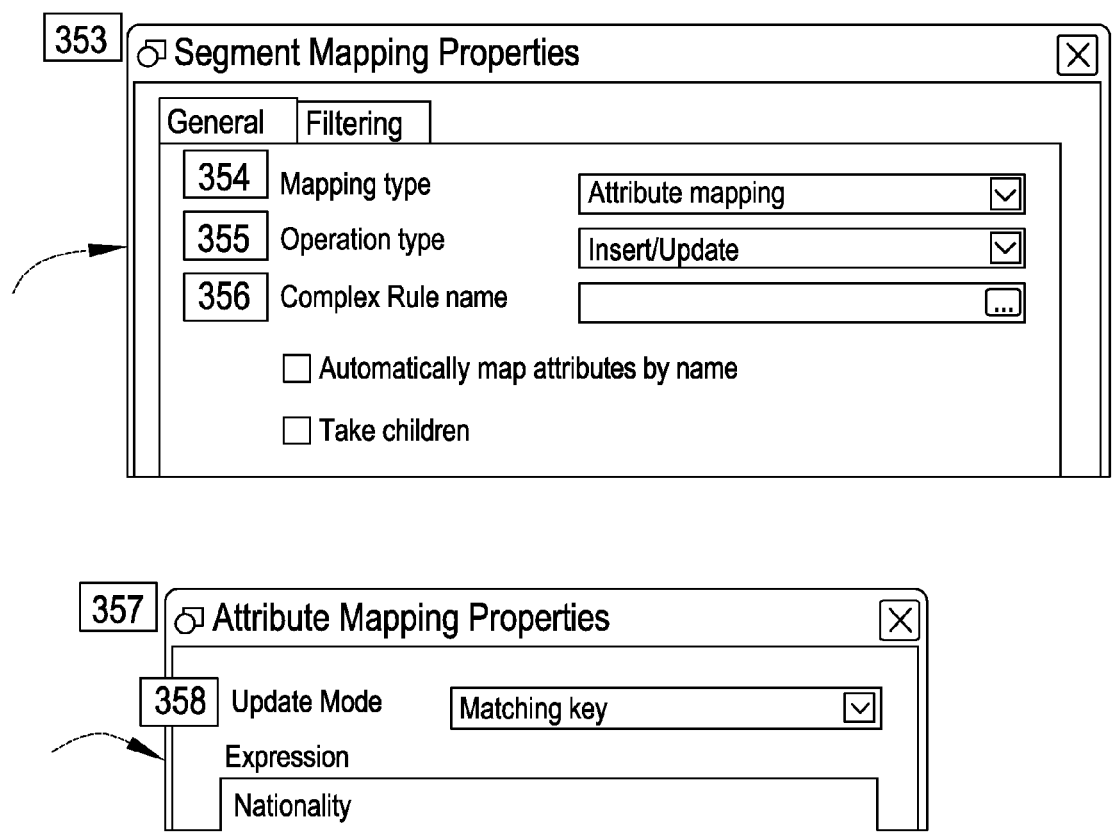
Figure 27:
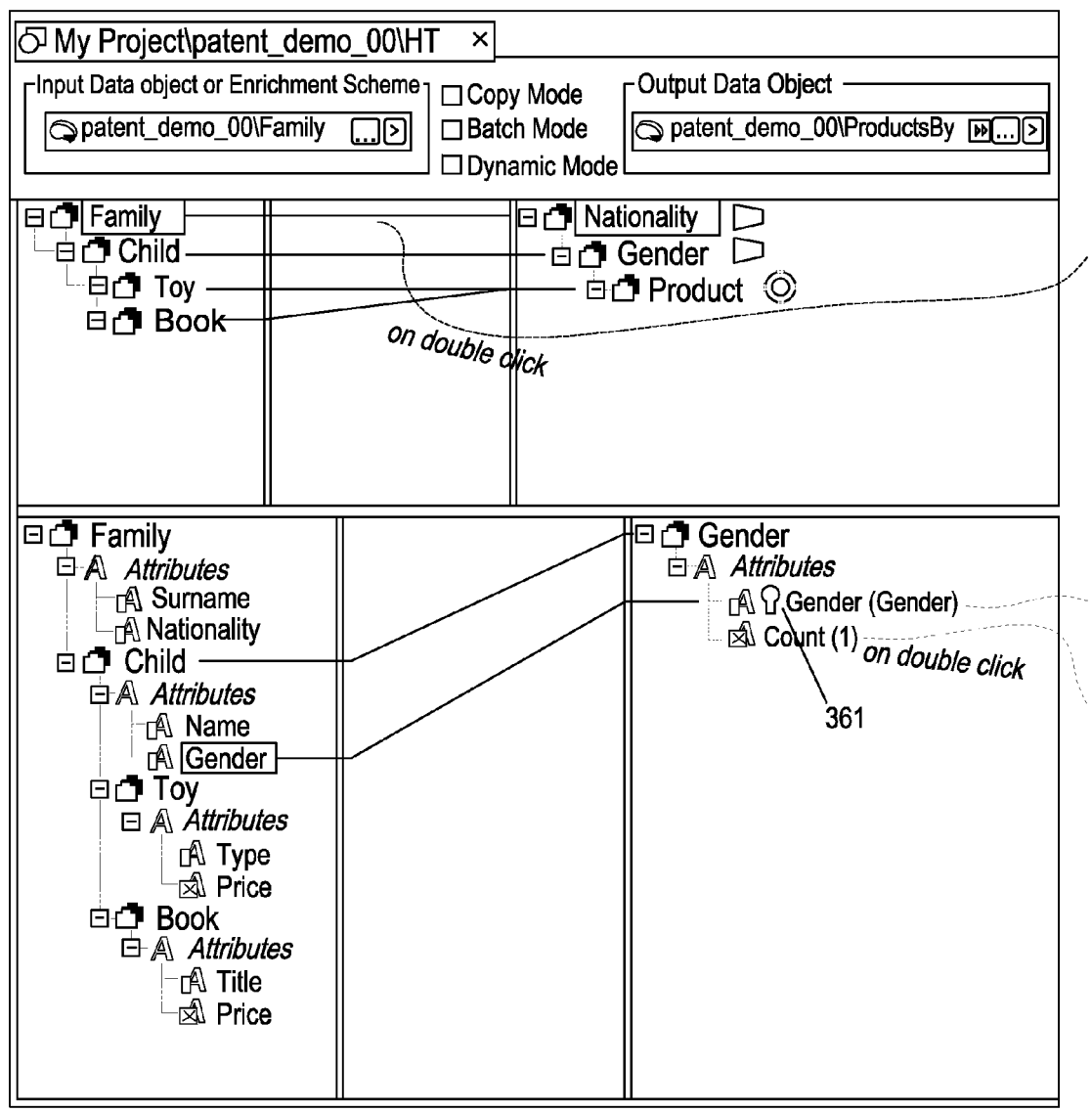
Figure 27:
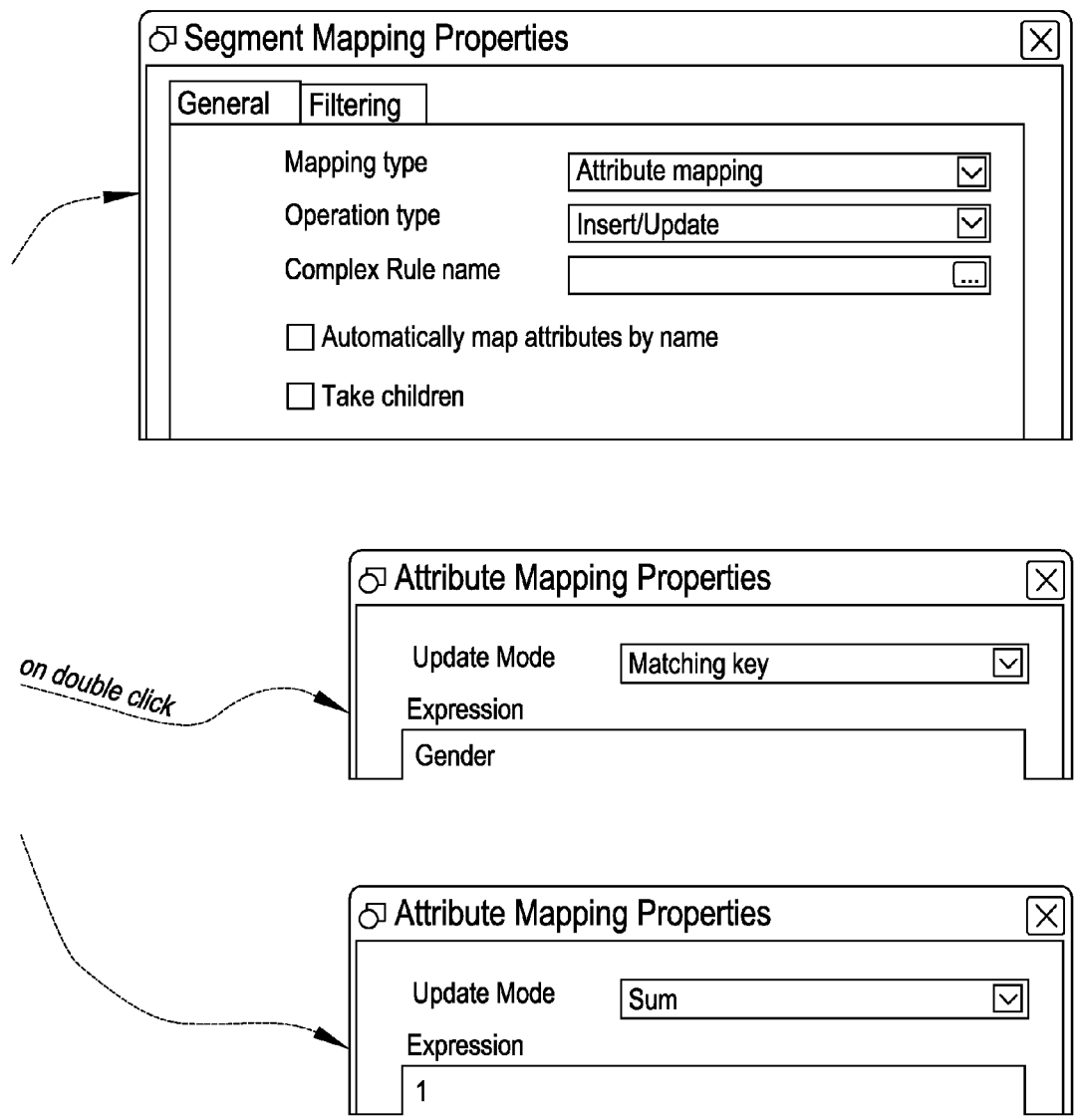
Figure 28:
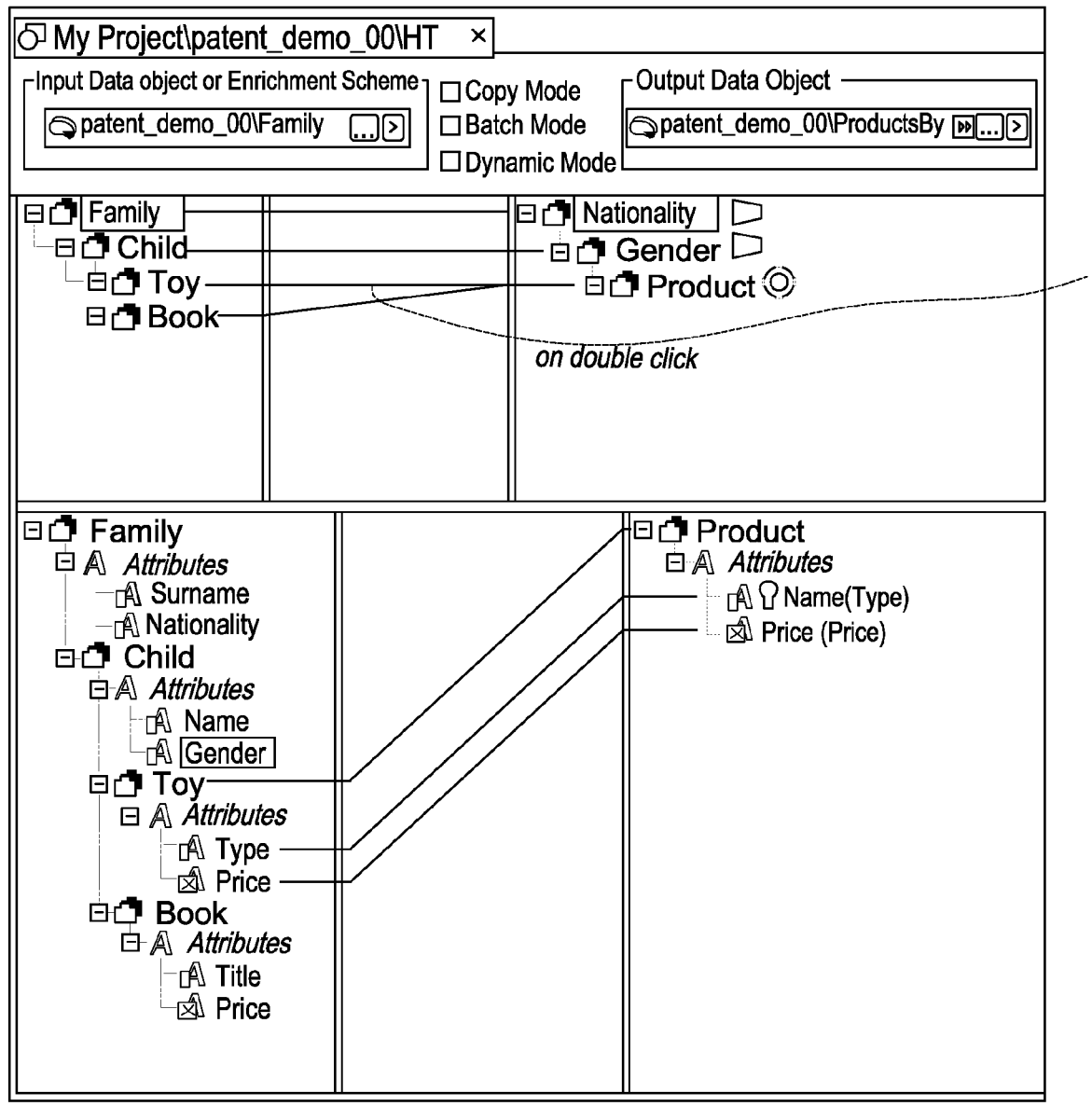
Figure 28:
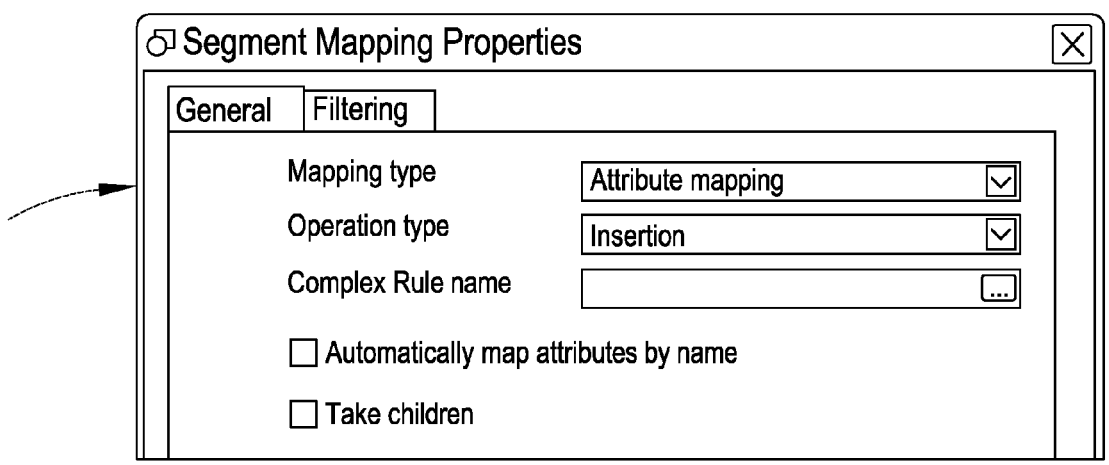
Figure 29:
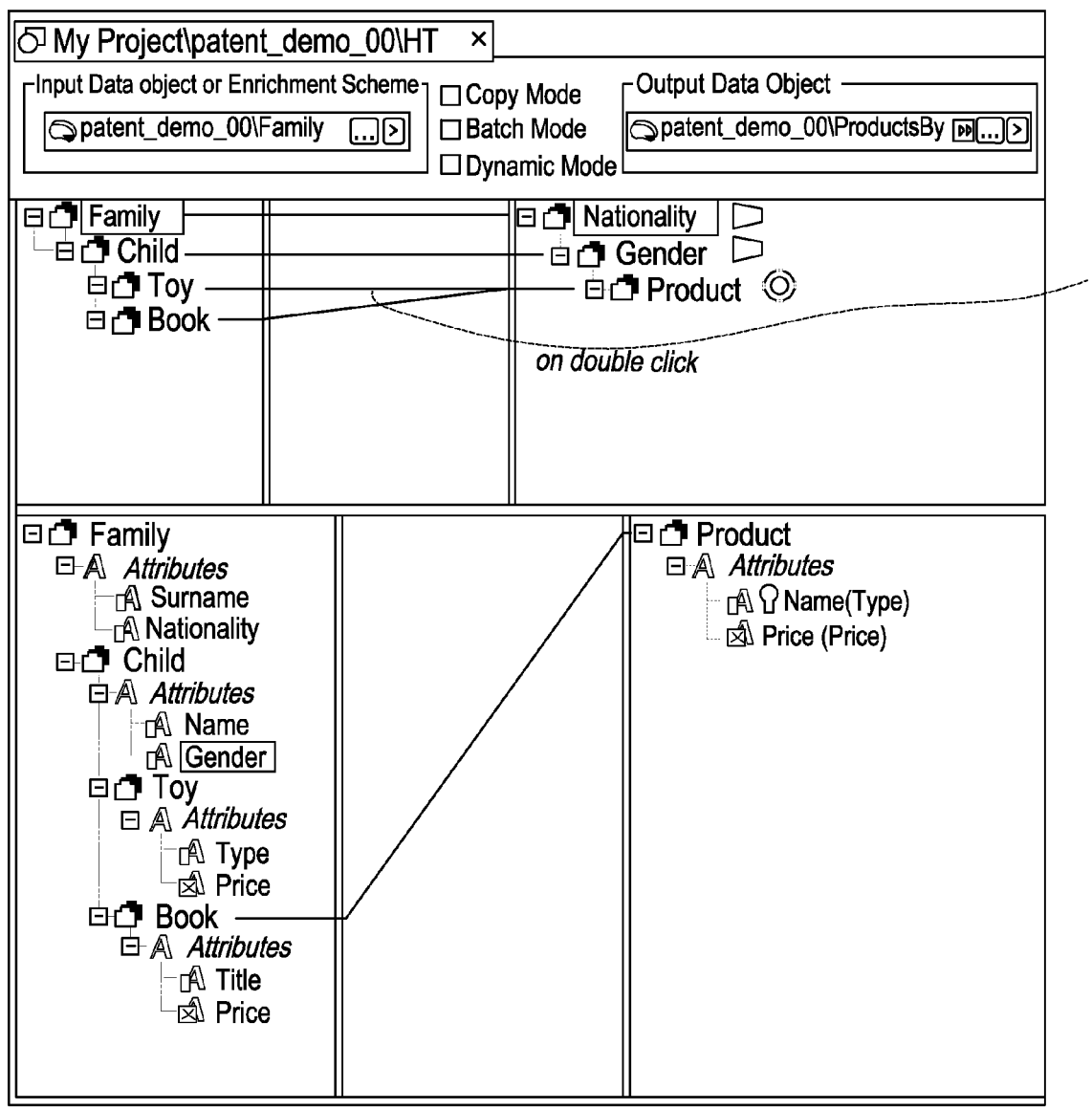
Figure 29:
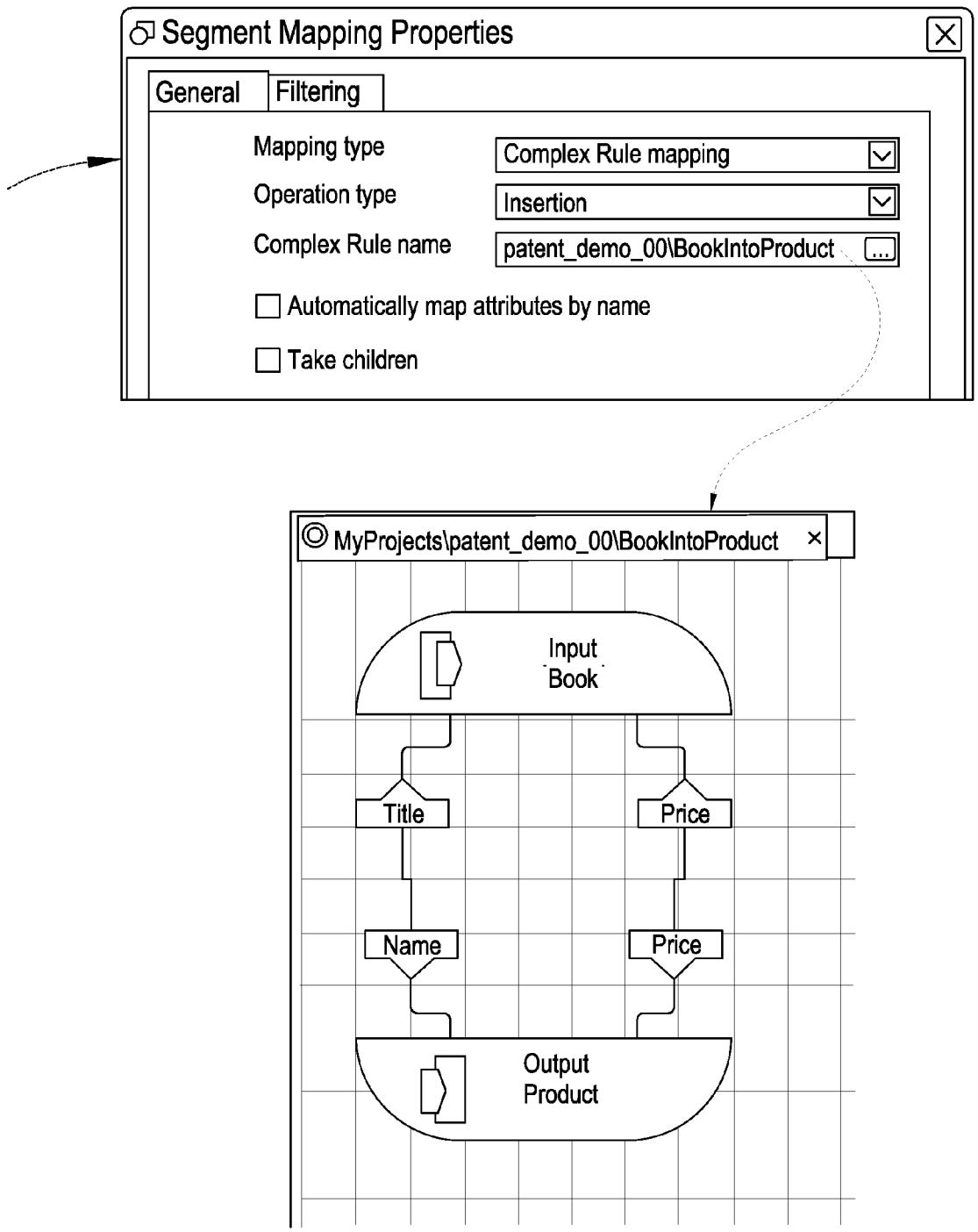

The screenshots that follow in FIGS. 27 to 29 are similar to FIG. 26, and show the settings for the rest of the Segment Links in the example of FIG. 18.

In the case of the "Book to Product" Segment Link (328 in FIG. 18), a Segment Processor in the form of a Complex Rule was used for the sake of demonstration.

Sample Transformations

FIGS. 30 to 37 show some examples of transformations that Aptitude's Hierarchy Transformation Project Element can be used for. The Segment Processor used in the examples is Attribute Mapping.

Figure 30:
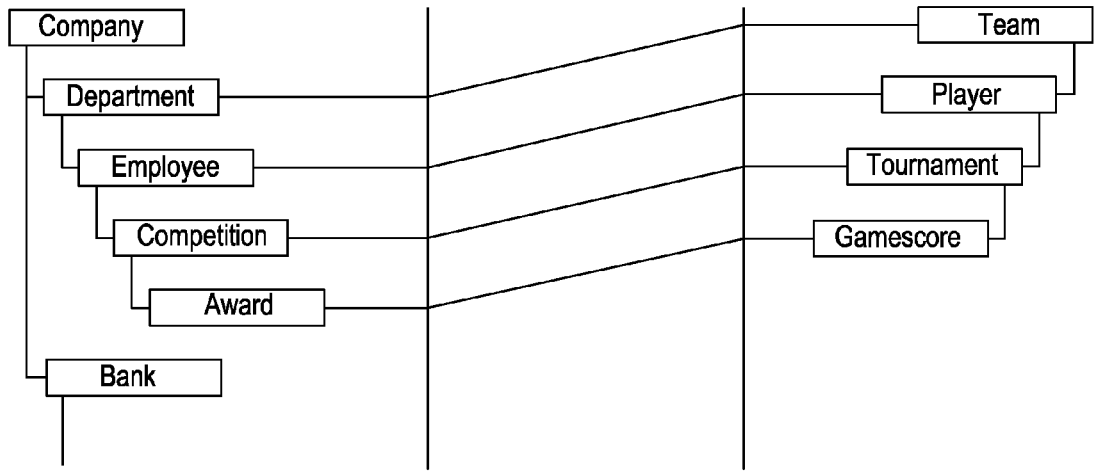

FIG. 30 shows Structure Cloning.

The linked outbound and inbound structures are actually the same (in the sense of their graph/tree structures).

FIG. 30 shows Segment Links only.

Figure 31:
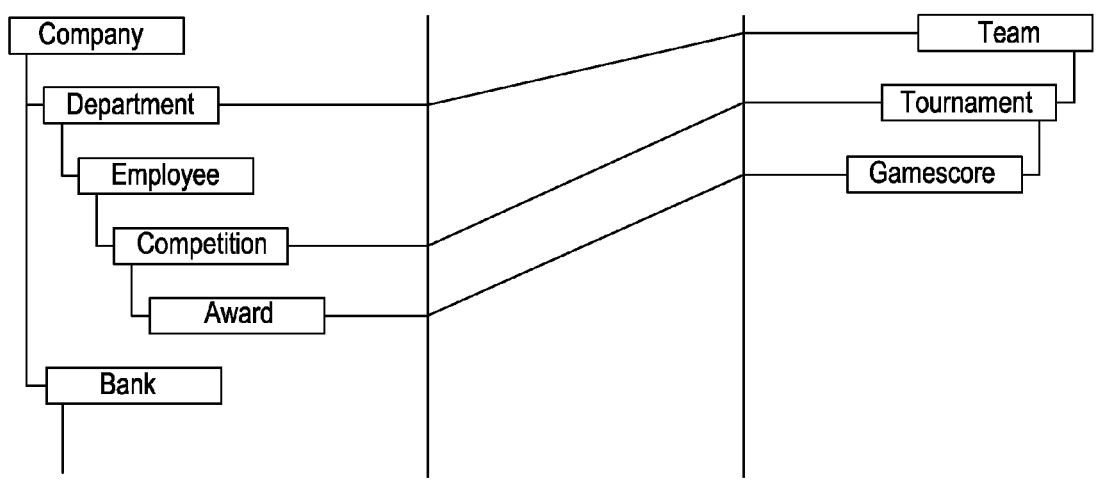

FIG. 31 shows Structure Pruning.

The linked outbound structure (on the right) has one or more Segments skipped when compared to the inbound structure.

The picture shows Segment Links only.

Figure 32:
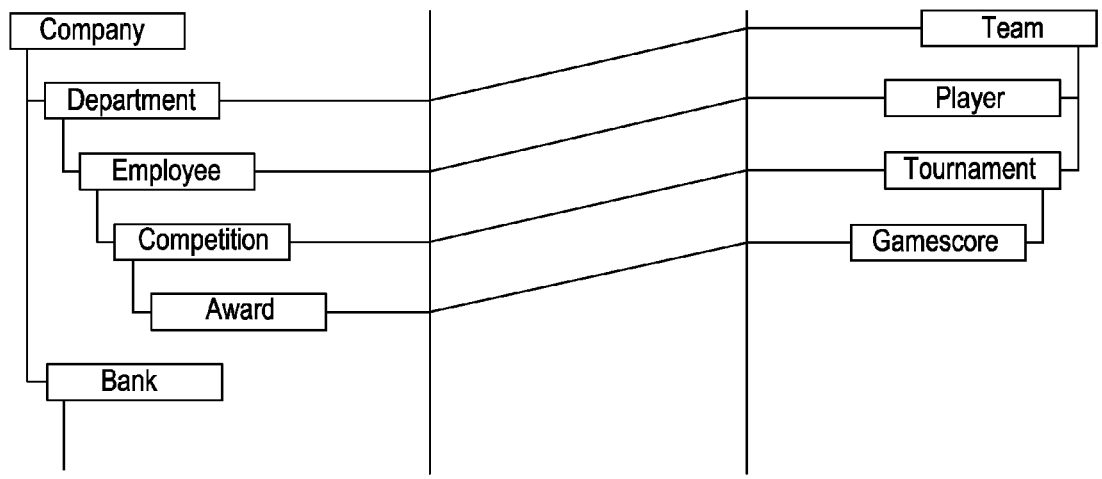

FIG. 32 shows Structure Grafting.

Two segments (Employee and Competition) of the inbound structure are linked to two sibling segments (Player and Tournament) of the output structure. By "sibling segments" we mean that the segments are both subordinate segments of the same parent segment, in this case the Team segment.

In the example of FIG. 32, the outbound structure doesn't care who actually scored the points in the tournament. The game scores in the tournament are just assigned to the team.

FIG. 32 shows Segment Links only.

Figure 33:
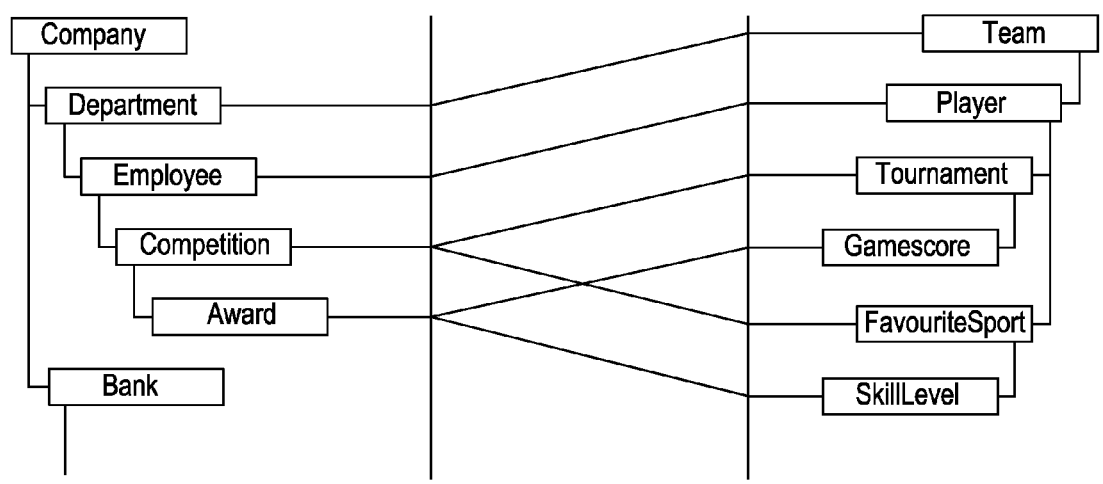

FIG. 33 shows Structure Splitting.

The Inbound structure is split into two parts in the outbound structure.

FIG. 33 shows Segment Links only.

FIG. 34 shows Structure Flattening, and shows both the segment links and the attribute mappings (visible to the developer in the attribute mapping panel 352 which was shown in FIG. 26).

The 'Account' Segment's attributes and its ancestors' attributes are mapped to the 'Account-Bank-Company' segment.

In this example the inbound structure on the left is efficient in terms of storage space. The outbound structure contains a separate record for each bank account which includes all of the company and bank details, and such a structure may be needed for certain purposes.

Figure 35:
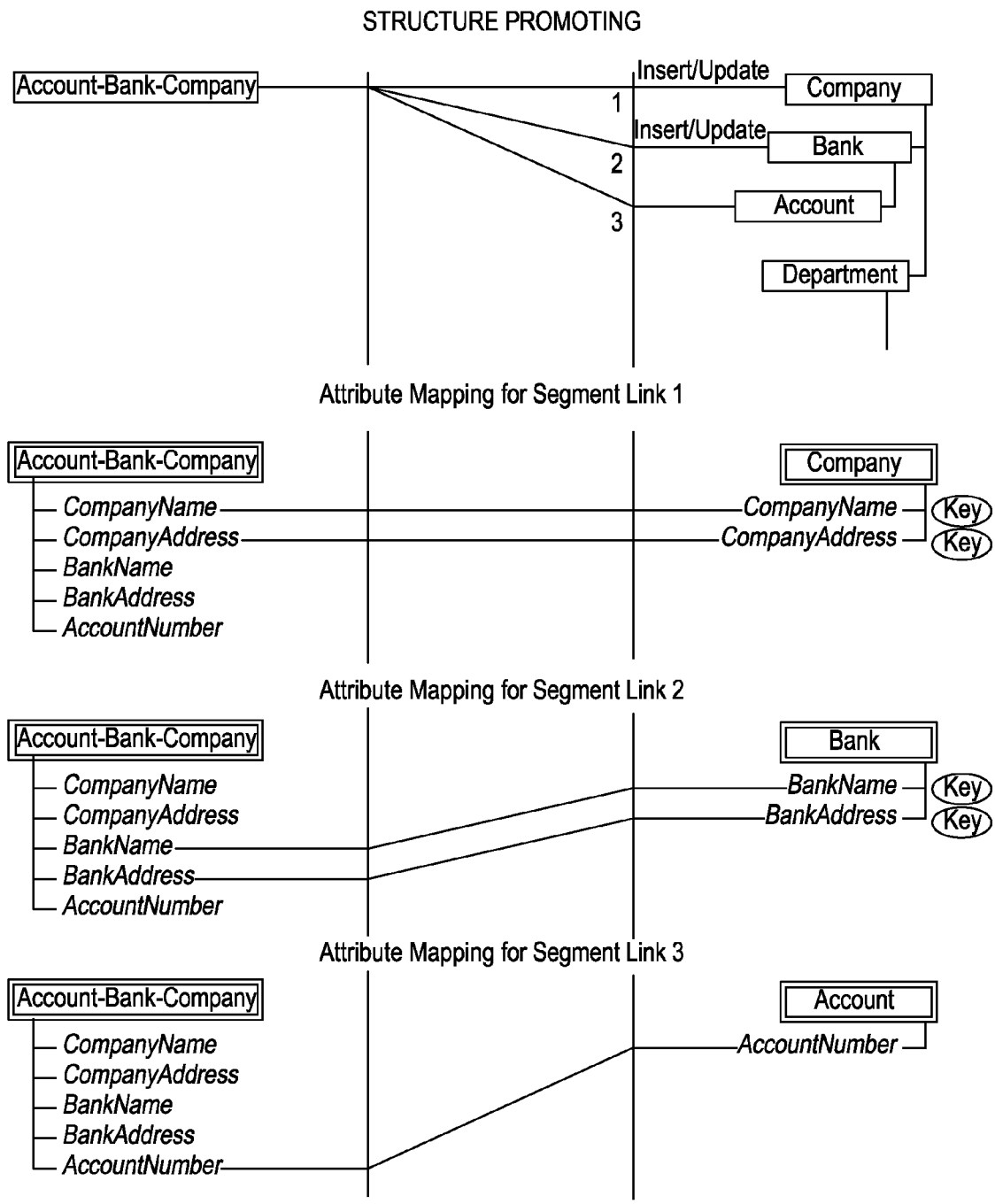

FIG. 35 shows Structure Promoting, which is the reverse of structure flattening. FIG. 35 shows Segment Links and Attribute Mappings. In this example the bank account records are transformed into a more efficient structure in which the account instances for each bank are stored under the relevant bank instances, and the various different bank instances are stored under the relevant company instances.

This example uses Matching Keys, which are represented in FIG. 35 as "Key". Matching Keys are used by the operations of the Segment Links. It should be noted that Matching Keys make sense only for some Operation Modes (update, insert/update, delete and select, but not insert or replace). The Segment Processor is not (and should never be) aware of the Link's Operation Mode nor Matching Keys.

In the Structure Promoting example of FIG. 35 the attributes "BankName" and "BankAddress" of the Bank segment are labelled as matching keys. This ensures that for each inbound instance of "Account-Bank-Company" (ie for each inbound bank account), if the bank name and address match those of an existing Bank instance (ie instance of the Bank segment in the outbound structure) then no new outbound instance of the bank should be created, but instead the "AccountNumber" should be recorded under the existing Bank instance. In the Aptitude software a key-shaped icon is used alongside attributes which are matching keys, as shown for example by the key icon 361 shown alongside the Gender attribute or the Gender segment in FIG. 27.

Figure 36:
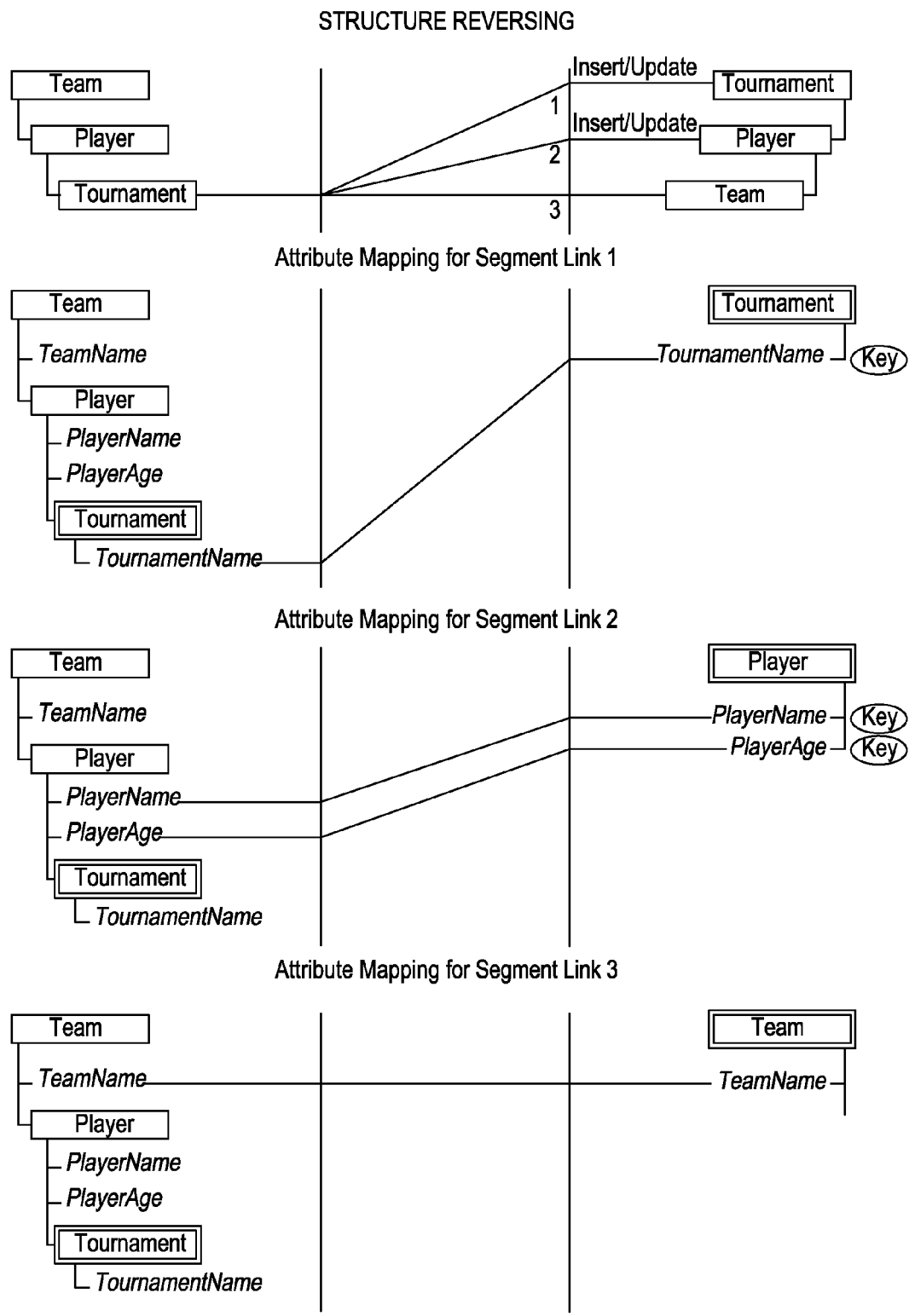

FIG. 36 shows Structure Reversing, the effect of which is to turn a hierarchical structure upside down. In the inbound structure each team has a number of players who each play in a number of tournaments. In the outbound structure each tournament is played in by a number of players, each of which may belong to a number of teams. FIG. 36 shows Segment Links and Attribute Mappings.

Figure 37:
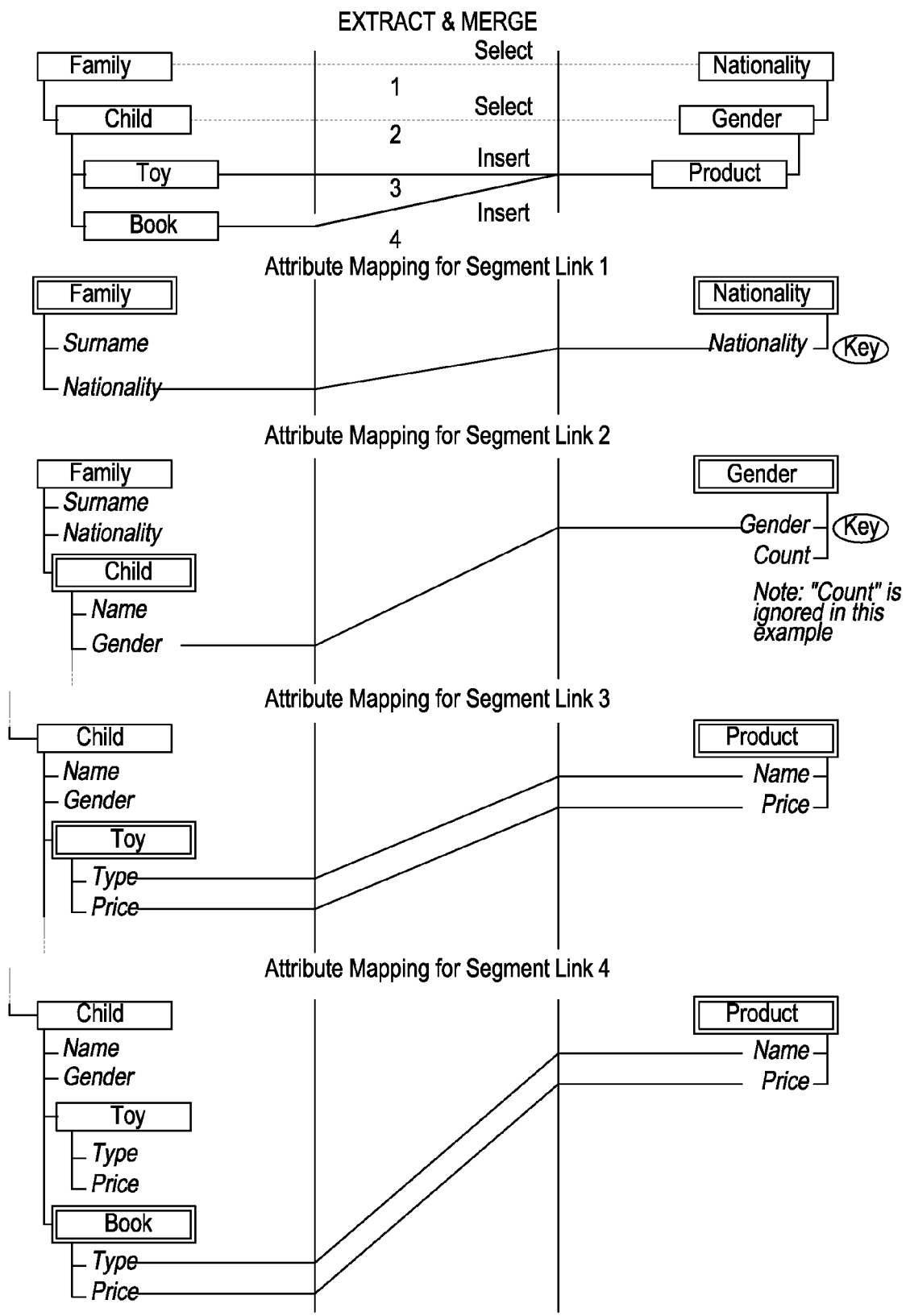

FIG. 37 shows "Extract & Merge"

The "Extract & Merge" application employs the Segment Link's "Select" Operation Mode. It usually applies where the outbound Data Format Instance is partially constructed beforehand and the transformation is to modify or add some data to the existing one where required (as determined by the Matching Keys), rather than create the whole outbound Instance from scratch.

Hierarchy Transformation in Aptitude includes the following features and benefits:

1. A graphical notation in which the developer models transformation of one tree graph into another.
2. A process of validation and compilation of such a graphical prescription of a transformation:
   a) validation: if the developer has violated the constraints that must be obeyed for the transformation to be executable by HT, they are informed about it in informative way.
   b) compilation (always preceded by validation): the graphical prescription—if validated successfully—is compiled into optimized, executable code.
3. A simple definition of a transformation—including the fact that Segment Links form the Segment Links Tree.
4. Execution of the transformation in runtime—i.e. the fact that the algorithm described in the "Execution Algorithm" chapter executes the transformation when applied to the compiled Segment Links Tree defined by the developer.
5. A wizard builds a default Segment Links Tree based on the Inbound Data Format—that means that the developer must only draw the Segment Links, but doesn't have to set up the relations between them (i.e. set up the Segment Links Tree)—this default tree generation covers a wide variety of HT applications.
6. Segment Link's features:
   a) The Operation Modes that allows complex transformations
   b) "Take Children" flag
   c) Input Filter
   d) exchangeable Segment Processor—"exchangeable" means that the Segment Processor can be changed to another one without changing the transformation itself—the only constraint on the Processor is that its input/output must match the input/output of the Segment Link.

Currently, two link processors are available in Aptitude: Attribute Mapping; and Rule Mapping, which allows rules to be embedded into the Hierarchy Transformation.

We next describe a functionality in Aptitude which we refer to as Traversal Transformation, or simply TT. Traversal Transformation allows a developer to create a Microflow (being a flow diagram within Aptitude comprising Aptitude icons and links), such as that shown in the example of FIG. 43, which includes Traversal Transformation nodes 402, 404, as will be described below. Such Traversal Transformation nodes are particularly important for processing data objects containing recursive segments, as will be described below.

Traversal Transformation (TT) involves breaking down the programming paradigm of iteration across a collection of items into a handful of abstract component concepts. These component concepts, when named, specialized and combined together, can cover a wide range of data processing issues.

Figure 43:
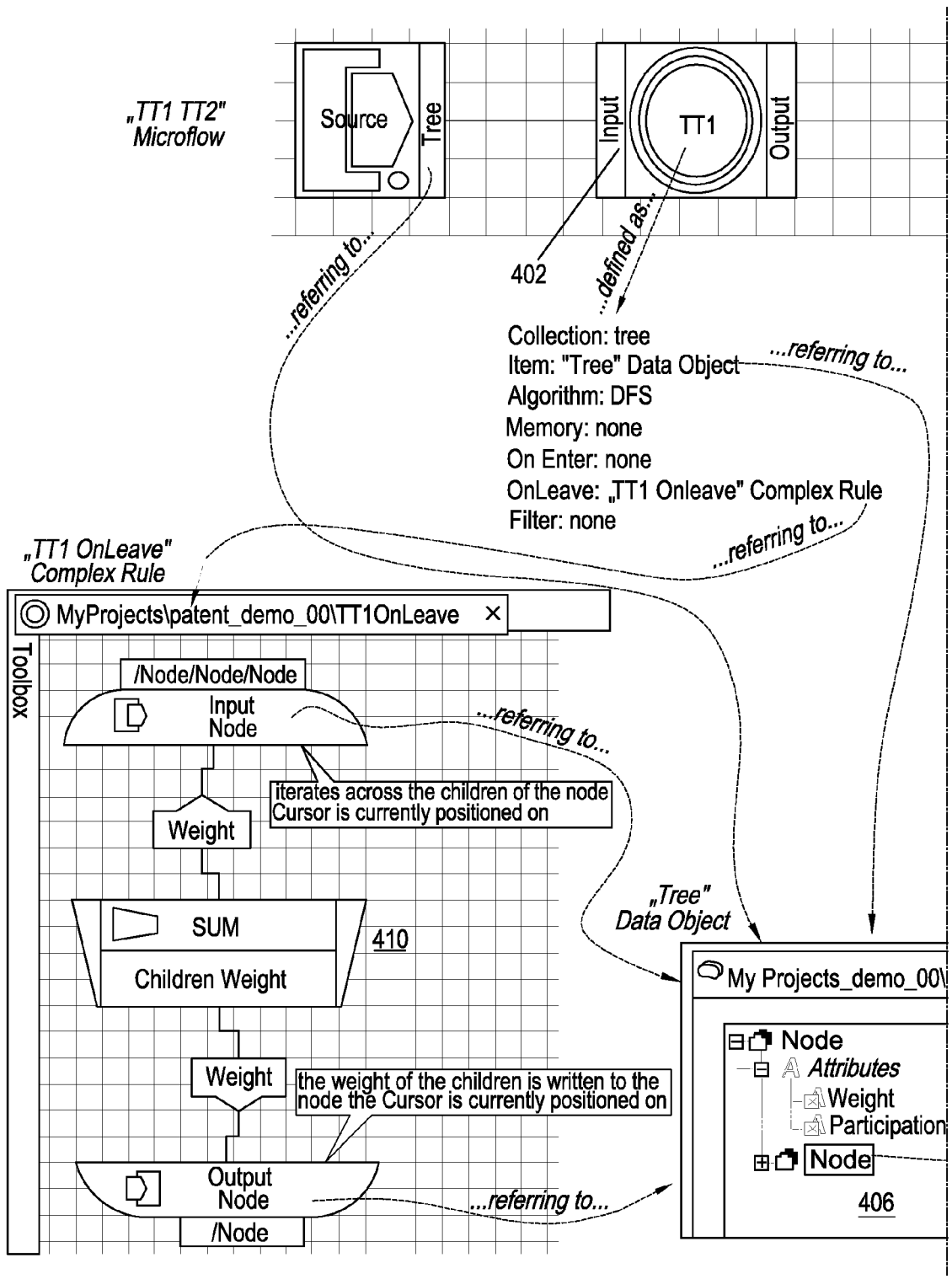
FIG. 43 shows implementation of the exemplary Traversal Transformations in Aptitude.
Figure 43:
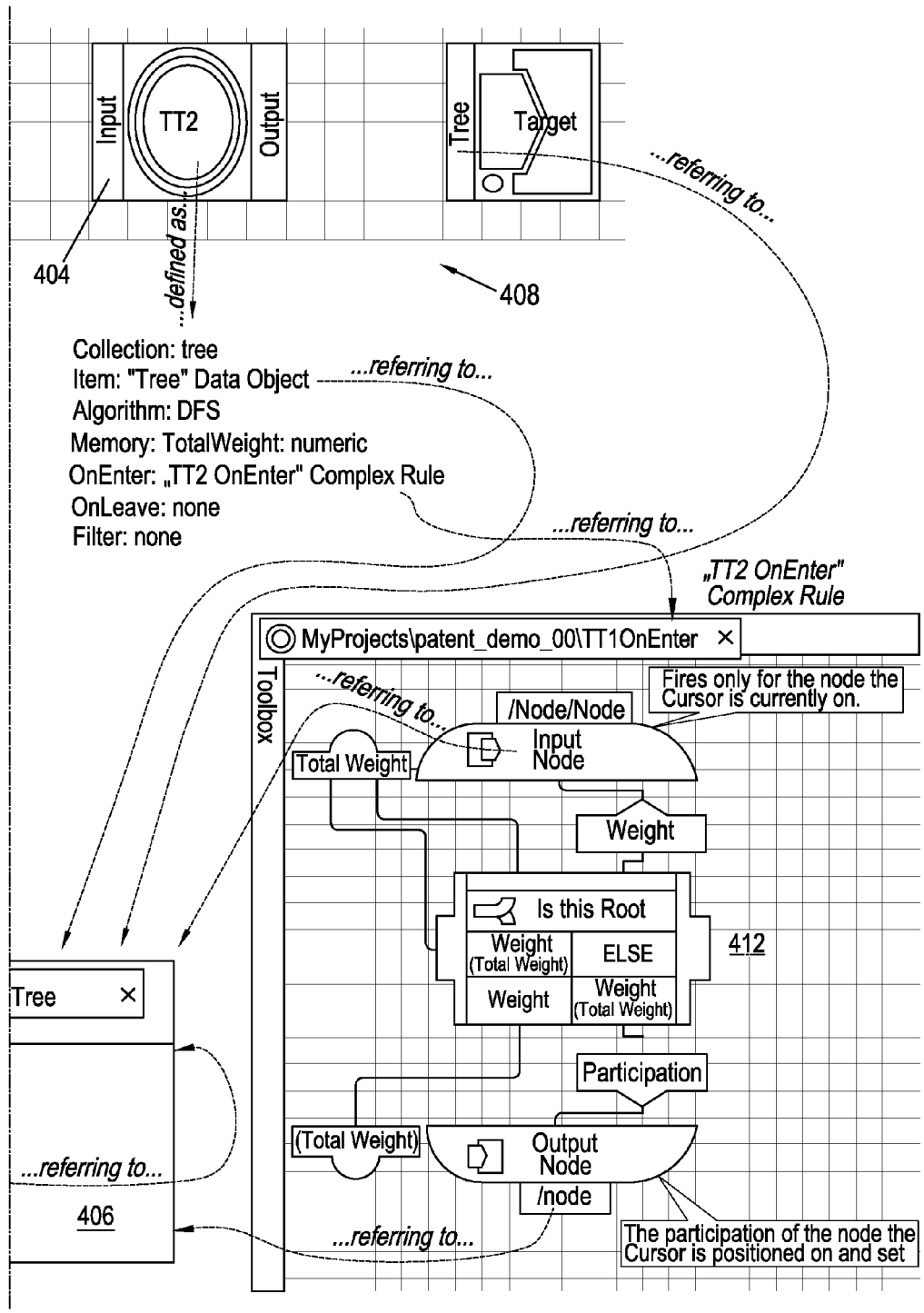
Figure 44:
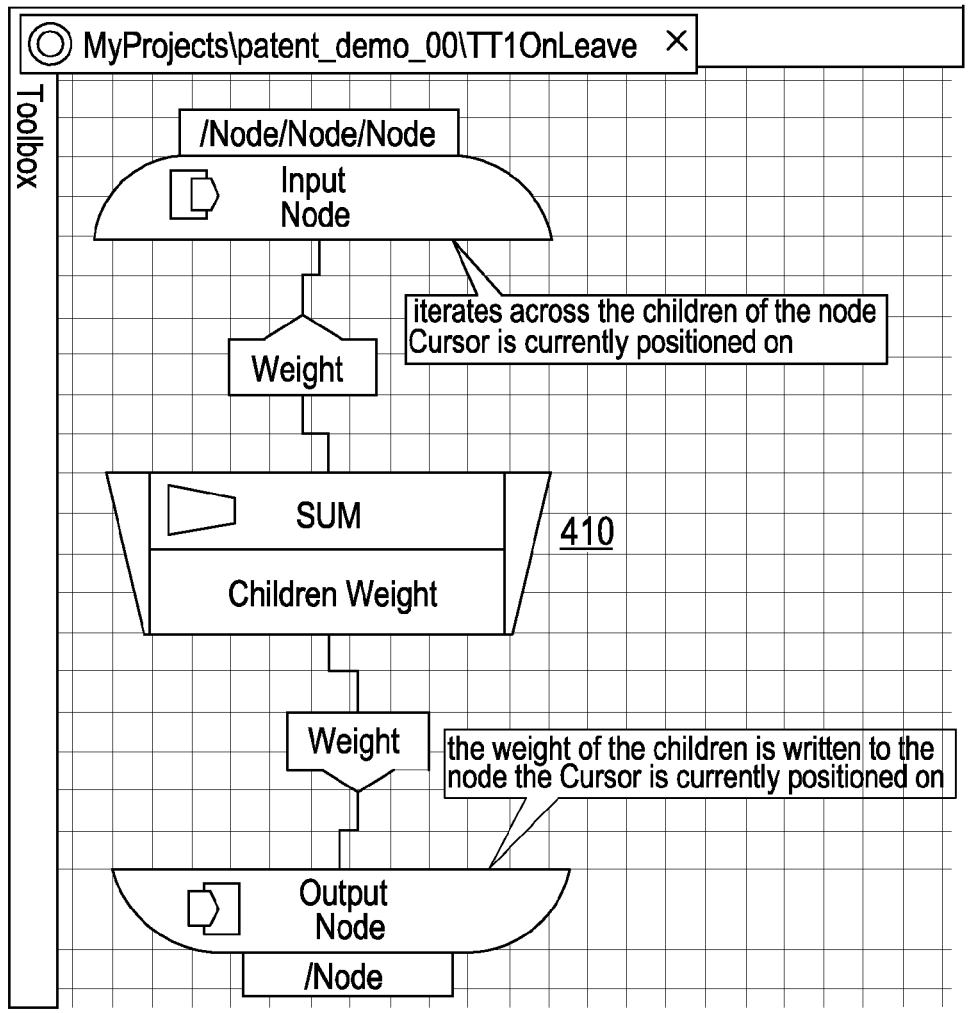
FIG. 44 shows Complex Rule "TT1 OnLeave"

We next summarise the following Traversal Transformation component concepts, some of which are declared (ie specified) by the developer when defining a Traversal Transformation node, such as the nodes 402 and 404 of FIG. 43:

Item: This is declared (ie specified) by the developer (ie the user of the Aptitude graphical interface). It is an item of any collection, for example:
   an item in a list; or
   a node in a tree graph.

Such a tree graph is in this case (ie in the context of Traversal Transformations) a data object which has recursive segments. The example of FIG. 43 shows, in the window 406, how such a data object is defined by the developer in Aptitude. In this example the root segment is called "Node" and has two attributes (ie weight and participation, which will be described below) together with a segment (ie the next level downwards in the tree) which is also "Node". This is an example of a recursive data object. An instance of the data object (Node) can potentially be of any (ie infinite) depth.

Collection: This is declared by the user. It is a collection of Items, for example:
   a list; or
   a tree graph.

Cursor: This is not visible to the user or developer. It is an auxiliary runtime concept, which can be thought of as an entity that visits Collection Items in the order specified by the Algorithm (see below).

Algorithm: This is declared by the developer. It can for example be a known algorithm (suitable for the type of the Collection) according to which the Cursor traverses the Collection, e.g.
   a backward iteration across a list; or
   a DFS (Depth First Search) graph traversal algorithm.

The developer may be presented with a number of different algorithms to choose from, and simply has to choose one from a list in a window. This makes the process straightforward for the developer as he/she does not have to devise the algorithm from scratch.

"On Enter" Event Handler and "On Leave" Event Handler: These are declared (ie specified) by the developer, and represent the actions that are performed when the Cursor enters or leaves an Item respectively.

The Handler can modify everything provided by the Context (Context is defined below). A Handler can also embed and execute another Traversal Transformation. The Event Handler may also be defined by a (graphical) Aptitude Rule, which may make use of data from the tree node itself, its parent(s) and/or its child(ren).

Filter or Selector: This is declared (ie specified) by the developer. It is an entity (in software) that evaluates conditions (specified by the developer) that must be met by an Item to fire the Event Handlers on this Item. If the conditions are not met the Cursor simply moves to the next item.

The Filter (also referred to as a Selector) can modify everything provided by the Context (Context is defined below) except the current Item (defined below). This is because modification of the current item is done only by the Handlers (referred to above). However, the Filter is not prevented from modifying other things, such as the Context's Memory for example. The logic of the Filter can be quite complex—for example it may require caching some results calculated in one iteration to perform filtering in another iteration.

The Filter can embed and execute another Traversal Transformation, but the Event Handlers of this embedded Traversal Transformation cannot modify any Item in the Collection. The logic of the Filter can be quite complex—for example, prior to the decision whether the current Item is to be processed or not, the Filter may require iteration across a collection other than the one the Traversal Transformation is currently dealing with. To do this, it is possible to use another Traversal Transformation that runs across the other collection and that shares the Memory with the current Traversal Transformation.

Aptitude's Traversal Transformations can be recursive and reusable. Recursion and reusability is also applicable in Hierarchy Transformations (described earlier). For example, a Segment Processor could embed another Hierarchy Transformation, or event Traversal Transformation—and vice versa—a Traversal Transformation could employ a Hierarchy Transformation.

Context: The Context contains the following two items, ie Memory and current Item. It is important to understand that "Context" here (ie in relation to Traversal Transformations) is not related to the "Input Context" and "Output Context" described above in relation to Hierarchical Transformations. The word "Context" here has a completely separate and different meaning.

Memory: This is declared (ie specified by the developer), and is memory storage where Handlers and Selector can store some results they calculated during the current iteration for later use (i.e. in the subsequent iterations of the algorithm).

current Item: This is not something which is declared by the developer, but is instead an auxiliary runtime concept which represents the Item that the Cursor is currently on during the process of the algorithm.

We next describe, with reference to FIGS. 38 to 44, an example of the use of Traversal Transformations in Aptitude to solve the following exemplary problem.

Problem: given an input tree graph where only leaf nodes have values assigned—say this value is Weight (e.g. in kilograms)—we want to:
calculate the Weight of each sub-tree in that tree
calculate how a given sub-tree participates in the Weight of the whole tree.

Figure 38:
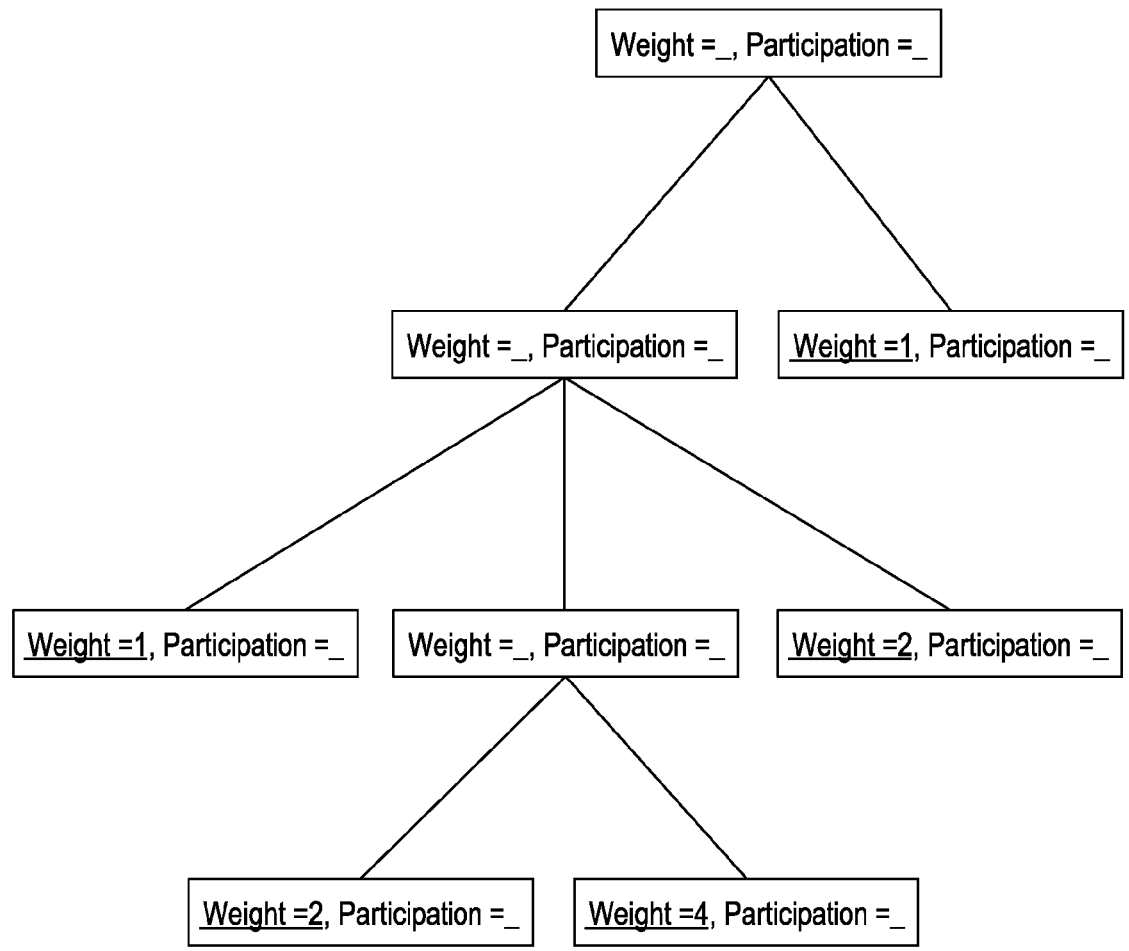
FIGS. 38 to 42 show progressive stages in the processing of an exemplary data collection, using exemplary Traversal Transformations TT1 and TT2.

FIG. 38 shows the starting position of this exemplary problem, in which the weights of only some items are known. In FIG. 38, the "Participation" of each item represents the item's weight as a fraction of the total weight.

Solution: Two Traversal Transformations will be required. We name these TT1, which is executed first and TT2 which is executed second.

Figure 39:
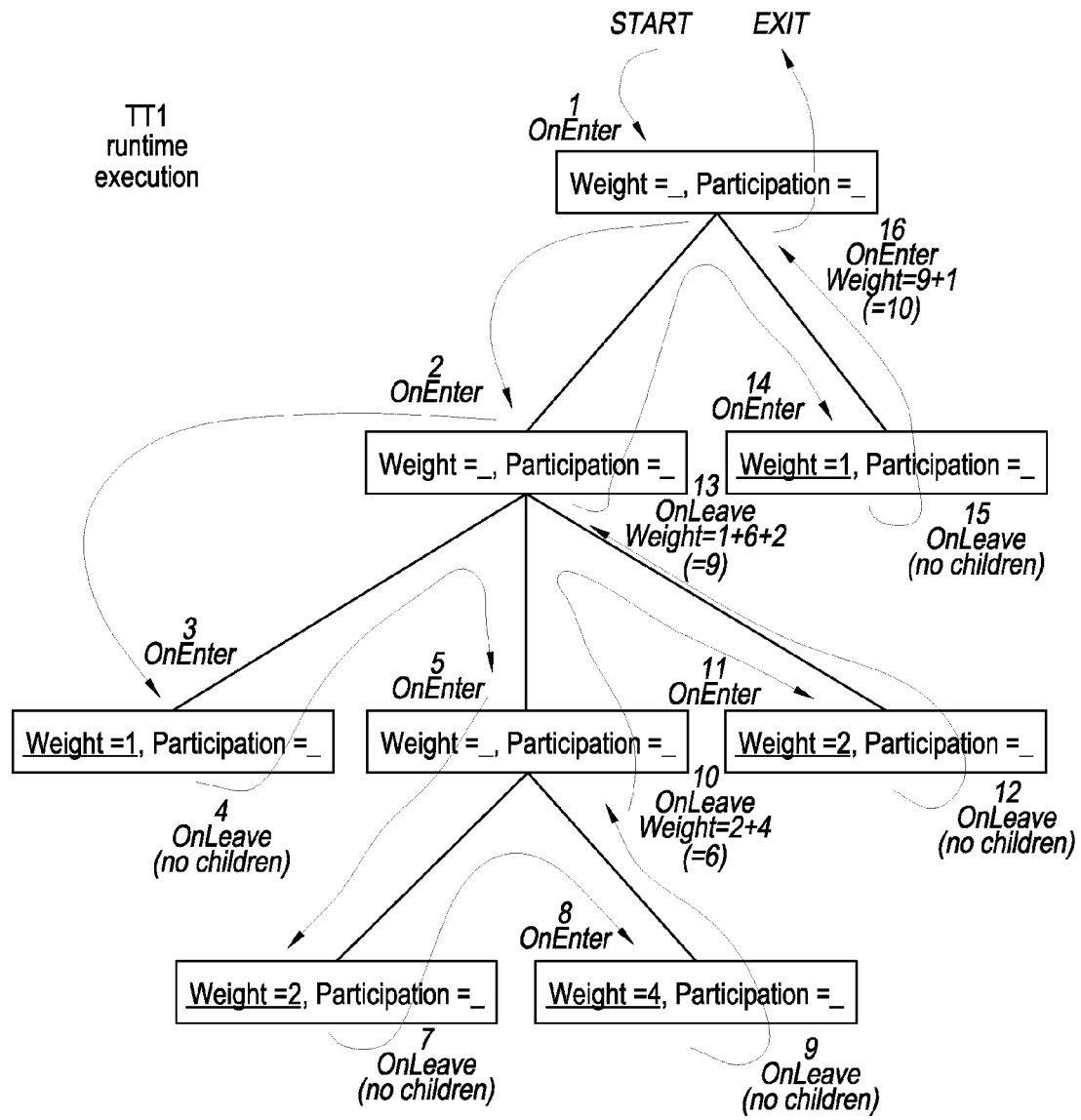

TT1 should be defined by the developer as follows:

Collection: tree
Item: a node defined as follows:
    Weight:      numeric
    Participation:   numeric
Algorithm: Depth-First-Search -continued Context Memory: NONE
"On Enter" Handler: NONE
"On Leave" Handler:
    (for the Item the Cursor is currently on) sum the Weights of the children
    (if there are any) and assign the sum to the Item's Weight
Selector: NONE TT2 should be defined by the developer as follows:

Collection: same as TT1
Item: same as TT1
Algorithm: same as TT1
Context Memory: defined as follows:
    TotalWeight:    numeric
"On Enter" Handler:
    IF there is nothing in the Context's Memory yet, that means the Cursor is on the root node, which holds the Weight of the whole tree (calculated by TT1) - store this value in the Context's Memory;
    OTHERWISE divide the current Item's Weight by the TotalWeight stored in the Context's Memory and assign the result to the Item's Participation.
"On Leave" Handler: NONE
Selector: NONE FIG. 39 shows how the algorithm of TT1 traverses the tree and shows (by means of the dotted arrows between START and EXIT) the sequence in which the Event Handlers are triggered during execution of TT1.

Figure 40:
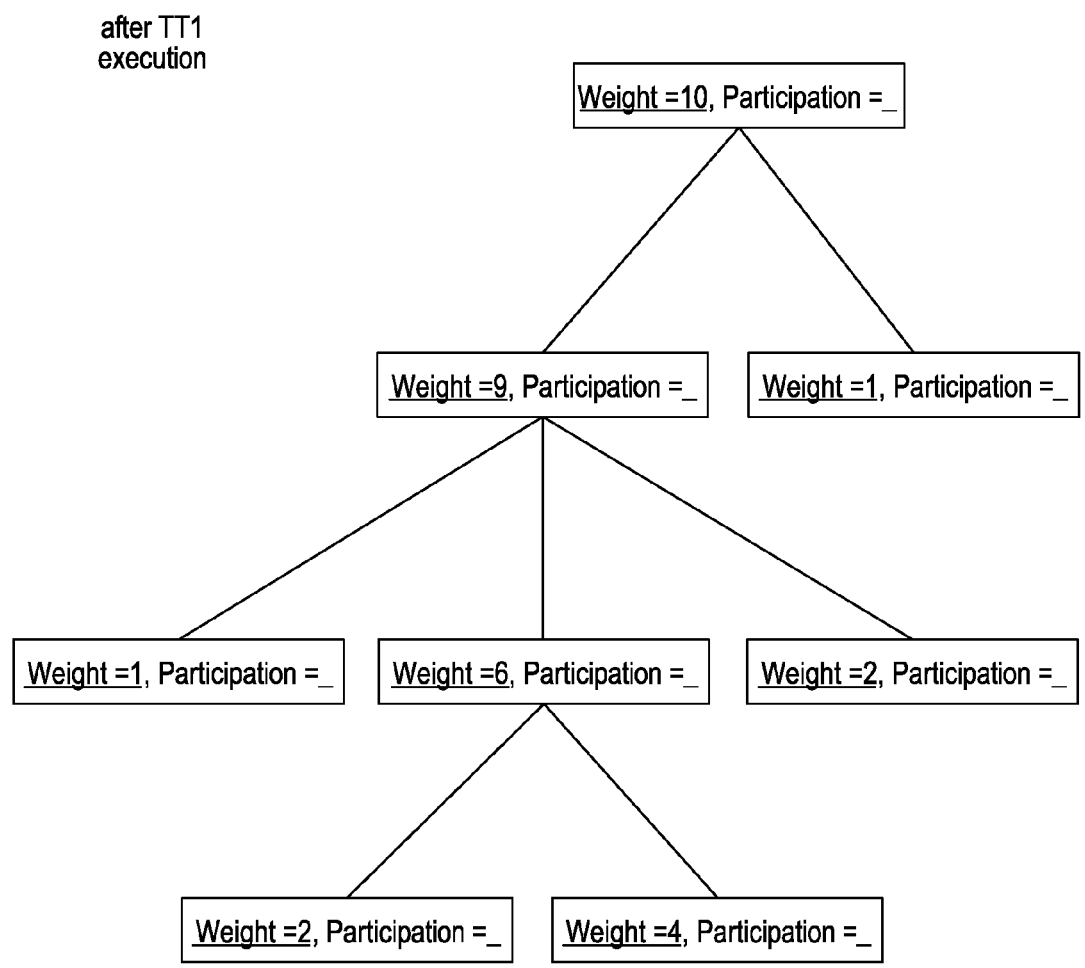

FIG. 40 shows the tree right after the execution of TT1. The weight of each item has been added to each item.

Figure 41:
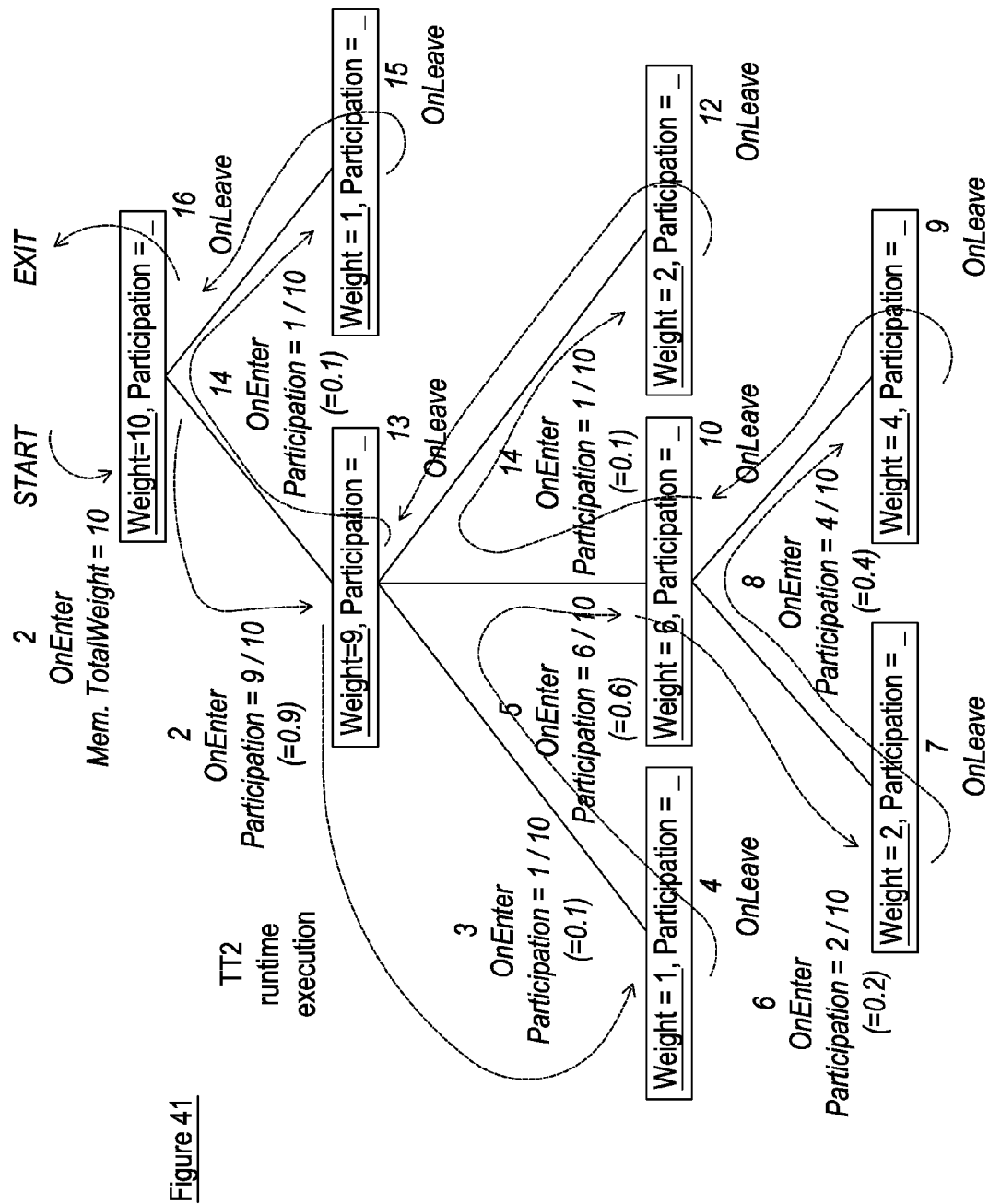

FIG. 41 shows how the algorithm of TT2 traverses the tree and shows the sequence in which Event Handlers are triggered during execution of TT2.

Figure 42:
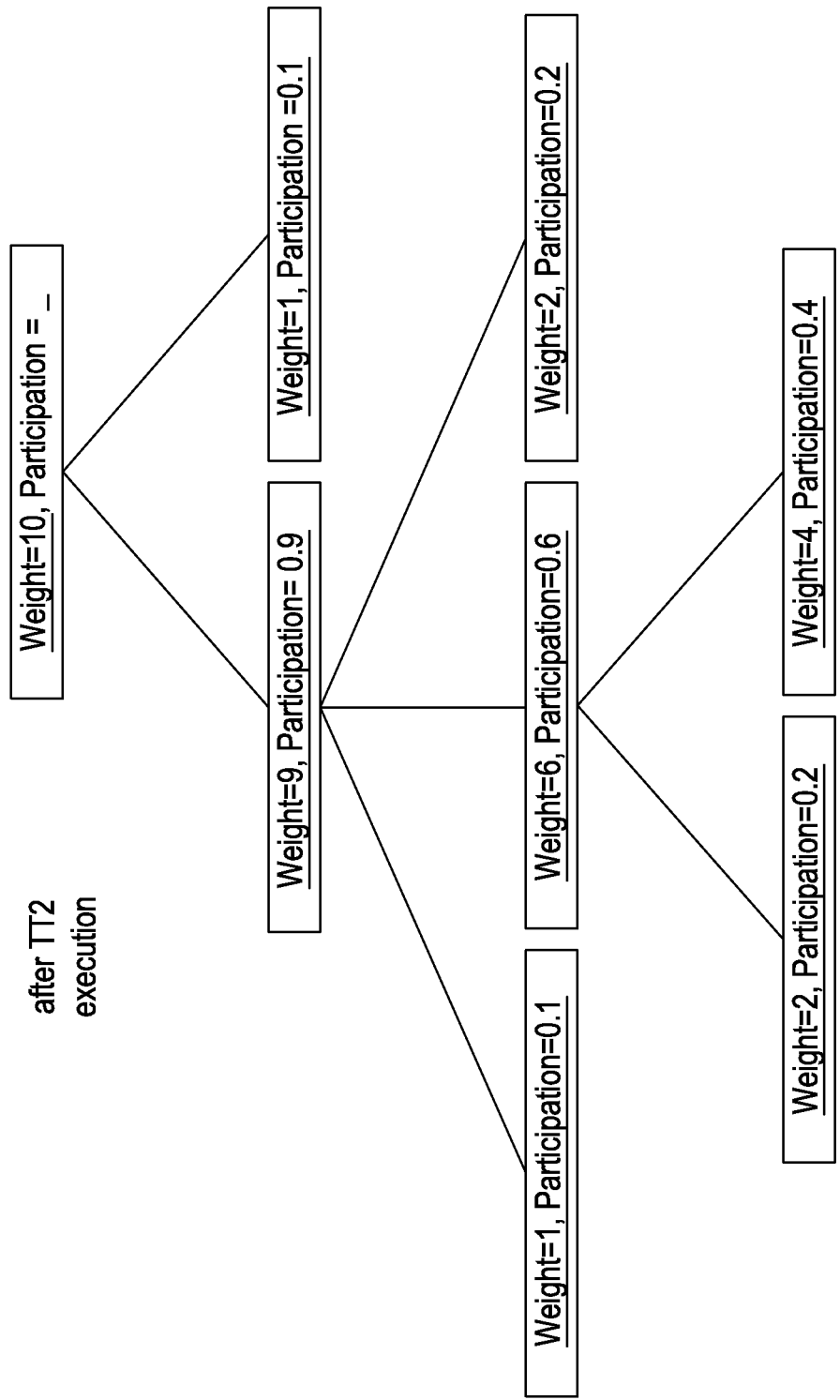

FIG. 42 shows the tree right after the execution of TT2. The Participation of each item has been added to each item.

Note that the Participation in the root node is not set, but that is irrelevant since the sub-tree the root of which is the root of the whole tree is simply that very tree—so Participation in the root node always equals 1—no matter what.

FIG. 43 shows how Traversal Transformations are implemented in Aptitude. In the Microflow 408 (ie Aptitude's graphical flowchart) shown at the top of FIG. 43 the Traversal Transformations TT1 and TT2 of the example above are represented by Traversal Transformation nodes 402 and 404. FIG. 43 depicts how the user should define Aptitude Project in order to achieve the functionality presented in the example.

Figure 45:
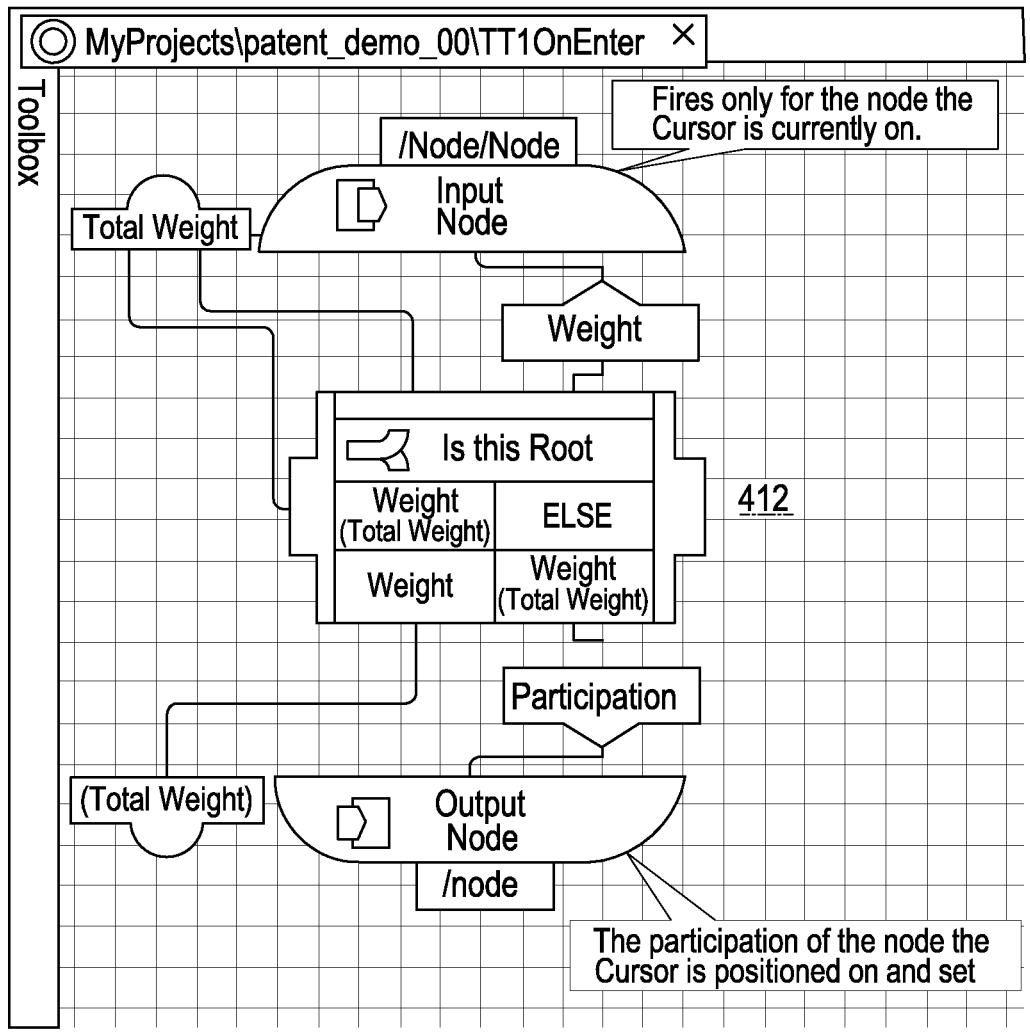
FIG. 45 shows Complex Rule "TT2 OnEnter"

FIG. 43 shows the graphical representations of the Complex Rules 410 and 412 which are used as the OnLeave and OnEnter Event Handlers in the definitions of the TT1 and TT2 Nodes 402 and 404 respectively. The graphical representations of the Complex Rules 410 and 412 are shown in enlarged form in FIGS. 44 and 45 respectively. As described above, window 406 contains the definition of the data object.

Traversal Transformation in Aptitude allows the approach that many programmers employ intuitively when processing collections of data to be made more abstract (i.e. to apply to any collection and any algorithm), and to be broken down into simple, well-formed and named abstract components, thus allowing the developer in Aptitude to achieve complex processing of potentially complex data collections, via Aptitude's graphical interface, without the need for computer programming knowledge. The process is simpler for the developer, who does not need to worry about the structure of the tree, but only needs to define the on-enter and on-leave actions together with the type of algorithm used to traverse the tree. In this way a complex problem can be decomposed into a handful of simpler concepts.

Turning now to rule templates, one of the tools used to implement hierarchy transformations in Aptitude are Complex Rules. They operate on hierarchical structures of any fixed format (referred to herein as a Data Object). However, there are some circumstances in which it would be advantageous to process different structures using the same logic, allowing the developer to re-use a rule.

A rule template allows a developer to operate on abstract structures, which may later be instantiated with one or more of a variety of different specific structures (Data Objects). Rule templates have a similar purpose to class templates in the generic programming paradigm.

A rule template refers to the segments and attributes of a Data Object using their names or paths, but it does not refer to the Data Object itself. The rule template is therefore not bound to a fixed data structure.

A rule template input is not defined by a Data Object, but instead is defined only by defining input attributes, which in turn are defined as "name, type" pairs. There is no need to refer to a Data Object or segment path, as is the case for regular rules.

A rule template output is also defined only by defining output attributes, which in turn are defined as "name, type" pairs. Again, there is no need to refer to a Data Object or segment path, as is the case for complex rules.

A rule template may invoke another (or the same) rule template. If a rule template invokes another (or the same) rule template, then two paths are specified in a rule template block (call to another rule template). The first is a segment path for input (relative or absolute), and the second is a segment path for output (relative or absolute).

Figure 46:
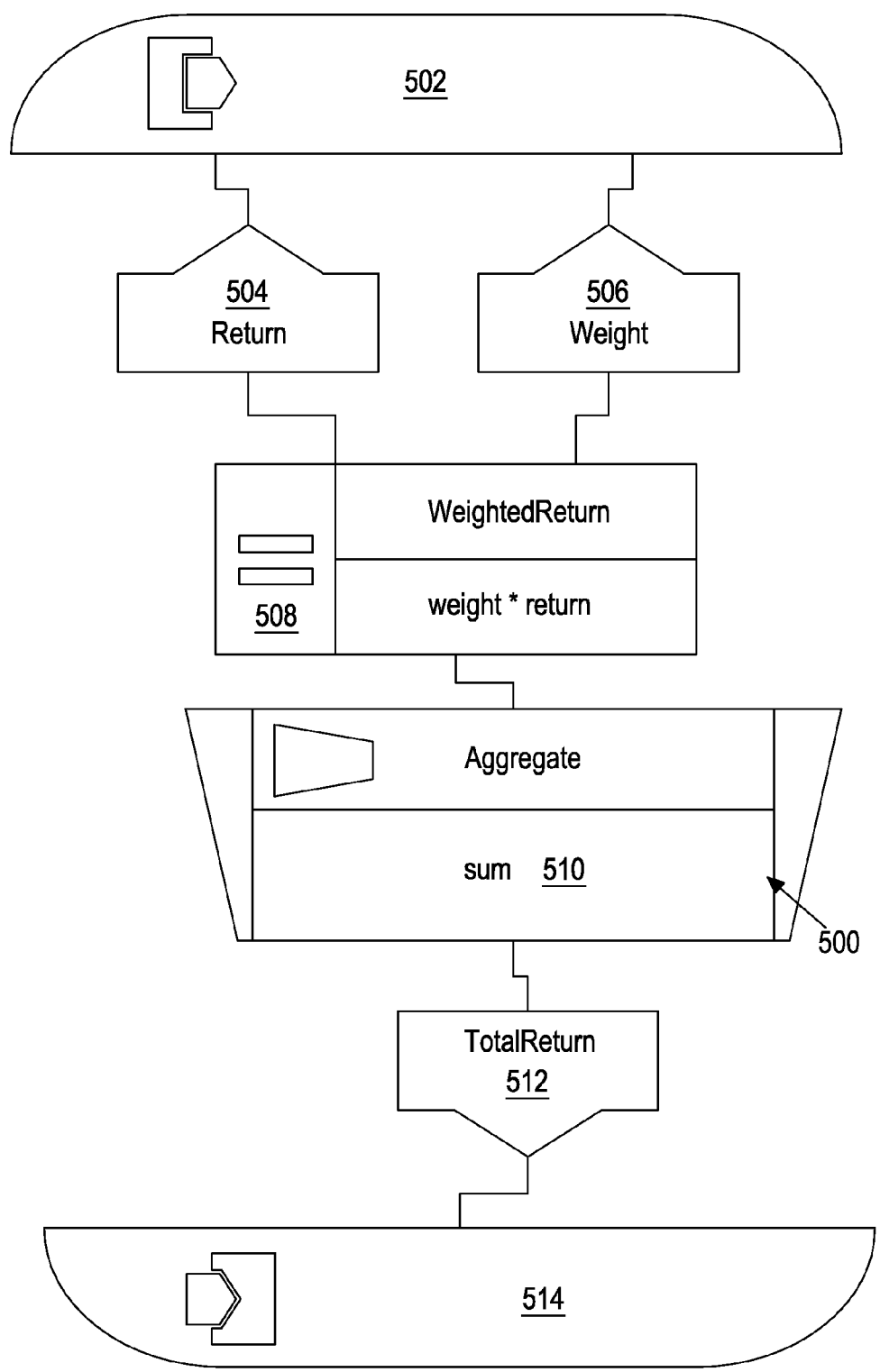
FIG. 46 illustrates schematically in a block diagram a rule template according to an embodiment of the invention.

To illustrate the invention, FIG. 46 shows an exemplary rule template. In this example, it is required to create a generic component for calculating a total return on a portfolio. A rule template 500 comprises an input 502, which makes no assumption about the identity of a Data Object or path. Return 504 and weight 506 components are provided, which identify the return and weight components of input data. A weighted return calculation block 508 is provided for calculating a weighted return. A reduction block 510 is provided to reduce a set of values to a single value, and a total return block 512 is provided to give the output value. As with the input 502, the output 514 makes no assumption about the identity of a Data Object or path.

Figure 47:
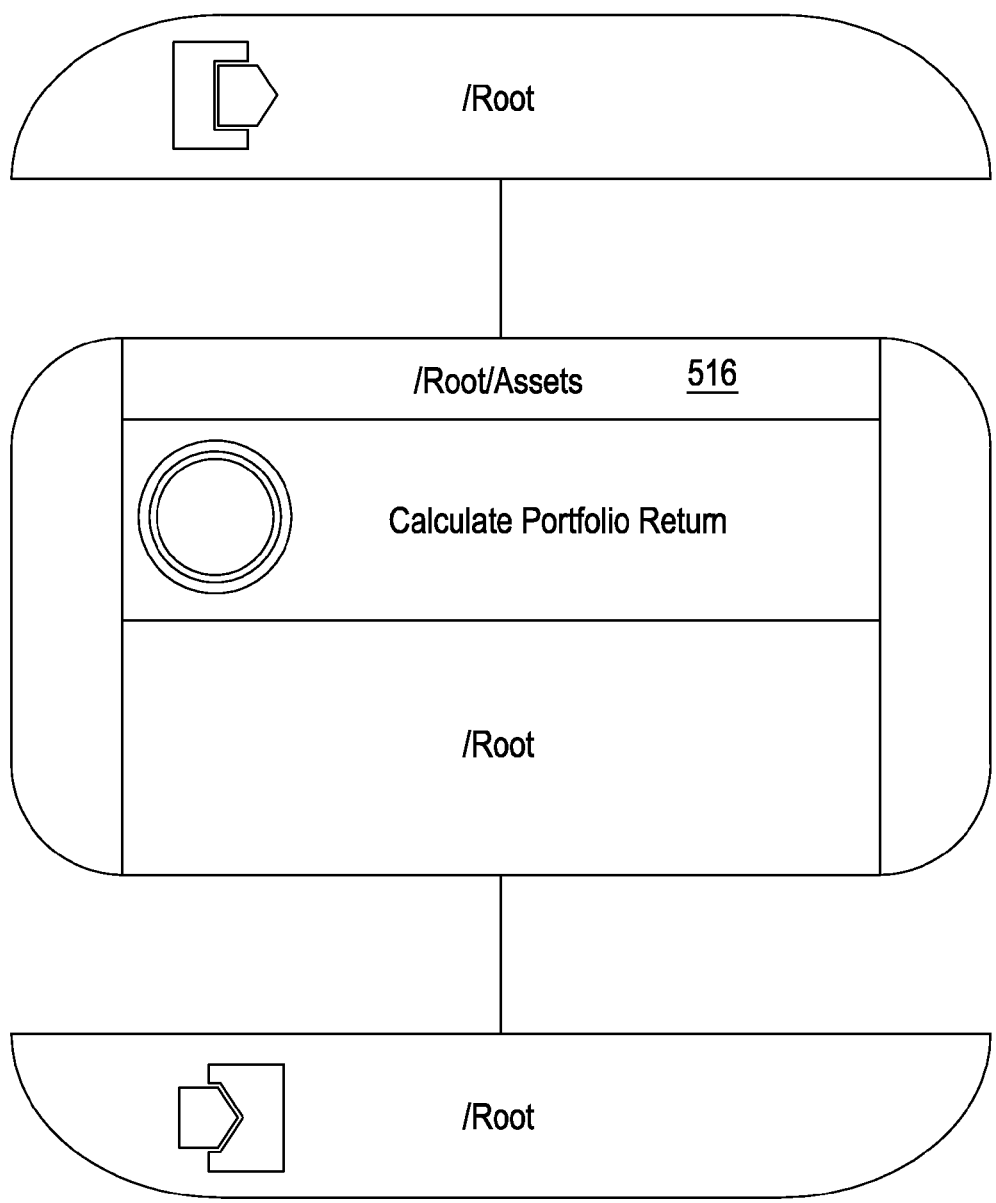
FIG. 47 illustrates schematically in a block diagram a rule template applied to a data object.

In order to apply the rule template to a specific calculation, it must be linked to a Data Object, as shown in FIG. 47. In this example, it is required to calculate a total return on a portfolio, described by a Data Object "MyPortfolio", containing root segment "Root" 516 having one sub-segment "Assets". The developer decides that the result is to be stored in a Data Object "MyCalculations", in its only segment "Root".

To invoke the rule template 500 it is instantiated. In other words, its input is bound to Data Object "MyPortfolio" and subsegment "Assets", and its output is bound to Data Object "MyCalculations", segment "Root".

In order for the rule template to be compiled successfully, the input and output Data Objects and segments must conform to the requirements specified in the rule template. In this example, the segment "Assets" must have two numeric attributes called "Return" and "Weight" in order for rule template 500 to be used with the segment.

Figure 48:
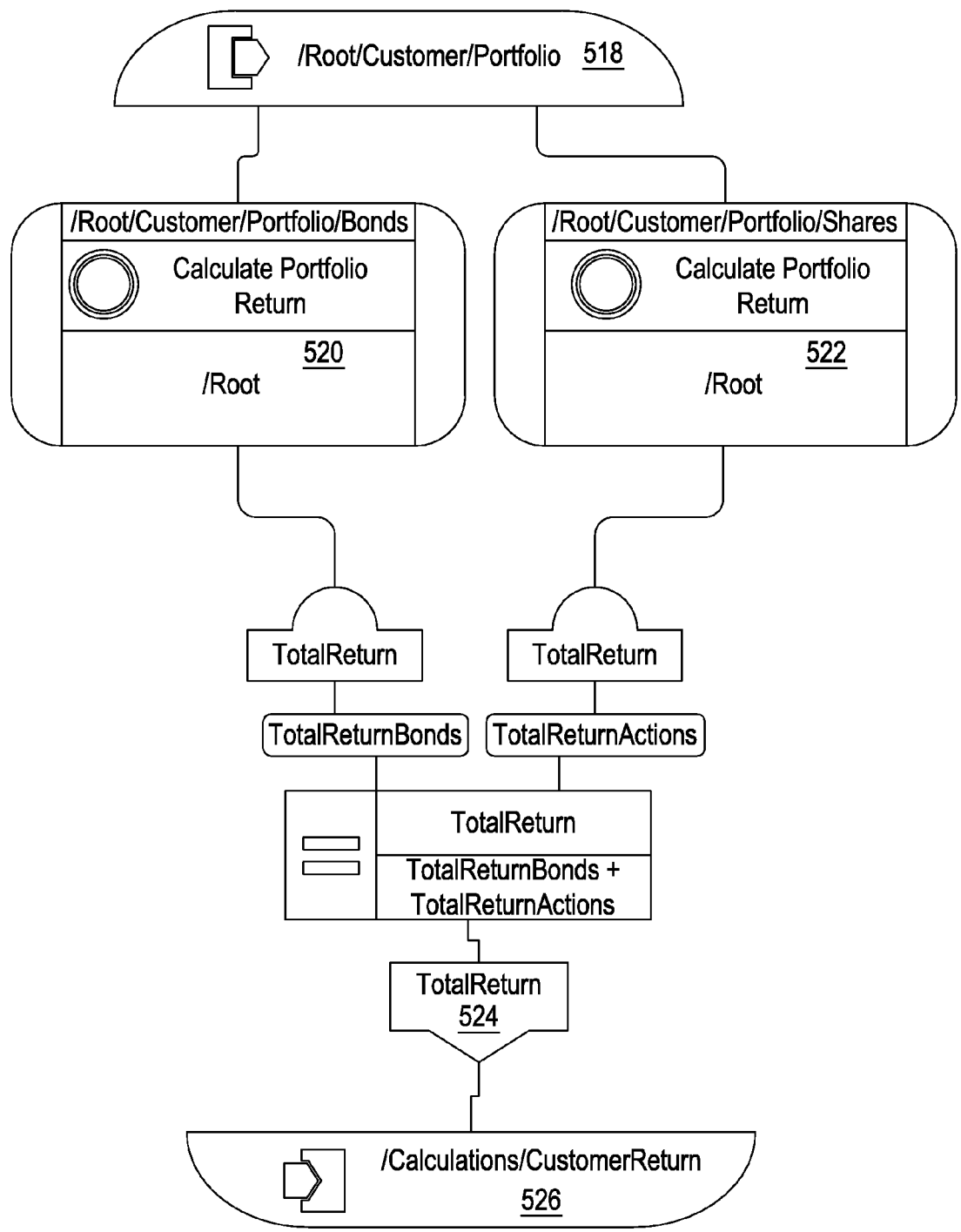
FIG. 48 illustrates schematically in a block diagram an exemplary calculation of a customer portfolio using a rule template twice.

In some cases, the rule template may be used for more than one calculation in a data flow. For example, and referring to FIG. 48, assuming the same logic as described in FIG. 47 is used to calculate returns on a plurality of portfolios that are described by different Data Object "CustomerPortfolios" with a structure as illustrated in FIG. 51A:

In this example, the input is root/customer/portfolio 518, and the rule template "Calculate Portfolio Return" is invoked twice 520, 522. The rule template is invoked once for bonds 520, and once for shares 522. The returns are then summed and stored as a total return 524 for a customer portfolio in calculations/customer/return 526. Again, it is only required that the Bonds and Shares segments have both "Return" and "Weight" numeric attributes.

Figure 49:
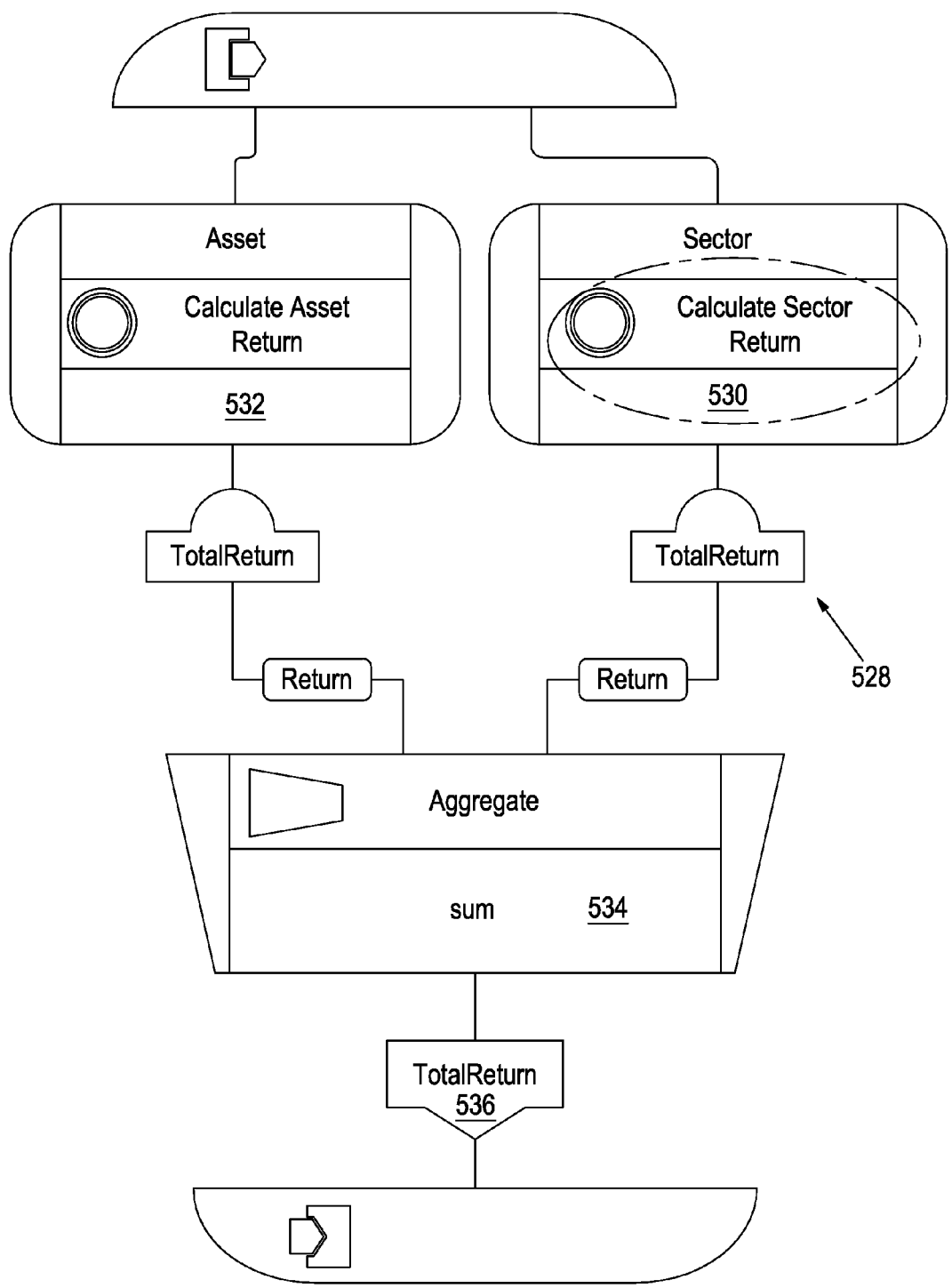
FIG. 49 illustrates schematically in a block diagram an exemplary rule template for performing a recursive calculation of a portfolio using a hierarchical structure.

Considering FIG. 49, a rule template may also be used for the processing of hierarchical structures, where one rule template invokes other rule templates. It is possible for a rule template may invoke itself and in this way handle recursive structures of any depth. For example, consider the case where the assets in a portfolio are grouped into sectors. Sectors may be further grouped together to create sectors having of an upper level and so on. A portfolio may then be represented by the recursive Data Object: illustrated in FIG. 51B. In this example, the Sector has itself as a "child" sector, giving a recursive structure.

A rule template 528 calls another rule template 530, termed "calculate sector return". The calculate sector return template 530 can process the recursive structure that arises from a recursive Data Object The calculate sector return template 530 invokes itself for all the child sectors, and invokes a rule template 532 as described with respect to FIG. 47. The results are accumulated in a reduction block 534, which gives a total return 536 for a given sector. Note that where there is more that one child sector, the calculate sector return rule template recursively calculates for all child sectors until results have been calculated for all child sectors.

Figure 50:
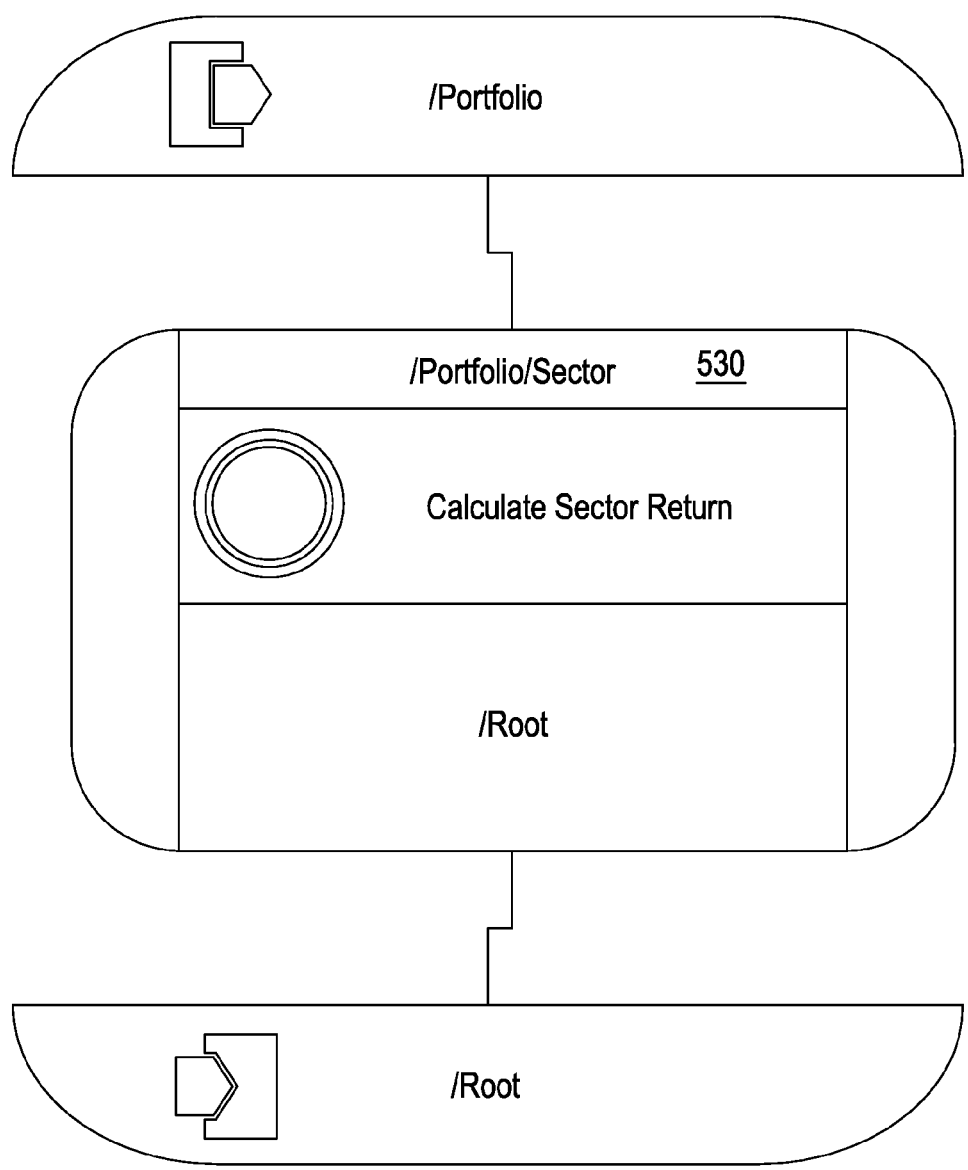
FIG. 50 illustrates schematically in a block diagram the rule template of FIG. 49 applied to a Data Object.

FIG. 50 illustrates the calculate sector return block 530 of FIG. 49 in more detail. Note that, in this example, the rule template has been instantiated with the portfolio and root Data Objects, and will produce the total return for a portfolio.

A rule template may be instantiated with different specific structures (Data Objects), and may process either flat or hierarchical structures. It may also process structures that are defined in a recursive way (such as a Data Object referring to itself, or a segment referring to itself), and makes the fewest possible assumptions about the structures it is instantiated with, which allows the structure to be changed without having an impact on the processing definition. A rule template is also easily re-usable with other Data Objects.

A key issue with the use of rule templates is determining whether it is possible for a rule template to be instantiated with the given data structure (Data Object) and path. For example, the rule template 500 shown in FIG. 46 requires that the Data Object that it is instantiated with has a return and a weight component. However, a problem will arise if the Data Object does not have these components, as if the Data Object does not have the required attributes then it cannot be instantiated with the rule template. Checking this would be a trivial exercise if rule templates did not allow for recursion (i.e. when rule template calls itself, either directly or indirectly).

It is therefore necessary for the developer to have a tool which allows him to check whether instantiation of a rule template is possible. To this end, an algorithm is used when the Aptitude project is compiled to search for rules that are incompatible with data, and any invalid instantiations are discovered and reported to the user. As an additional effect, a tree of (instantiated) template rule calls is created by the algorithm.

The following description of the algorithm makes the following assumptions:
- Only input paths are considered. For output paths, the algorithm looks the same;
- Only relative paths are considered, as these are more difficult to handle. Absolute paths allow the template instantiation algorithm to be applied from where the path occurs; and
- Only rule templates are considered, as they are more difficult to handle than standard rules that are associated with one or more fixed Data Objects and absolute paths, and allows template instantiation algorithm to be applied from the place where the path occurs.

The following definitions are used in the description of the template instantiation algorithm:

A rule template recursive call is defined as a direct or indirect call from a rule template to itself (possibly in a different input context);

A recursion offset is the difference of input path lengths (expressed in the number of path segments) for two consecutive rule template recursive calls;

A rule context path is the longest common ancestor path (in a Data Object) for the rule input paths in a call sub-tree, starting from the given rule and cut where the recursive call is discovered; and A rule context segment is the last segment of the rule context path.

The template instantiation algorithm requires an input of the following:
- The rule template (or templates) to be instantiated;
- A rule template(s) definition;
- A Data Object definition (in other words, the Data Object with which a rule template will be instantiated); and
- An absolute path within the Data Object with which the rule template will be instantiated.

The algorithm outputs a TRUE result if the rule template can be instantiated for a given Data Object and absolute path within it (as a side-effect a non-empty call tree is produced), and a FALSE result if the rule template cannot be instantiated for the given Data Object.

The data structure required by the algorithm is that for a call tree C, every node is a pair consisting of a rule and an absolute path within the Data Object, and a set R of instantiated rules (rule is instantiated for a relative path starting from a rule context segment and ending with a segment the rule input is based on).

Figure 51:
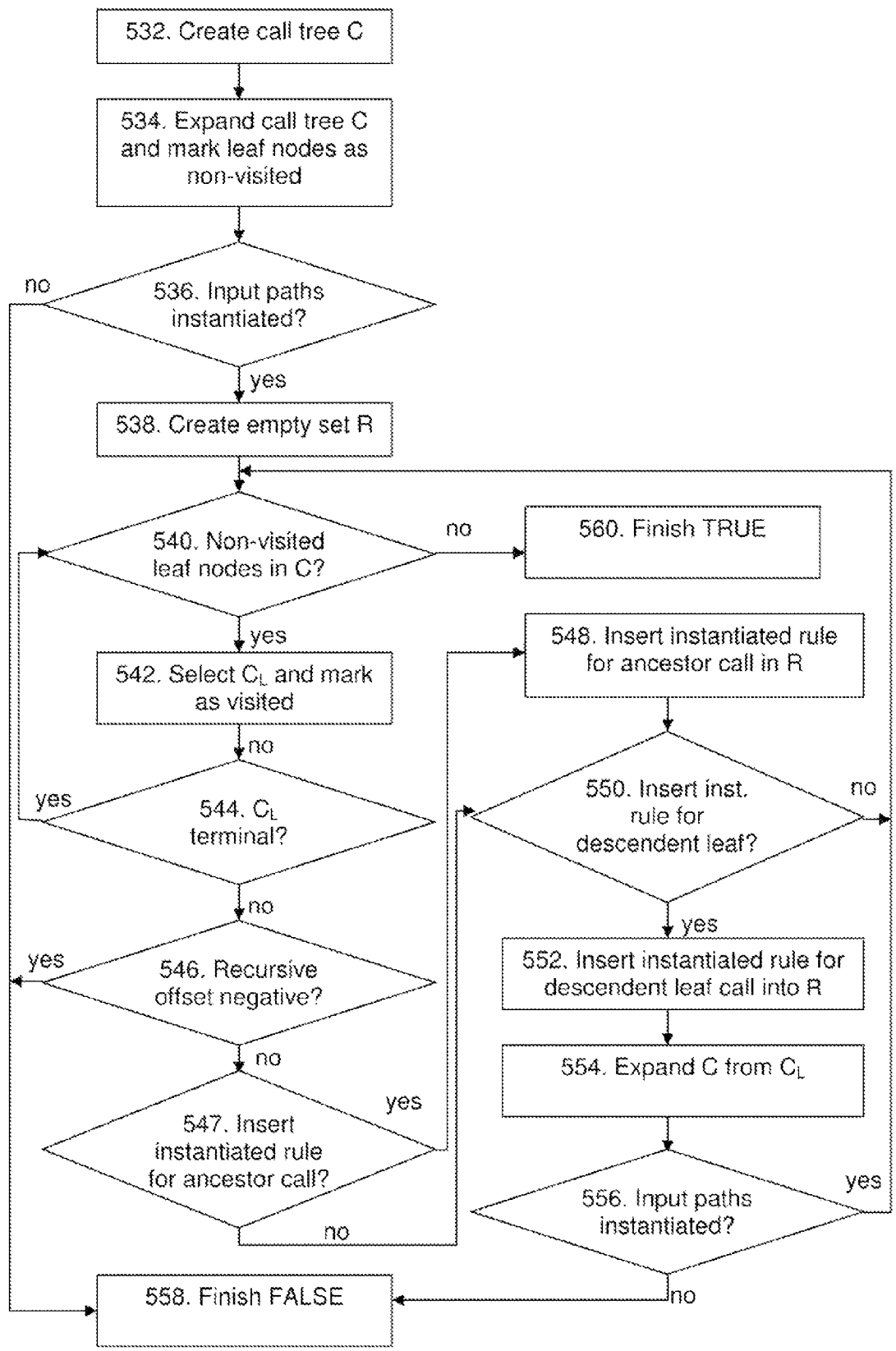
FIG. 51 is a flow diagram illustrating the steps of a template instantiation algorithm.

With reference to FIG. 51, the algorithm is as follows, with the following numbering corresponding to the numbering of FIG. 51:

532. Create a call tree C. The rule template is inserted having an absolute path as a root node. The tree is then expanded 534. Stop expanding at recursive calls. For any node, instantiate an absolute input path within the Data Object.

536. If the input path cannot be instantiated, then stop with result set to FALSE 558. Mark all the leaf nodes as non-visited.

538. Create an empty set R.

540. If there are any non-visited leaf nodes in the call tree C, do the following steps. Otherwise, finish with the result TRUE 560.

542. Select a leaf node $C_L$ that has not been visited yet and mark it as visited.

544. If the node is terminal (it corresponds to a rule that does not call any other rules), go to step 540.

546. Determine recursion offset. If it is negative (up the tree), then stop with result set to FALSE 558.

547. The rule context segment is calculated. If a rule is processed for the first time, a rule context segment for the ancestor node of $C_L$ corresponding to the previous call to the same rule is calculated. The rule instantiated for a relative path starting from a rule context segment is inserted 548 into the set R.

550. Calculate a rule context segment for $C_L$ and a determination is made whether an instantiated rule has already been processed in a given context, in which case an instantiated rule will already be populated in set R. If the rule has already been processed in a given context, go to step 540. Otherwise, insert 552 the descendent instantiated rule to the set R.

554. Expand the call tree starting from node $C_L$. Stop expanding the nodes at recursive calls. For any node, instantiate 556 absolute input path within Data Object. If input path cannot be instantiated, then stop with result set to FALSE 558.

In order to better describe the operation of the template instantiation algorithm, the following example is provided:

Let us assume that the developer wishes to instantiate rule template R1, which calls itself and another rule template, R2. Moreover, rule template R2 in turn calls rule template R1. This may be depicted as a call tree, in which the parent-child relationship is a caller-callee relationship, as illustrated in FIG. 51C.

For the sake of simplicity, only input paths for the rules are considered, and they are shown in parentheses in the FIG. 51C. In this case, all the paths are relative. For example, R1 calls itself for a child segment called A, and calls R2 for a sibling segment B. As there is recursion, the leaf nodes (both for R1) can be expanded further.

The example assumes that the developer wishes to instantiate the rule template R1 for a Data Object DO1, and for the path /D/C, as illustrated in FIG. 51D.

Note that the DO1 is recursive, as the children of segment A are A itself and B. Similarly, the children of B are A and B. Actual data based on this Data Object may then have many more levels than shown in the picture. For example, there may be a segment instance for a path /D/C/A/B/A/A/A.

Table 1 below illustrates step by step the running of the template instantiation algorithm. Note that the in the call tree, rules instantiated for absolute paths (paths starting from a root segment) are shown, while in the set R, rules instantiated for relative paths (paths starting from a rule context segment) are contained.

TABLE 1

| Step | Call tree | Rule context segments | Comments |
| --- | --- | --- | --- |
| 1 | R1 (/D/C)<br>\|_R1 (/D/C/A)<br>\|_R2 (/D/B)<br>  \|_R1 (/D/B/B) | R = { } | Initial call tree is shown. Non-visited leaf nodes are in bold. |

TABLE 1-continued

| Step | Call tree | Rule context segments | Comments |
|---|---|---|---|
| 2 | | | There are some non-visited leaf nodes in the call tree. |
| 3 | | | Node /R1/R1 is picked for examination. It is not a terminal node. |
| 4 | | | Recursion offset is one level down (ancestor call to R1 is based on path /D/C, this call to R1 is based on path /D/C/A, the difference is one level down). |
| 5a | | R={R1<D/C>} | Rule R1 is processed for the first time. To calculate a rule context path we consider the subtree rooted in a previous call to R1, which in this case is /R1 (the whole call tree). For all the instantiated paths (paths in DO) in this subtree we find the longest common ancestor path. This is /D, which is one level up from the rule input path. Rule context segment is then D, and the rule is instantiated for the relative path starting from this segment, i.e. D/C. R1<D/C is inserted to the set R. |
| 5b | | R = { R1< D/C>, R1<C/A>} | Knowing that rule context segment for R1 is one level up, we determine it for the second call to R1, i.e. /R1/R1. As it is based on /D/C/A, its rule context path is /D/C, and relative path is C/A. The context has not been seen yet for the rule R1, so R1<C/A> is inserted in the set R |
| 6 | R1 (/D/C)<br>|_R1 (/D/C/A)<br>| |_R1 (/D/C/A/A)<br>| |_R2 (/D/C/ B)<br>|    |_R1(/D/C/ B/B)<br>|_R2 (/D/B)<br>  |_R1 (/D/B/B) | | The tree is shown after node /R1/R1 has been expanded. Leaf nodes are in bold. |
| 2 | | | We continue, as there are still non-visited nodes in the call tree. |
| 3 | | | Node /R1/R1/R1 is picked. It is not a terminal node. |
| 4 | | | Recursion offset is one level down. |
| 5a | | | Rule has already been processed, nothing is done. |
| 5b | | R = { R1< D/C>, R1<C/A>, R1<A/A>} | Rule context segment is to be found one level up, relative path is A/A. It has not been seen yet, so the rule R1<A/A> is inserted to set R. |
| 6 | R1 (/D/C)<br>|_R1 (/D/C/A)<br>| |_R1 (/D/C/A/A)<br>| | |_R1 (/D/C/A/A/A)<br>| | |_R2(/D/C/A/B)<br>| |   |_R1(/D/C/A/B/B)<br>| |_R2 (/D/C/ B)<br>|   |_R1(/D/C/ B/B)<br>|_R2 (/D/B)<br>  |_R1 (/D/B/B) | | The tree is shown after /R1/R1/R1 has been expanded. |
| 2 | | | There are still non-visited nodes in the call tree. |

TABLE 1-continued

| Step | Call tree | Rule context segments | Comments |
|---|---|---|---|
| 3 | | | Node /R1/R1/R1/R1 is picked. It is not terminal. |
| 4 | | | Recursion offset is again one level down. |
| 5a | | | Rule has already been processed, nothing is done. |
| 5b | | | Rule context segment is one level up, which is segment A. Rule R1 has already been processed in the context of A/A, so we can stop expanding this branch and go to step 2. |
| 2 | R1 (/D/C)<br>\|_R1 (/D/C/A)<br>\| \|_R1 (/D/C/A/A)<br>\| \| \|_R1 (/D/C/A/A/A)<br>\| \| \|_R2(/D/C/A/ B)<br>\| \| \|_R1 (/D/C/A/ B/B)<br>\| \|_R2 (/D/C/ B)<br>\| \|_R1(/D/C/ B/B)<br>\|_R2(/D/B)<br>\| \|_R1 (/D/B/B) | | There are still non-visited nodes. |
| 3 | | | Node /R1/R1/R1/R2/R1 is picked for examination. |
| 4 | | | To calculate recursion offset we consider two calls: ancestor call /R1/R1/R1 and the current call /R1/R1/R1/R2/R1. From the DO paths for these calls it can be seen that recursion offset is one level down (to obtain /D/C/A/B/B from /D/C/A/A one has to move one level up and two levels down). That is OK. |
| 5a | | | Rule R1 has already been processed, nothing is done here. |
| 5b | | R = {<br>R1< D/C>,<br>R1<C/A>,<br>R1<A/A><br>R1<B/B>} | Rule context segment for R1 is one level up, which is segment B. Rule R1 has not been seen in the B/B context yet, so the context is registered in set R. |
| 6 | R1 (/D/C)<br>\|_R1 (/D/C/A)<br>\| \|_R1 (/D/C/A/A)<br>\| \| \|_R1 (/D/C/A/A/A)<br>\| \| \|_R2(/D/C/A/ B)<br>\| \| \|_R1(/D/C/A/ B/B)<br>\| \| \|_R1(/D/C/A/B/ B/A)<br>\| \| \|_R2(/D/C/A/ B/B)<br>\| \|_R2 (/D/C/ B)<br>\| \|_R1(/D/C/ B/B)<br>\|_R2 (/D/B)<br>\| \|_R1 (/D/B/B) | | The tree is shown after node /R1/R1/R1/R2/R1 has been expanded. Please note that this time the node /R1/R1/R1/R2/R1/R2 did not have to be expanded, as it is the recursive call to R2. |
| 2 | | | There are still non-visited nodes in the call tree. |
| 3 | | | Node /R1/R1/R1/R2/R1/R1 is picked for examination. |
| 4 | | | Recursion offset is one level down, which is OK. |
| 5a | | | Rule R1 has already been processed, nothing to be done here. |
| 5b | | R =<br>{R1< D/C>,<br>R1<C/A>,<br>R1<A/A><br>R1<B/B><br>R1<B/A>} | Rule context segment for R1 is one level up, which is segment B. Rule R1 has not been seen in the context of B/A yet, so it is inserted to set R. /R1/R1/R1/R2/R1/R1 will be expanded |
| 2 | R1 (/D/C)<br>\|_R1 (/D/C/A)<br>\| \|_R1 (/D/C/A/A) | | There are still non-visited nodes. |

TABLE 1-continued

| Step | Call tree | Rule context segments | Comments |
|---|---|---|---|
| |   \|  \|  \|_R1 (/D/C/A/A/A) | | |
| |   \|  \|  \|_R2(/D/C/A/B) | | |
| |   \|  \|    \|_R1(/D/C/A/B/B) | | |
| |   \|  \|    \|  \|_R1(/D/C/A/B/B/A) | | |
| |   \|  \|    \|    \|_R1(/D/C/A/B/B/A/A) | | |
| |   \|  \|    \|_R2(/D/C/A/B/B) | | |
| |   \|  \|    \|_R2(/D/C/A/B/B) | | |
| |   \|  \|_R2 (/D/C/B) | | |
| |   \|    \|_R1(/D/C/B/B) | | |
| |   \|_R2 (/D/B) | | |
| |     \|_R1 (/D/B/B) | | |
| 3 | | | Node /R1/R1/R1/R2/R1/R1/R1 is picked for examination. |
| 4 | | | Recursion offset is one level down, which is OK. |
| 5a | | | Rule R1 has already been processed. |
| 5b | | | Rule context segment is to be found one level up, so it is segment A. Rule R1 has already been processed in the context of A/A, so we can stop expanding this branch and go to step 2. |
| 2 | R1 (/D/C) | | There are still non-visited nodes in the call tree. |
| |   \|_R1 (/D/C/A) | | |
| |   \|  \|_R1 (/D/C/A/A) | | |
| |   \|  \|  \|_R1 (/D/C/A/A/A) | | |
| |   \|  \|  \|_R2(/D/C/A/B) | | |
| |   \|  \|    \|_R1(/D/C/A/B/B) | | |
| |   \|  \|    \|  \|_R1(/D/C/A/B/B/A) | | |
| |   \|  \|    \|    \|_R1(/D/C/A/B/B/A/A) | | |
| |   \|  \|    \|_R2(/D/C/A/B/B) | | |
| |   \|  \|    \|_R2(/D/C/A/B/B) | | |
| |   \|_R2 (/D/C/B) | | |
| |     \|_R1(/D/C/B/B) | | |
| | \|_R2 (/D/B) | | |
| |   \|_R1 (/D/B/B) | | |
| 3 | | | Node /R1/R1/R1/R2/R1/R1/R2 is picked for examination |
| 4 | | | Recursion offset is two levels down, which is OK. |
| 5a | | R = {( R1< D/C, R1<C/A>, R1<A/A> R1<B/B> R1<B/A>, R2<B>} | Rule R2 is processed for the first time. Rule context segment is calculated for the ancestor R2 call, i.e. /R1/R1/R1/R2. Rule context path for the subtree rooted in this node is /D/C/A/B, which is just the the rule input path. The relative path consists only from segment B. A rule R2<B> is inserted to the set R. |
| 5b | | | Rule context segment for /R1/R1/R1/R2/R1/R1/R2 is zero level up, which is segment B. Rule R2 has already been processed in the context of B, so we go to step 2. |
| 2 | R1 (/D/C) | | There are still non-visited nodes in the call tree. |
| |   \|_R1 (/D/C/A) | | |
| |   \|  \|_R1 (/D/C/A/A) | | |
| |   \|  \|  \|_R1 (/D/C/A/A/A) | | |
| |   \|  \|  \|_R2(/D/C/A/B) | | |
| |   \|  \|    \|_R1(/D/C/A/B/B) | | |
| |   \|  \|    \|  \|_R1(/D/C/A/B/B/A) | | |
| |   \|  \|    \|    \|_R1(/D/C/A/B/B/A/A) | | |
| |   \|  \|    \|_R2(/D/C/A/B/B) | | |
| |   \|  \|    \|_R2(/D/C/A/B/B) | | |
| |   \|_R2 (/D/C/B) | | |
| |     \|_R1(/D/C/B/B) | | |
| | \|_R2 (/D/B) | | |
| |   \|_R1 (/D/B/B) | | |

TABLE 1-continued

| Step | Call tree | Rule context segments | Comments |
|---|---|---|---|
| 3 | | | Node R1/R1/R1/R2/R1/R2 is picked for examination. |
| 4 | | | Recursion offset is one level down, which is OK. |
| 5a | | | Rule R2 has already been processed. |
| 5b | | | Rule context segment for /R1/R1/R1/R2/R1/R2 is zero level up, which is segment B. Rule R2 has already been processed in the context of B, so we go to step 2. |
| 2 | R1 (/D/C)<br>\|_R1 (/D/C/A)<br>\| \|_R1 (/D/C/A/A)<br>\| \| \|_R1 (/D/C/A/A/A)<br>\| \| \|_R2(/D/C/A/B)<br>\| \| \|_R1(/D/C/A/B/B)<br>\| \| \| \|_R1(/D/C/A/B/B/A)<br>\| \| \| \|_R1(/D/C/A/B/B/A/A)<br>\| \| \|_R2(/D/C/A/B/B)<br>\| \| \|_R2(/D/C/A/B)<br>\| \|_R2 (/D/C/B)<br>\| \|_R1(/D/C/B/B)<br>\|_R2 (/D/B)<br>  \|_R1 (/D/B/B) | | There are still non-visited nodes in the call tree. |
| 3 | | | Node /R1/R1/R2/R1 is picked for examination. |
| 4 | | | Recursion offset is one level down, which is OK. |
| 5a | | | Rule R1 has already been processed, nothing to be done here. |
| 5b | | | Rule context segment is one level up, which is segment B. Rule R1 has already been processed in the context of B/B, so we go to step 2. |
| 2 | R1 (/D/C)<br>\|_R1 (/D/C/A)<br>\| \|_R1 (/D/C/A/A)<br>\| \| \|_R1 (/D/C/A/A/A)<br>\| \| \|_R2(/D/C/A/B)<br>\| \| \|_R1(/D/C/A/B/B)<br>\| \| \| \|_R1(/D/C/A/B/B/A)<br>\| \| \| \|_R1(/D/C/A/B/B/A/A)<br>\| \| \|_R2(/D/C/A/B/B)<br>\| \| \|_R2(/D/C/A/B)<br>\| \|_R2 (/D/C/B)<br>\| \|_R1(/D/C/B/B)<br>\|_R2 (/D/B)<br>  \|_R1 (/D/B/B) | | There are still non-visited nodes in the call tree. |
| 3 | | | Node /R1/R2/R1 is picked for examination. |
| 4 | | | Recursion offset is one level down That is OK. |
| 5a | | | Rule R1 has already been processed. Nothing to be done here. |
| 5b | | | Rule context segment is one level up which is segment B. Rule R1 has already been processed in the context of B/B, so we go to step 2. |

TABLE 1-continued

| Step | Call tree | Rule context segments | Comments |
|---|---|---|---|
| 2 | R1 (/D/C)<br>  \|_R1 (/D/C/A)<br>  \|  \|_R1 (/D/C/A/A)<br>  \|  \|  \|_R1 (/D/C/A/A/A)<br>  \|  \|_R2(/D/C/A/B)<br>  \|     \|_R1(/D/C/A/B/B)<br>  \|        \|_R1(/D/C/A/B/B/A)<br>  \|          \|_R1(/D/C/A/B/B/A/A)<br>  \|     \|_R2(/D/C/A/B/B)<br>  \|     \|_R2(/D/C/A/B/B)<br>  \|_R2 (/D/C/B)<br>     \|_R1(/D/C/B/B)<br>\|_R2 (/D/B)<br>    \|_R1 (/D/B/B) | | All the leaf nodes in the call tree have been visited. The result is TRUE (rule template R1 may be instantiated with Data Object DO1 and path /D/C). |

The template instantiation algorithm is used to validate rule template instantiation within a context of a specific data structure and specific path. It is necessary for rule templates to be employed in practice, and not only handles recursive rule template calls but also provides a compile-time validation.

Figure 52:
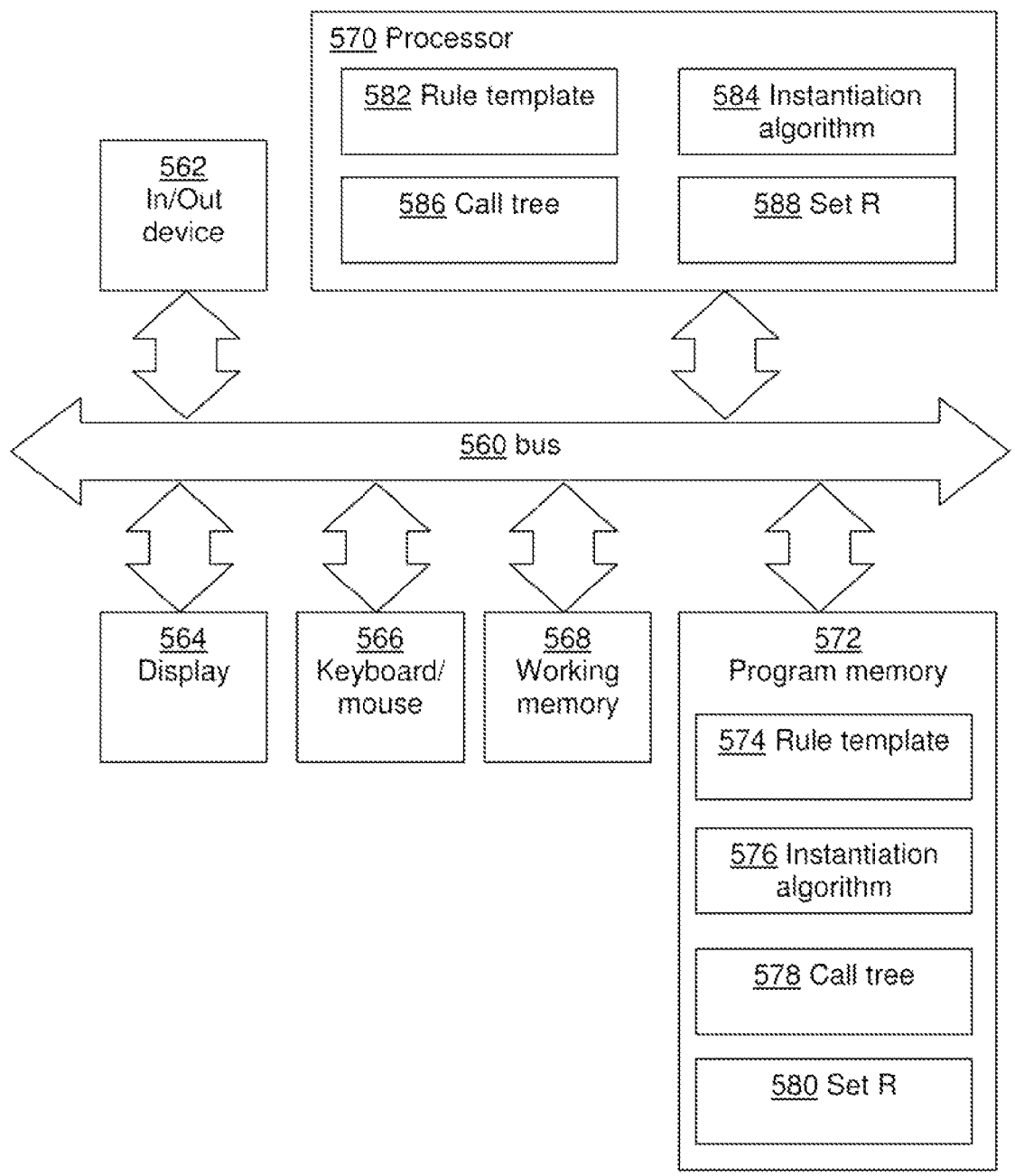
FIG. 52 illustrates schematically in a block diagram an apparatus according to an embodiment of the invention.

Turning now to FIG. 52, there is illustrated a computer device for allowing a developer to manipulate rules templates and run a template instantiation algorithm. A bus 560 is provided in order to allow components in the computer device to communicate with one another. An in/out device 562 is provided to allow the input and output of data. A display 564 is provided to allow representations of Data Objects and rule templates to be shown to the developer, and a user input device 566 such as a keyboard and/or mouse is provided to allow the developer to manipulate the Data Objects and rule templates. A working memory 568 is provided, as is a processor 570. It will be appreciated that whilst only one processor 570 is shown, the invention may be implemented using more than one processor. A computer readable medium in the form of a program memory 572 is provided. The program memory 572 is used to store at least one rule template 574, along with a template instantiation algorithm 576. During template instantiation checking, the call tree 578 and set R 580 may be stored in the program memory 572 or the working memory 568. During processing, a rule template 582 may be manipulated by the processor 570, which may also use the template instantiation algorithm. Furthermore, the processor 570 is used to manipulate the call tree 586 and set R 588.

Aptitude introduces a concept of transactional variables. A transactional variable may contain a variety of information, which is structured in one of a number of ways. A transactional variable consists of two parts, a key and a value. The key is unique to a particular transactional variable and acts as an identifier for that transactional variable. The value contains information, which may be organised in a multi-level hierarchical tree.

By way of example, a transactional variable holding information of a certain employee consists of a key which uniquely identifies the employee, such as his social security number, and a value, which would be based on a Data Object describing that employee. An example of a Data Object, i.e. value type is shown in FIG. 53i.

A transactional variable may appear as illustrated in FIG. 53ii, and a further example of a transactional variable is as illustrated in FIG. 53iii. Note that the key of examples ii and iii has the same length (although lengths may be different), while the value of the example ii contains more data than the value of the second example.

Figure 54:
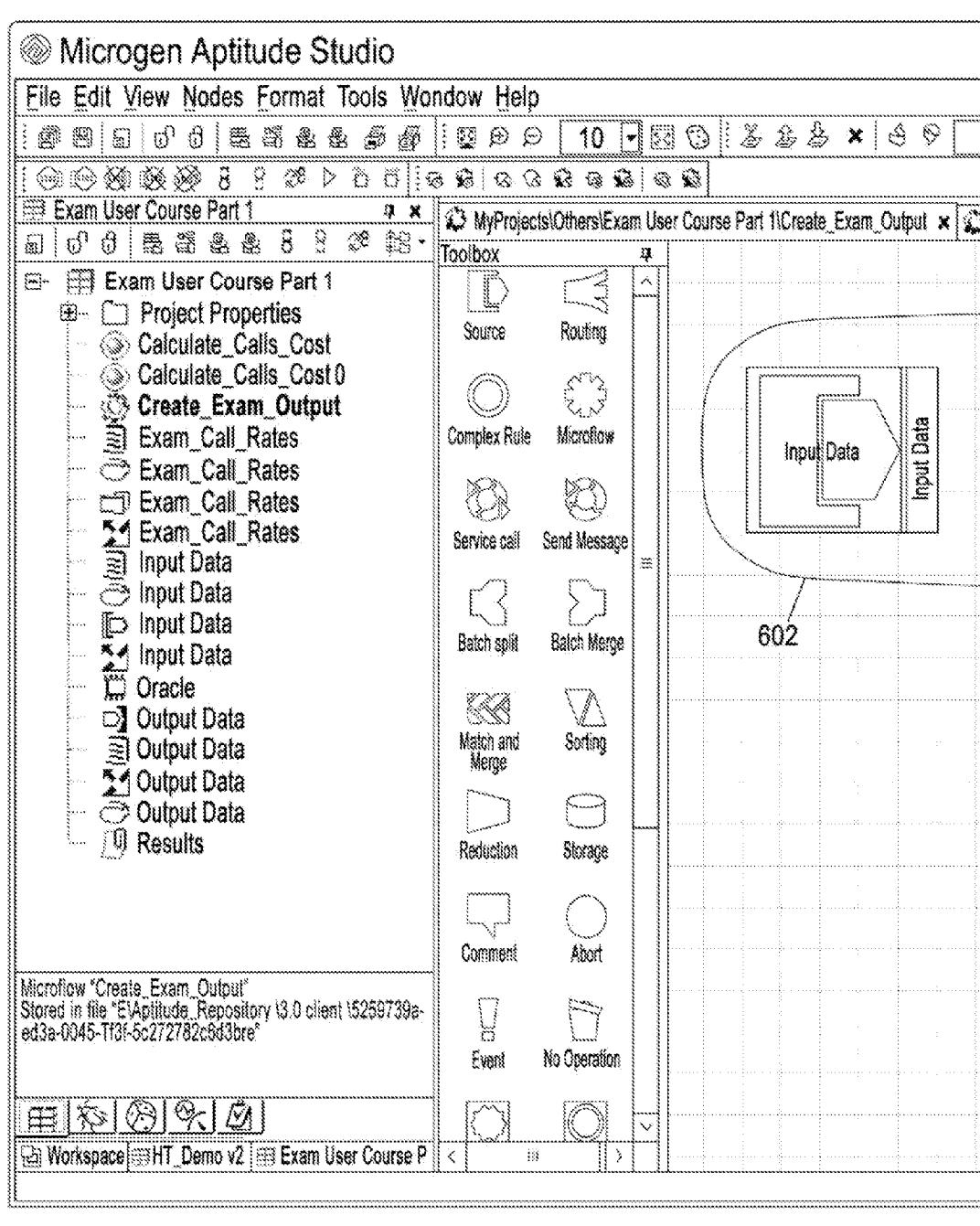
FIG. 54 shows a user interface illustrating transaction regions.
Figure 54:
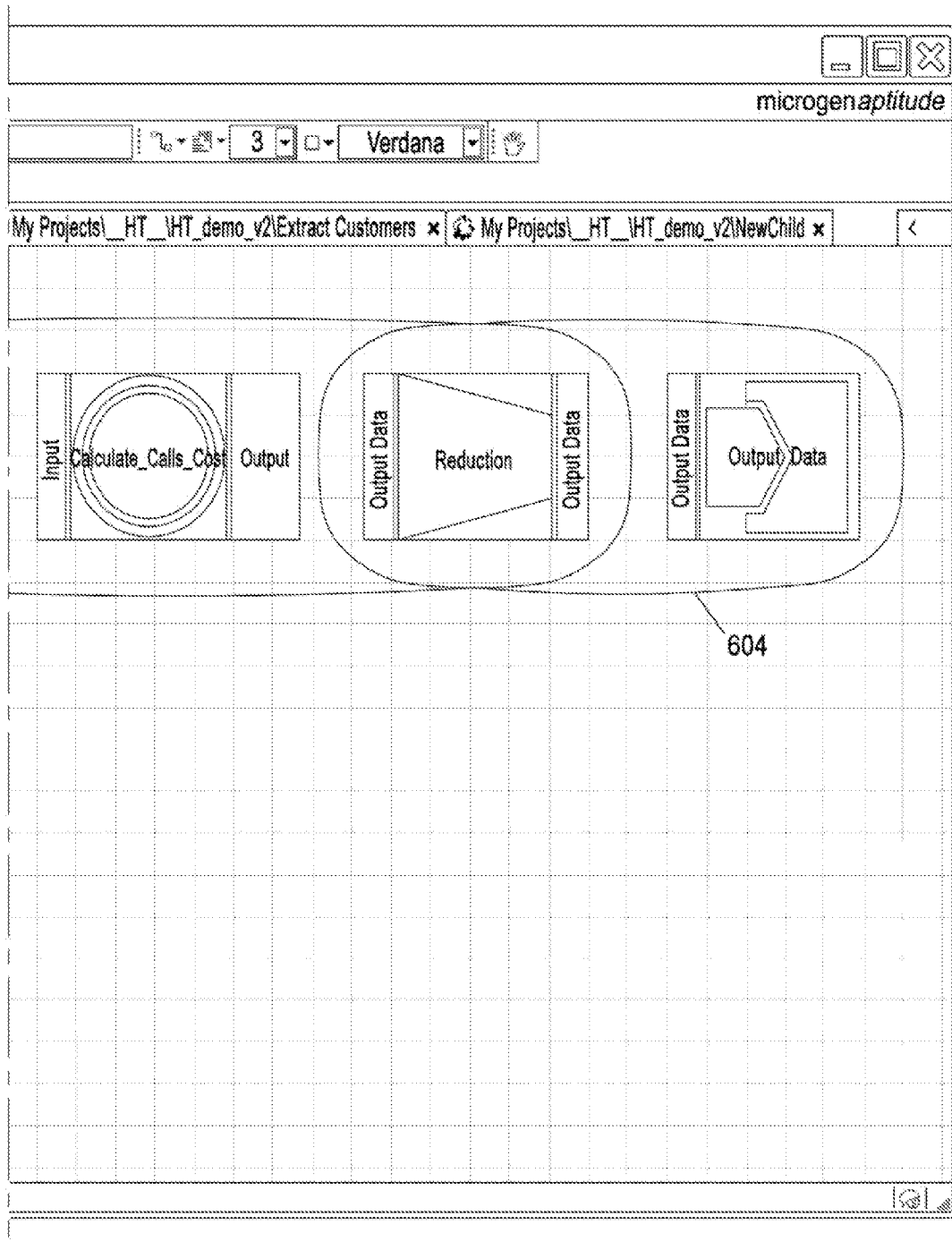

Transactional variables can be used in an Aptitude process, which is performed by execution units called transaction regions, as described above. An example of transaction regions is shown in FIG. 54. Transaction regions 602, 604 may have conditional relations, in which transaction regions are related to one another. For example, region 604 will wait for a batch of data from related region 602 before it can start processing the batch of data.

Figure 55:
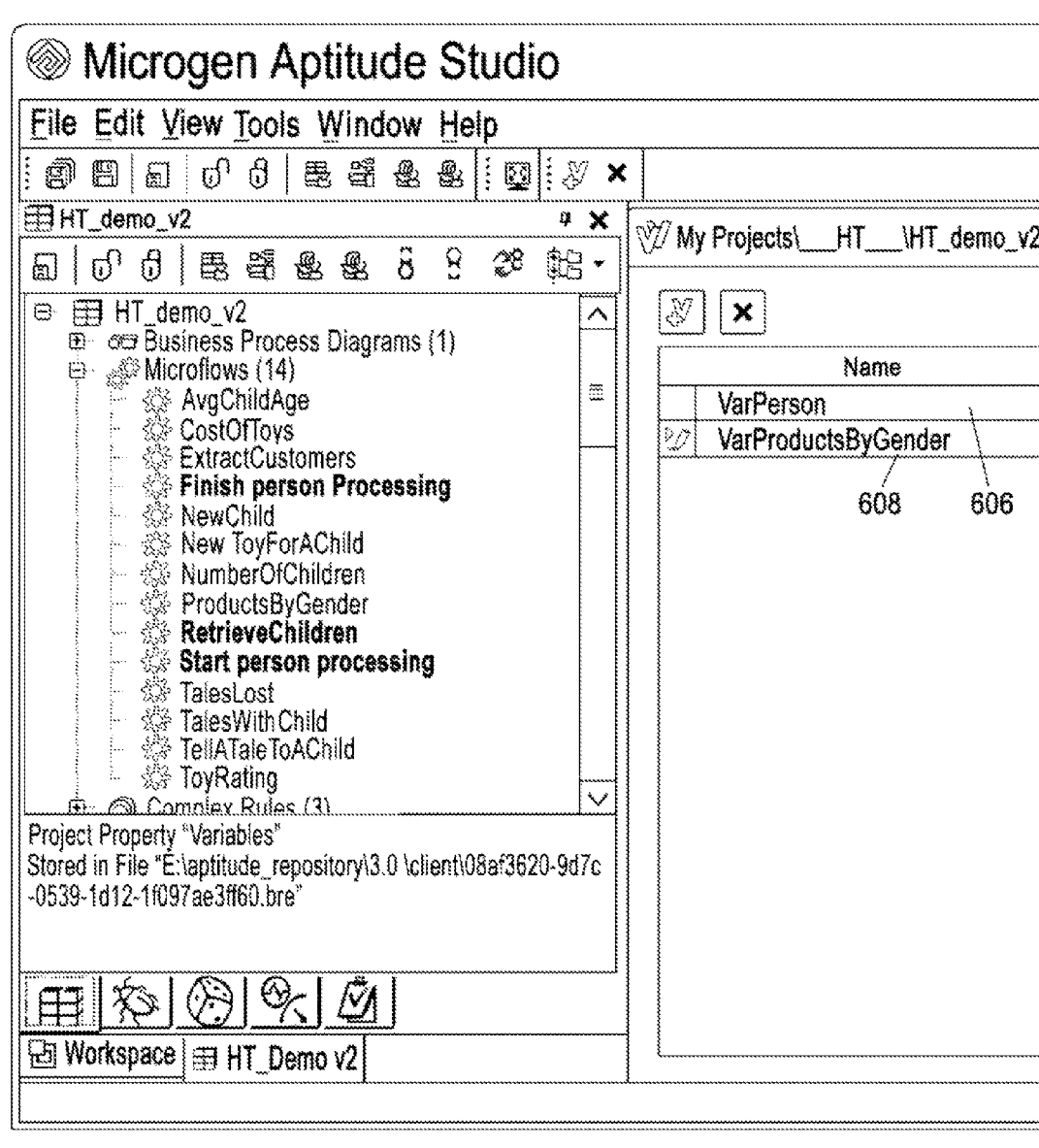
FIG. 55 shows a user interface for editing variables.
Figure 55:
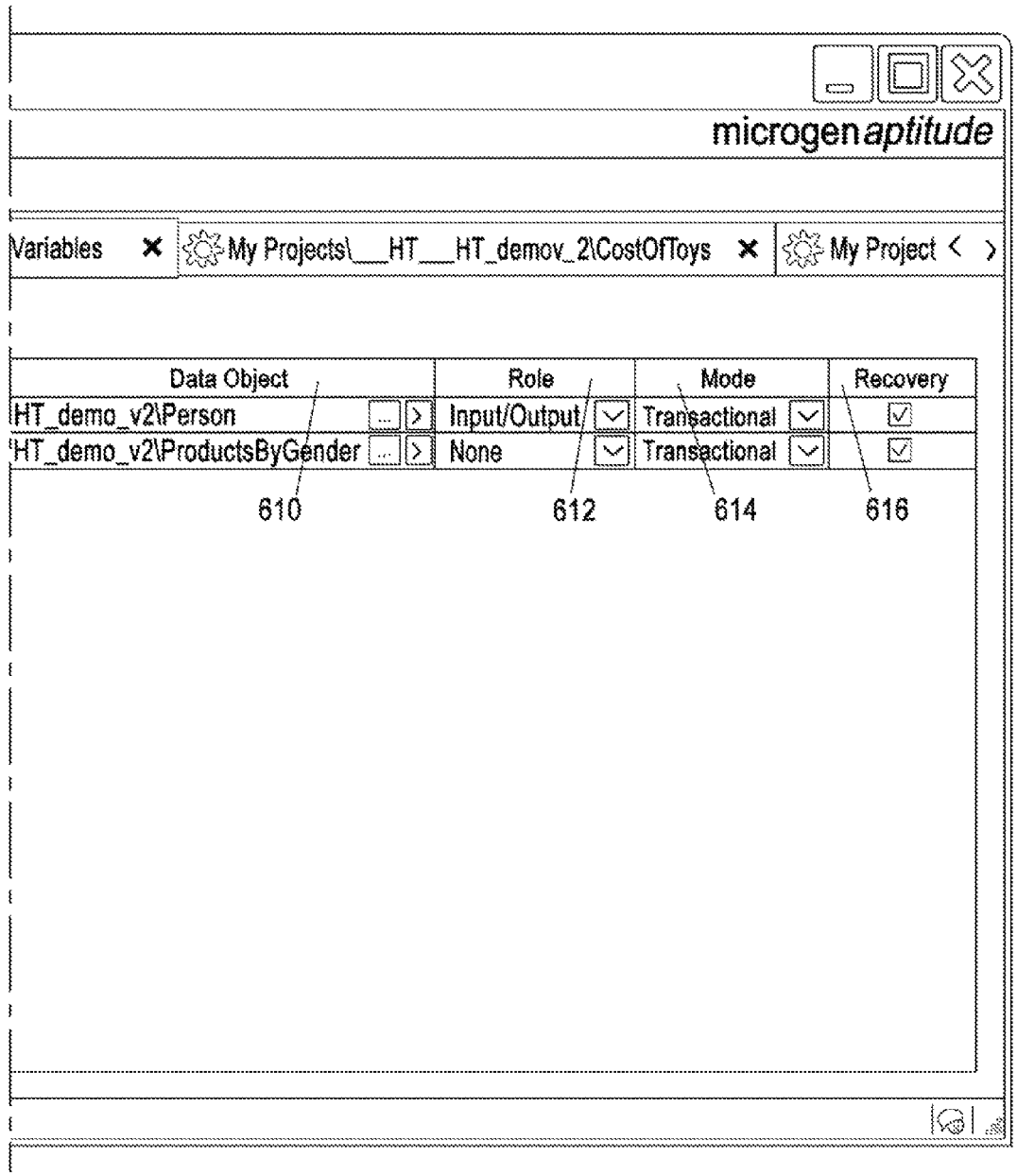

A transactional variables editor is shown in FIG. 55. Two transactional variables are shown in FIG. 55, VarPerson 606 and VarProductsByGender 608. In the Data Object column 610, types of the transactional variable are shown. The Role column 612 is related to the calling of Aptitude executable units. There are currently two types of executable units, Aptitude projects and Aptitude services. A project may be thought of as a set of services. Either the whole set of services or individual services can be called. When an executable unit is called by another unit, which is then a caller, it receives a message in the form of hierarchical data at its input. The message is provided by the caller and stores the caller's request. After completing the process, the executable unit returns a message to its output. The returned message is sent back to the caller as a response. These input and output messages are stored in Aptitude variables, in such a way that they can be accessed during data processing. The input message is stored in a variable with Role set to Input; the output message is stored in a variable with Role set to Output. The input and output messages are the same in some cases, and the Role is then set to Input/Output. The Mode 614 can be set to Transactional or Simple. If the Mode is set to Simple, access to the variable is not protected. If the mode is set to Transactional, the access to the variable is protected, which is described in more detail below. If the box Recovery 616 is checked, the variable is persistent and is written to a database when a relevant transaction is committed. In the event of an error during further processing, the variable may be restored using the database copy.

When data are processed, a transaction region is responsible for processing a single batch of data. A transaction region may be used concurrently by multiple threads, but every thread processes a batch unique to that thread, so there is no need to protect the access to the data being processed.

When a transactional variable is processed, on the other hand, it is desirable to protect access to the transactional variable in order to avoid multiple threads from editing the same transactional variable simultaneously. Transactional variables may be accessed concurrently by multiple threads of a single process. Those threads may be part of the same or different transaction regions. Access to the transactional variable may be subject to different isolation levels.

Figure 56:
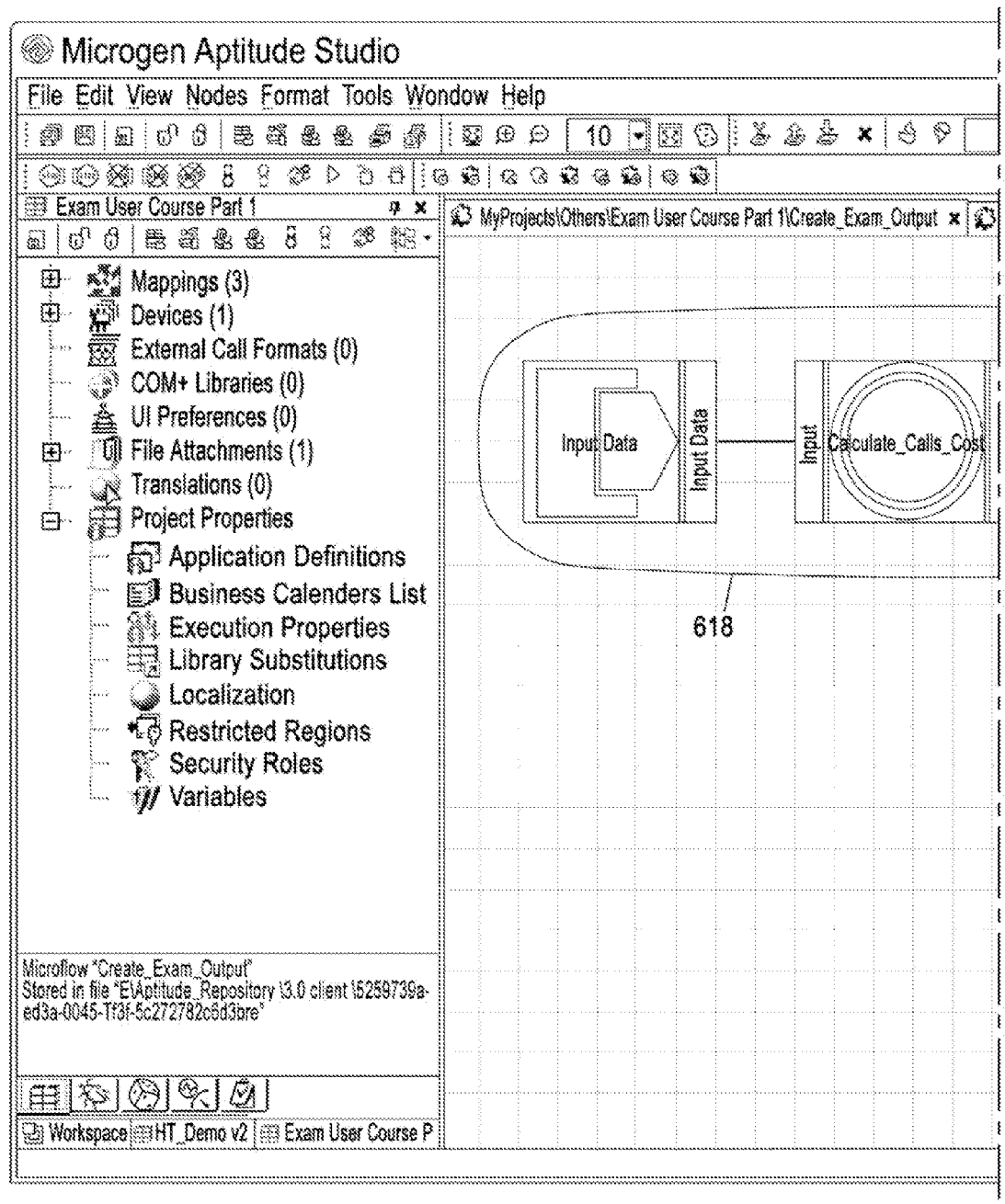
FIG. 56 shows a user interface for accessing the variables using a Variable Access Node.
Figure 56:
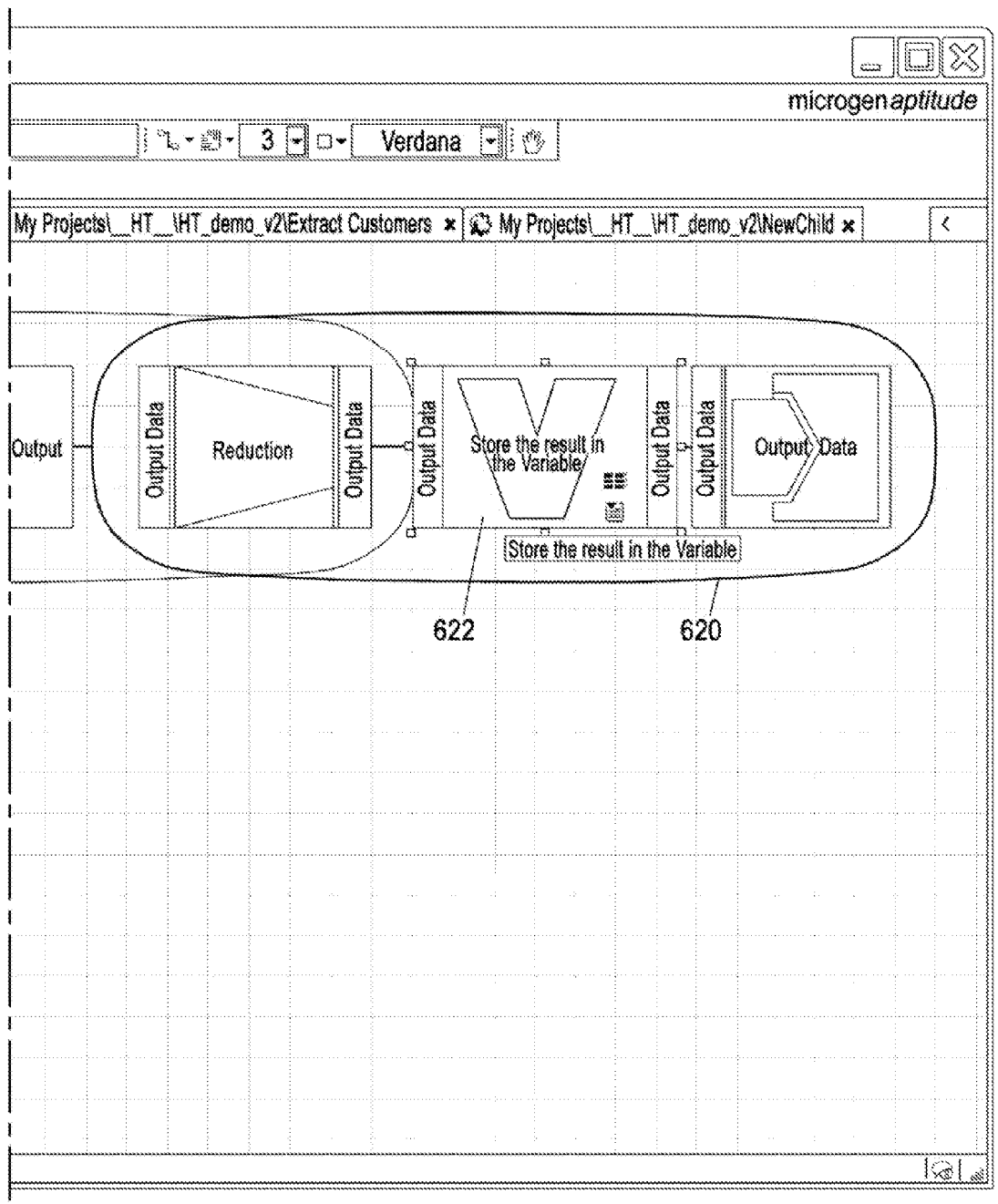
Figure 57:
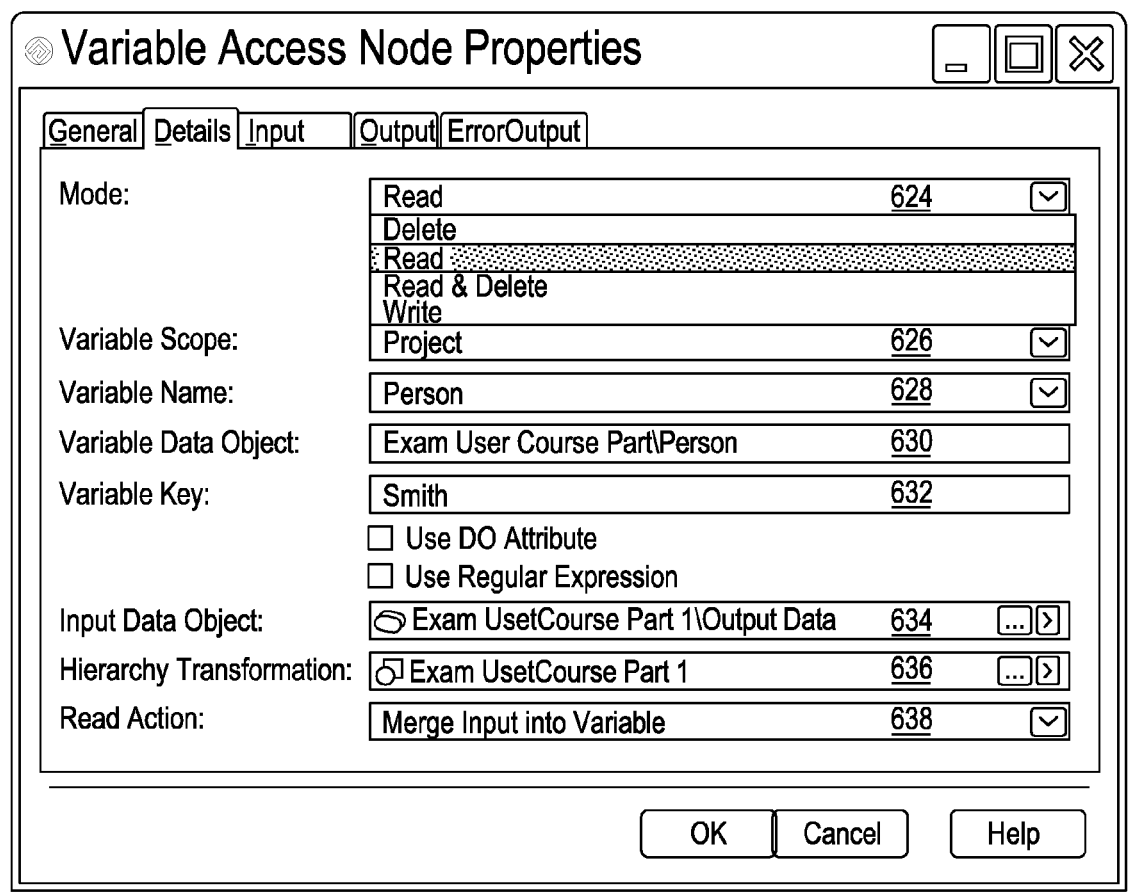
FIG. 57 shows a user interface for editing the properties of a Variable Access Node

A transactional variable can be accessed using a variable access node. A variable access node 622 is shown in FIG. 56, where it is located in transaction region 620, which executes after transaction region 618 has provided a complete batch. A window showing the properties of a variable access node is shown in FIG. 57. There are a number of possible access modes for the transactional variable, as shown in the drop-down menu of the mode property 624: delete, read, read for update (not shown in the Figure), read & delete, and write. Variable Scope 626 is used to specify a region where a variable occurs. Selectable options for variable scope include 'project scope', 'microflow scope' and 'transaction region scope'. Further properties that are shown in FIG. 57 are the variable name 628, variable data object 630, variable key 632, input data object 634, hierarchy transformation 636, and read action 638.

The following policy is applied to implement the desired isolation levels when accessing a transactional variable: readers may always access the transaction variable; they are not blocked by other readers or writers and they can see the consistent, committed version of a transaction variable. The committed version of a transaction variable is the version that has been made permanent by writing it to the computer memory. Writers block each other until the end of a transaction, which ends either by committing to writing, or by rollback to the beginning of the transaction. A locking mechanism is employed to implement this policy.

Transactional variables have properties of atomicity, consistency, integrity and durability (termed ACID), and are persistent once a transaction writing operation has been committed.

The ACID properties of transactional variables are:
Atomicity: either all operations on transactional variables are performed within a transaction or none of them are performed;
Consistency: there are no consistency checks on Data Objects that are behind variables, so consistency cannot be violated;
Isolation: other transactions cannot access the intermediate version of a variable being modified in a given transaction; and
Durability: once a transaction is committed, changes to the transaction variable are made permanent.

The American National Standards Institute (ANSI) and International Organization for Standardization (ISO) Structured Query Language (SQL) transaction isolation levels and their equivalents in Aptitude are:
Read uncommitted: the equivalent in Aptitude is transactional variable mode 614 set in the editor to be Simple (in other words, not transactional). The transactional variable may be accessed both in reading or writing mode;
Read committed: the equivalent in Aptitude is a transactional variable mode set to be Transactional. The transactional variable can be accessed in a "read" mode;
Repeatable read: the equivalent in Aptitude is a transactional variable mode set to be Transactional, and it is accessed in a "read for update" or "write" mode; and
Serialisable: the equivalent in Aptitude is the same as for Repeatable read.

In order to illustrate managing access to transactional variables, three exemplary scenarios are illustrated in FIG. 58, in which the following symbols are used:
$R_i$ reader operation that reads version i of a transactional variable,
$W_i$ writer operation that writes version i of a transactional variable,
Tc transaction commit,
Tr transaction rollback,
* waiting for a lock to be released, to obtain access to the variable,
- normal activity (not waiting for a lock).

Scenario 1 in FIG. 58i illustrates that failed writer transactions do not affect the transactional variable. The timelines 640, 642 indicate, from left to right, the order in which events happen. First, a reading operation by reader 1 640 takes place, followed by a writer operation by a writer 642, and a transaction rollback by that writer. This is followed by a reading operation and a commitment of the transaction by reader 1 640.

Figure 59:
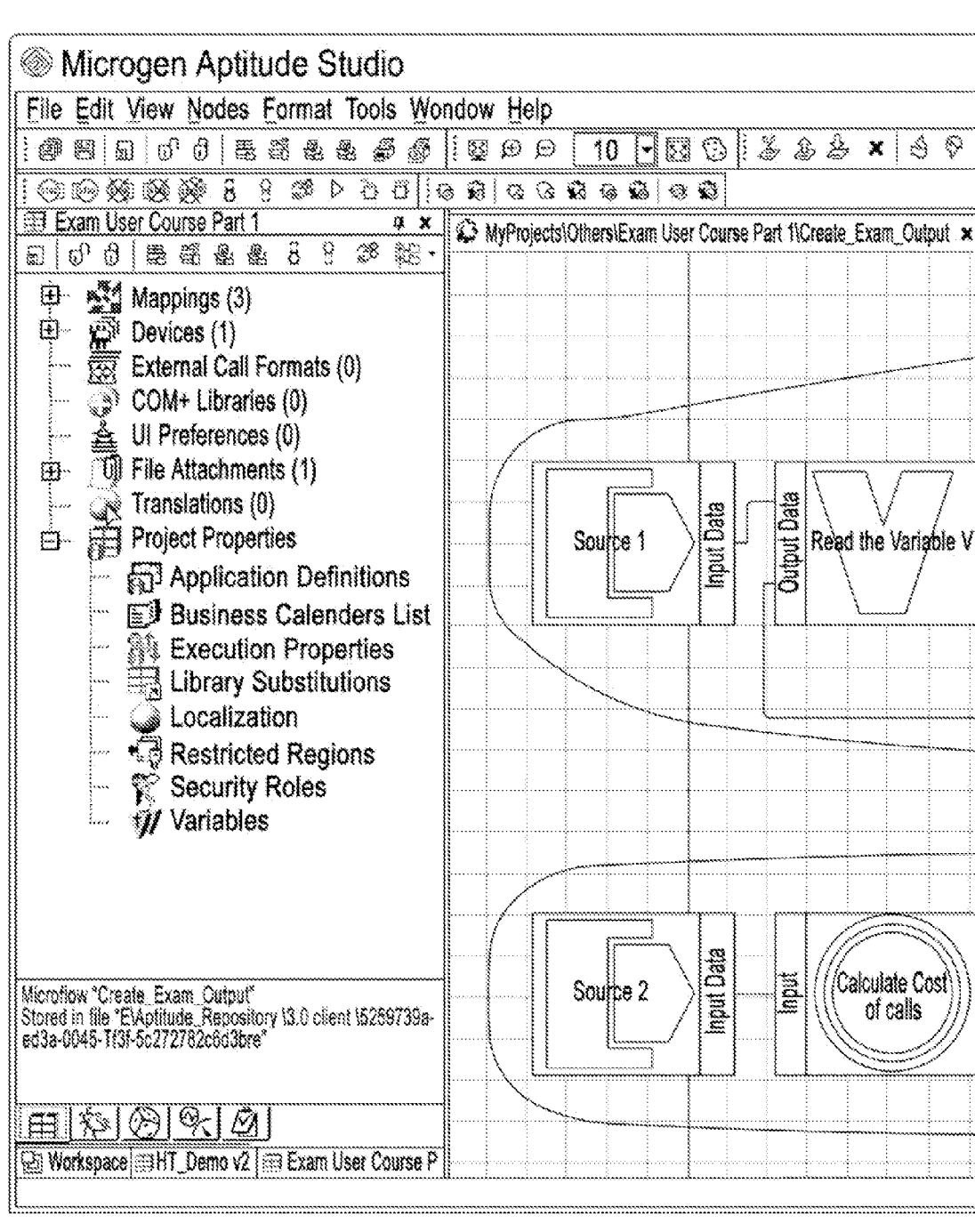
FIG. 59 shows a user interface showing exemplary read and write transaction regions.
Figure 59:
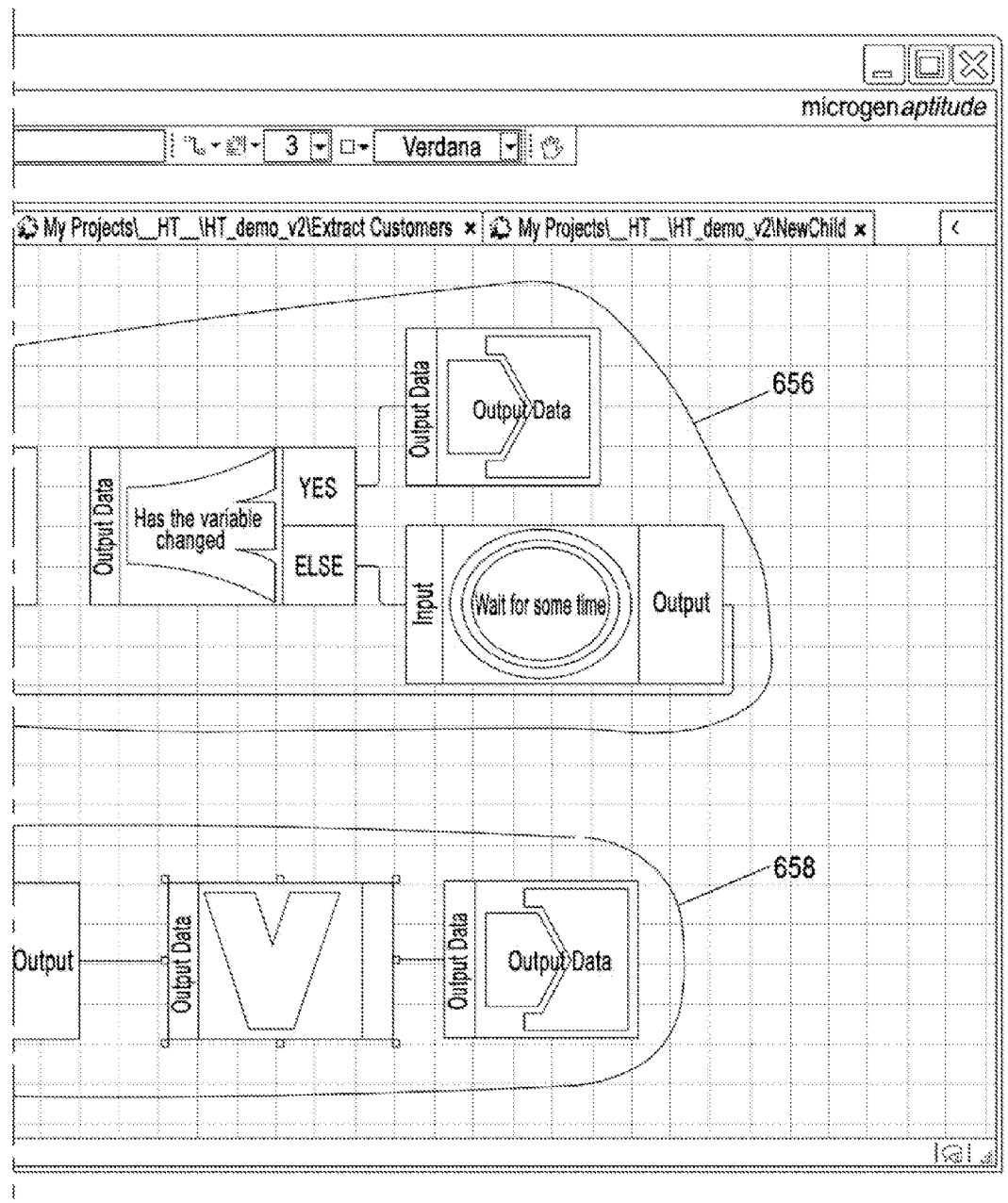

Aptitude transaction reader 656 and writer 658 regions that may correspond to such a scenario are shown in FIG. 59.

The upper transaction region 656 acts as a reader, which periodically checks if the variable has changed. If it is determined that the variable has changed, the current variable value is written to a target, for example a database. The lower transaction region 658 acts as a writer, which after some calculations saves the result to the variable, and then writes the result to an external target. If the write fails, then transaction rollback occurs, and the reader does not see any change to the variable.

Scenario 2 in FIG. 58 ii shows that the writers block one another, but they do not block the reader. A reading operation by a reader 644 is followed by a writing operation by a first writer 646. The writing operation blocks a second writer 648 from writing, until the transaction of the first writer 646 is committed. Then the second writer 648 can perform a writing operation and commit the writing operation. Meanwhile, the reader 644 can read during the writing operations.

Scenario 3 in FIG. 58 iii shows that the readers accessing a transactional variable which is being simultaneously accessed by a writer can not see the new version of the variable until the writer commits its writing operation. Until writer 654 commits, the two readers 652, 650 read an old version $R_0$ of the variable. After the writer 654 commits the writing operation, the first reader 650 reads the new version $R_1$. This figure also illustrates 'non-repeatable read'. After the writer has committed a writing operation, the first reader 650 will read the new version $R_1$ and can not repeat the reading of the old version $R_0$.

Transactional variables are typically stored in a memory termed process private memory. Note that Hierarchy Transformation, described above, can be used to operate on hierarchical variables using a Variable Access Node.

Aptitude provides a data generation functionality that allows a developer to generate artificial data for an Aptitude project. Data generation together with monitoring allows developers to test the functionality of the Aptitude Projects, measure their performance, and identify possible bottlenecks. This can be achieved during the early development phase of an Aptitude Project, in which there is usually no real business data is available. When the Aptitude Project is being executed in a simulation phase using generated data, its data sources are populated with artificial data produced during the data generation phase. The settings provide full control over the simulation process as well as the generated data.

Figure 60:
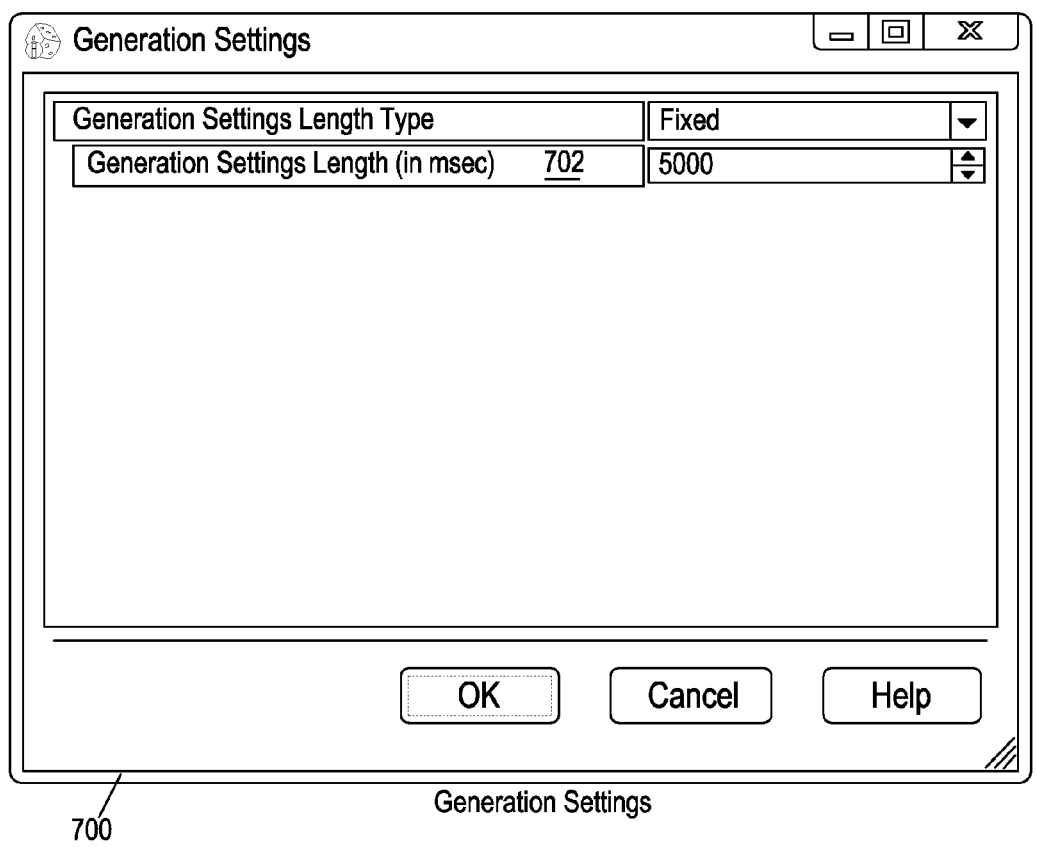
FIG. 60 shows a user interface for allowing a developer to set dummy data generation parameters.

FIG. 60 shows a user interface 700 that allows the developer to set Generation settings parameters concerning the generation process of artificial data. Currently the only parameter defined here is the length 702 of the generation session. This can be either infinite (data would be generated until the executor is stopped) or fixed to some value (defined in milliseconds).

Figure 61:
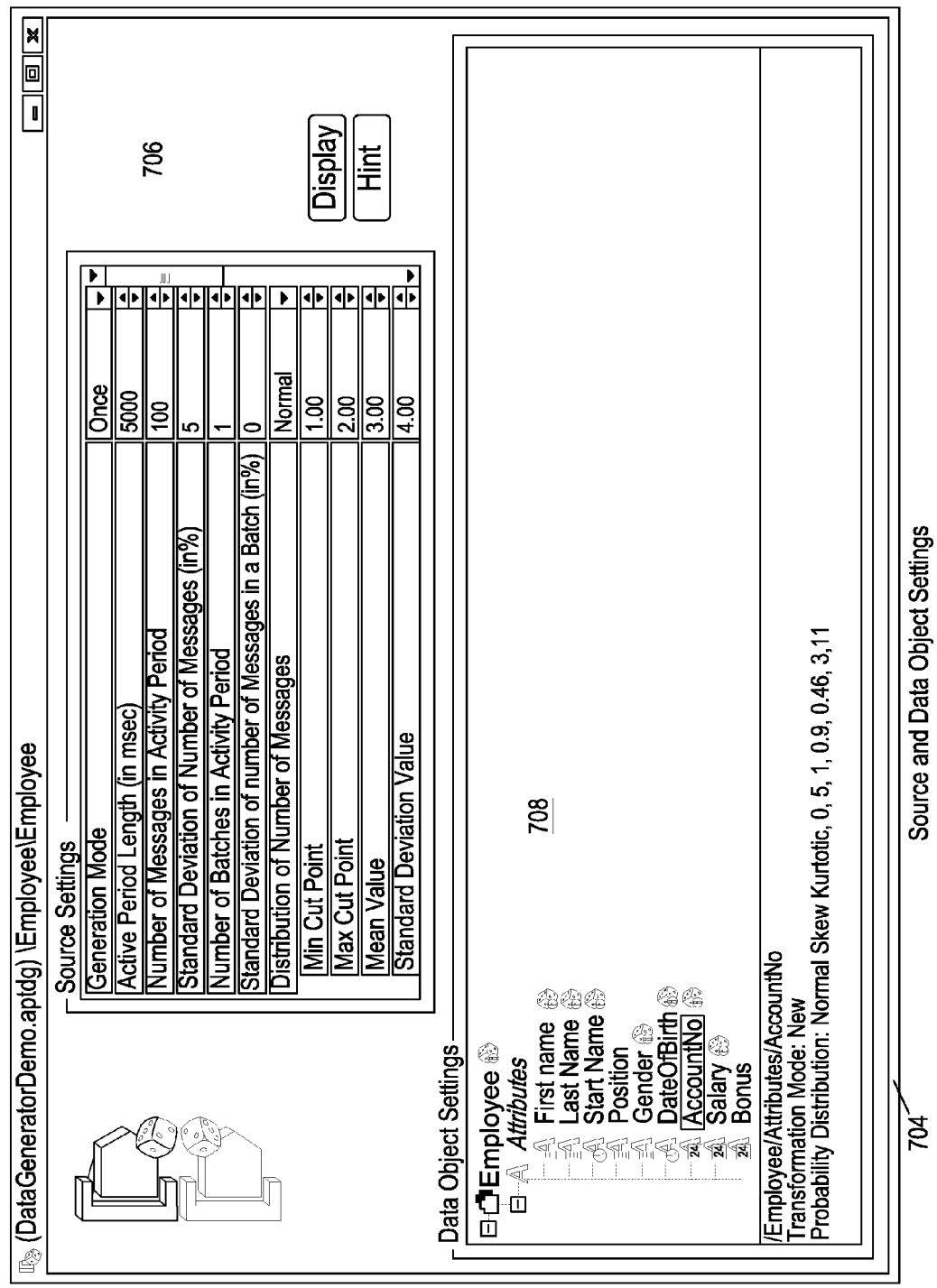
FIG. 61 shows a user interface for allowing a developer to select Source and Data Object settings.

A further user interface 704 shown in FIG. 61 allows the developer to set Source and Data Object settings, which contain parameters concerning the generation process of artificial data for a single data source from the Aptitude Project. Since the Aptitude Project may contain multiple data sources of various types (database tables, xml files, etc.), which are representing multiple business data models, each of them has its own Source and Data Object settings. Above mentioned settings can be divided into two main sections—Source settings 706 and Data Object settings 708.

Source settings define general features of the generation of artificial data. In the example of FIG. 61, the developer can select the following settings:

Generation Mode, which determines whether messages are generated only once or are generated at predetermined time intervals.

Interval Length, which determines the length of generation interval (defined in milliseconds). This is the length of time every in which source is active. The interval length must be at least equal (or longer) than the activity period length (see below).

Activity Period Length, which determines the length of activity interval (defined in milliseconds). This is the amount of time for which source generates messages. The activity period length may not be longer than the interval length Number of Messages in Activity Period, which determines the number of messages that is produced during the activity period.

Standard Deviation of Number of Messages, which determines the standard deviation of the number of messages (defined in %).

Number of Batches in Activity Period, which determines the number of data batches that is produced during activity period.

Standard Deviation of Number of Messages in a Batch, which determines the standard deviation of the number of messages in a batch (defined in %)

Distribution of Number of Messages, which determines the distribution shape of the number of data messages within the activity period.

Figure 62:
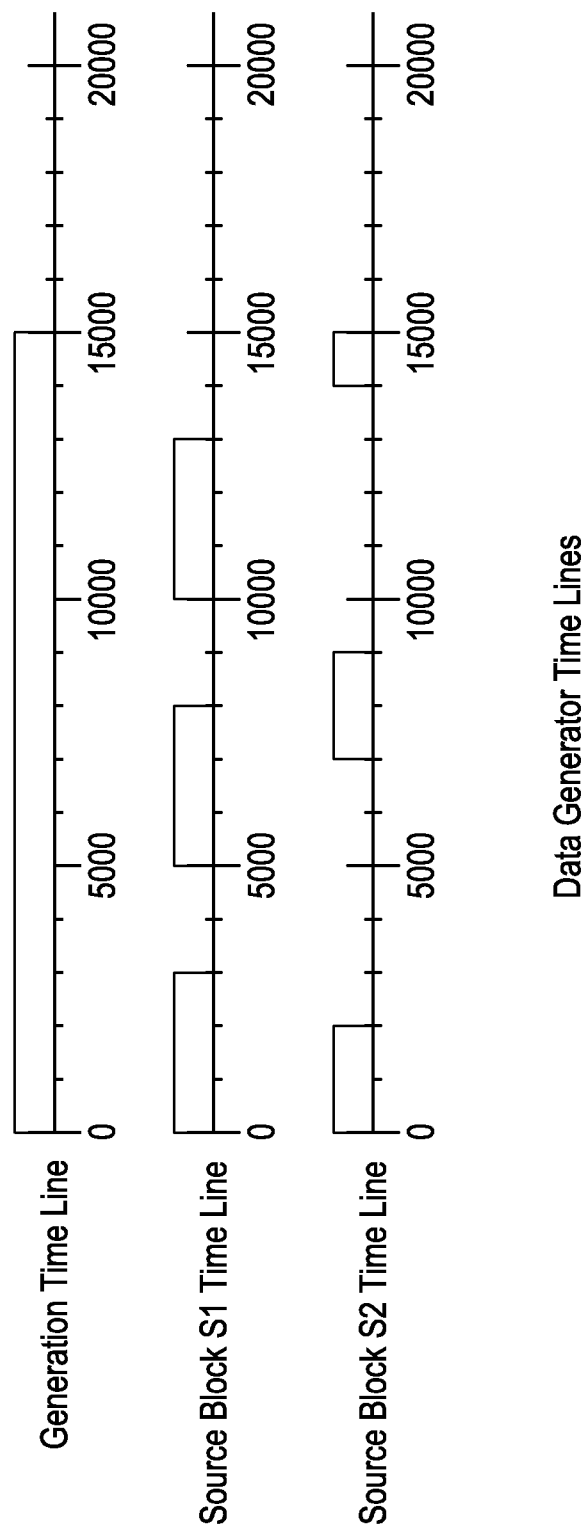
FIG. 62 illustrates schematically a time line showing dummy data generation from two source blocks having different parameters.

To better understand the correlation between the Generation Session Length defined using Generation settings and the Interval Length/Activity Period Length defined using the Source settings, consider the following example with reference to FIG. 62. In this example, the Generation Session Length is set to 15000 ms. Two source blocks are provided, S1 and S2. The Interval Length for S1 is set to 5000 ms, and the Activity Period Length for S1 is set to 3000 ms. The Interval Length for S2 is set to 7000 ms, and the Activity Period Length for S2 is set to 2000 ms. This means that S1 generates data messages for 300 ms every 5000 ms, and S2 generates data messages for 200 ms every 7000 ms. Because the Generation session length is set to 7000 ms, S2 finished generating its third set of data messages before the 2000 ms Activity Period Length has expired.

A user interface allows the developer to describe detailed features of the generation of artificial data. Generation settings and Source settings define parameters influencing the generation process, whereas Data Object settings define parameters shaping the generated data itself. A Data Object is a dummy representation of the business data model, so its generation settings are crucial to the whole generation process. They are defined by:

Assigning for each Data Object attribute its value probability distribution (except for binary attributes, in which case the value is empty).

Alternatively, attribute sets can be created. In other words, sets of attributes' values which are correlated and always applied together with a probability of certain attributes being chosen for each set.

A minimum and maximum number of instances of Data Object segments can be defined for hierarchical structures.

Figure 63:
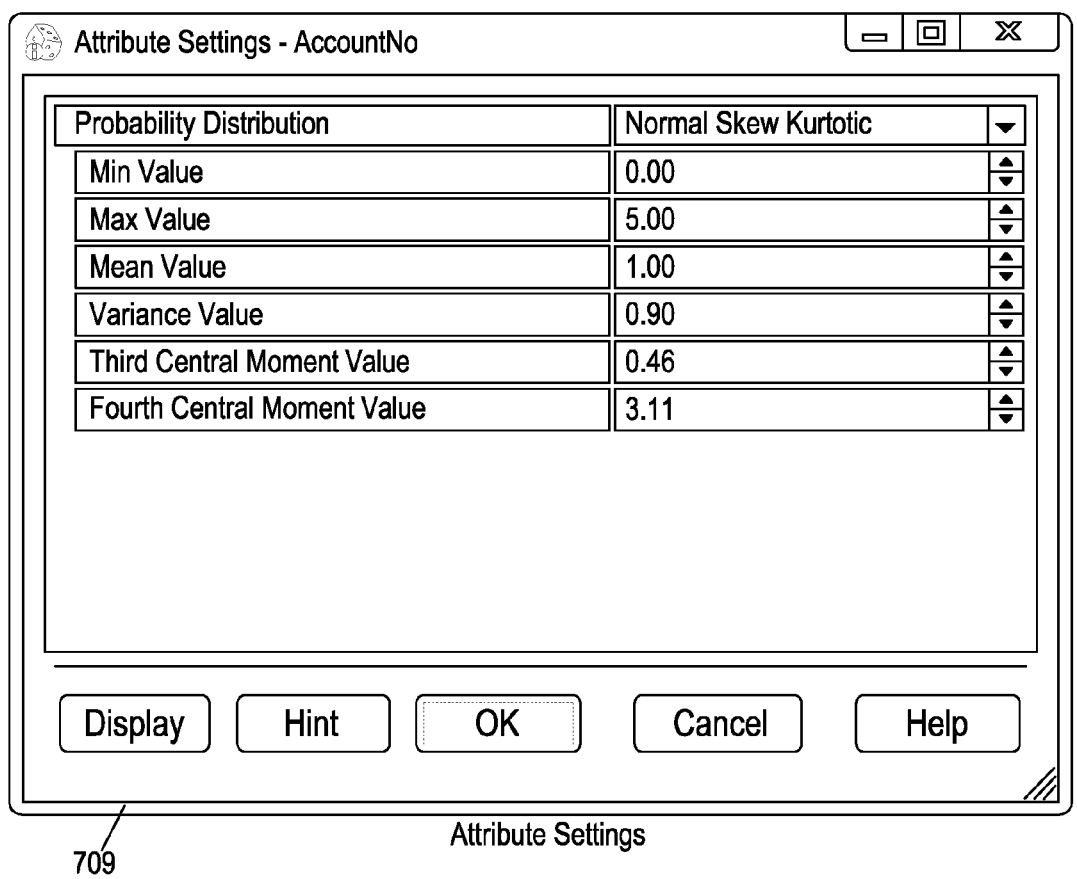
FIG. 63 shows a user interface for allowing a developer to set Attribute settings for the generation of dummy data.

Turning now to FIG. 63, a user interface 709 is illustrated that allows the developer to set Attribute settings. Attribute settings describe parameters concerning value probability distributions (see below) of each Data Object attribute. The value of each Data Object attribute is generated separately according to parameters defined by the developer.

Figure 64:
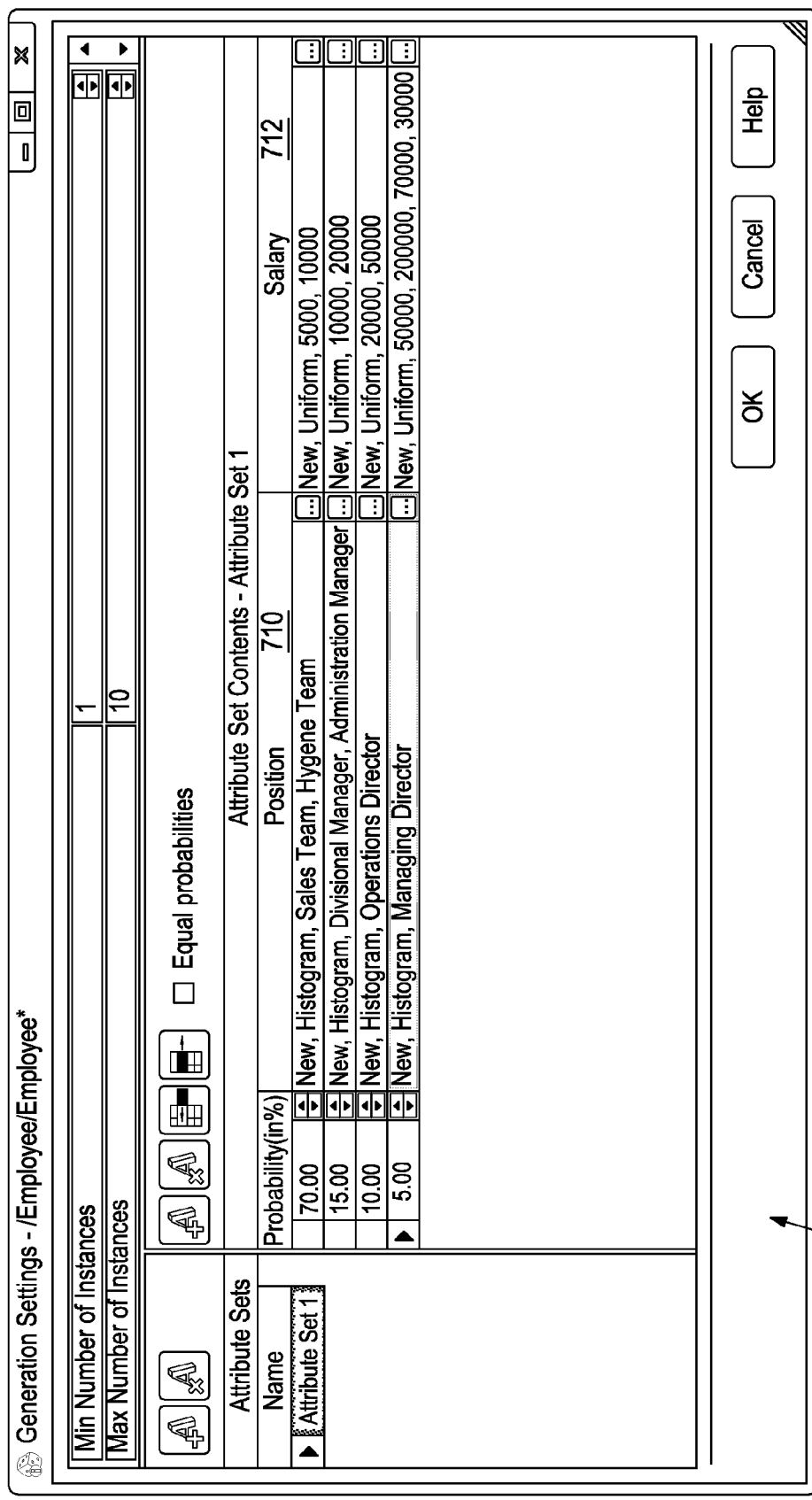
FIG. 64 shows a user interface for allowing a developer to set Attribute Set settings for the generation of dummy data.

Referring to FIG. 64, a user interface 708 is illustrated that allows the developer to set Attribute Set settings. Attribute Set settings define sets of Data Object attributes' value probability distributions, which allows dependencies between attributes to be expressed. These settings are always applied together with a predetermined probability of being chosen for each set. This allows the developer to generate data that is similar to the real business data that the application will use, and models dependencies that may occur in the real business data. Such data could not be generated using only standalone Data Object attributes. Generation settings for each Data Object attribute that are part of the Attribute Set are set in exactly the same manner as for standalone Data Object attribute. To better understand the concept of Attribute Sets, consider the example presented in FIG. 64 in which artificial data for an Employee is generated. The number of generated Employees in the Position field 710 reflects the structure of a business organization, and the amount of salary set in the Employee's Salary field 712 is correlated to the employee's position.

A probability distribution determines the generated value of the Data Object attribute. Available probability distributions depend on the required probability distribution type. Different probability distribution types can be chosen for Numeric, String and Date-Time Data Object attributes. For example, numeric data lends itself to uniform, normal, normal skew kurtotic, histogram and sequence probability distributions, as described below, whereas string data lends itself to uniform and histogram probability distributions. These are described in more detail below. The data generation function allows the developer to define probability distributions in two ways: Firstly, it provides the possibility to display a probability chart for supplied parameters and thus makes it easier for the developer to imagine what the generated values would be. Secondly it provides hints for the more complex probability distributions, i.e. Skew and Kurtosis properties where the values are constrained by the values of the lower level moments.

Exemplary probability distributions available for a numeric Data Object attribute are as follows:

Uniform, defined by the minimum and maximum values.

Normal, defined by minimum, maximum, mean and standard deviation values.

Normal Skew Kurtotic, a normal distribution with two additional parameters defining the third and fourth central moment values.

Histogram, a developer-defined set of values with given probability of being chosen; probabilities can be equal for each value or set manually by the user.

Sequence, which selects the next unpicked value. A sequence is defined by a start value, and has a step of 1.

Figure 65:
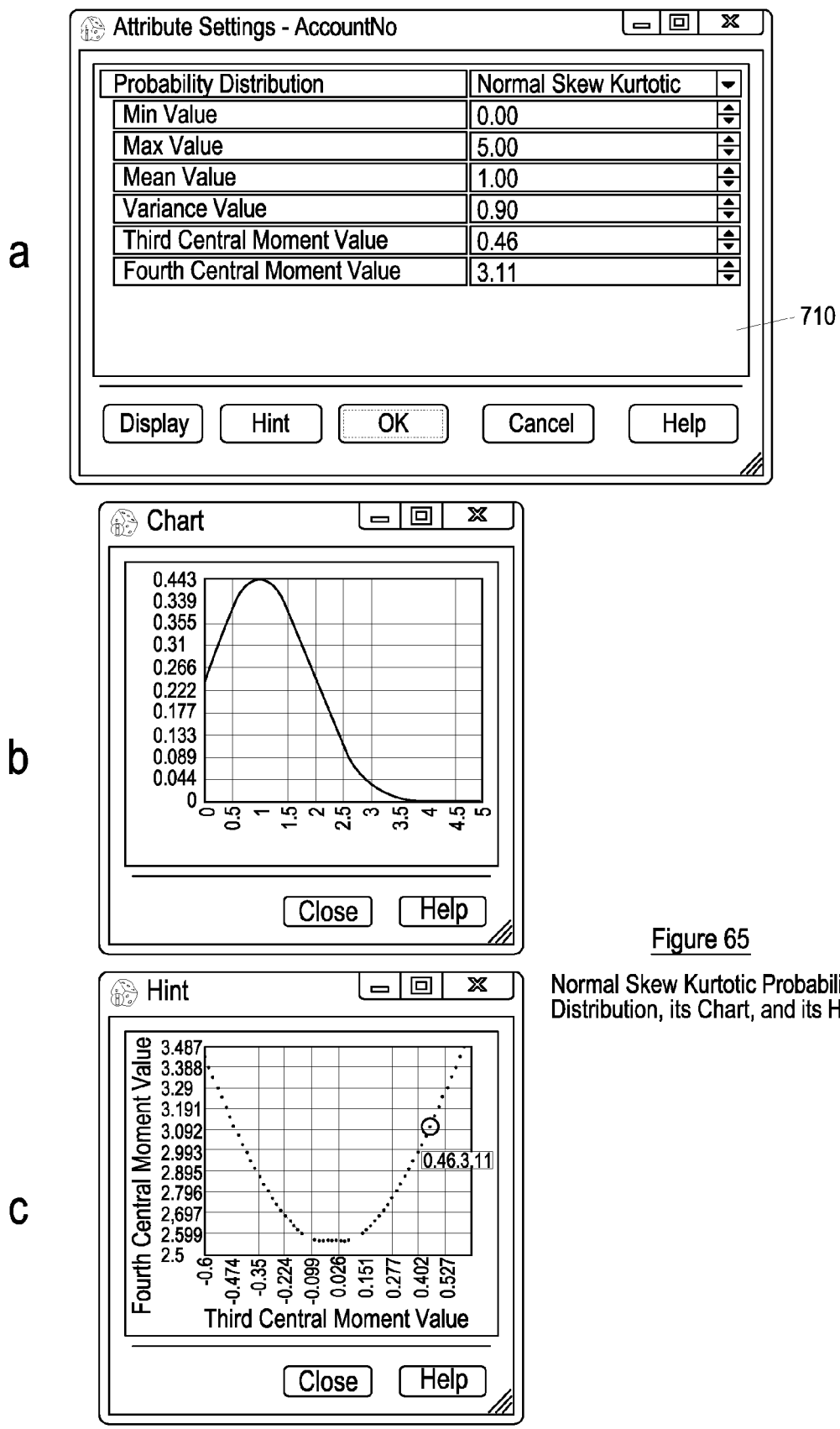
FIG. 65 shows exemplary user interfaces for illustrating a selected probability distribution.

FIG. 65 illustrates the user interface for a normal skew kurtotic probability distribution. In FIG. 65a, the user interface 710 allows the developer to select the type of probability distribution, and in this example the developer has selected a normal skew kurtotic probability distribution, along with third and fourth central moment values. FIG. 65b shows a chart that is displayed to the user to allow the user to visualise the probability distribution, and FIG. 65c shows a plot of the fourth central moment value against the third central moment value. It will be apparent to the person skilled in the art that any type of probability distribution may be defined.

Figure 66:
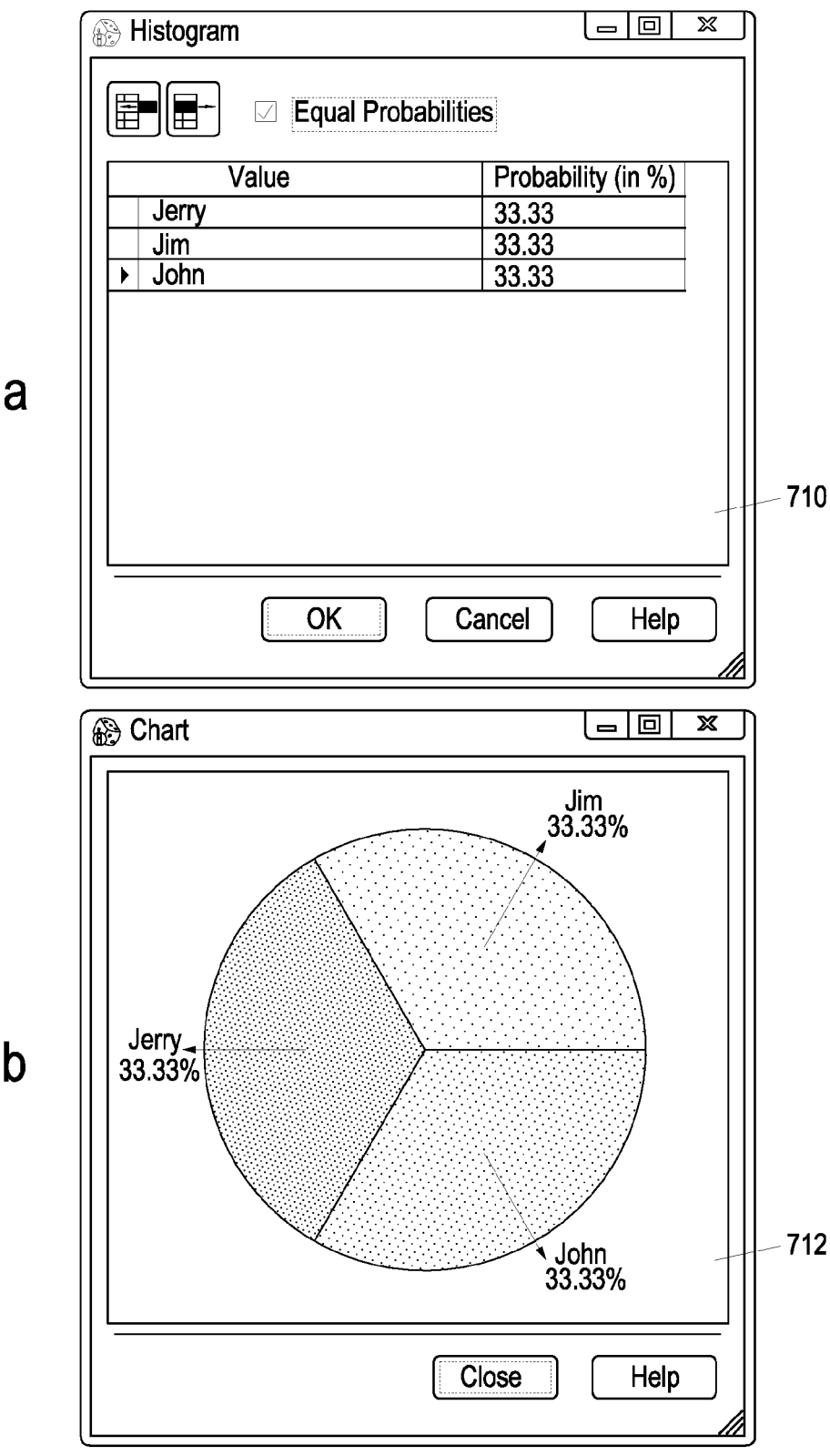
FIG. 66 shows an exemplary user interface for allowing a developer to select a histogram probability distribution and an associated chart.

Probability distributions can also be defined for string Data Object attributes (i.e. non-numerical Data Object attributes). The distribution may be uniform, defined by the minimum and maximum values for the string length, or defined using a histogram displaying a set of values, each with a given probability of being chosen. In this case, probabilities can be equal for each value or set manually by the developer. FIG. 66a shows a user interface that allows the developer to set a histogram probability distribution for string values, and FIG. 66b shows an associated pie chart displayed to the developer to allow the developer to visualize the probability distribution. In this example, the three string values have all been assigned an equal probability.

Referring to FIG. 67, a probability distribution can be set by the developer for a Date-Time Data Object attribute. In this example, the user interface 714 shows the developer setting a uniform distribution defined by the minimum and maximum values (start and end date), and a chart 716 can also be displayed to the developer allowing him to visualize the probability distribution. The types of probability distribution that can be applied to a Date-Time Data object include:

Normal, defined by minimum, maximum, mean and standard deviation values.
Normal Skew Kurtotic, a normal distribution having third and fourth central moment values as additional parameters.
Histogram, a set of values with given probability of being chosen; probabilities can be equal for each value or set manually by the user.

The data generation function provides the developer with the ability to generate artificial data for Aptitude Projects that simulates real business data. It also provides the ability to model dependences in the generated data reflecting dependences that usually occur in real business data. Full control is provided over the generation process as well as the generated data, and this gives the possibility of testing functionality of the Aptitude Projects during early development phase. As described above, a variety of different probability distributions can be used to model the generated data, and graphical representations of probability distributions make it easier for the developer to imagine what the generated data would be.

Note also that instead of using generated data, an Aptitude Project can use "recorded" data. This is real data that has been recorded from a previous execution of the Project. It can be played back in real time or in compressed time.

Monitoring allows developers to measure performance and identify possible bottlenecks in their Aptitude projects in an easy and convenient way before the project is released to the customer. The Aptitude Project is executed under monitoring conditions either normally or in a playback mode that utilizes data generated using the data generator function or data that has been "recorded" from a real-life execution of the program. When the Aptitude Project is being executed under monitoring conditions, the developer can select the nodes are to be monitored, and is presented with monitoring indicators concerning each of the nodes that have been selected to be monitored. The developer is provided with the ability to define his own monitoring indicators (Key Performance Indicators, KPIs) using the underlying business data. The KPIs are then accessible from within Aptitude Project interface and can be used, for example, to implement a Business Activity Monitor in a Web Application. The values of all above mentioned KPIs may be presented in a graphical form allowing the developer to easily visualise the status of the monitored nodes.

Figure 68:
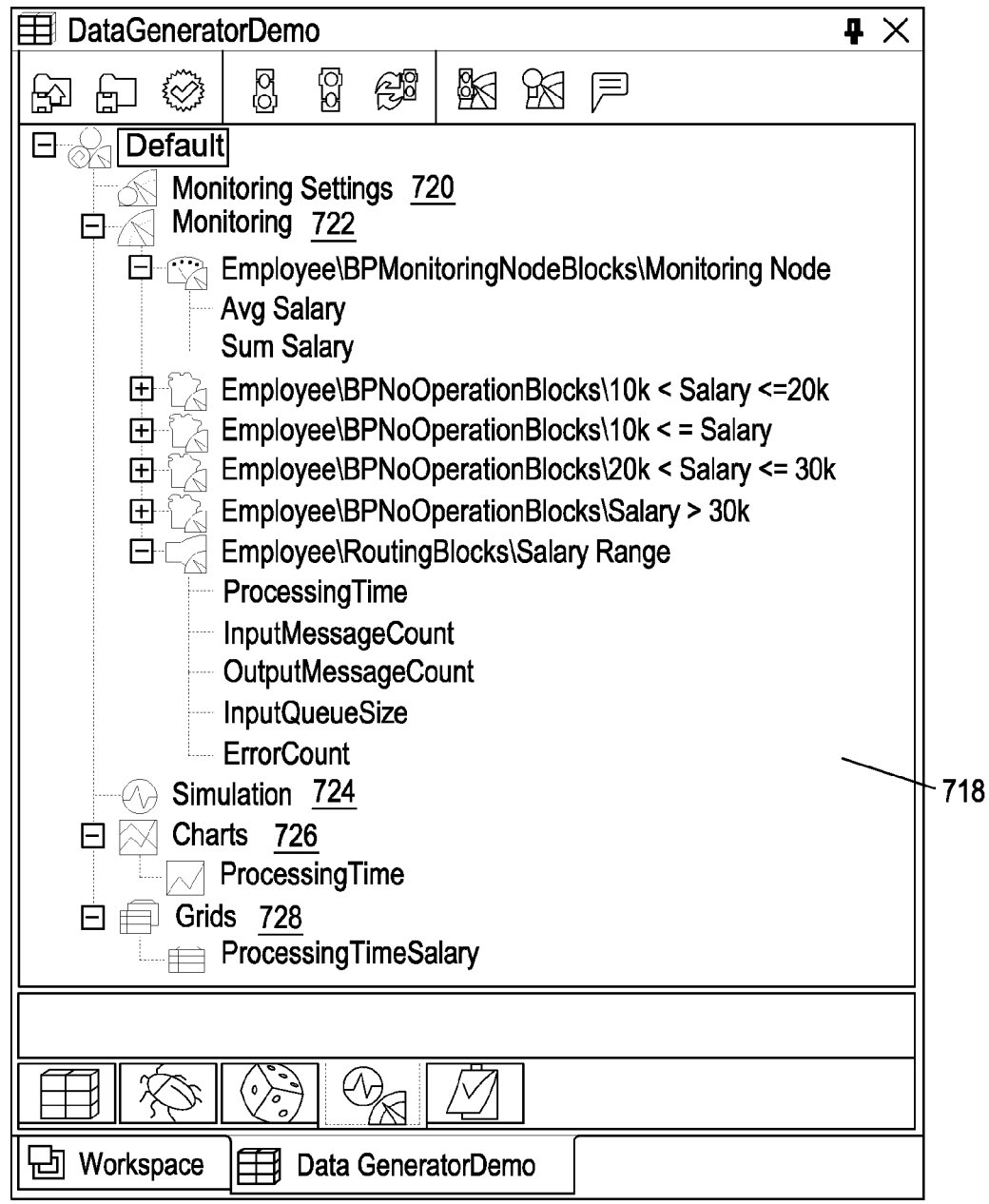
FIG. 68 shows a user interface for allowing a developer to access monitoring functionality.

Referring to FIG. 68, an exemplary user interface 718 is shown that allows the developer to access various aspects of the monitoring functionality. The user interface 718 shows all Microflows (and/or the associated nodes) that have been selected by the developer to be monitored. It is presented as a tree that contains five main nodes as follows:

Monitoring Settings 720.
Monitoring 722. This allows the developer to group a set of nodes which are monitored in the current session along with their monitoring indicators.
Simulation 724. This allows the developer to group a set of nodes which are simulated in the current session
Charts 726. This allows a user to group user defined line charts that show monitoring indicators.
Grids 728. This allows a user to group user defined tables used to display monitoring indicators.

Figure 69:
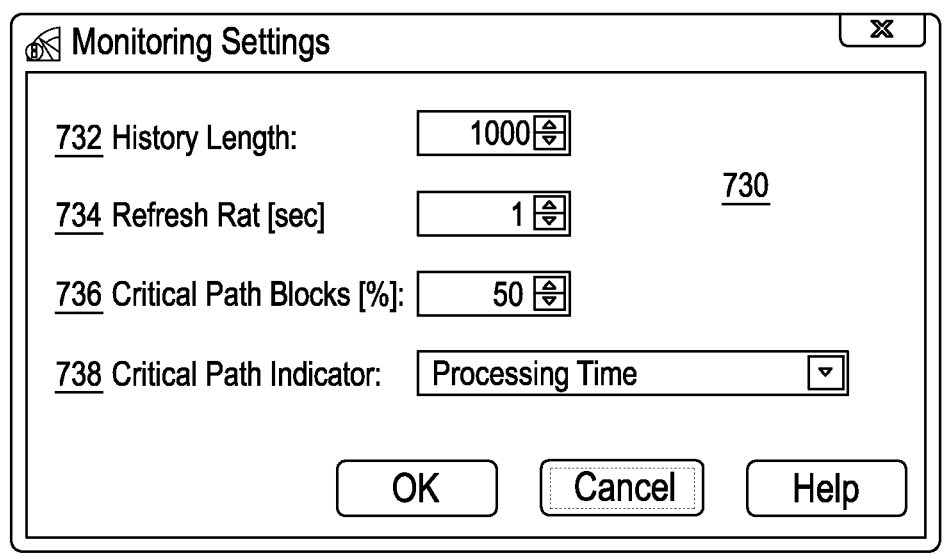
FIG. 69 shows a user interface for allowing a developer to select monitoring settings.

When a developer selects monitoring settings 720, is opens up a new user interface 730 that allows the developer to set parameters concerning the monitoring process on the Aptitude server side as well as the storage of monitoring samples on the Aptitude client side. This interface is shown in FIG. 69. The following parameters are available:

History Length 732 that specifies a number of samples that will be stored together with the other monitoring settings in the Monitoring and Simulation .aptms file. The .aptms file contains all monitoring settings along with samples collected during the monitoring process.
Refresh rate 734 that specifies the frequency of sample requests sent by the client to the server.
Critical Path Blocks 736 that specifies a percentage number of blocks that are presented on the critical path (see below)
Critical Path Indicator 738, that specifies a name of the node parameter used to measure (and present) the critical path of the flow (see below).

When the Aptitude Project is being executed under monitoring conditions, the developer is presented with a variety of monitoring indicators concerning each of the nodes that the developer has selected to be monitored. All nodes have a set of predefined performance indicators that are monitored. This set is identical for almost all the nodes available in the data Microflow and indicators selected from the following:

Processing Time
Input Message Count
Output Message Count
Input Queue Size
Error Count A Monitoring Node can be selected that has a developer-defined set of key performance indicators. In addition, a Manual Activity Node can be selected, which is provided with the following set of indicators:

Queue Length
Human Processing Time—Current
Human Processing Time—Min
Human Processing Time—Max
Human Processing Time—Mean Human Processing Time—Top
Human Processing Time—Deviation
Human Processing Time—Skew
Human Processing Time—Kurtosis
Human Processing Time—Top Density The values of monitoring indicators can be presented to the developer as any of a call-out, a chart, and a grid. Call outs show real-time values of all monitoring indicators in a particular point in time of the monitoring process. Charts and Grids present all values of the chosen monitoring indicators collected during the whole monitoring process. In other words, a Call out shows data at the current point in time; a grid shows a collection of data at the current point in time and a chart shows changes in a data set over a period of time. All three kinds of monitoring indicator perspectives are refreshed according to the frequency defined in the Monitoring Settings.

Figure 70:
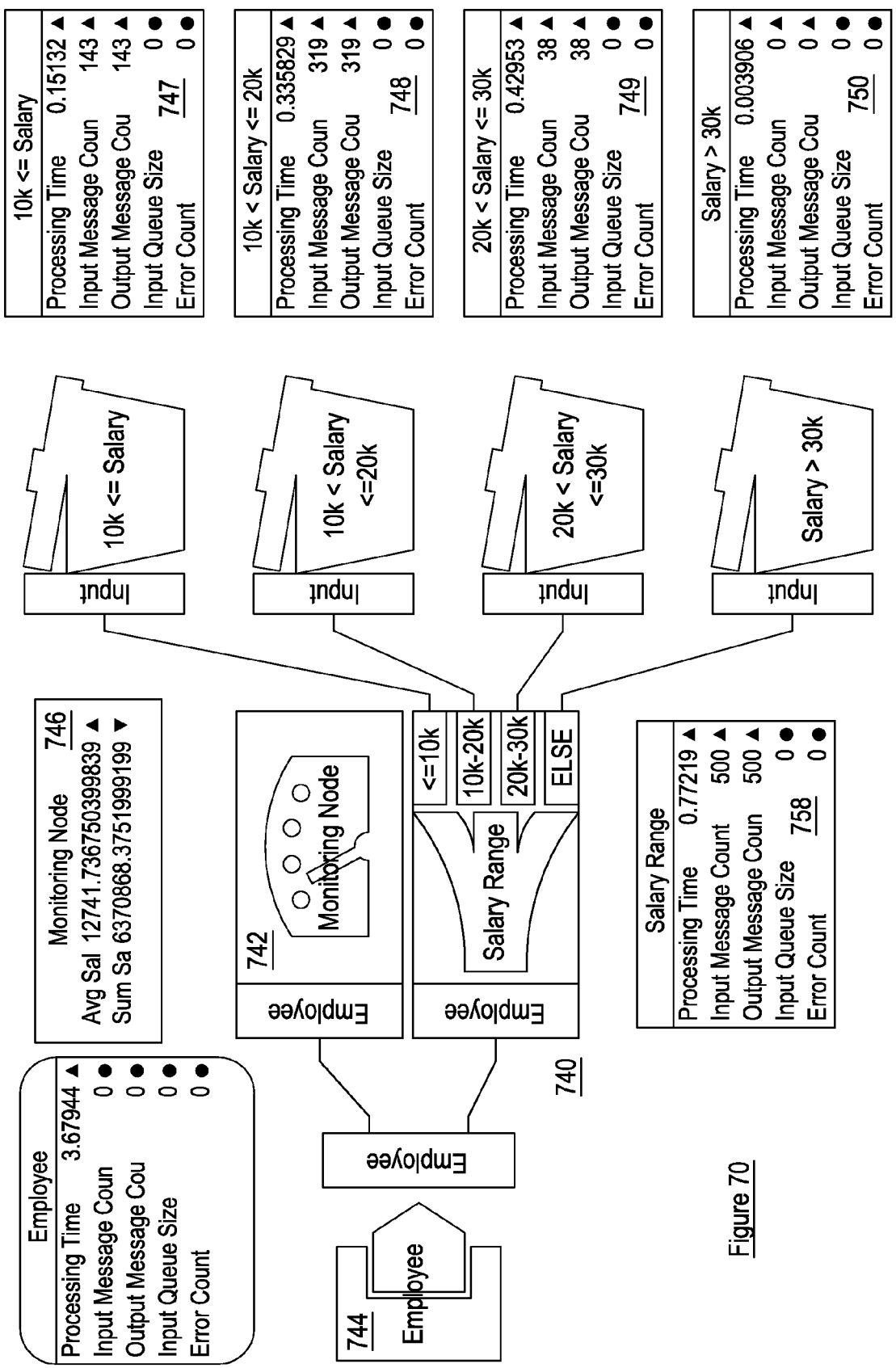
FIG. 70 shows a user interface of an Aptitude project having a monitoring node associated with another node.

Referring to FIG. 70, a user interface 740 is shown. In this example, a monitoring node 742 is associated by the developer with a data source node 744. A call out 746 containing monitoring indicators is displayed next to the monitoring nodes 742. The call-out contains real-time values of monitoring indicators and graphical markers showing their trends, in this case a downward arrow for a downward trend, and an upward arrow for an upward trend. Call outs 747, 748, 749, 750 are also displayed next to each data output node.

Figure 71:
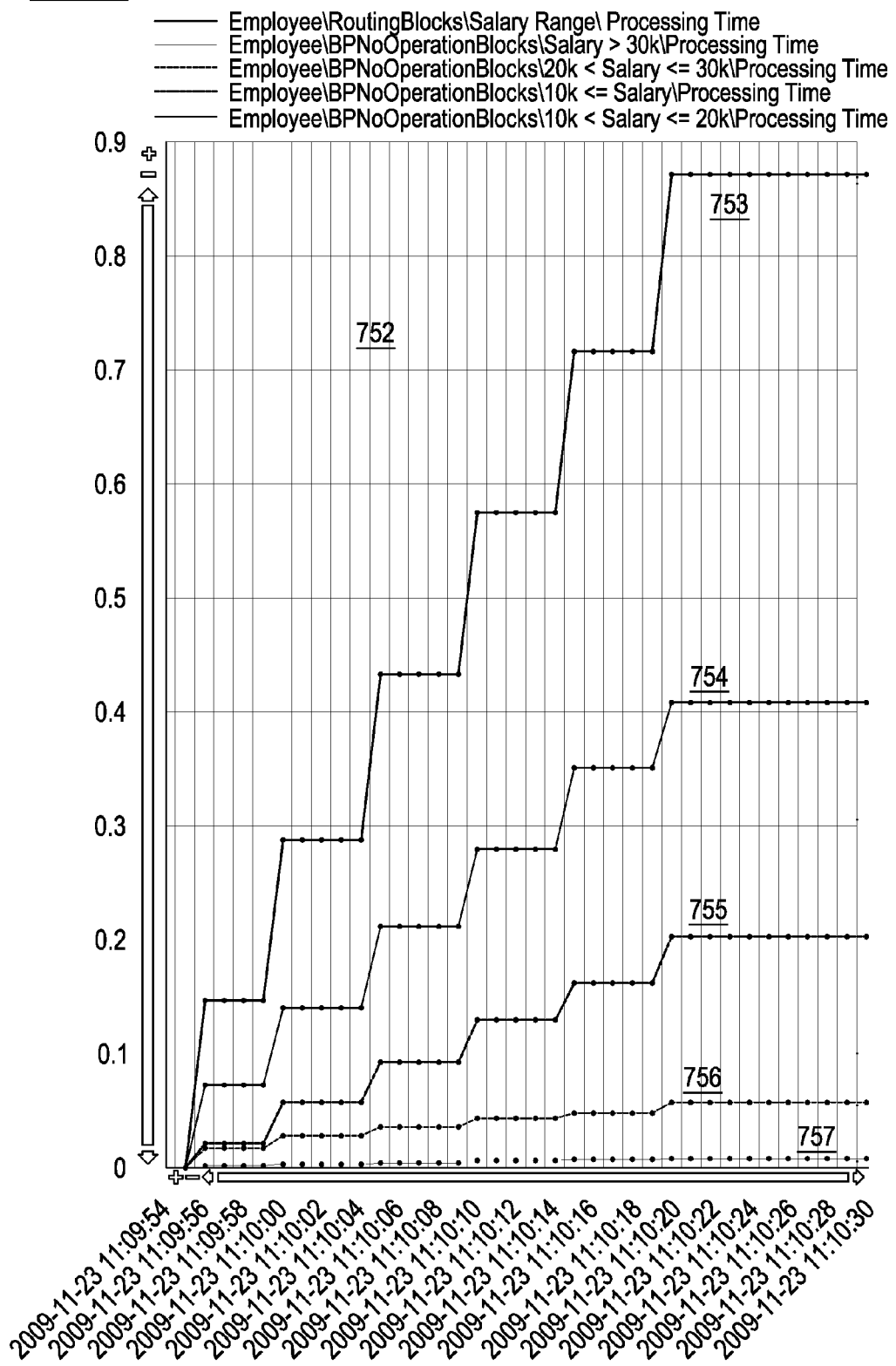
FIG. 71 is an exemplary chart output of a monitoring node.

Monitoring results may also be displayed using one or more charts. Referring, to FIG. 71 herein, a chart 752 is a linear representation of monitoring indicators. The chart 752 contains a separate line 753-757 for each chosen monitoring indicator that reflects subsequent values of that indicator collected during the whole monitoring process. In order to define a chart, the developer selects the chart shown on the display, drags the desired monitoring indicators from the Monitoring Explorer and drops them onto surface of the Chart.

Another way to display the results of monitoring is to use a grid, as shown in FIG. 72. A grid is a tabular view of monitoring indicators. In contrast to the chart shown in FIG. 71, it does not display the values of the chosen monitoring indicators collected during the whole monitoring process but instead displays the values gathered in a particular point in time of the monitoring process. This point in time can be selected by the developer from a range that overlaps with the period of the monitoring process. Grids are defined by dragging the desired monitoring indicators from the Monitoring Explorer and dropping them on the surface of the Grid.

A monitoring node 742, as shown in FIG. 70, allows the developer to define his own set of monitoring indicators using underlying data. Each indicator consists of: a name, an aggregation function and an expression to evaluate. The expression is based on attributes from the Data Object (which is the input to the monitoring node 742) and standard calculator functions. An aggregation function can be selected from any of the following:

Average of all values;
First value;
Last value;
Maximum of all values;
Minimum of all values; and
Sum of all values Note that the Monitoring Node is a normal node that takes part in the execution of the Aptitude Project. In other words, it always evaluates the user defined monitoring indicators, even if the project is not executed under monitoring conditions. The monitoring indicators are then accessible from within the Aptitude Project and can be used, for example, to implement a Business Activity Monitor in a Web Application.

Figure 73:
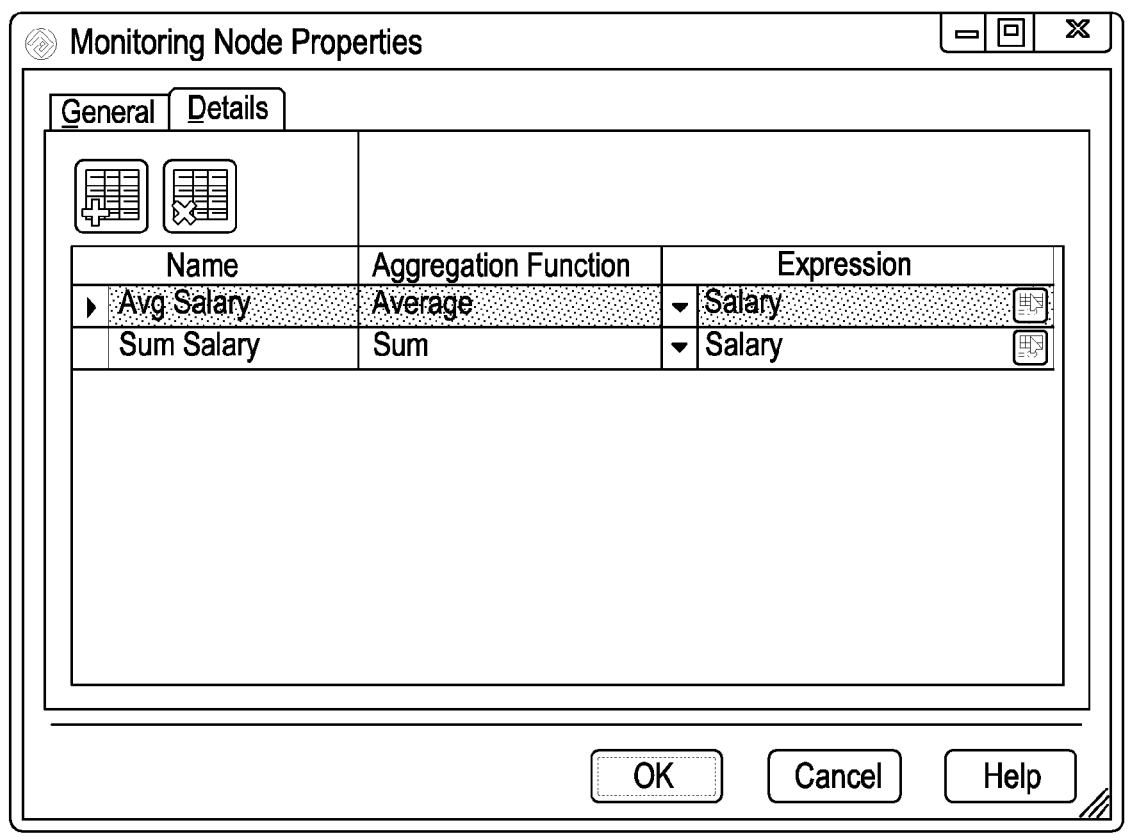
FIG. 73 is a user interface for allowing the developer to select properties of a monitoring node.

FIG. 73 shows a user interface for selecting monitoring node properties, such as the attributes of the data process to be monitored.

Monitoring can be used to assist the developer in determining Microflow nodes that have inadequate performance, and therefore have the most influence on the critical path of the Aptitude Project execution. In order to turn use this feature, the developer defines two parameters: Critical Path Blocks and Critical Path Indicator (see above). The Critical Path Block defines the percentage of the nodes that should be considered as belonging to the critical path. The Critical Path Indicator selects a monitoring indicator that is most pertinent to the critical path. The critical path for the chosen monitoring indicator is visually presented as a highlight to the nodes that have the highest values of the indicator. For example, if the value for Critical Path Blocks parameter is 50%, the selected monitoring indicator is "Processing Time" and six nodes from a particular Microflow are monitored, then the three nodes with the highest "Processing Time" would be highlighted as most critical to the critical path. In the example of FIG. 70, call outs 747, 748 and 758 would be highlighted. This allows the developer to explore the parameters of the associated nodes and determine whether any action can be taken to improve their efficiency.

The monitoring function allows the developer to measure performance and identify possible bottlenecks in an Aptitude Project. A variety of predefined monitoring indicators are available, along with the possibility of allowing the developer to create user defined monitoring indicators. Multiple ways of presenting values of monitoring indicators are provided, and charts and Grids can be easily defined by utilizing "drag and drop" in the display. The monitoring function also gives the developer the ability to identify the critical path during execution of the Aptitude Project.

Figure 74:
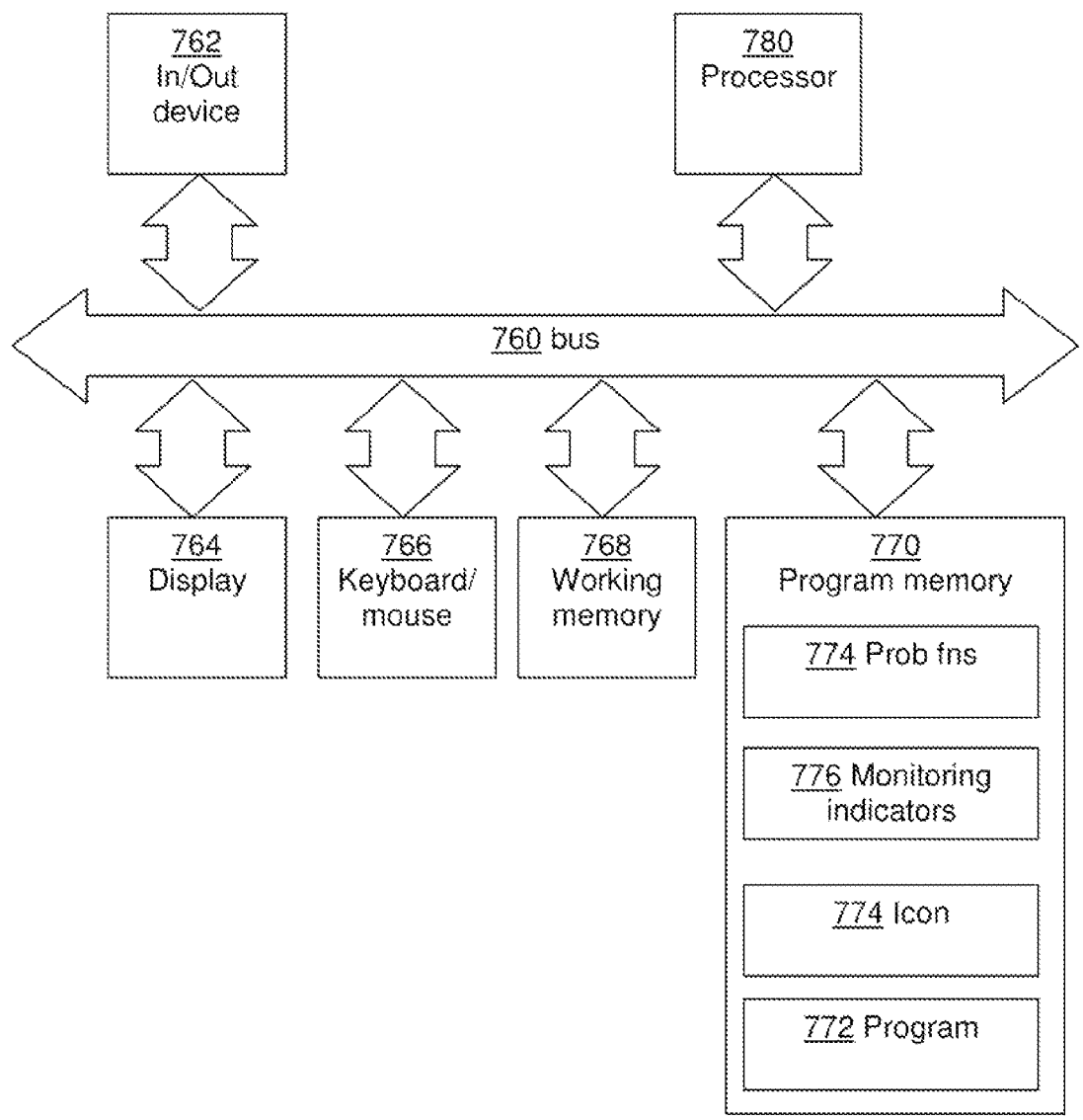
FIG. 74 illustrates schematically in a block diagram a computer according to an embodiment of the invention.

Referring to FIG. 74 herein, there is illustrated schematically in a block diagram a computer device according to an embodiment of the invention. The computer device is provided with a bus 760 for allowing different components of the computer device to communicate with one another. In in/out device 762 is provided, along with a display 764, a user input device 766 such as a keyboard/mouse, and a working memory 768. A program memory 770 is provided at which is stored a program 772 that allows the developer to manipulate one or more functions graphically using the user input device 766 and the display 764. The memory 770 also stored probability distribution functions 774, monitoring indicators 776 and a monitoring node icon 778. A processor 780 is provided for processing the generation of dummy data and monitoring a data processing operation.

Data can be handled and processed by Microgen Aptitude in two different ways, as individual data messages in a straight through processing (STP) mode, and as groups of data messages in a batch mode. The STP mode is the basic way of supplying data messages and the data messages are subsequently processed independently by Business Process Nodes, one by one, and immediately after their arrival. A more efficient way of processing large amounts of data messages is by using the batch mode of execution, in which many data messages are processed collectively. Microgen Aptitude has been designed to operate in both STP mode and batch mode as well as in combination of both modes simultaneously.

A Source Node can deliver data in STP mode or in batch mode, but the choice of mode strongly depends on the external system requirements. For example, a. database source may be able to deliver data in a batch mode, but a message queue source cannot.

The Business Process contains nodes that process data messages. There are two classes of nodes: STP mode nodes and Grouping nodes. The difference between these classes lies in the way of dealing with the data stream. The execution result of a single Grouping node depends on many data messages, but the execution result of an STP mode node depends on a single data message.

If data messages are grouped in batches, Grouping nodes functionality can be used. The following Grouping nodes are available: a Batch Merge node, a Batch Split node, a Reduction node, a Match & Merge node, a Sorting node and a Hierarchy Transformation node (as an option).

Figure 75:
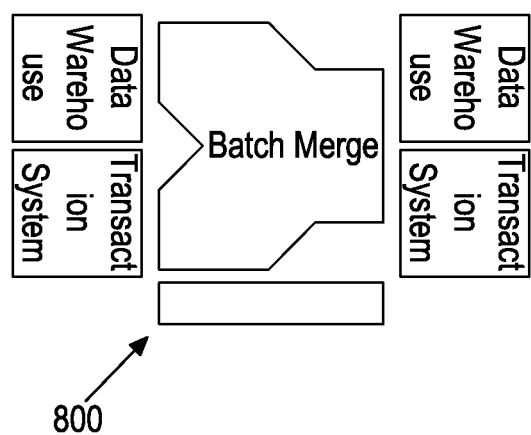
FIG. 75 illustrates schematically a batch merge node according to an embodiment of the invention.
Figure 76:
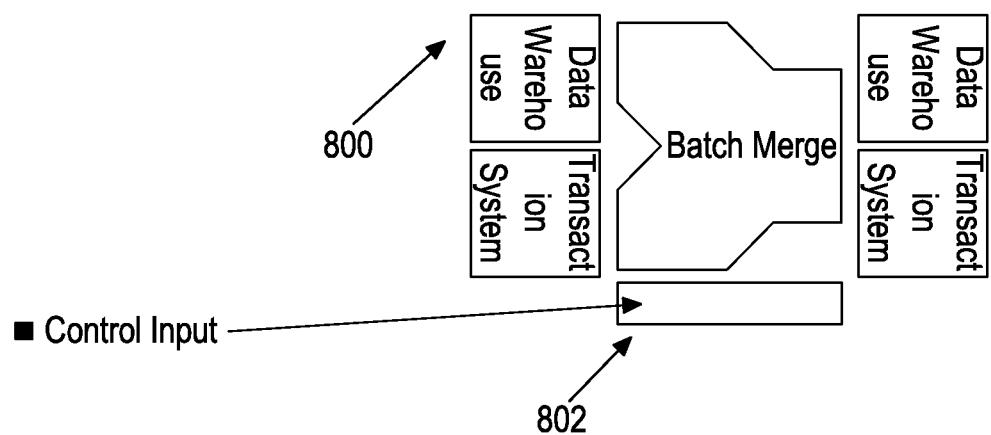
FIG. 76 illustrates schematically in a block diagram a batch merge node having a control input.
Figure 77:
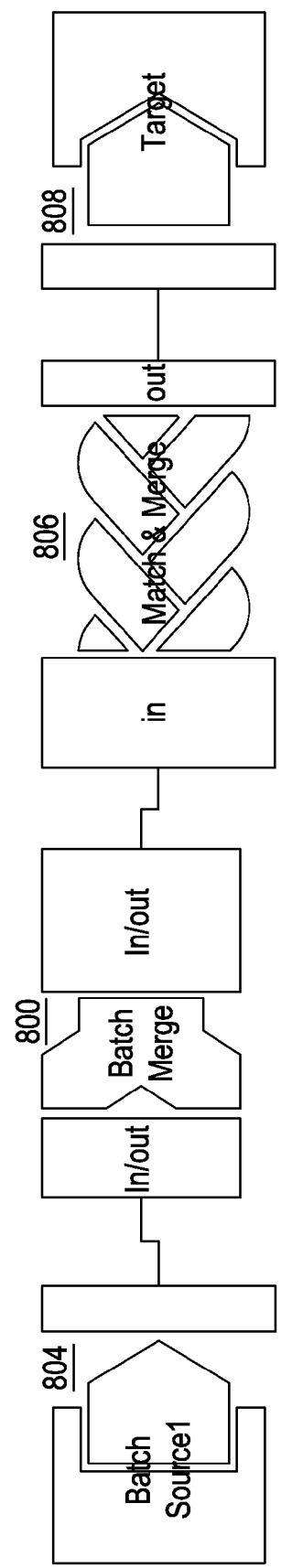
FIG. 77 illustrates schematically in a block diagram an exemplary use of a batch merge node in a data processing operation.

A Batch Merge node 800 is shown in FIG. 75 and offers conversion an STP stream of data messages into a Batch of data messages. The Batch Merge node makes it possible to use STP Sources for Business Processes which have to use Grouping node functionality. The Batch Merge node may be also used to merge multiple Batches into one Batch which can be used further, e.g. for aggregation. The format of the input and output data is the same; the node does not merge separate input formats to a single output one. The node stores the input records and generates a batch on the output in reaction to an End of Data signal from all directly preceding Transaction Regions. The node has a control input 802, shown in FIG. 76, which may signal the moment when the batch should be generated. As soon as data arrives at the control input, the records stored in the node will be generated as output batch. A control input signal must arrive from all directly preceding Transaction Regions. FIG. 77 shows conversion of an STP stream of data into a batch. STP data arrives from a source 804 to the Batch Merge node 800, and is merged into a batch. The batch in this example if then passed to a Match and Merge node 806 and from there goes on to a Target node 808.

Figure 78:
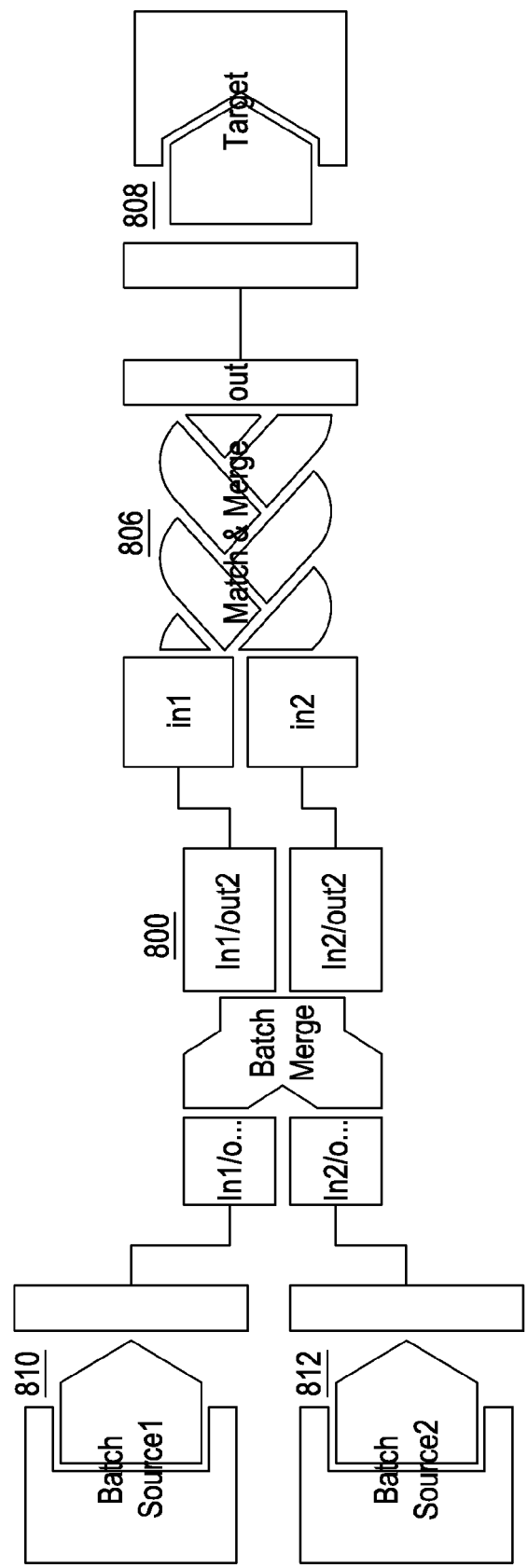
FIG. 78 illustrates schematically in a block diagram an exemplary use of a batch merge node to merge two batches in a data processing operation.

FIG. 78 shows conversion of smaller batches into one larger batch. Data arrives from two data sources 810, 812 and is passed to the Batch Merge node 800. The Batch Merge node 800 merges the data into one larger batch and in this example passes the larger batch to a Match and Merge node 806 and from there to a Target node 808.

Figure 79:
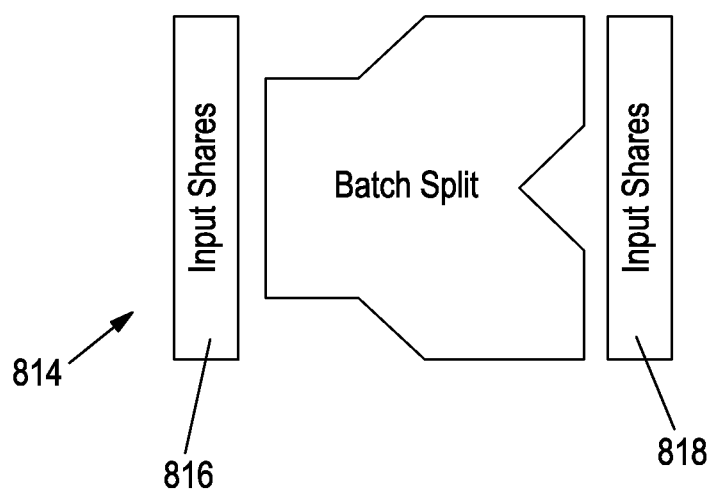
FIG. 79 illustrates schematically in a block diagram a batch split node according to an embodiment of the invention.

The Batch Split node 814, shown in FIG. 79, allows the developer to split a batch of data into smaller batches or single messages. The format of input and output is the same. In other words, the events received into the block are the same as those being output, but the events are grouped differently. The Batch Split node 814 has one input 816 and one output 818 based on the same Data Object and enables incoming events to be grouped into batches that have matching values for specified grouping root attributes. The Batch Split node 814 can be used when a batch of messages is intended to be treated as a group of batches or single messages, for example by the Execution Error Handling discussed below.

Figure 80:
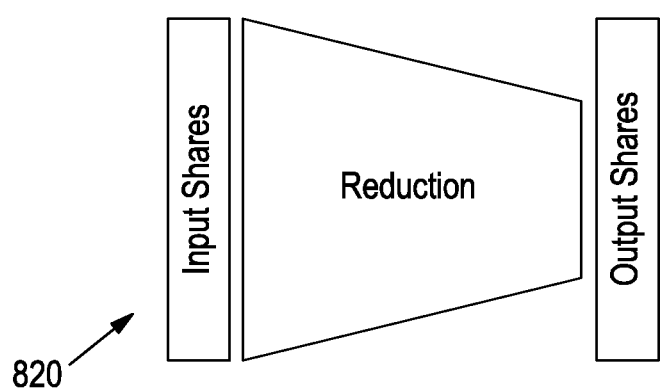
FIG. 80 illustrates schematically in a block diagram a reduction node according to an embodiment of the invention.

The Reduction Node 820, shown in FIG. 80, is used to perform reduction operations within a batch of data to create a single output for each group that meets specified criteria. The Reduction node 820 is used to aggregate messages. For example, ten rows of batch data could be reduced to one summary row. The Reduction node 820 has one input and one output and enables grouping of input messages (Data Objects) having the same values of the selected set of attributes of the root segment. The developer indicates an expression to be calculated on input attributes. Only attributes from the root segment can be used in the expression. The expression result is used in the aggregation. Multiple expressions can be defined, and the results of the aggregation of multiple expressions are available at separate outputs of the Reduction Node. The following exemplary aggregation types are available: Sum, Minimum, Maximum, First Value, Last Value, Count, and Average.

Figure 81:
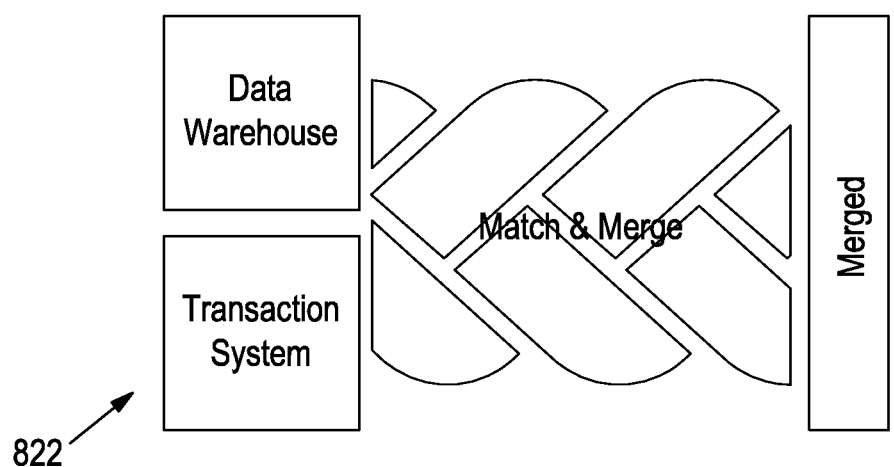
FIG. 81 illustrates schematically in a block diagram a match and merge node according to an embodiment of the invention.

The Match and Merge node 822, shown in FIG. 81, allows the developer to merge different messages into one message. Data from separate processing streams can be merged or grouped into a single stream. A developer can specify conditions, called a Matching Key, against which data should be matched. The Match and Merge node 822 is commonly used for reconciliation purposes, to compare and verify data coming from different sources.

The Sorting node 824, shown in FIG. 82, arranges messages into a particular order; it sorts incoming events within a batch of data. Source messages from a database can be ordered using Source node settings. Incoming events are sorted by attributes included in a list determined by the developer. Only attributes from the root segment of the Data Object, known as the Base Object, can be sorted. Sorting can be in ascending or descending order.

The Transformation node 826, shown in FIG. 83, is used to convert one message into another or perform simple operations on a complex message. Particular segments can be accumulated or processed by a specified Rule. The Transformation Node is one of the implementations of the Hierarchy Transformation in Microgen Aptitude, described above. The Transformation node 826 operates by default in an STP mode, but can also operate in Batch mode. The Batch mode must be used when there is a reduction link from the input root segment to the output root segment in the selected Hierarchy Transformation, otherwise, in the STP mode, the link would effectively execute an insertion operation instead of the reduction operation.

Input data records can be grouped into logical batches or transactional batches by Microgen Aptitude. In logical batches, data messages are grouped together depending on their attributes and source. In transactional batches, data messages are grouped together depending on their presence in a user indicated region of the data flow diagram.

A logical batch is a set of messages that are grouped together because of business reasons, such as all messages from one division. A logical batch can be determined in several ways. For example, a logical batch may be determined by Aptitude Source (e.g. all data included in one file), by a Batch Split node 814 within the Business Process Diagram, or by a Batch Merge node 800 from an STP stream of data.

Aptitude Sources working with some external system types may not have the ability to determine a logical batch, depending on the properties of the external system. Data messages are grouped into logical batches using the Data Object attributes' values. For example, all records from one division, and settings in Source Objects, such as all records from a source file, could be treated as one logical batch.

A Data Object represents an internal data format visible to the developer, whereas the external data format may be different, for example a database table or an XML file. A Data Object is a logical format for an underlying Aptitude object i.e. source, target, or reference object within the business process. It is also used for input and output of most processing nodes within a Business Process. An example of a Data Object is shown in a tree-like structure in FIG. 84(*a*). The shown tree-like structure in this example has a single layer, but it can be multi-layered.

An Aptitude Source node is the core node that specifies where an input message is taken from, and forms the input to a Business Process. The icon 828 corresponding to the Aptitude Source node is shown in FIG. 84(*b*). It reads data from external systems and its Base Object can be either a Data Object or Source Object. The Source node 828 determines the structure of the data passed to subsequent nodes in the Business Process. This node 828 is required as a starting point for most of Business Processes.

Figure 85:
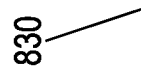
FIG. 85 shows an exemplary user interface for defining a logical batch.

A Logical Batch Definition tab 830 in Aptitude Source, shown in the FIG. 85, makes it possible to define the logical batch and specify the attributes that make up a logical batch using the logical batch definition form 832, and choose the order in which the records (messages) will appear at the Source output, using the logical batch sort form 834.

To increase performance and to allow the developer greater control of product behaviour it is possible to group input messages coming to one transaction region into one bigger transaction. It is possible to group messages, creating sets which contain a certain number of messages. Such a set of input data is called a Transactional Batch. For example, if a transaction batch size for the source is set to ten then all operations conducted as a result of processing of the ten subsequent messages received from this source will constitute one transaction. A Transactional batch is a set of data containing a certain number of records, e.g. 10 or 100. The use of Transactional batches increases performance, because the transaction is committed to the internal database for a group of records rather than for single records separately. If a Transactional Batch size equals zero, then all data is processed in Logical batches. If no Logical batches are defined, then all data is processed as one transaction batch. If a Logical batch is split into smaller Transactional batches, the Grouping nodes will still operate on the level of Logical batches.

The Logical batch contains at least one Transactional batch. Under some circumstances the size of a Transactional batch equals the size of a Logical batch. If the Logical batch is split into many Transactional batches, Grouping Nodes still work on the level of Logical Batches, i.e. they trigger their execution only when the whole Logical Batch is delivered to them. If there are no Grouping nodes, or if the Grouping nodes are on a transaction region border, then there is no need to wait to process each batch.

If the processing of a Transactional batch fails and leads to a broken batch, then the broken batch can be reprocessed. The broken batch may either be reprocessed excluding the broken message, or all messages in the batch can be treated as broken in which case the entire batch is reprocessed. The handling of such errors is controlled by several options in the configuration.

The developer sets the parameter for each Transaction region of the Business Process, allowing for a better programming environment and external systems adaptation.

The developer uses an Execution Error Handling form to determine how execution errors are handled in the event that any execution errors occur during the processing of a batch. An example of a developer interface 736 showing the different modes for Execution Error Handling is shown in FIG. 86.

In order to explain the modes of error handling, some terms are defined. Aptitude uses five record status codes: unprocessed, processing, processed, error and broken. Marking records as either "broken" or "error" ensures that they are not subsequently processed, but the two statuses "broken" and "error" have different results in the different error handling modes, as will be explained below. Initially, a record is in an unprocessed state. When the batch is created, and processing of the batch begins, the status of all records in the batch is changed to "processing". Once a record has been processed successfully, its status is changed to "processed". If an error occurs in processing a record, the status of the record is changed to "error". A fifth status, "broken", is used when the batch has not been successfully processed and those records marked "broken" should not be re-processed. The "broken" status prevents the records from being re-processed, and it is still possible to identify the record in which the error happened as it has the "error" status (rather than the broken status).

The following modes of error handling are available:

Reprocess Events 838: In case of an error, a rollback operation is performed on processed records, which withdraws all changes made during the batch processing both to the records and to external systems. The record that gave rise to the error is marked as "error", and then all records are reprocessed excluding the record which gave rise to the error.

Continue Processing 840: If this option is set, data processing is continued and the broken record is marked as "error". Neither a rollback operation nor reprocessing is performed. This mode may only be used in sequential, one Target, processes. After processing, records are marked as either "processed" or "error".

Break Batch Processing 842: Rollback is performed. All records contained in a batch where the error occurred are marked as "broken" except the record causing the error which is marked as an "error". Marking records as either "broken" or "error" ensures that they are not subsequently processed. Rollback is performed but processing of the batch is not repeated.

Stop Microflow Execution 844: Rollback is performed. All records contained in a batch where the error occurred are marked as "broken", and the record that gave rise to the error is marked as "error". The Project execution is terminated.

Mark Batch As Error 846: Rollback is performed. All records contained in a batch where the error occurred are marked as "error". In this mode, data can be processed in packages rather than individual records, which means processing is faster. However, the end user has no way of knowing which record caused the error. The batch is not re-processed.

Reprocess Events—Optimistic Mode 848: This mode works like a combination of the "Mark Batch As Error" and "Reprocess Events" modes. Processing starts in the "Mark Batch As Error" mode, assuming optimistically that there will be no errors. Data can be processed in packages rather than in individual records and the processing is fast. If there are no errors by the end of the batch, then the processing is completed in this mode. If there are errors, however, the end user will not know which record caused the error, as data was processed as a single package. In this situation, a rollback operation is performed and the processing is re-started in the "Reprocess Events" mode, which is slower but makes it possible to identify the record(s) that gave rise to the error. This record is then marked as "error", and then all records are reprocessed excluding the record which gave rise to the error (just as in the Reprocess Events mode).

The optimistic mode works well for a small or moderate number of errors, as it processes data significantly faster. The more errors however, the more times the batch processing has to be repeated, so in case of high error rate it may be slower.

Figure 87:
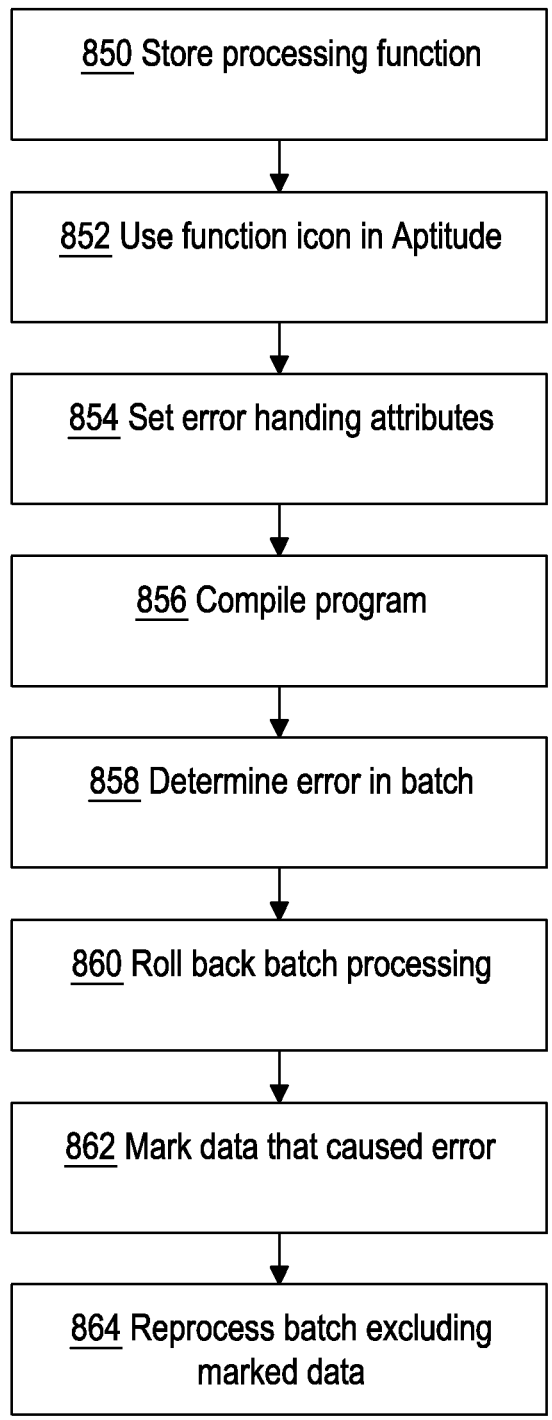
FIG. 87 is a flow diagram showing an exemplary error handling function of the invention.

The optimistic mode is summarized in FIG. 87, with the following numbering corresponding to the numbering of FIG. 87:

850. A processing function is stored in a memory.

852. A function icon corresponding to the processing function is used in an Aptitude data flow diagram.

854. The developer sets error handling attributes associated with the function icon.

856. The Aptitude data flow diagram is complied as a computer program.

858. During subsequent processing of a batch of data using the function, it is determined that one of the data messages in the batch has given rise to a processing error. If there are no errors, the batch execution completes at this step.

860. The batch processing is rolled back to obtain the original data batch.

862. The data message that gave rise to the processing error is marked.

864. The batch is reprocessed, excluding the marked data. This may be repeated if more errors occur.

Figure 88:
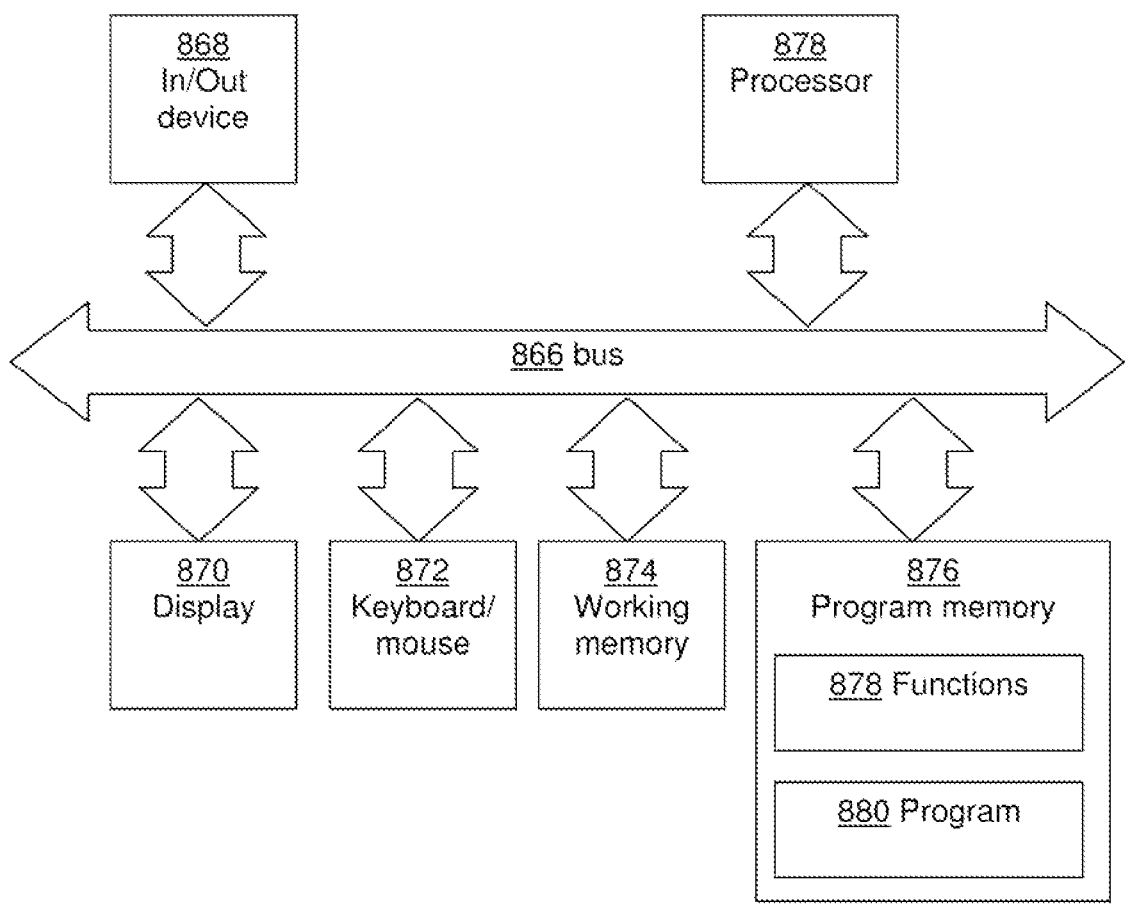
FIG. 88 illustrates schematically in a block diagram a computer device according to an embodiment of the invention.

Referring now to FIG. 88 herein, there is illustrated a computer device. The computer device is provided with a bus 866 for allowing different components of the computer device to communicate with one another. In in/out device 868 is provided, along with a display 870, a user input device 872 such as a keyboard/mouse, and a working memory 874. A program memory 876 is provided that contains a plurality of data processing functions 878 and a program 880 that allows the developer to manipulate one or more functions graphically using the user input device 872 and the display 870. A processor 878 is provided for executing the program 880.

We now describe functionality of Aptitude which allows Complex Rules in Aptitude to be used for processing hierarchical data structures, and particularly for transforming data having a first tree structure into data having a second tree structure.

We described above the concept of Hierarchy Transformation in Aptitude, which made use of a Segment Processor for each Segment Link, and we explained that the Segment Processor may be implemented using Attribute Mapping or using a Complex Rule. In that case the Complex Rule was embedded in the Hierarchy Transformation's Segment Link. However, as an alternative to this Aptitude allows a developer to use Complex Rules to transform one data structure into another, without the developer drawing Hierarchy Transformation's Segment Links between inbound and outbound segments. In this sense Complex Rules may be used as an alternative to Hierarchy Transformation.

In general Complex Rules may be used to transform instances of a hierarchical inbound data format into zero, one or more instances of a hierarchical outbound data format.

Complex Rules is a functionality that is alternative to Hierarchy Transformation with regard to some of the hierarchical data processing issues. In Aptitude, Complex Rules accept Data Objects, Enrichment Schemas and scalar parameters as the format of their input and accept Data Objects and scalar parameters as the format of their outputs. Simple Rules accept only scalar parameters for both input and output. No Context Links are allowed in Simple Rules, as they cannot process hierarchical data. The icons used for Simple and Complex Rules are different.

Complex Rules give the developer a lot of flexibility when constructing calculations intermixed with data transformation, but at some cost of visibility (as will be discussed below).

Complex Rules would not be recommended for example for the transformation given in the example in FIG. 18 because the Complex Rules would look more complicated and would require more imagination and comprehension from the developer.

But Complex Rules can be used to deal with issues that Hierarchy Transformation cannot. For example, a set of Complex Rules, when constructed properly, can produce virtually any number of outbound Data Format Instances compliant with different Data Formats because each Rule can have more than one output. In contrast Hierarchy Transformation has only one outbound Data Format. This ability of Complex Rules is useful when productions of Segment Instances based on two or more different Segments share the same calculation routine. To achieve this functionality in Hierarchy Transformation we would need to construct as many Hierarchy Transformations as the number of outbound Data Formats, which would be less efficient from the runtime performance perspective.

For non-advanced users the use of Complex Rules is recommended when hierarchy transformation is simple, but the scalar data calculation routines are complicated. Advanced users can use Complex Rules (sometimes embedded in Hierarchy Transformation's Segment Links as Segment Processors) to deal with transformations where Hierarchy Transformation itself would be less suitable.

In Complex Rules, a transformation prescription is constructed by the developer as follows:

embedding references to Rules inside other Rules by means of Rule Blocks.

assigning to the input of Rules a Segment Path within the inbound Data Format.

assigning to the output of Rules a Segment Path within the outbound Data Format.

connecting the Input Block of the embedding Rule with the input cell(s) of the embedded Rule Block(s) by means of Input Context Links.

connecting the Output Block of the embedding Rule with the output cell(s) of the embedded Rule Block(s) by means of Output Context Links.

These concepts will be illustrated by means of an example. Our task in the example is to construct a set of Complex Rules that will simply clone the inbound Message (which in the Hierarchical Transformation terminology is an "Inbound Data Format Instance") from input to output. There is little advantage to having such a set of Rules, of course, but this example is given for the purpose of illustration.

Figure 89:
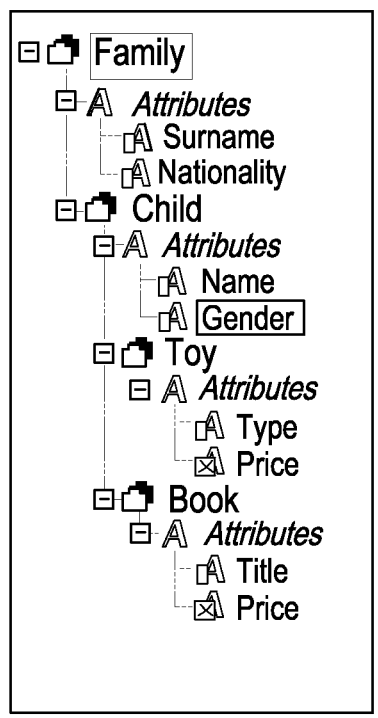
FIG. 89 shows an example data format displayed to a developer on a display device.
Figure 90:
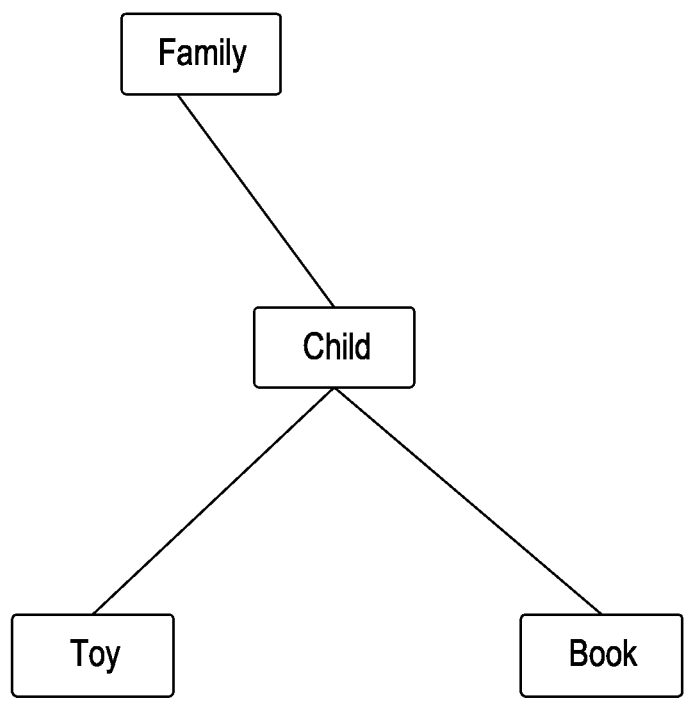
FIG. 90 is a schematic diagram of the data format of FIG. 89.

Let us presume we have a Data Object (which in the Hierarchical Transformation terminology is a "Data Format") of the same format that we used for the Inbound Data Format in the Hierarchy Transformation example of FIG. 18. FIG. 89 shows how this Data Object is displayed to a developer in Aptitude, and FIG. 90 is a schematic diagram of the Data Object.

Figure 91:
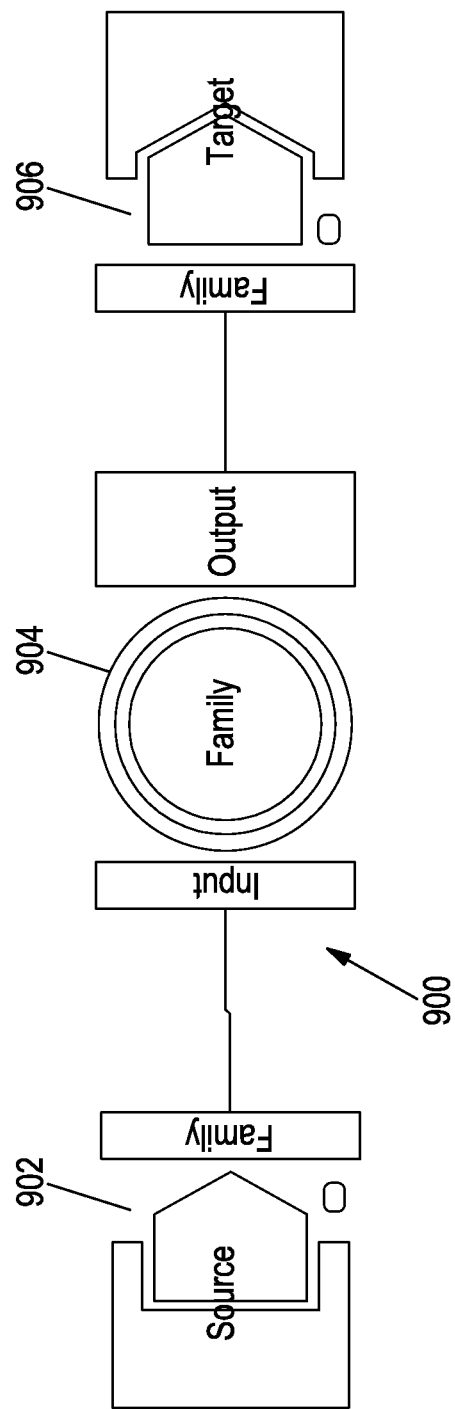
FIG. 91 shows a Microflow for use in the example.

FIG. 91 shows a Microflow 900 for use in our example. The Microflow 900—which is an Aptitude term for the top-level entity, represented by a flow chart, that triggers other entities (directly or indirectly)—contains three nodes connected by links. The Microflow 900 starts with a Source Node 902, which feeds a Complex Rule Node 904, which in turn feeds a Target Node 906.

Figure 92:
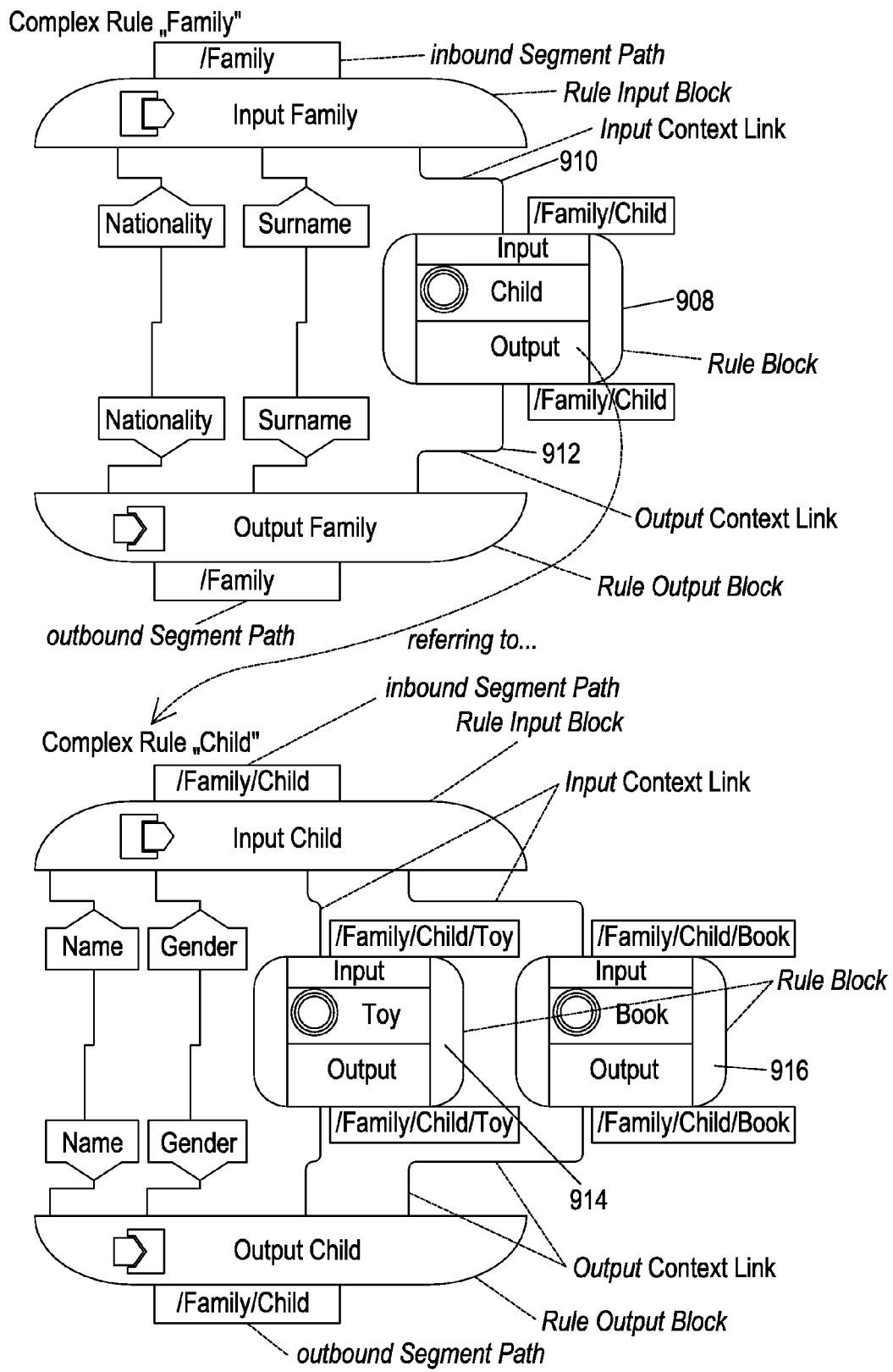
FIG. 92 shows a "Family" Complex Rule and a "Child" Complex Rule for use in our example.

FIG. 92 shows a "Family" Complex Rule and a "Child" Complex Rule for use in our example. The node 904 in the middle of the Microflow 900 of FIG. 91 represents the "Family" Complex Rule. The "Family" Complex Rule refers to (embeds) another Complex Rule—the "Child" Complex Rule—by means of Rule Block 908 and Context Links 910 and 912 shown in FIG. 92. The "Family" Complex Rule is the "embedding" rule for the "Child" Complex Rule.

Figure 93:
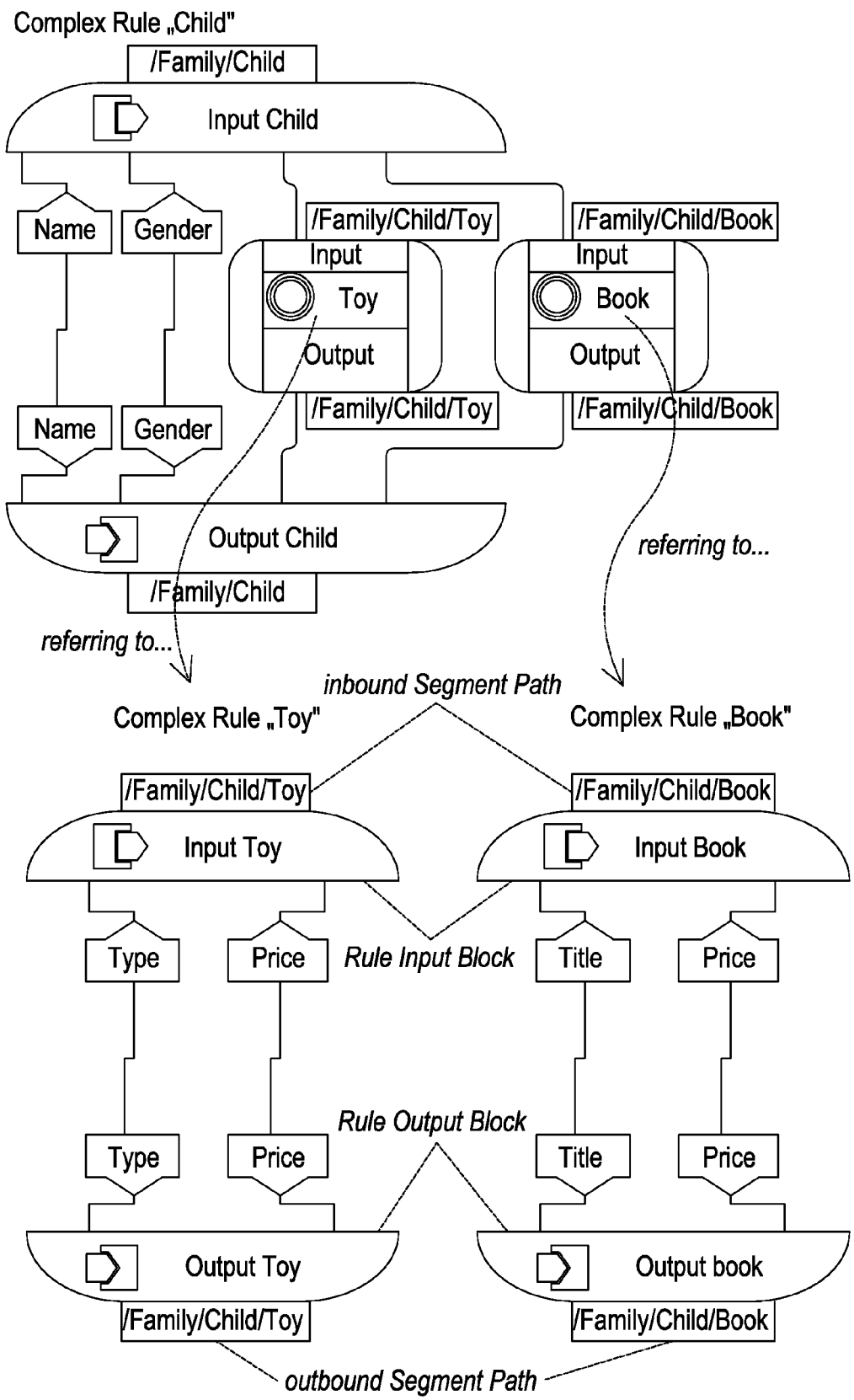
FIG. 93 shows the "Child" Complex Rule, together with two further Rules embedded within it, namely a "Toy" Complex Rule and a "Book" Complex Rule.

Complex Rule "Child" (referred to by "Family") also refers to (embeds) two other Complex Rules, namely the "Toy" Complex Rule and the "Book" Complex Rule by means of Rule Blocks 914 and 916 respectively, as illustrated in FIG. 93. Only one of these rules is displayed to the developer at any one time.

An important point to note here is the fact that when in Aptitude's Rules Editor, the developer works on and is presented with only one Rule at a time, the Rule being displayed on a Rule editor sheet (an area covered by a grid of lines). This plain view of the Blocks is very useful when it comes to flat, scalar data calculations, but is not so convenient when performing hierarchy transformations, as the developer can see only the "insides" of the currently edited Rule and the names of any Rules that this Rule refers to directly by means of Rule Blocks (as the name of the embedded rule is displayed in the Rule Block). For instance: Rule "Family", when opened in the editor, lets the developer know about the "Child" Rule— but not about the "Toy" nor "Book" Rules. To find out about those, the developer would need to open the "Child" Rule in another editor sheet.

Figure 94:
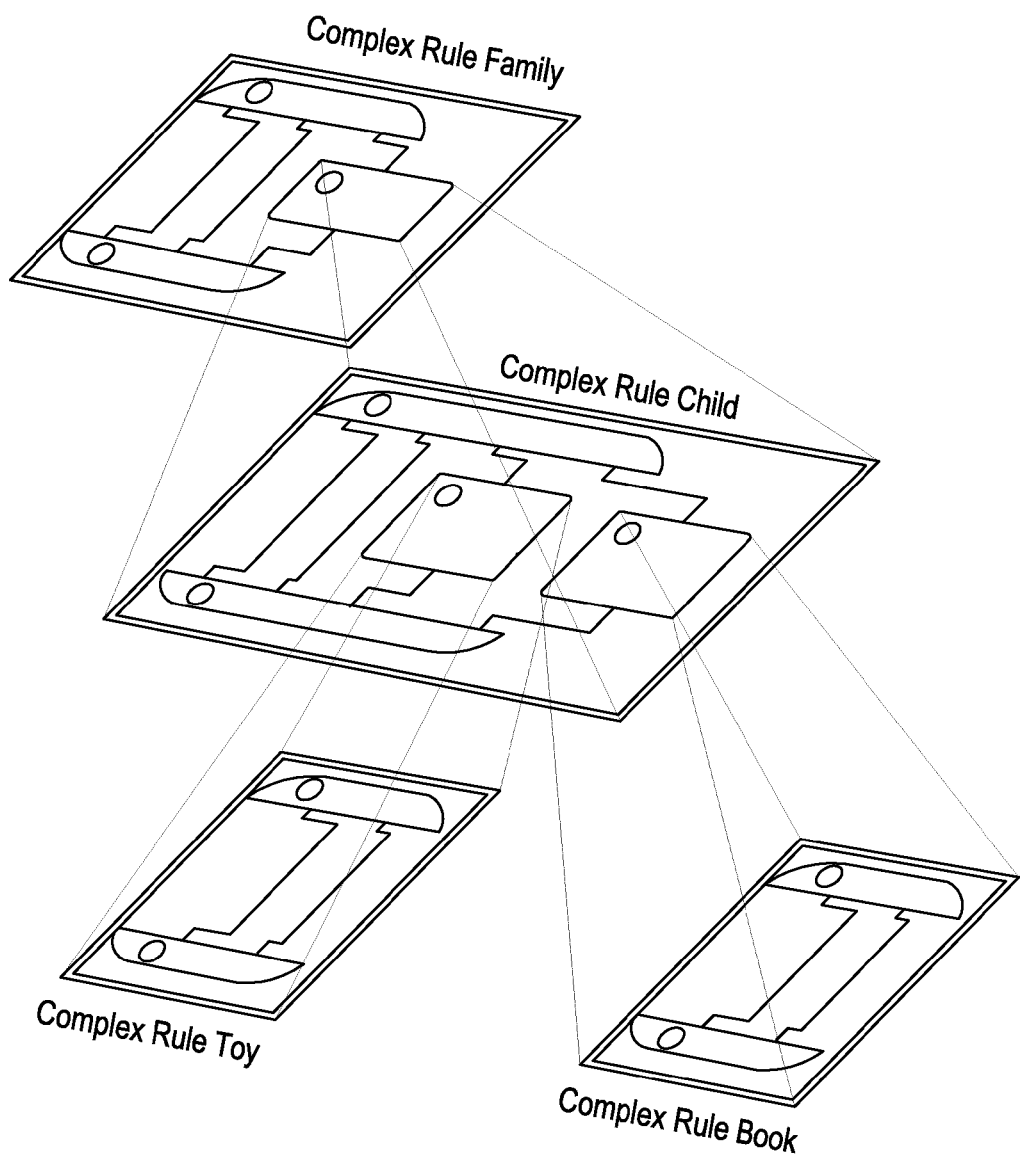
FIG. 94 is a schematic diagram illustrating the hierarchy of Rules used in our example.

Now, when we take all our Rules together, we will see that—more or less knowingly—we have created a hierarchy of Rules as illustrated in FIG. 94.

This hierarchy of Rules, when applied to a "Family" Data Object-compliant Message in runtime, will produce an exact copy of this Message.

Figure 95:
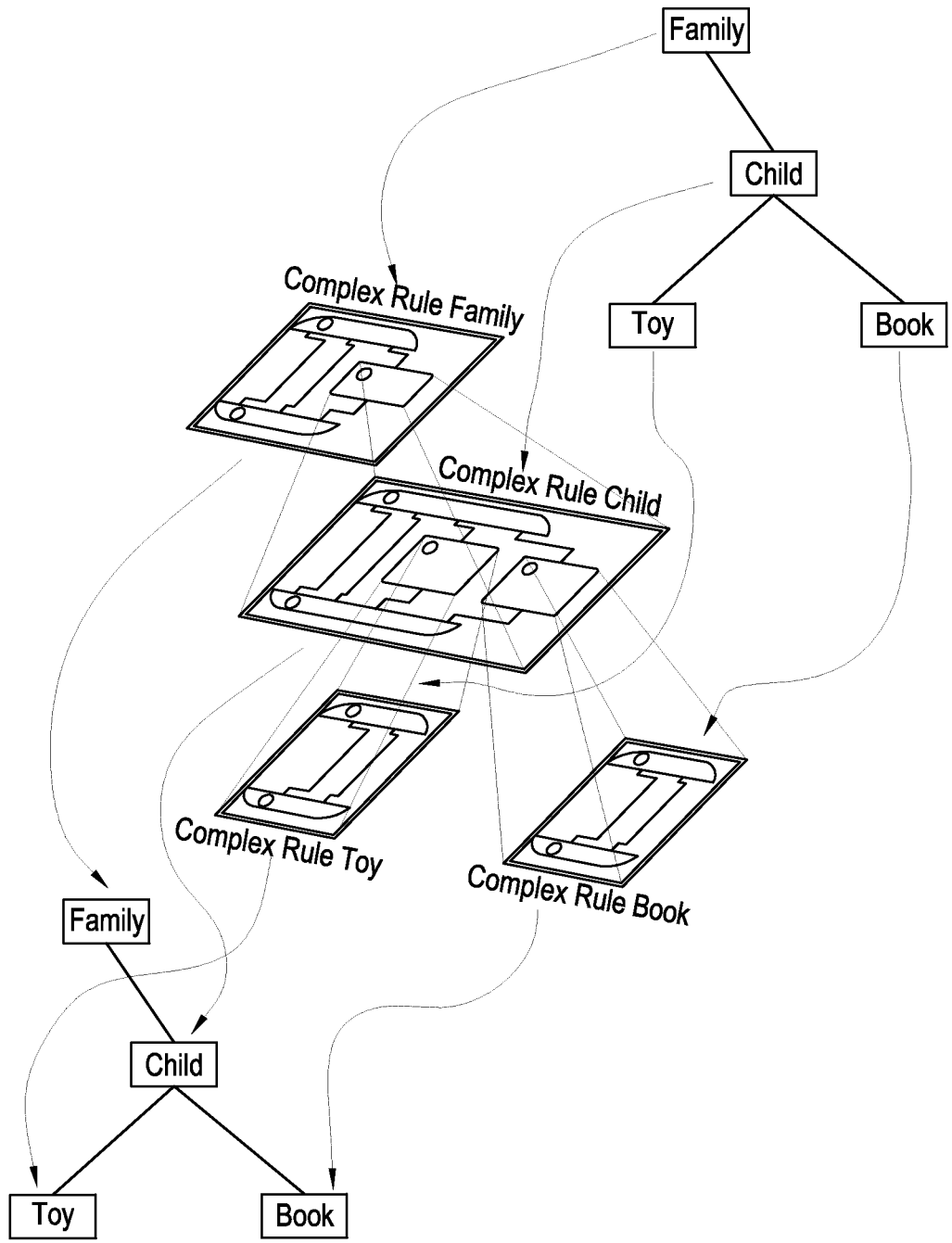
FIG. 95 is a perspective diagram illustrating how Rules in the hierarchy of Rules correspond with segments of the inbound and outbound data formats.

The "pseudo-perspective" view of FIG. 95 shows how particular Rules in the hierarchy of Rules are correlated with the inbound and outbound Data Format Segments, as declared by Segment Paths written in the Input and Output Blocks of these Rules. For example, referring to FIG. 93, the Input Block 918 of the "Child" Complex Rule is provided with a graphical element 920 which displays the inbound Segment Path of the rule, in this case "/Family/Child", and the Output Block 922 of the "Child" Complex Rule is provided with a graphical element 924 which displays the outbound Segment Path, in this case "/Family/Child".

The layout of the view of FIG. 95 is very much like the one presented in the Hierarchy Transformation example of FIG. 18, except that the direction is reversed—the inbound Data Structure is in the most distant scene here.

Figure 96A:
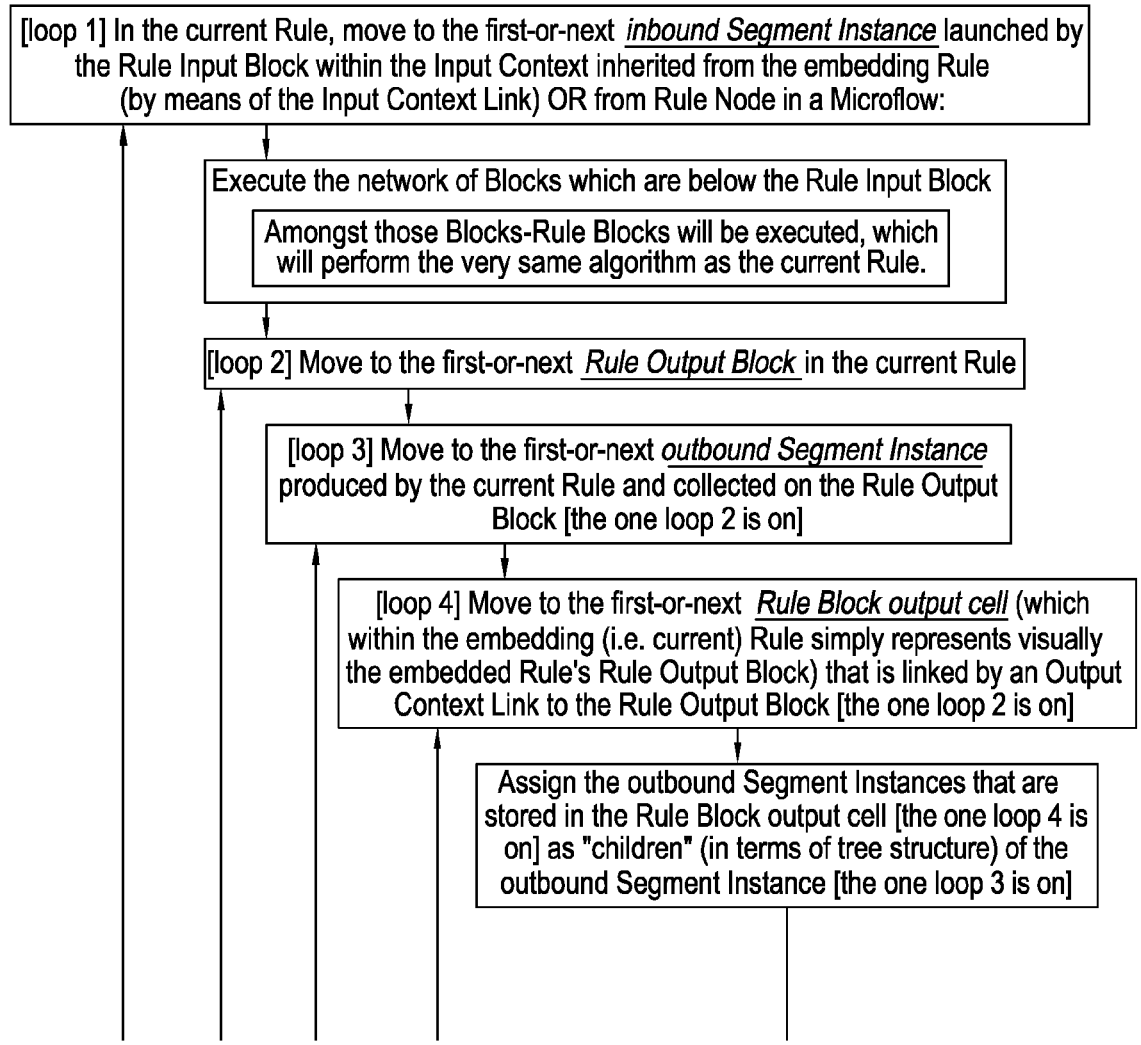
FIG. 96a/b is a flow chart which sets out the steps in an execution algorithm for executing the Rules in order to transform instances of one data format into another data format.
Figure 96B:
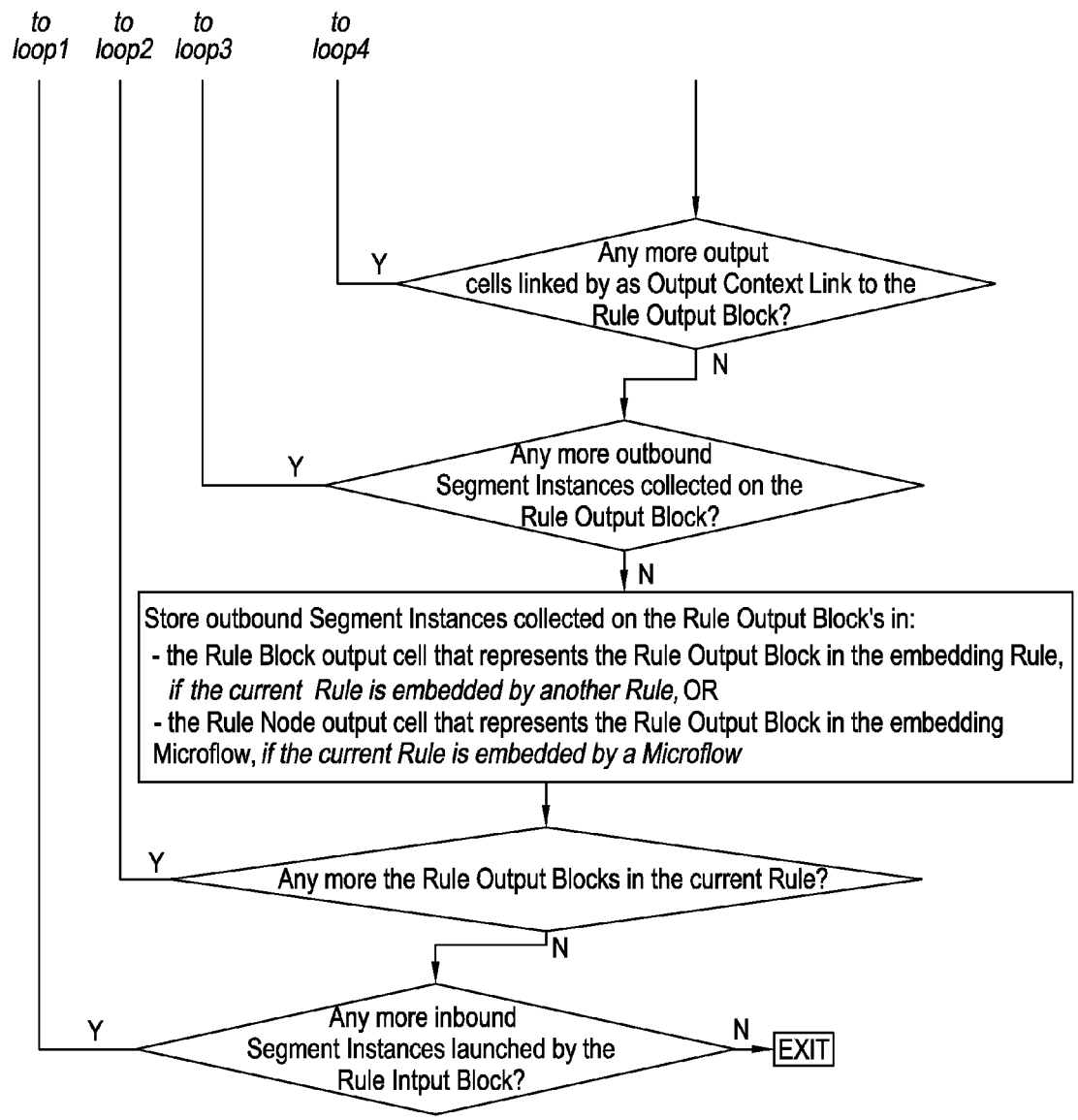

The Complex Rules execution algorithm, in the context of hierarchical data processing, can be described by the flow chart of FIG. 96*a/b*. The result of the execution of the algorithm are Messages (i.e. instances of Data Objects) that appear on the Rules' outputs.

Sometimes, during development, the number of levels in a hierarchy of Rules gets so large, that this is difficult for the developer to figure out how the Rules refer to each other or where the currently edited Rule is positioned in the hierarchy. To solve this problem Aptitude provides a browser, which we call a Complex Rules Navigator. The Navigator displays the hierarchy of the Rules together with connections to the inbound and the outbound Data Objects.

Figure 97:
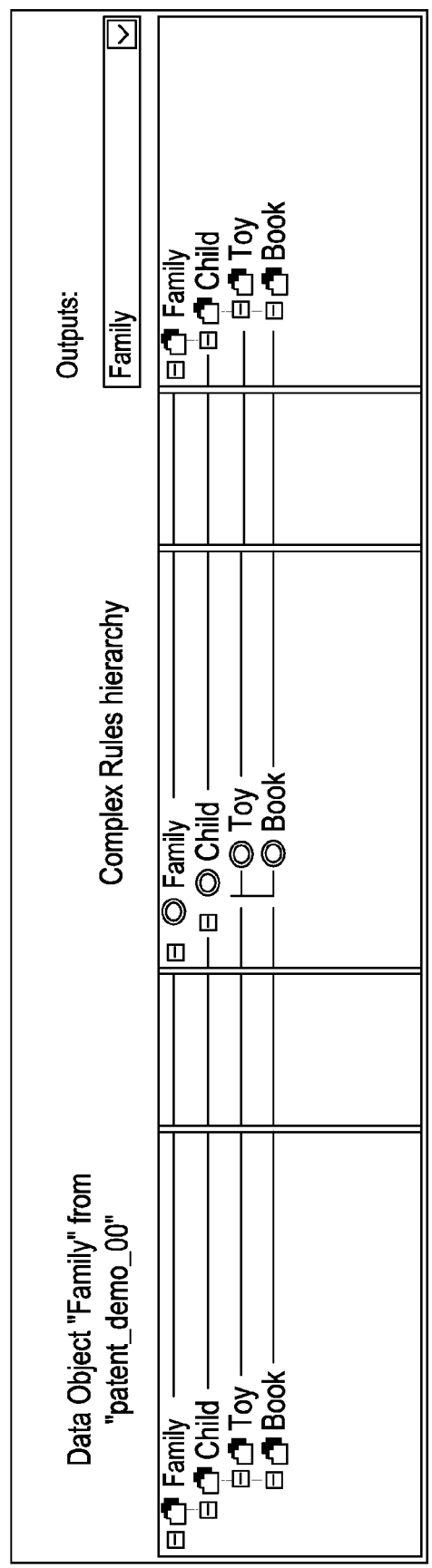
FIG. 97 shows a Complex Rule Navigator displayed to the developer for our example.
Figure 98:
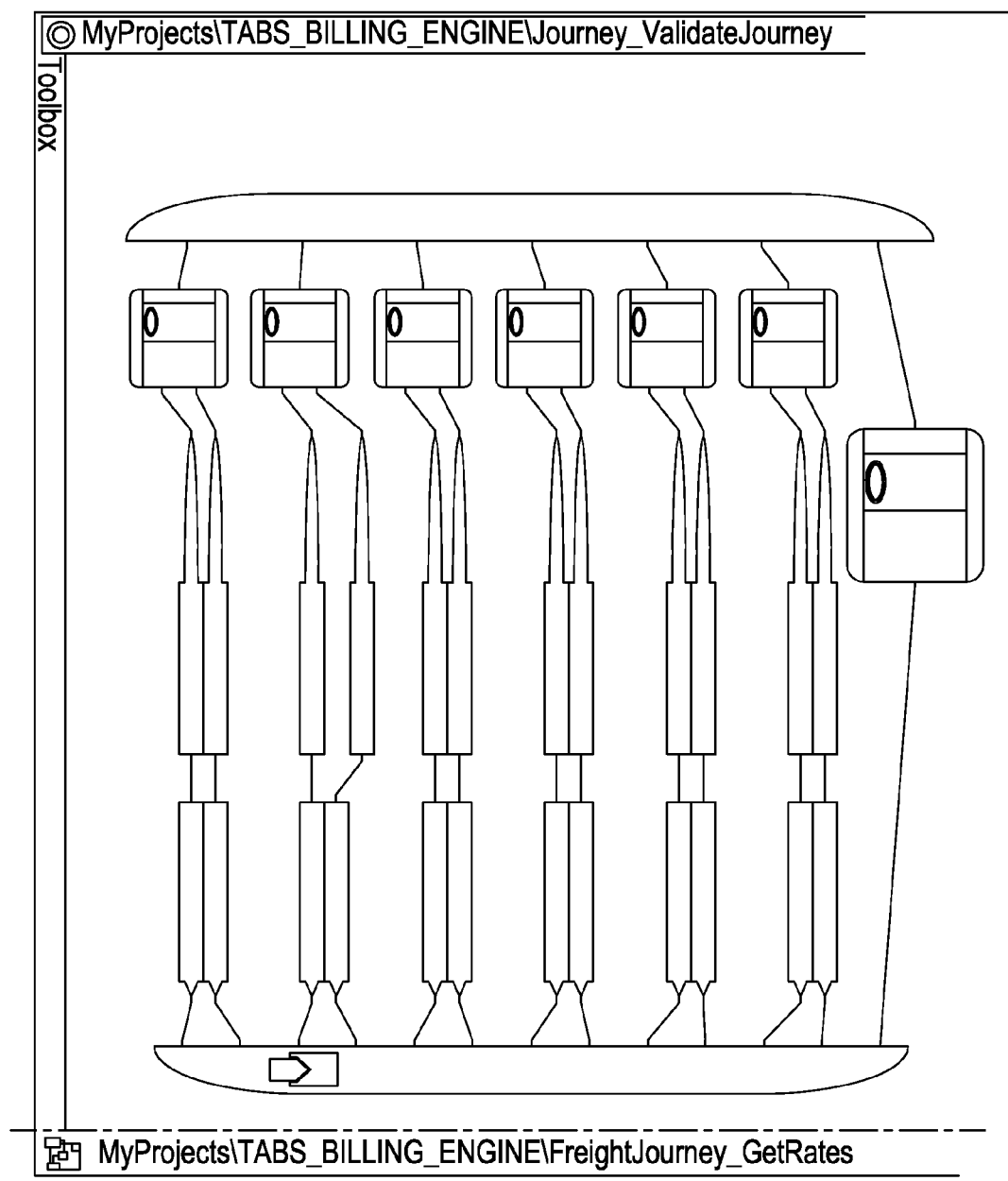
FIGS. 98 and 99 illustrate how the Complex Rule Navigator appears in cases of more complex transformations using Complex Rules.
Figure 98:
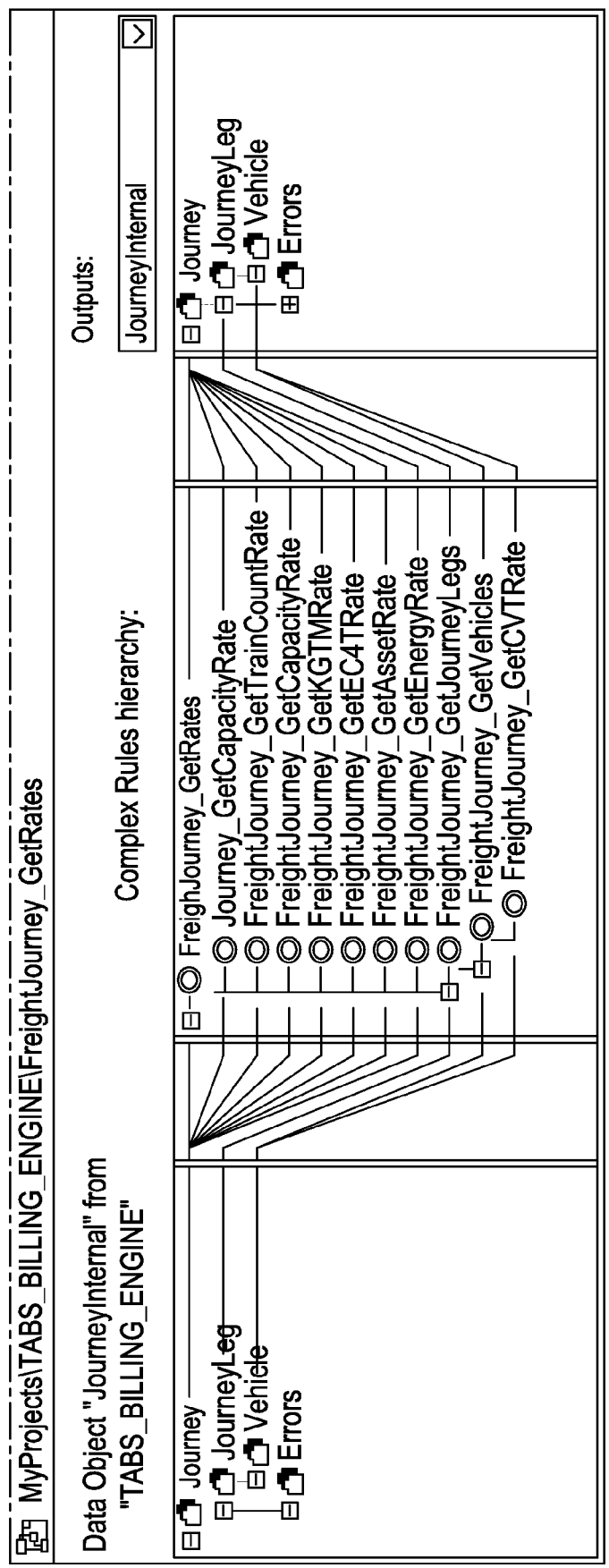
Figure 99:
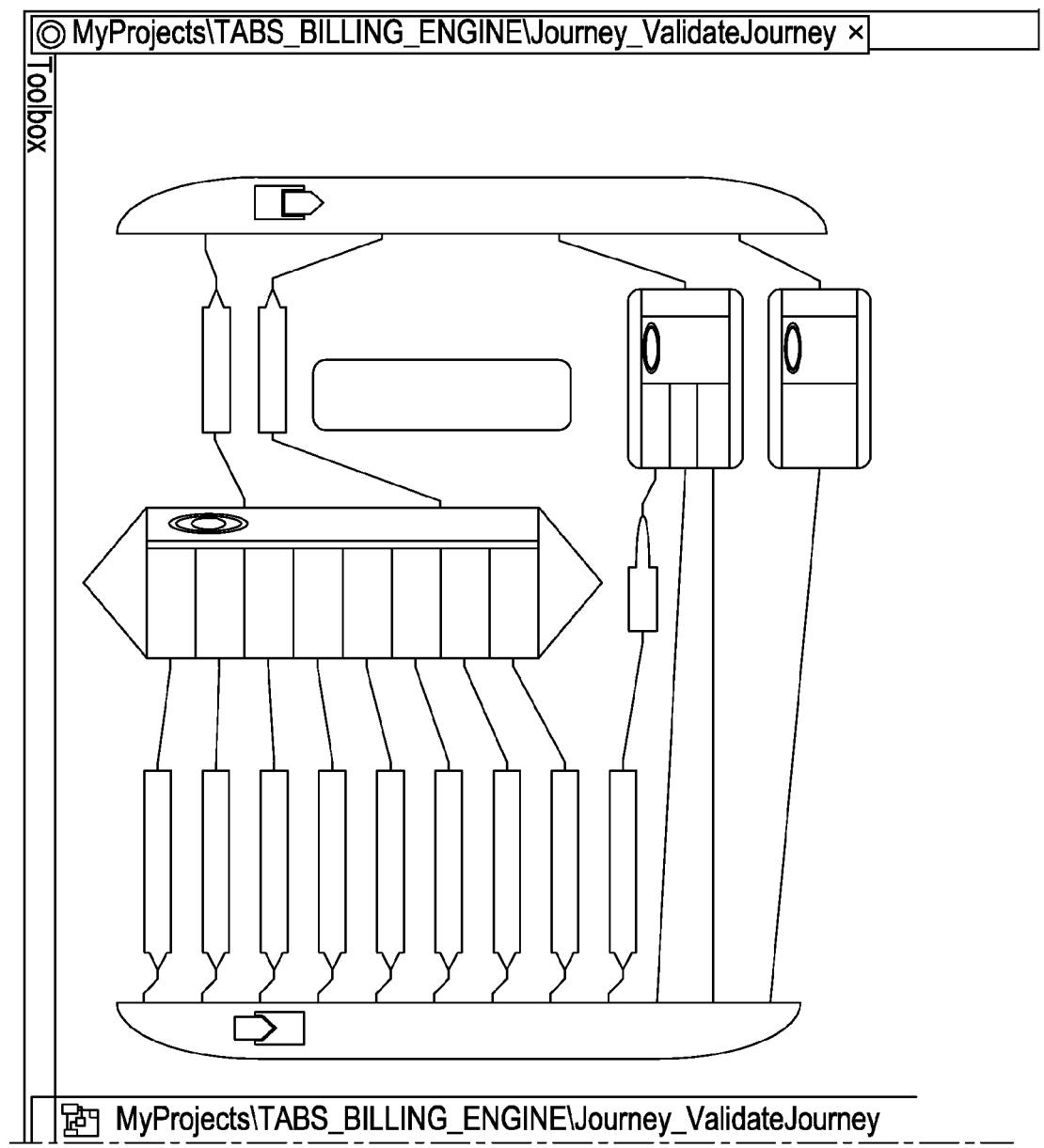
Figure 99:
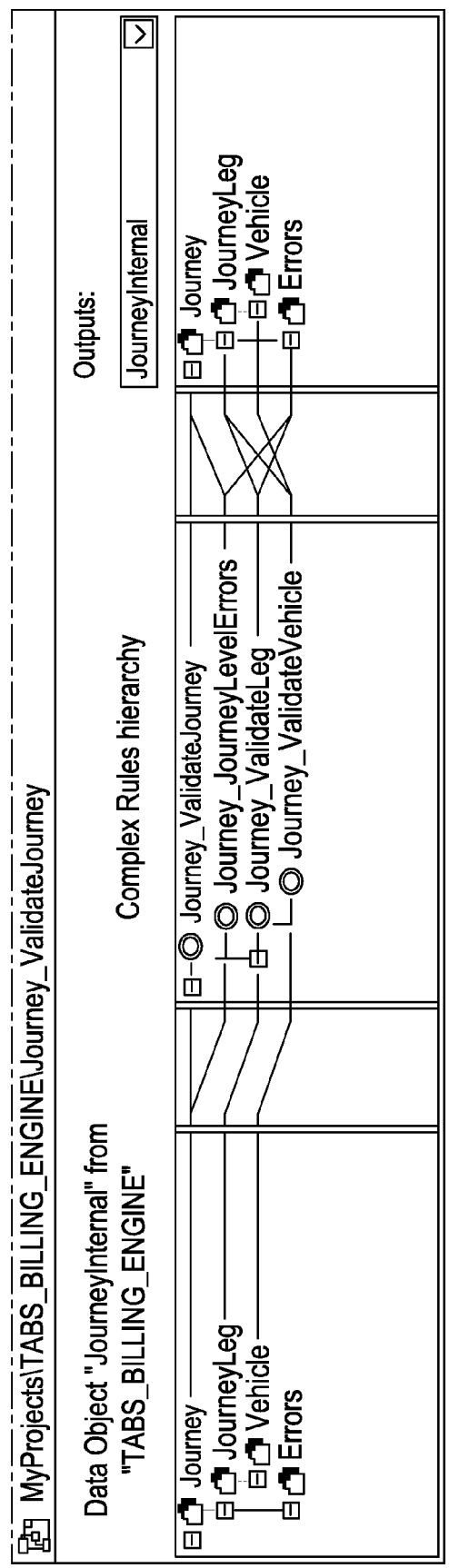

The Rules Navigator in the screenshot of FIG. 97 displays the structure of the "Family" example Complex Rule in relation to its inbound and outbound Data Objects The screenshots of FIGS. 98 and 99 show how two more complicated Complex Rules are displayed in the Complex Rules Navigator. It is important to note that, whilst in the simple example of FIG. 97 the Complex Rules hierarchy has the same tree structure as both the inbound and outbound Data Objects, this is not always the case, and the Complex Rules hierarchy can become very complicated, thus making it difficult for the developer to keep track of his or her place in the hierarchy of Rules. Indeed the developer may not even be aware that such a hierarchy of Rules exists, particularly if different Rules are worked on at different times, or by different developers. The Complex Rules Navigator thus provides a particular advantage in such situations.

The Complex Rule Navigator interprets the references between Rules and displays them in the form of a hierarchy of Rules correlated with the inbound and the outbound Data Formats.

Returning to FIG. 97 it can be seen that the Navigator displays the hierarchy of Rules to the developer in a convenient and intuitive manner. Each Rule is represented by a small icon alongside of which is displayed the name of the Rule. An embedded Rule is displayed below its embedding Rule, and also displaced slightly to the right. For example the "Child" Rule icon and name are displayed below the "Family" Rule icon and name, and are displaced slightly to the right. Different parts of the tree structure of the Complex Rules hierarchy may be expanded or collapsed by clicking on + or − symbols displayed beside the Complex Rule icons and names.

What is claimed is:

1. A method of creating a form-based web application using a computing device having at least a processor, a memory, a display device and an input device, the method comprising:

retrieving from said memory and providing on said display device a number of form icons, each form icon representing a form to be displayed to a user of the application;

retrieving from said memory and providing on said display device a number of service icons, each service icon representing a service which is callable in response to actions of said user;

allowing a developer of the application to use said input device to select one or more of said form icons and one or more of said service icons and to arrange the selected icons on the display device;

allowing the developer to use said input device to arrange links between said selected icons, wherein said links together with the selected icons form an Application Diagram which represents the navigation of a user of the application between the forms and services represented by the selected form and service icons respectively;

compiling, at said processor, said application on the basis of said Application Diagram, wherein each form icon is associated with only one data object relating to all data associated with that form, and wherein the links between the form and service icons represent both the navigation path of said user and the flow of data between the forms and services; and allowing the developer to create a number of different roles, and wherein users of the application corresponding with said different roles are given different security permissions when using the application.

2. A method as claimed in claim 1, wherein each form icon represents a number of pages which are displayed to a user of the application in a modal fashion.

3. A method as claimed in claim 1, which further includes allowing the developer to select from any or all of the following icons: a login icon, an exit icon, and a logout icon.

4. A method as claimed in claim 1, which further includes allowing the developer to select from a conversion icon which converts one data object to another data object.

5. A method as claimed in claim 1, which further includes allowing the developer to select from an input/output icon which allows embedding of one Application Diagram into another.

6. A method as claimed in claim 1, which further includes allowing the developer to select from a navigation jump icon which provides a jump to another point in the Application Diagram.

7. A method as claimed in claim 1, which further comprises:

allowing the developer to create a form template which defines the layout of a form; and creating a form based on the form template.

8. A method as claimed in claim 1, wherein each form or page may contain one or more controls, each of which may be activated by a user of the form or page, and wherein the method further comprises:
allowing the developer to associate each control with one or more of said roles; and
compiling the application such that a user of the application may activate a control only if the user has a role which is one of the roles associated with that control.

9. A method as claimed in claim 1, which further comprises: compiling the application such that as to allow said roles to be automatically mapped to different security levels in another application.

10. A method as claimed in claim 1 wherein said step of compiling the application comprises:
first compiling the application into an intermediate language which is technology independent and which may be deployed to more than one web technology; and
subsequently generating a final application in a particular technology.

11. A method as claimed in claim 10, wherein said particular technology is ASP.NET technology or JSP/JSF technology.

12. A method as claimed in claim 1, wherein the application is a web application for running on a web server, and wherein at least one of said services is arranged to provide data for web pages.

13. A computer-readable storage medium containing computer-readable instructions for performing a method of creating a form-based web application using a computing device having at least a processor, a memory, a display device and an input device, the method comprising:
retrieving from said memory and providing on said display device a number of form icons, each form icon representing a form to be displayed to a user of the application;
retrieving from said memory and providing on said display device a number of service icons, each service icon representing a service which is callable in response to actions of said user;
allowing a developer of the application to use said input device to select one or more of said form icons and one or more of said service icons and to arrange the selected icons on a display;
allowing the developer to use said input device to arrange links between said selected icons, wherein said links together with the selected icons form an Application Diagram which represents the navigation of a user of the application between the forms and services represented by the selected form and service icons respectively;
compiling, at said processor, said application on the basis of said Application Diagram, wherein each form icon is associated with only one data object relating to all data associated with that form, and wherein the links between the form and service icons represent both the navigation path of said user and the flow of data between the forms and services; and
allowing the developer to create a number of different roles, and wherein users of the application corresponding with said different roles are given different security permissions when using the application.

14. A method of deploying a form-based web application to a web server comprising:
first compiling the application into an intermediate language to form a deployment package which is technology independent and which may be deployed to more than one web technology;
compiling said deployment package to form a final application in a web technology;
deploying said final application to said web server; and
allowing the developer to create a number of different roles, and wherein users of the application corresponding with said different roles are given different security permissions when using the application.

15. A method of creating a form for a form-based web application using a computing device having at least a processor, a memory, a display device and an input device, the method comprising:
retrieving from said memory and providing on said display device a number of controls for use in a form;
allowing a developer of the application to create a form template and use said input device to select one or more of said controls on the display device and to arrange the controls on the form template so as to define the layout of the form template;
allowing the developer to create a form based on the layout of the form template; and
allowing the developer to create a number of different roles, and wherein users of the application corresponding with said different roles are given different security permissions when using the application.

16. A method as claimed in claim 15 which further comprises:
allowing the developer to amend said form template by making one or more changes to the layout of said form template,
providing the developer with an option to update all forms which have been created using said form template, and
if the developer so chooses, including said changes in all forms which have been created using said form template.

17. A method as claimed in claim 15 which further comprises:
allowing the developer to amend a form by making one or more changes to the layout of the form;
providing the developer with an option to update the form template on which the form is based with any or all of the changes made to the form, and
if the developer so chooses, including said changes in the form template on which the form is based so as to create an amended form template.

* * * * *